United States Patent
Patil et al.

(10) Patent No.: US 10,075,950 B2
(45) Date of Patent: Sep. 11, 2018

(54) TRAFFIC ADVERTISEMENT IN NEIGHBOR AWARE NETWORK (NAN) DATA PATH

(71) Applicant: QUALCOMM Incorporated, San Diego, CA (US)

(72) Inventors: Abhishek Pramod Patil, San Diego, CA (US); Santosh Paul Abraham, San Diego, CA (US); Alireza Raissinia, Monte Sereno, CA (US); George Cherian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 273 days.

(21) Appl. No.: 14/960,030

(22) Filed: Dec. 4, 2015

(65) Prior Publication Data

US 2016/0174221 A1    Jun. 16, 2016

Related U.S. Application Data

(60) Provisional application No. 62/091,081, filed on Dec. 12, 2014, provisional application No. 62/129,536, (Continued)

(51) Int. Cl.
*H04W 72/04* (2009.01)
*H04W 68/00* (2009.01)
(Continued)

(52) U.S. Cl.
CPC ....... *H04W 72/0446* (2013.01); *H04L 5/0055* (2013.01); *H04W 68/005* (2013.01);
(Continued)

(58) Field of Classification Search
CPC ........... H04W 72/0446; H04W 68/005; H04W 72/12; H04W 84/18; H04W 74/06; H04L 5/0055
See application file for complete search history.

(56) References Cited

U.S. PATENT DOCUMENTS 7,551,948 B2    6/2009    Meier et al.
7,684,333 B1    3/2010    Dasylva et al.
(Continued)

FOREIGN PATENT DOCUMENTS

EP    1589702 A1    10/2005
EP    1680886 A1    7/2006
(Continued)

OTHER PUBLICATIONS

Brownfield, M. I, "Energy-efficient Wireless Sensor Network MAC Protocol," Dissertation to the Faculty of Virginia Polytechnic Insitute and State University, Mar. 31, 2006, Retrieved from the Internet : URL: https://theses.lib.vt.edu/theses/available/etd-04102006-170423/unrestricted/Brownfield_Energy_Efficient_Wireless_Sensor_Network_MAC_Protocols.pdf, pp. 1-202.
(Continued)

*Primary Examiner* — Thai Nguyen
(74) *Attorney, Agent, or Firm* — Toler Law Group, PC.

(57) ABSTRACT

A method of communication includes generating a traffic advertisement at a particular device. The traffic advertisement indicates availability of data to be sent by the particular device to multiple devices. The method also includes sending, from the particular device, the traffic advertisement during a paging window. The method further includes receiving an unavailable message from a first device of the multiple devices during a data transmission window that is subsequent to the paging window. The method also includes, in response to receiving the unavailable message from the first device, refraining from sending first data from the particular device to the first device during the data transmission window.

26 Claims, 49 Drawing Sheets

Related U.S. Application Data filed on Mar. 6, 2015, provisional application No. 62/165,106, filed on May 21, 2015, provisional application No. 62/195,257, filed on Jul. 21, 2015.

(51) Int. Cl.
  *H04W 72/12* (2009.01)
  *H04L 5/00* (2006.01)
  *H04W 74/06* (2009.01)
  *H04W 84/18* (2009.01)

(52) U.S. Cl.
  CPC ............ *H04W 72/12* (2013.01); *H04W 74/06* (2013.01); *H04W 84/18* (2013.01)

(56) References Cited

U.S. PATENT DOCUMENTS

| | | |
|---|---|---|
| 8,385,338 B2 | 2/2013 | Li et al. |
| 8,542,620 B2 | 9/2013 | Sampathkumar |
| 8,611,268 B1 | 12/2013 | Thandaveswaran |
| 2005/0052318 A1 | 3/2005 | Jendbro et al. |
| 2005/0141548 A1 | 6/2005 | Koo et al. |
| 2005/0220131 A1 | 10/2005 | Ginzburg et al. |
| 2005/0237984 A1 | 10/2005 | Benveniste |
| 2006/0050673 A1 | 3/2006 | Park et al. |
| 2006/0280194 A1 | 12/2006 | Jang et al. |
| 2007/0025297 A1 | 2/2007 | Lee et al. |
| 2007/0133458 A1 | 6/2007 | Chandra et al. |
| 2007/0143637 A1 | 6/2007 | Tsai |
| 2007/0242695 A1 | 10/2007 | Xu |
| 2007/0286099 A1 | 12/2007 | Stocklein et al. |
| 2008/0232287 A1 | 9/2008 | Shao et al. |
| 2009/0073948 A1 | 3/2009 | Pani et al. |
| 2009/0232042 A1 | 9/2009 | Kneckt et al. |
| 2010/0062725 A1 | 3/2010 | Ryu et al. |
| 2010/0165896 A1 | 7/2010 | Gong et al. |
| 2011/0009158 A1 | 1/2011 | Lee et al. |
| 2011/0199953 A1 | 8/2011 | Seok |
| 2012/0008490 A1 | 1/2012 | Zhu |
| 2012/0009972 A1 | 1/2012 | Viering et al. |
| 2012/0155357 A1 | 6/2012 | Gong et al. |
| 2012/0263086 A1 | 10/2012 | Liu et al. |
| 2012/0314694 A1 | 12/2012 | Hsieh |
| 2013/0051293 A1 | 2/2013 | Wentink et al. |
| 2013/0128798 A1 | 5/2013 | Liu |
| 2013/0182643 A1 | 7/2013 | Pazos et al. |
| 2013/0272186 A1 | 10/2013 | Mohanty et al. |
| 2013/0294261 A1 | 11/2013 | Ghosh et al. |
| 2013/0294354 A1 | 11/2013 | Zhang et al. |
| 2013/0303202 A1 | 11/2013 | Jafarian et al. |
| 2013/0329627 A1 | 12/2013 | Liu |
| 2013/0329658 A1 | 12/2013 | Liu |
| 2014/0071874 A1 | 3/2014 | Li et al. |
| 2014/0112224 A1 | 4/2014 | Jafarian et al. |
| 2014/0140261 A1 | 5/2014 | Kim et al. |
| 2014/0204826 A1 | 7/2014 | Cherian |
| 2014/0293992 A1 | 10/2014 | Abraham et al. |
| 2014/0302786 A1 | 10/2014 | Kasslin et al. |
| 2014/0302787 A1 | 10/2014 | Rantala et al. |
| 2014/0313966 A1 | 10/2014 | Shukla et al. |
| 2014/0314060 A1 | 10/2014 | Park et al. |
| 2014/0321317 A1 | 10/2014 | Kasslin et al. |
| 2015/0009989 A1 | 1/2015 | Han et al. |
| 2015/0023236 A1 | 1/2015 | Choi et al. |
| 2015/0036540 A1 | 2/2015 | Kasslin et al. |
| 2015/0055577 A1 | 2/2015 | Han et al. |
| 2015/0063232 A1 | 3/2015 | Choi et al. |
| 2015/0098459 A1 | 4/2015 | Lee et al. |
| 2015/0124784 A1 | 5/2015 | Choi et al. |
| 2015/0172996 A1 | 6/2015 | Park et al. |
| 2015/0173015 A1 | 6/2015 | Lee et al. |
| 2015/0189673 A1 | 7/2015 | Park et al. |
| 2015/0200811 A1 | 7/2015 | Kasslin et al. |
| 2015/0208444 A1 | 7/2015 | Park et al. |
| 2015/0215832 A1 | 7/2015 | Fitzpatrick |
| 2015/0230179 A1 | 8/2015 | Gupta et al. |
| 2015/0319235 A1 | 11/2015 | Liu et al. |
| 2015/0341880 A1 | 11/2015 | Seok et al. |
| 2015/0365885 A1* | 12/2015 | Yang ................ H04W 4/06 370/312 |
| 2016/0014565 A1 | 1/2016 | Segev et al. |
| 2016/0029403 A1* | 1/2016 | Roy ................ H04W 72/0406 370/336 |
| 2016/0037559 A1 | 2/2016 | Malik et al. |
| 2016/0073340 A1 | 3/2016 | Xue et al. |
| 2016/0128101 A1 | 5/2016 | Park et al. |
| 2016/0157089 A1 | 6/2016 | Qi et al. |
| 2016/0165653 A1 | 6/2016 | Liu et al. |
| 2016/0174136 A1 | 6/2016 | Patil et al. |
| 2016/0174137 A1 | 6/2016 | Patil et al. |
| 2016/0174196 A1 | 6/2016 | Patil et al. |
| 2016/0174219 A1 | 6/2016 | Patil et al. |
| 2016/0174220 A1 | 6/2016 | Patil et al. |
| 2016/0174225 A1 | 6/2016 | Patil et al. |
| 2016/0198006 A1 | 7/2016 | Tsai et al. |
| 2016/0227443 A1 | 8/2016 | Tomici et al. |
| 2016/0227467 A1 | 8/2016 | Tomici et al. |
| 2016/0234124 A1 | 8/2016 | Tomici et al. |
| 2016/0249409 A1 | 8/2016 | Kim et al. |
| 2016/0345295 A1 | 11/2016 | Yang et al. |
| 2016/0353470 A1 | 12/2016 | Liu et al. |
| 2017/0127443 A1* | 5/2017 | Jeong ................ H04W 74/06 |

FOREIGN PATENT DOCUMENTS

| | | |
|---|---|---|
| EP | 2595133 A1 | 5/2013 |
| EP | 2632209 A2 | 8/2013 |
| EP | 2869653 A1 | 5/2015 |
| WO | 2006062292 A1 | 6/2006 |
| WO | 2008115282 A2 | 9/2008 |
| WO | 2008115813 A1 | 9/2008 |
| WO | 2009047722 A2 | 4/2009 |
| WO | 2009135996 A1 | 11/2009 |
| WO | 2013134231 A1 | 9/2013 |
| WO | 2013169876 A1 | 11/2013 |
| WO | 2014003463 A1 | 1/2014 |
| WO | 2014047125 A1 | 3/2014 |
| WO | 2014085142 A1 | 6/2014 |
| WO | 2014176079 A1 | 10/2014 |
| WO | 2015142932 A1 | 9/2015 |

OTHER PUBLICATIONS

International Search Report and Written Opinion for International Application No. PCT/US2015/064559, ISA/EPO, dated Aug. 8, 2016, 25 pp.

Partial International Search Report for International Application No. PCT/US2015/064559, ISA/EPO, dated Apr. 11, 2016, 8 pgs.

Wu, Shan-Hung, et al., "Collaborative Wakeup in Clustered Ad Hoc Networks," IEEE Journal on Selected Areas in Communications, Sep. 2011, vol. 29, No. 8, IEEE, Piscataway, pp. 1585-1594.

* cited by examiner

Traffic Announcement Attribute ~2234

| Field | Size (octets) | Value | Description |
|---|---|---|---|
| Attribute ID | 1 | | Identifies the type of NAN attribute |
| Length | 2 | Variable | Length of the following fields in the attribute |
| NDL Group ID | 6 | | Data Link Group Identifier |
| Traffic Indicator | Variable | | TLV |

2210, 2211, 2212, 2213

Traffic Indicator Field ~2213

| Field | Size (octets) | Value | Description |
|---|---|---|---|
| Type | 1 | Variable | Indicates type of the traffic indicator (e.g., a bloom filter type, a TIM type, an ATIM type, or an address list type) |
| Length | 2 | Variable | Indicates length of the value field |
| Value | Variable | Variable | Traffic indicator (e.g., a bloom filter, a TIM, an ATIM, or a list of MAC addresses) |

Traffic Announcement Attribute 2334

| | Field | Size (octets) | Description |
|---|---|---|---|
| 2210 | Attribute ID | 1 | Identifies the type of NAN attribute |
| 2211 | Length | 2 | Length of the following fields in the attribute |
| 2212 | NDL Group ID | 6 | Data Link Group Identifier |
| 2313 | Page Control | 1 | Indicates which fields are present |
| 2317 | Sequence of PDLs | Variable | One or more Paged Device Lists |

Page Control Field 2313

| | Field | Size (bits) | Value | Description |
|---|---|---|---|---|
| 2314 | Broadcast/Multicast | 1 | 0-1 | Indicates whether device has multicast traffic to send |
| 2315 | Number of PDLs | 3 | 0-7 | Indicates a number of PDLs carried |
| 2316 | Reserved | 4 | | |

Paged Device List (PDL) 2318

| | Field | Size (octets) | Description |
|---|---|---|---|
| 2319 | PDL Control | 2 | |
| 2320 | List of Devices | Variable | Indicates one or more devices |

PDL Control Field 2319

| | Field | Size (bits) | Description |
|---|---|---|---|
| 2321 | Length | 8 | Length of PDL |
| 2322 | QoS Category | 2 | 00 AC_VO; 01 AC_VI; 10 AC_BE; 11 AC_BK |
| 2323 | Type | 2 | 00 – MAC address list type; 01 – bloom filter type; 10 – TIM bitmap type |
| 2324 | Number of Octets Per Addr. | 2 | When type = 00, indicates number of bytes (≤6) of MAC address indicated 00 – all 6 octets; 01 – 1 octet (LSB); 10 – 2 octets (LSB); 11 – 4 octets (LSB) When type = 01, indicates bloom filter index When type = 10, indicates bitmap control and partial virtual bitmap |

*FIG. 23*

NDL Negotiation Attribute ← 2534

| | Field | Size (octets) | Value | Description |
|---|---|---|---|---|
| 2510 | Attribute ID | 1 | 0x0C | Identifies the type of NAN attribute |
| 2511 | Length | 2 | Variable | Length of the following fields in the attribute |
| 2512 | MAC Address | 6 | Variable | Device MAC Address for Data Link |
| 2513 | Group ID | 6 | Variable | Unique NDL Group ID |
| 2514 | Validity Time | 2 | Variable | Number of DW intervals this attribute is valid |
| 2515 | NDL Control | 1 | Variable | Indicates/Presence and absence of bits |
| 2519 | Security Type | 1 | Variable | Indicates the authentication protocol and cipher suites supported by the device |
| 2516 | NDL Logical Channel Indicator | 2 | Variable | Present if indicated by NDL Control. Indicates the Logical Channel Index for the NDL |
| 2517 | Map Control | 1 | Variable | Present if indicated by NDL Control. The availability channel and time map control information |
| 2518 | Availability Intervals Bitmap | Variable | Variable | Present if indicated by NDL Control. The availability intervals bitmap divides the time between the beginnings of consecutive Discovery Windows of a given NAN cluster into consecutive time intervals of equal durations. The time interval duration is specified by the Availability Interval Duration subfield of the Map Control field. A NAN device that sets the i-th bit of the Availability Intervals Bitmap to 1 shall be present during the corresponding i-th time interval in the operation channel indicated by the associated Further Availability Map attribute. A NAN device that sets the i-th bit of the Availability Intervals Bitmap to 0 may be present during the corresponding i-th time interval in the operation channel indicated by the associated Further Availability Map attribute. |

NDL Control Field
⤺ 2515

| Field | Size (bits) | Value | Description |
|---|---|---|---|
| Availability Map Present | 1 | Variable | Set if the attribute indicates that map control and availability map is present |
| NDL Logical Channel Indicator Present | 1 | Variable | Set if the NDL attribute indicates a spec defined channel. When set, the NDL Logical Channel Indicator field is present |
| Status Code | 2 | Variable | 00-Request; 01-Reject/Counter Request; 10-Fail; 11-Confirm |
| Flexible | 1 | Variable | When set indicates that the receiving device may negotiate an alternate schedule |
| Power Save | 1 | Variable | When set, the device is indicating that it is a power constraint device and prefers to have a scheme to aid power save (e.g., traffic announcement, etc.) |
| Security | 1 | Variable | Set if the Security Type field indicates authentication protocol & cipher suites |
| Reserved | 1 | | |

2614 → Availability Map Present
2615 → NDL Logical Channel Indicator Present
2616 → Status Code
2617 → Flexible
2618 → Power Save
2620 → Security
2619 → Reserved

TRAFFIC ADVERTISEMENT IN NEIGHBOR AWARE NETWORK (NAN) DATA PATH

I. CROSS-REFERENCE TO RELATED APPLICATIONS

This application claims the benefit of U.S. Provisional Patent Application No. 62/091,081, filed Dec. 12, 2014 and entitled "TRAFFIC ADVERTISEMENT IN NEIGHBOR AWARE NETWORK (NAN) DATA PATH", U.S. Provisional Patent Application No. 62/129,536, filed Mar. 6, 2015 and entitled "TRAFFIC ADVERTISEMENT IN NEIGHBOR AWARE NETWORK (NAN) DATA PATH", U.S. Provisional Patent Application No. 62/165,106, filed May 21, 2015 and entitled "TRAFFIC ADVERTISEMENT IN NEIGHBOR AWARE NETWORK (NAN) DATA PATH", and U.S. Provisional Patent Application No. 62/195,257, filed Jul. 21, 2015 and entitled "TRAFFIC ADVERTISEMENT IN NEIGHBOR AWARE NETWORK (NAN) DATA PATH"; the contents of each of the aforementioned applications are expressly incorporated herein by reference in their entirety.

II. FIELD

The present disclosure is generally related to traffic advertisement in a neighbor aware network (NAN) data path.

III. DESCRIPTION OF RELATED ART

Advances in technology have resulted in smaller and more powerful computing devices. For example, there exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and Internet protocol (IP) telephones, can communicate voice and data packets over wireless networks. Further, many such wireless telephones include other types of devices that are incorporated therein. For example, a wireless telephone can also include a digital still camera, a digital video camera, a digital recorder, and an audio file player. Also, such wireless telephones can process executable instructions, including software applications, such as a web browser application, that can be used to access the Internet. As such, these wireless telephones can include significant computing capabilities.

Electronic devices, such as wireless telephones, may use wireless connections to access networks in order to transmit and receive data or to exchange information. For example, mobile electronic devices that are in close proximity to each other may form a wireless mesh network to perform data exchanges via the wireless mesh network (e.g., without involving wireless carriers, Wi-Fi access points, or the Internet). To enable functionality of the wireless mesh network, a particular wireless network (e.g., a particular wireless channel of the particular wireless network) may be reserved for transferring data between electronic devices of the wireless mesh network. For example, a "provider" device of the wireless mesh network may share a service, e.g., a music service, with other electronic devices in the wireless mesh network. To illustrate, the provider device may transmit music data to a subscriber device in the wireless mesh network. Because the subscriber device does not know when the provider device will transmit the data (e.g., the music data), the subscriber device may substantially continuously monitor the wireless mesh network for transmissions from the provider device. Accordingly, the subscriber device consumes power to monitor the wireless mesh network, even during time periods when the provider device is not transmitting data to the subscriber device.

IV. SUMMARY

The present disclosure is directed to systems and methods to enable electronic devices in a data path group of a neighbor aware network (alternatively referred to as neighbor awareness networking) (NAN) to use traffic advertisements to coordinate times to exchange traffic (e.g., data) of a particular service. As referred to herein, a "data path group" refers to one or more electronic devices that share a time period (e.g., a time block) corresponding to an active operating mode of the electronic devices (e.g., a paging window) and that have common security credentials. For example, a data path group may include a wireless mesh network (e.g., a "social wireless fidelity (wi-fi) mesh (SWF-mesh)"). The one or more electronic devices of the data path group may be a subset of electronic devices in the NAN. As referred to herein, "data path (DP)", "NAN DP (NDP)", "NAN data link (NDL) group", "NDL", or "NAN DP group" may refer to the data path group. The data path group may be restricted based on security credentials. A restricted data path group may be based on out-of-band credentials.

The data path group may be initiated by a provider device of the NAN sending a message (e.g., a service advertisement) to electronic devices of the NAN during a discovery window. The service advertisement may indicate that the provider device is available to provide a particular service via a plurality of logical channels. As referred to herein, a "discovery window" refers to a time period (or a time block) corresponding to an active operating mode of the electronic devices of the NAN. During the discovery window, one or more of the electronic devices of the NAN may listen to (e.g., monitor) a NAN communication channel (e.g., a particular wireless channel) for service advertisements.

As referred to herein, a "logical channel" refers to the combination of a particular (physical) communication channel(s) and one or more time periods (e.g., one or more transmission windows) during which the electronic devices of the data path group may communicate regarding the particular service via the particular communication channel(s).

A subscriber device of the NAN may respond to a service advertisement by sending a subscribe message to the provider device. A particular data path group may correspond to the particular service and to the plurality of logical channels indicated in the service advertisement. For example, the particular data path group may include the provider device and one or more subscriber devices that sent a subscribe message responsive to the service advertisement. Each transmission window of a particular logical channel may include a portion of time (e.g., a paging window) during which a provider device of the data path group may send a traffic advertisement (e.g., a paging message) via the particular communication channel to a set of subscriber devices of the data path group. Electronic devices of the data path group may listen to (e.g., monitor) the (physical) communication channel(s) during at least a portion of one or more paging windows associated with the logical channel.

The traffic advertisement may indicate availability of data to be sent by the provider device to one or more subscriber devices of the set of subscriber devices. For example, the traffic advertisement may indicate multiple subscriber devices as data recipients. The data may include first data to be sent to a first subscriber device of the multiple subscriber devices and second data to be sent to a second subscriber device of the multiple subscriber devices. An acknowledging subscriber device of the multiple subscriber devices may send an acknowledgement (ACK) to the provider device in response to determining that the acknowledging subscriber device is a "leader" device of the multiple data subscriber devices. The leader device may be a subscriber device that sends the ACK in response to receiving the traffic advertisement. A single subscriber device of the multiple subscriber devices may be the leader device. The provider device may determine that the traffic advertisement has been successfully received by at least one subscriber device in response to receiving the ACK from one (e.g., the leader device) of the multiple subscriber devices.

The traffic advertisement may indicate the leader device that is to send the ACK. The acknowledging subscriber device may send the ACK in response to determining that the traffic advertisement indicates that the acknowledging subscriber device is the leader device. Alternatively, the acknowledging subscriber device may determine that the acknowledging subscriber device is the leader device in response to determining that another ACK from another subscriber device to the provider device is undetected within a particular duration of receiving the traffic advertisement.

The acknowledging subscriber device may send the ACK via the particular communication channel to the provider device during the paging window. Network resources may be conserved by having a subscriber device send the ACK based on determining whether the subscriber device is the leader device, as compared to having all subscriber devices send ACKs in response to receiving the traffic advertisement.

The provider device may receive a trigger message from a requesting subscriber device (e.g., the first subscriber device or the second subscriber device) of the multiple subscriber devices. The requesting subscriber device may be the same as or distinct from the acknowledging subscriber device. The provider device may, in response to receiving the trigger message, send data (e.g., the first data or the second data) to the requesting subscriber device (e.g., the first subscriber device or the second subscriber device) via the particular communication channel during a second portion (e.g., a data transmission window) of the transmission window. The second portion (e.g., an ending portion) of the transmission window may be subsequent to the paging window. The trigger message may be received during a trigger slot subsequent to the paging window and prior to the data transmission window. Alternatively, the trigger message may be received during a beginning portion of the data transmission window or during the data transmission window.

The requesting subscriber device may send the trigger message in response to receiving a trigger request from the provider device. For example, the provider device may send the trigger request to one or more of the multiple subscriber devices during the trigger slot, during the beginning portion of the data transmission window, or during the data transmission window.

In a particular example, a device (e.g., the provider device or a subscriber device) may transmit control messages (e.g., a traffic advertisement, an ACK, a trigger, or a trigger message) based on an access category of corresponding data. For example, voice data may be associated with a first access category, and background data may be associated with a second access category. The device may include multiple transmission queues corresponding to multiple access categories. The device may add a control message to a transmission queue based on an access category of corresponding data. For example, the device may add a control message to a first transmission queue in response to determining that data corresponding to the control message and the first transmission queue are both associated with the same access category (e.g., a first access category). The device may process the transmission queues in an order based on corresponding access categories. For example, the first transmission queue may be processed prior to (or subsequent to) a second transmission queue associated with a second access category.

The device may determine that transmission of a control message is to be delayed. For example, the device may determine that transmission of the control message is to be delayed in response to determining that a transmission medium is busy. As another example, the device may determine that transmission of the control message is to be delayed in response to determining that the first transmission queue is to be processed subsequent to the second transmission queue based on the first access category and the second access category. The device may determine a first delay in response to determining that transmission of the control message is to be delayed. The device may send the control message upon expiration of a delay period. The delay period may be based on the first delay. For example, the delay period may begin, at a first time, in response to detecting that the transmission medium is idle. The delay period may expire in response to determining that the transmission medium remained idle subsequent to the first time during a time interval that is based on the first delay. The first delay associated with the first access category may be shorter than a second delay associated with the second access category. Transmission of control messages associated with the first access category may thus be prioritized over transmission of messages (e.g., control messages or data packets) associated with the second access category.

At least one of the disclosed aspects may enable an electronic device of the NAN to transition to an inactive mode during particular time periods (or time blocks) to conserve resources. The electronic device may, while operating in the inactive mode, refrain from monitoring a communication channel (e.g., the NAN communication channel), transition to a low-power operating mode (e.g., a "sleep mode" or a power save mode), perform operations (or actions) related to another network, or a combination thereof. The actions may include participating in the other network, communicating with at least one device of the other network, or both. Participating in the other network may include exchanging one or more messages with a device of the other network. Communicating with at least one device of the other network may include exchanging messages with the at least one device. The other network may include a second NDL group, an AP based network, an infrastructure (Infra) based network, an IBSS network, or a wireless fidelity (WiFi) direct network.

In a particular aspect, the electronic device may transition to the inactive mode in response to determining that a service advertisement is not received (or sent), or that a subscribe message responsive to the service advertisement is not sent (or received) during a discovery window. The electronic device may transition to the inactive mode until a subsequent discovery window. While in the inactive mode, the electronic device may refrain from monitoring the NAN communication channel.

As another example, in response to determining that no traffic advertisement indicating the subscriber device as a data recipient has been received during the paging window or that no trigger request has been received during the trigger slot (or during the beginning portion of the data transmission window), the subscriber device may transition to the inactive mode during a remaining portion of the transmission window. While in the inactive mode, the subscriber device may refrain from monitoring the particular communication channel (e.g., until the subscriber device exits the inactive mode at the start of a subsequent paging window).

As a further example, in response to determining that no ACK responsive to the traffic advertisement has been received during the paging window or that no trigger messages have been received during the trigger slot (or during the beginning portion of the data transmission window), the provider device may transition to the inactive mode during a remaining portion of the transmission window. While in the inactive mode, the provider device may refrain from monitoring the particular communication channel (e.g., until the provider device exits the inactive mode at the start of a subsequent paging window).

In a particular aspect, a method of communication includes generating a traffic advertisement at a particular device. The traffic advertisement indicates availability of data to be sent by the particular device to multiple devices of a set of devices. The data includes first data to be sent to a first device of the multiple devices and second data to be sent to a second device of the multiple devices. The method also includes sending, from the particular device, the traffic advertisement during a paging window. The method further includes receiving a first acknowledgement (ACK) during the paging window at the particular device from an acknowledging device. The method also includes sending the first data from the particular device to the first device during a data transmission window.

In another aspect, a method of communication includes generating a traffic advertisement at a particular device. The traffic advertisement indicates availability of data to be sent by the particular device to multiple devices of a set of devices. The data includes first data to be sent to a first device of the multiple devices and second data to be sent to a second device of the multiple devices. The method also includes sending, from the particular device, the traffic advertisement during a paging window. The method further includes receiving a first acknowledgement (ACK) during the paging window at the particular device from the first device. The method also includes receiving a trigger message from the second device. The method further includes sending the first data from the particular device to the first device during a data transmission window. The method further includes, in response to detecting receipt of the trigger message from the second device, sending the second data from the particular device to the second device during the data transmission window without receiving a second ACK during the paging window from the second device. For example, data may be sent to data recipients (e.g., the first device and the second device) during the data transmission window based on receiving an ACK from fewer than all of the data recipients during the paging window.

In another aspect, a method of communication includes receiving a traffic advertisement at a first device from a particular device. The traffic advertisement indicates availability of data to be sent by the particular device to multiple devices of a set of devices. The method also includes determining, at the first device, whether the first device is a leader device of the multiple devices. The method further includes sending an acknowledgement (ACK) from the first device to the particular device based on the determination. For example, the ACK may be sent from the first device to the particular device in response to determining that the first device is the leader device. As another example, the first device may refrain from sending the ACK to the particular device in response to determining that the first device is not the leader device.

In another particular aspect, a computer-readable storage device for communication stores instructions that, when executed by a processor, cause the processor to perform operations including generating a traffic advertisement indicating availability of data to be sent to multiple devices of a set of devices. The data includes first data to be sent to a first device of the multiple devices. The operations also include initiating sending of the traffic advertisement during a paging window. The operations further include, in response to detecting receipt of a trigger message from the first device, initiating sending of the first data to the first device during a data transmission window independently of detecting receipt of an acknowledgement (ACK) responsive to the traffic advertisement from the first device. For example, data may be sent to a data recipient (e.g., the first device) during the data transmission window independently of receiving an ACK during the paging window.

In another particular aspect, a computer-readable storage device for communication stores instructions that, when executed by a processor, cause the processor to perform operations including receiving a traffic advertisement at a first device from a particular device. The traffic advertisement indicates availability of data to be sent by the particular device to multiple devices of a set of devices. The operations also include determining, at the first device, whether the first device is a leader device of the multiple devices. The operations further include sending an acknowledgement (ACK) from the first device to the particular device based on the determination. For example, the ACK may be sent to the particular device in response to determining that the first device is the leader device. As another example, the operations may include refraining from sending the ACK to the particular device in response to determining that the first device is not the leader device.

In another particular aspect, an apparatus for communication includes a traffic advertisement generator and a transceiver. The traffic advertisement generator is configured to generate a traffic advertisement indicating availability of data to be sent to multiple devices of a set of devices. The data includes first data to be sent to a first device of the multiple devices and second data to be sent to a second device of the multiple devices. The transceiver is configured to send the traffic advertisement during a paging window, to receive a first acknowledgement (ACK) during the paging window from the first device, and to send the first data to the first device during a data transmission window. The transceiver is also configured to send the second data to the second device during the data transmission window without receiving a second ACK from the second device during the paging window. For example, data may be sent to data recipients (e.g., the first device and the second device) during the data transmission window based on receiving an ACK from fewer than all of the data recipients during the paging window.

In another particular aspect, an apparatus for communication includes a receiver, a traffic advertisement analyzer, and a transmitter. The receiver is configured to receive a traffic advertisement from a particular device. The traffic advertisement indicates availability of data to be sent by the particular device to multiple devices of a set of devices. The traffic advertisement analyzer is configured to determine whether the apparatus is a leader device of the multiple devices. The transmitter is configured to send an acknowledgement (ACK) to the particular device in response to the traffic advertisement analyzer determining that the apparatus is the leader device. The transmitter is also configured to refrain from sending the ACK to the particular device in response to the traffic advertisement analyzer determining that the apparatus is not the leader device.

In another particular aspect, a method of communication includes generating a control message at a particular device. The control message indicates availability of data to be sent by the particular device. The data includes first data corresponding to a first access category. The method also includes, subsequent to determining that transmission of the control message is to be delayed, determining a first delay based on the first access category. The method further includes sending the control message from the particular device upon expiration of a delay period. The delay period is based on the first delay.

In another particular aspect, a method of communication includes receiving a traffic advertisement at a first device from a particular device. The traffic advertisement indicates availability of data to be sent by the particular device. The data includes first data associated with a first access category. The method also includes generating a control message based on the traffic advertisement. The control message includes an acknowledgement (ACK) or a trigger message. The method also includes, subsequent to determining that transmission of the control message is to be delayed, determining a first delay based on the first access category. The method further includes sending the control message from the first device to the particular device upon expiration of a delay period based on the first delay.

In another particular aspect, a computer-readable storage device for communication stores instructions that, when executed by a processor, cause the processor to perform operations including generating a control message indicating availability of data to be sent to at least one device of a set of devices. The data includes first data corresponding to a first access category. The operations also include, subsequent to determining that transmission of the control message is to be delayed, determining a first delay based on the first access category. The operations further include sending the control message upon expiration of a delay period. The delay period is based on the first delay.

In another particular aspect, a computer-readable storage device for communication stores instructions that, when executed by a processor, cause the processor to perform operations including receiving a traffic advertisement at a first device from a particular device. The traffic advertisement indicates availability of data to be sent by the particular device. The data includes first data associated with a first access category. The operations also include generating a control message based on the traffic advertisement. The control message includes an acknowledgement (ACK) or a trigger message. The operations further include, subsequent to determining that transmission of the control message is to be delayed, determining a first delay based on the first access category. The operations also include sending the control message from the first device to the particular device upon expiration of a delay period based on the first delay.

In another particular aspect, an apparatus for communication includes a processor and a transmitter. The processor is configured to generate a control message at a particular device. The control message indicates availability of data to be sent by the particular device. The control message indicates that the data includes first data corresponding to a first access category. The transmitter is configured to send the control message from the particular device.

In another particular aspect, an apparatus for communication includes a receiver, a traffic advertisement analyzer, and a transmitter. The receiver is configured to receive a traffic advertisement from a particular device. The traffic advertisement indicates availability of data to be sent by the particular device. The data includes first data associated with a first access category. The traffic advertisement analyzer is configured to generate a control message based on the traffic advertisement. The control message includes an acknowledgement (ACK) or a trigger message. The traffic advertisement analyzer is also configured to determine a first delay based on the first access category in response to determining that transmission of the control message is to be delayed. The transmitter is configured to send the control message to the particular device upon expiration of a delay period. The delay period is based on the first delay.

In another aspect, a method of communication includes generating a traffic advertisement at a particular device. The traffic advertisement indicates availability of data to be sent by the particular device to multiple devices. The method also includes sending, from the particular device, the traffic advertisement during a paging window. The method further includes receiving an unavailable message from a first device of the multiple devices during a data transmission window that is subsequent to the paging window. The method also includes, in response to receiving the unavailable message from the first device, refraining from sending first data from the particular device to the first device during the data transmission window.

In another aspect, a method of communication includes receiving a traffic advertisement at a first device from a particular device during a paging window. The traffic advertisement indicates availability of data to be sent by the particular device. The method also includes determining, during a data transmission window, that the first device is unavailable to receive the data. The method further includes, in response to the determination, sending an unavailable message from the first device to the particular device during the data transmission window.

In another aspect, a method of communication includes generating a traffic advertisement at a particular device. The traffic advertisement indicates availability of data to be sent by the particular device to multiple devices. The data includes first data to be sent to a first device of the multiple devices and second data to be sent to a second device of the multiple devices. The method also includes sending, from the particular device, the traffic advertisement during a paging window. The method further includes receiving a limited availability message from the first device during the paging window or a data transmission window that is subsequent to the paging window. The method also includes, in response to receiving the limited availability message from the first device, sending the first data to the first device during the data transmission window prior to sending the second data to the second device during the data transmission window.

In another aspect, a method of communication includes receiving a traffic advertisement at a first device from a particular device during a paging window. The traffic advertisement indicates availability of data to be sent by the particular device. The method also includes determining that the first device is expected to be unavailable to receive the data during a portion of a data transmission window that is subsequent to the paging window. The method further includes, in response to the determination, sending a limited availability message from the first device to the particular device during the paging window or the data transmission window.

In another aspect, a method of communication includes generating a traffic advertisement at a particular device. The traffic advertisement indicates availability of data to be sent by the particular device to multiple devices. The method also includes sending, from the particular device, the traffic advertisement during a paging window. The method further includes monitoring a communication channel during a first portion of a data transmission window irrespective of whether an acknowledgement (ACK) is received during the paging window. The data transmission window is subsequent to the paging window.

In another aspect, a computer-readable storage device for communication stores instructions that, when executed by a processor, cause the processor to perform operations including generating a traffic advertisement indicating availability of data to be sent to multiple devices. The operations also include sending the traffic advertisement during a paging window. The operations further include receiving an unavailable message from a first device of the multiple devices during a data transmission window that is subsequent to the paging window. The operations also include, in response to receiving the unavailable message from the first device, refraining from sending first data to the first device during the data transmission window.

In another aspect, a computer-readable storage device for communication stores instructions that, when executed by a processor, cause the processor to perform operations including receiving a traffic advertisement at a first device from a particular device during a paging window. The traffic advertisement indicates availability of data to be sent by the particular device. The operations also include determining, during a data transmission window, that the first device is unavailable to receive the data. The operations further include, in response to the determination, sending an unavailable message from the first device to the particular device during the data transmission window.

In another aspect, a computer-readable storage device for communication stores instructions that, when executed by a processor, cause the processor to perform operations including generating a traffic advertisement indicating availability of data to be sent to multiple devices. The data includes first data to be sent to a first device of the multiple devices and second data to be sent to a second device of the multiple devices. The operations also include sending the traffic advertisement during a paging window. The operations further include receiving a limited availability message from the first device during the paging window or a data transmission window that is subsequent to the paging window. The operations also include, in response to receiving the limited availability message from the first device, sending the first data to the first device during the data transmission window prior to sending the second data to the second device during the data transmission window.

In another aspect, a computer-readable storage device for communication stores instructions that, when executed by a processor, cause the processor to perform operations including receiving a traffic advertisement at a first device from a particular device during a paging window. The traffic advertisement indicates availability of data to be sent by the particular device. The operations also include determining that the first device is expected to be unavailable to receive the data during a portion of a data transmission window that is subsequent to the paging window. The operations further include, in response to the determination, sending a limited availability message from the first device to the particular device during the paging window or the data transmission window.

In another aspect, a computer-readable storage device for communication stores instructions that, when executed by a processor, cause the processor to perform operations including generating a traffic advertisement indicating availability of data to be sent to multiple devices. The operations also include sending the traffic advertisement during a paging window. The operations further include monitoring a communication channel during a first portion of a data transmission window irrespective of whether an acknowledgement (ACK) is received during the paging window. The data transmission window is subsequent to the paging window.

In another aspect, an apparatus includes a processor, a transmitter, and a receiver. The processor is configured to generate a traffic advertisement indicating availability of data to be sent to multiple devices. The transmitter is configured to send the traffic advertisement during a paging window. The transmitter is also configured to, in response to receiving an unavailable message from a first device of the multiple devices during a data transmission window that is subsequent to the paging window, refrain from sending first data to the first device during the data transmission window. The receiver is configured to receive the unavailable message from the first device during the data transmission window.

In another aspect, an apparatus includes a receiver, a processor, and a transmitter. The receiver is configured to receive a traffic advertisement from a particular device during a paging window. The traffic advertisement indicates availability of data to be sent by the particular device. The processor is configured to determine, during a data transmission window, that the apparatus is unavailable to receive the data. The transmitter is configured to, in response to the determination that the apparatus is unavailable to receive the data, send an unavailable message to the particular device during the data transmission window.

In another aspect, an apparatus includes a processor, a transmitter, and a receiver. The processor is configured to generate a traffic advertisement. The traffic advertisement indicates availability of data to be sent to multiple devices. The data includes first data to be sent to a first device of the multiple devices and second data to be sent to a second device of the multiple devices. The transmitter is configured to send the traffic advertisement during a paging window. The receiver is configured to receive a limited availability message from the first device. The transmitter is also configured to, in response to determining that the limited availability message has been received from the first device, send the first data to the first device during a data transmission window prior to sending the second data to the second device during the data transmission window. The data transmission window is subsequent to the paging window.

In another aspect, an apparatus includes a receiver, a processor, and a transmitter. The receiver is configured to receive a traffic advertisement from a particular device during a paging window. The traffic advertisement indicates availability of data to be sent by the particular device. The processor is configured to determine that the apparatus is expected to be unavailable to receive the data during a portion of a data transmission window that is subsequent to the paging window. The transmitter is configured to, in response to the determination that the apparatus is expected to be unavailable, send a limited availability message to the particular device during the paging window or the data transmission window.

In another aspect, an apparatus includes a processor, a transmitter, and a receiver. The processor is configured to generate a traffic advertisement indicating availability of data to be sent to multiple devices. The transmitter is configured to send the traffic advertisement during a paging window. The receiver is configured to monitor a communication channel during a first portion of a data transmission window irrespective of whether an acknowledgement (ACK) is received during the paging window, wherein the data transmission window is subsequent to the paging window.

In another aspect, an apparatus for communication includes a processor and an interface. The processor is configured to monitor a communication channel during a first portion of a neighbor aware network (NAN) data link (NDL) time block independently of receiving a traffic advertisement from a device indicating that the device will send first data during the NDL time block. The interface is configured to receive the first data from the device during the first portion of the NDL time block.

In another aspect, a method of communication includes receiving a packet at a first device from a second device. The first device is operating in a promiscuous mode. The method also includes selectively processing the packet based on determining the first device is associated with the second device, the packet includes a group identifier of a group of devices including the first device, the packet corresponds to an active traffic session between the first device and the second device, or a combination thereof.

In another aspect, a method of communication includes generating, at a device, a frame having a neighbor aware network (NAN) service discovery frame format. The frame includes a traffic announcement attribute that indicates availability of data to be sent by the device. The method also includes sending the frame during a communication window.

In another aspect, a method of communication includes receiving a frame at a first device from a second device. The frame has a neighbor aware network (NAN) service discovery frame format. The method also includes determining the frame includes a traffic announcement attribute indicating availability of data to be sent by the second device to one or more devices. The method further includes monitoring a communication channel during a NAN data link (NDL) time block based on the determination.

In another aspect, a method of communication includes generating, at a first device, a traffic advertisement indicating availability of data to be sent by the first device to at least one second device. The method also includes sending the traffic advertisement during an initial portion of a neighbor aware network (NAN) data link (NDL) time block. The method further includes sending first data to the second device during the NDL time block. The first data is sent independently of receiving an acknowledgement (ACK) responsive to the traffic advertisement from the second device.

In another aspect, a method of communication includes receiving a traffic advertisement at a first device from a second device during an initial portion of a neighbor aware network (NAN) data link (NDL) time block. The traffic advertisement indicates availability of data to be sent by the second device to one or more recipient devices. The method also includes monitoring a communication channel at the first device during at least a first portion of the NDL time block based on determining that the first device is included in the one or more recipient devices. The communication channel is monitored independently of whether an acknowledgment (ACK) responsive to the traffic advertisement is detected from the one or more recipient devices.

In another aspect, a method of communication includes generating, at a first device, a traffic page indicating that the first device will not send data to a second device during a neighbor aware network (NAN) data link (NDL) time block. The method also includes transmitting the traffic page during the NDL time block.

In another aspect, a method of communication includes receiving a traffic page at a first device from a second device. The traffic page indicates that the second device will not send data to one or more non-recipient devices. The method also includes determining whether to monitor a communication channel during a first portion of a neighbor aware network (NAN) data link (NDL) time block based on whether the first device is included in the one or more non-recipient devices.

In another aspect, a method of communication includes monitoring, at a first device, a communication channel during a neighbor aware network (NAN) data link (NDL) time block independently of receiving a traffic advertisement from a second device indicating that the second device will send first data to the first device during the NDL time block. The method also includes receiving the first data from the second device during the first portion of the NDL time block.

In another aspect, a method of communication includes generating, at a first device, a notice of absence indicating that the first device is unavailable to participate in at least one neighbor aware network (NAN) data link (NDL) group. The method also includes transmitting, from the first device, the notice of absence during a NAN discovery window.

In another aspect, a method of communication includes receiving a notice of absence at a first device from a second device during a neighbor aware network (NAN) discovery window. The notice of absence indicates that the second device is unavailable to participate in at least one NAN data link (NDL) group. The method also includes determining that the first device will not send first data associated with the at least one NDL group to the second device during at least a portion of one or more discovery intervals subsequent to the NAN discovery window.

In another aspect, a method of communication includes exchanging, at a first device, a negotiation message with a second device. The method also includes determining, at the first device, whether to send a traffic message during a neighbor aware network (NAN) data link (NDL) time block based on the negotiation message.

In another aspect, a method of communication includes exchanging, at a first device, a negotiation message with a second device. The method also includes receiving a traffic message from the second device. The method further includes selectively processing the traffic message based on the negotiation message.

In another aspect, a method of communication includes generating, at a first device, a service advertisement indicating that the first device supports traffic messaging. The method also includes transmitting the service advertisement.

In another aspect, a computer-readable storage device stores instructions that, when executed by a processor, cause the processor to perform operations including receiving a packet at a first device from a second device. The first device is operating in a promiscuous mode. The operations also include selectively processing the packet based on determining the first device is associated with the second device, the packet includes a group identifier of a group of devices including the first device, the packet corresponds to an active traffic session between the first device and the second device, or a combination thereof.

In another aspect, a computer-readable storage device stores instructions that, when executed by a processor, cause the processor to perform operations including generating, at a device, a frame having a neighbor aware network (NAN) service discovery frame format. The frame includes a traffic announcement attribute that indicates availability of data to be sent by the device. The operations also include sending the frame during a communication window.

In another aspect, a computer-readable storage device stores instructions that, when executed by a processor, cause the processor to perform operations including receiving a frame at a first device from a second device. The frame has a neighbor aware network (NAN) service discovery frame format. The operations also include determining the frame includes a traffic announcement attribute indicating availability of data to be sent by the second device to one or more devices. The operations further include monitoring a communication channel during a NAN data link (NDL) time block based on the determination.

In another aspect, a computer-readable storage device stores instructions that, when executed by a processor, cause the processor to perform operations including generating, at a first device, a traffic advertisement indicating availability of data to be sent by the first device to at least one second device. The operations also include sending the traffic advertisement during an initial portion of a neighbor aware network (NAN) data link (NDL) time block. The operations further include sending first data to the second device during the NDL time block. The first data is sent independently of receiving an acknowledgement (ACK) responsive to the traffic advertisement from the second device.

In another aspect, a computer-readable storage device stores instructions that, when executed by a processor, cause the processor to perform operations including receiving a traffic advertisement at a first device from a second device during an initial portion of a neighbor aware network (NAN) data link (NDL) time block. The traffic advertisement indicates availability of data to be sent by the second device to one or more recipient devices. The operations also include monitoring a communication channel at the first device during at least a first portion of the NDL time block based on determining that the first device is included in the one or more recipient devices. The communication channel is monitored independently of whether an acknowledgment (ACK) responsive to the traffic advertisement is detected from the one or more recipient devices.

In another aspect, a computer-readable storage device stores instructions that, when executed by a processor, cause the processor to perform operations including generating, at a first device, a traffic page indicating that the first device will not send data to a second device during a neighbor aware network (NAN) data link (NDL) time block. The operations also include transmitting the traffic page during the NDL time block.

In another aspect, a computer-readable storage device stores instructions that, when executed by a processor, cause the processor to perform operations including receiving a traffic page at a first device from a second device. The traffic page indicates that the second device will not send data to one or more non-recipient devices. The operations also include determining whether to monitor a communication channel during a first portion of a neighbor aware network (NAN) data link (NDL) time block based on whether the first device is included in the one or more non-recipient devices.

In another aspect, a computer-readable storage device stores instructions that, when executed by a processor, cause the processor to perform operations including monitoring, at a first device, a communication channel during a neighbor aware network (NAN) data link (NDL) time block independently of receiving a traffic advertisement from a second device indicating that the second device will send first data to the first device during the NDL time block. The operations also include receiving the first data from the second device during the first portion of the NDL time block.

In another aspect, a device includes an interface and a processor. The interface is configured to receive a packet from a second device. The interface is configured to operate in a promiscuous mode. The processor is configured to selectively process the packet based on at least one criterion.

In another aspect, a device includes a processor and a transmitter. The processor is configured to generate, at a device, a frame having a neighbor aware network (NAN) service discovery frame format, a NAN management frame format, or both. The frame includes a traffic announcement attribute that indicates availability of data to be sent by the device. The transmitter is configured to send the frame during a communication window.

In another aspect, a device includes an interface and a processor. The interface is configured to receive a frame from a second device. The frame has a neighbor aware network (NAN) service discovery frame format. The processor is configured to determine the frame includes a traffic announcement attribute indicating availability of data to be sent by the second device to one or more devices. The processor is also configured to monitor a communication channel during a NAN data link (NDL) time block based on the determination.

In another aspect, a device includes a processor and an interface. The processor is configured to generate a traffic advertisement indicating availability of data to be sent by the device to at least one second device. The interface is configured to send the traffic advertisement during an initial portion of a neighbor aware network (NAN) data link (NDL) time block. The interface is also configured to send first data to the second device during the NDL time block. The first data is sent independently of receiving an acknowledgement (ACK) responsive to the traffic advertisement from the second device.

In another aspect, a device includes an interface and a processor. The interface is configured to receive a traffic advertisement from a second device during an initial portion of a neighbor aware network (NAN) data link (NDL) time block. The traffic advertisement indicates availability of data to be sent by the second device to one or more recipient devices. The processor is configured to monitor a communication channel during at least a first portion of the NDL time block based on determining that the device is included in the one or more recipient devices. The communication channel is monitored independently of whether an acknowledgment (ACK) responsive to the traffic advertisement is detected from the one or more recipient devices.

In another aspect, a device includes a processor and an interface. The processor is configured to generate a traffic page indicating that the device will not send data to a second device during a neighbor aware network (NAN) data link (NDL) time block. The interface is configured to transmit the traffic page during the NDL time block.

In another aspect, a device includes an interface and a processor. The interface is configured to receive a traffic page from a second device. The traffic page indicates that the second device will not send data to one or more non-recipient devices. The processor is configured to determine whether to monitor a communication channel during a first portion of a neighbor aware network (NAN) data link (NDL) time block based on whether the device is included in the one or more non-recipient devices.

In another aspect, a device includes a processor and an interface. The processor is configured to monitor a communication channel during a neighbor aware network (NAN) data link (NDL) time block independently of receiving a traffic advertisement from a second device indicating that the second device will send first data to the device during the NDL time block. The interface is configured to receive the first data from the second device during the first portion of the NDL time block.

In another aspect, a computer-readable storage device stores instructions that, when executed by a processor, cause the processor to perform operations including generating, at a first device, a notice of absence indicating that the first device is unavailable to participate in at least one neighbor aware network (NAN) data link (NDL) group. The operations also include transmitting, from the first device, the notice of absence during a NAN discovery window.

In another aspect, a computer-readable storage device stores instructions that, when executed by a processor, cause the processor to perform operations including receiving a notice of absence at a first device from a second device during a neighbor aware network (NAN) discovery window. The notice of absence indicates that the second device is unavailable to participate in at least one NAN data link (NDL) group. The operations also include determining that the first device will not send first data associated with the at least one NDL group to the second device during at least a portion of one or more discovery intervals subsequent to the NAN discovery window.

In another aspect, a computer-readable storage device stores instructions that, when executed by a processor, cause the processor to perform operations including exchanging, at a first device, a negotiation message with a second device. The operations also include determining, at the first device, whether to send a traffic message during a neighbor aware network (NAN) data link (NDL) time block based on the negotiation message.

In another aspect, a computer-readable storage device stores instructions that, when executed by a processor, cause the processor to perform operations including exchanging, at a first device, a negotiation message with a second device. The operations also include receiving a traffic message from the second device. The operations further include selectively processing the traffic message based on the negotiation message.

In another aspect, a computer-readable storage device stores instructions that, when executed by a processor, cause the processor to perform operations including generating, at a first device, a service advertisement indicating that the first device supports traffic messaging. The operations also include transmitting the service advertisement.

In another aspect, a device includes a processor and an interface. The processor is configured to generate a notice of absence indicating that the device is unavailable to participate in at least one neighbor aware network (NAN) data link (NDL) group. The interface is configured to transmit the notice of absence during a NAN discovery window.

In another aspect, a device includes an interface and a processor. The interface is configured to receive a notice of absence from a second device during a neighbor aware network (NAN) discovery window. The notice of absence indicates that the second device is unavailable to participate in at least one NAN data link (NDL) group. The processor is configured to determine that the device will not send first data associated with the at least one NDL group to the second device during at least a portion of one or more discovery intervals subsequent to the NAN discovery window.

In another aspect, a device includes an interface and a processor. The interface configured to exchange a negotiation message with a second device. The processor is configured to determine whether to send a traffic message during a neighbor aware network (NAN) data link (NDL) time block based on the negotiation message.

In another aspect, a device includes an interface and a processor. The interface is configured to exchange a negotiation message with a second device and to receive a traffic message from the second device. The processor is configured to selectively process the traffic message based on the negotiation message.

In another aspect, a device includes a processor and an interface. The processor is configured to generate a service advertisement indicating that the device supports traffic messaging. The interface is configured to transmit the service advertisement.

One particular advantage provided by at least one of the disclosed aspects is a reduction in power consumption at one or more electronic devices of a data path group. Because the internal clocks of the electronic devices of a data path group may be synchronized (e.g., based on synchronization from the NAN), each electronic device of the data path group may determine a particular time period corresponding to a paging window to transition to the active operating mode and to monitor a wireless network (e.g., a particular communication channel) for an indication of traffic (e.g., a traffic advertisement). If a particular electronic device does not receive a traffic advertisement or is not identified as a data recipient in the traffic advertisement, the particular electronic device may reduce power consumption by transitioning to the inactive mode during a remaining portion of a transmission window or may perform operations corresponding to other data path groups or other networks during the remaining portion of the transmission window.

Additionally, a single subscriber device (e.g., a "leader" data recipient) may send an ACK in response to receiving a traffic advertisement from a provider device. The paging window may be smaller to accommodate the ACK from the single subscriber device, as compared to a paging window designed to accommodate ACKs from multiple data recipients. The one or more electronic devices may monitor the particular communication channel during the paging window. Having a smaller paging window may result in reduction of power consumption by the one or more electronic devices.

Other aspects, advantages, and features of the present disclosure will become apparent after a review of the entire application, including the following sections: Brief Description of the Drawings, Detailed Description, and the Claims.

V. BRIEF DESCRIPTION OF THE DRAWINGS

FIG. 22 is a diagram illustrating examples of a traffic announcement attribute and a traffic indicator field of the traffic announcement attribute;

FIG. 23 is a diagram illustrating examples of a traffic announcement attribute, a page control field, a paged device list (PDL), and a PDL control field;

FIG. 25 is a diagram illustrating an example of a neighbor aware network (NAN) data link (NDL) attribute;

FIG. 26 is a diagram illustrating an example of a neighbor aware network (NAN) data link (NDL) control field;

VI. DETAILED DESCRIPTION

Particular aspects of the present disclosure are described below with reference to the drawings. In the description, common features are designated by common reference numbers throughout the drawings.

Figure 1:
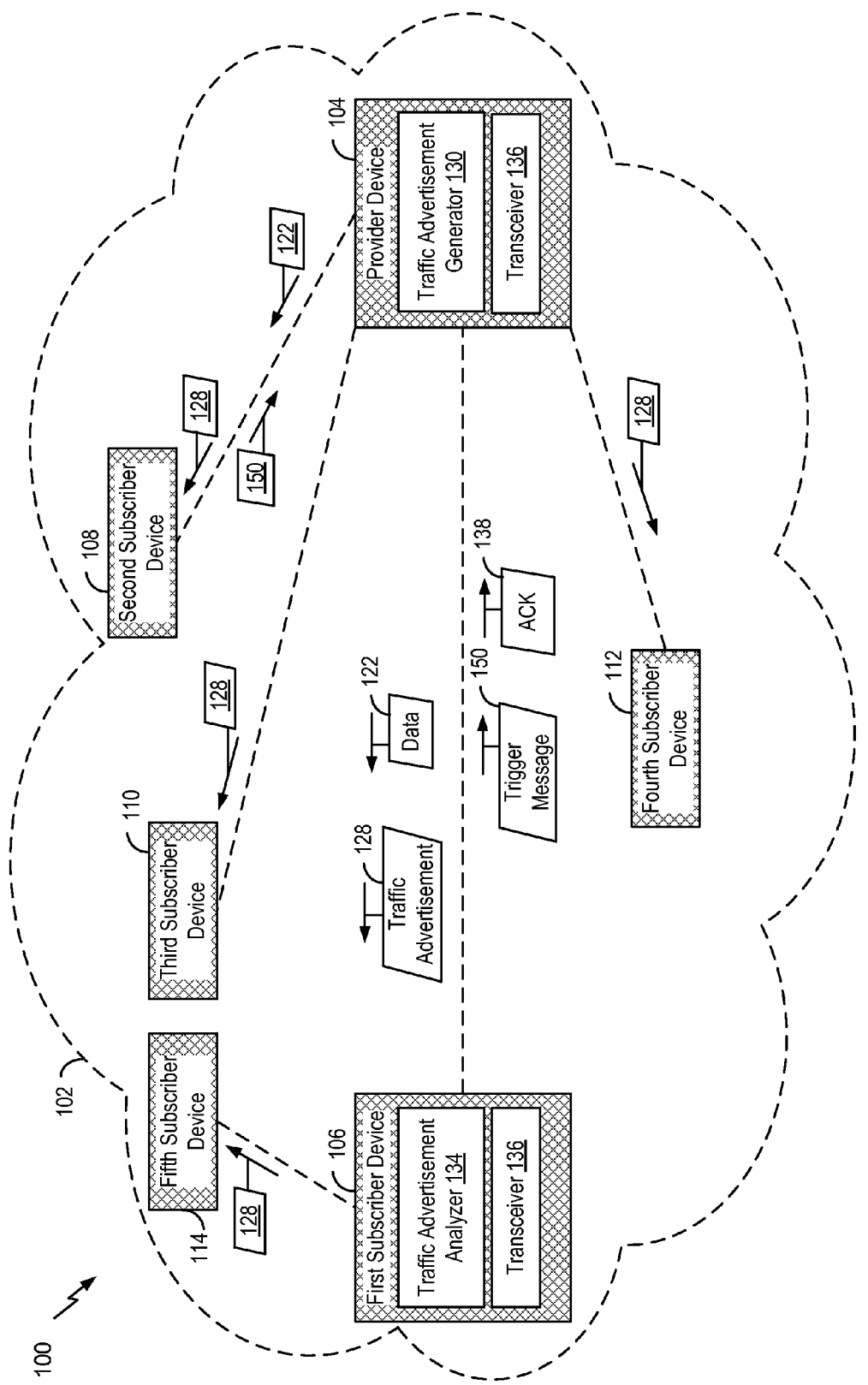
FIG. 1 is a diagram of a particular aspect of a system that includes a neighbor aware network (NAN) having one or more electronic devices of a data path group that exchange a traffic advertisement.

Referring to FIG. 1, a particular aspect of a system 100 that includes a neighbor aware network (NAN) 102 is shown. The NAN 102 includes one or more electronic devices. For example, the NAN 102 includes a provider device 104, a first subscriber device 106, a second subscriber device 108, a third subscriber device 110, a fourth subscriber device 112, and a fifth subscriber device 114. An electronic device (e.g., the device 104-114) may be configured to perform data exchanges via wireless communications (e.g., without involving wireless carriers, Wi-Fi access points, or the Internet) with one or more other electronic devices of the NAN 102.

The system 100 is illustrated for convenience only and the particular illustrated details are not limiting. For example, in other aspects, the system 100 may include more electronic devices or fewer electronic devices than illustrated in FIG. 1, and the electronic devices may be located at different locations than illustrated in FIG. 1. The device 104-114 may include a traffic advertisement generator, a traffic advertisement analyzer, a transceiver 136, or a combination thereof. In the example of FIG. 1, the provider device 104 includes a traffic advertisement generator 130, and the first subscriber device 106 includes a traffic advertisement analyzer 134.

The device 104-114 may be a fixed location electronic device or a mobile electronic device. For example, the device 104-114 may include or correspond to mobile phones, laptop computers, tablet computers, personal computers, multimedia devices, peripheral devices, data storage devices, or a combination thereof. Additionally or alternatively, the device 104-114 may include a processor (e.g., a central processing unit (CPU), a digital signal processor (DSP), a network processing unit (NPU), etc.), a memory (e.g., a random access memory (RAM), a read-only memory (ROM), etc.), and the transceiver 136 (e.g., a wireless receiver and a wireless transmitter) configured to send and receive data via one or more wireless networks (e.g., one or more wireless communication channels), as further described with reference to FIG. 12. Although certain operations described herein may be described with reference to a "transceiver," in other aspects a "receiver" may perform data receiving operations and a "transmitter" may perform data transmitting operations.

The devices 104-114 may exchange data, services, or both, via one or more wireless networks. As used herein, a transmission "via" a wireless network may include, but is not limited to, a "point-to-point" (e.g., unicast) transmission between two electronic devices of the wireless network. As another example, a transmission via the wireless network may include a communication that is "broadcast" (e.g., transmitted) from a particular electronic device of the wireless network to multiple other electronic devices of the wireless network. The device 104-114 may be configured to operate in accordance with one or more wireless protocols or standards, such as an Institute of Electrical and Electronics Engineers (IEEE) 802.11 standard. For example, the device 104-114 may operate in accordance with at least one of an IEEE 802.11a, b, g, n, s, aa, ac, ad, ae, af, ah, ai, aj, aq, ax, or mc standard. Additionally, the device 104-114 may operate in accordance with one or more NAN standards or protocols.

Additionally, the device 104-114 may be configured to communicate with a cellular network via one or more cellular communication protocols or standards, such as a code division multiple access (CDMA) protocol, an orthogonal frequency division multiplexing (OFDM) protocol, an orthogonal frequency division multiple access (OFDMA) protocol, a time division multiple access (TDMA) protocol, a space division multiple access (SDMA) protocol, a carrier sense multiple access (CSMA) protocol, etc. Additionally, the device 104-114 may be configured to operate in accordance with one or more near-field communications standards, such as a Bluetooth® standard (Bluetooth is a registered trademark of Bluetooth SIG, Inc. of Kirkland, Wash.). Additionally, the device 104-114 may exchange data via infrared or other near-field communications.

The device 104-114 may enter and exit the NAN 102 at various times during operation. For example, an electronic device that is not within the NAN 102 may detect a discovery beacon and may associate with the NAN 102 during a discovery window identified by the discovery beacon, in accordance with a NAN standard or protocol. Additionally, the device 104-114 may disassociate from the NAN 102 at any time. While within the NAN 102, the device 104-114 may be configured to transmit or to receive messages indicating an availability to communicate via one or more logical channels. For example, the device 104-114 may be configured to transmit or to receive service advertisements (e.g., service discovery frames (SDFs)) that advertise a service provided via one or more logical channels by at least one electronic device of the NAN 102.

Additionally, while within the NAN 102, the device 104-114 may be configured to transmit or to receive synchronization beacons. A synchronization beacon may indicate synchronization information and may be formed in accordance with one or more NAN standards or protocols. The device 104-114 may be configured to synchronize a respective internal clock based on the synchronization beacons. Because the internal clock of the devices 104-114 may be synchronized, the devices 104-114 may determine a common time period (e.g., the discovery window) to transition to an active operating mode and monitor the NAN communication channel for a service advertisement. The devices 104-114 of a data path group may determine a common time period (e.g., a paging window) to transition to the active operating mode and monitor a particular communication channel corresponding to a particular logical channel for a traffic advertisement.

The synchronization beacons may be retransmitted (e.g., rebroadcast) by the device 104-114 within the NAN 102, in accordance with a NAN standard or protocol, to enable the synchronization beacons to reach electronic devices that are beyond a wireless communication range of the electronic device that transmits the synchronization beacon. In a particular aspect, the synchronization beacons may be transmitted between electronic devices of the NAN 102 via a first wireless channel (e.g., a "NAN communication channel"). As referred to herein, a "NAN communication channel" is a particular wireless channel that is reserved for electronic devices to perform NAN discovery operations and NAN synchronization operations.

In addition to being included in the NAN 102, the device 104-114 may be included in one or more data path groups. Thus, a NAN may include zero or more data path groups, and each device in the NAN may be a member of zero or more data path groups. A data path group may correspond to a service provided via one or more logical channels by one or more provider devices (e.g., the provider device 104) of the NAN 102. For example, in FIG. 1, the provider device 104 may provide a particular service (e.g., a music service, a gaming service, a social media service, an advertising service, a message sharing service, etc.) via the one or more logical channels to subscriber devices of the data path group, as described herein. The data path group may be associated with a schedule. The schedule may include a set of time periods (or time blocks) occurring during a discovery interval between consecutive NAN discovery windows. The set of time blocks may repeat during consecutive discovery intervals. The set of time blocks may correspond to transmission windows of the one or more logical channels. In a particular aspect, one or more additional provider devices may also provide the particular service via the one or more logical channels to the subscriber devices. As another example, the provider device 104 may be part of another network (e.g., an access point (AP) based network or an independent basic service set (IBSS) network), and the provider device 104 may be configured to advertise the other network to enable other electronic devices of the NAN 102 to join the other network via the provider device 104.

Data path groups may include "single-hop" data path groups, "multi-hop" data path groups, or both. A single-hop data path group may include one or more electronic devices that are within a wireless communication range (e.g., distance) of a provider (e.g., an electronic device that provides a service). A multi-hop data path group may include one or more electronic devices that are outside a wireless communication range of the provider. In the multi-hop data path group, at least one electronic device may receive a message (including data) from the provider and may rebroadcast the message to another electronic device that outside of the wireless communication range of the provider. In a particular aspect, a multi-hop data path group may include the devices 104-114. In this aspect, wireless communications from the provider device 104 to the fifth subscriber device 114 may be routed (e.g., retransmitted) by the first subscriber device 106, as shown in FIG. 1. In another particular aspect, the data path group may be a single-hop data path group that includes the devices 104-112. The fifth subscriber device 114 may not be included in the single-hop data path because the fifth subscriber device 114 is not within a wireless communication range (e.g., a one-hop range) of the provider device 104.

The provider device 104 may operate as a data source and transmit data to other electronic devices (e.g., subscriber devices) of the data path group. For example, to share a music service, the provider device 104 may transmit music data to another electronic device in the data path group. As another example, to share a social media service, the provider device 104 may transmit text data, image data, video data, or a combination thereof, to another electronic device in the data path group. As a further example, to share a gaming service, the provider device 104 may transmit text data, score data, image data, video data, or a combination thereof, to another electronic device in the data path group. At least one of the other electronic devices (e.g., the subscriber devices) may be configured to operate as a data sink.

In a particular aspect, data may be transmitted between electronic devices of the data path group via one or more "data path group" channels. As used herein, a "data path group channel" is a particular wireless channel that is reserved for electronic devices in a corresponding data path group to communicate messages (e.g., traffic advertisements) regarding sharing a service and to communicate data associated with the service. A logical channel may correspond to a data path group channel and one or more transmission windows. For example, data may be transmitted between electronic devices of the data path group via one or more data path group channels during corresponding transmission windows. The transmission windows may correspond to one or more repeating time blocks of a schedule associated with the logical channel. For example, the time blocks may repeat between consecutive NAN discovery windows. As used herein, the "data path group channel" is associated with a data path group network, and communications in the data path group network may be performed over (e.g., via) the data path group channel. Additionally, the data path group channel may be used for sharing security information, for performing association operations, and for performing routing operations (e.g., in multi-hop data path groups).

In some aspects, a data path group channel and the NAN communication channel may be different wireless channels that correspond to different wireless frequency bands. In a particular aspect, the NAN communication channel may be a 2.4 gigahertz (GHz) channel and the data path group channel may be a 5 GHz channel. In other aspects, the data path group channel and the NAN communication channel may be the same wireless channel. For example, the device 104-114 may share data with the data path group via the NAN communication channel. In some aspects, the NAN 102 may include multiple data path groups, and each of the multiple data path groups may correspond to distinct, overlapping, or same data path group channels. The multiple data path groups may correspond to different services provided by various electronic devices in the NAN 102. In some aspects, electronic devices of the multiple data path groups may share data via the same data path group channel during distinct transmission windows.

During operation, one of the electronic devices of the NAN 102 may generate and transmit a synchronization (sync) beacon in accordance with a NAN standard or protocol. For example, the second subscriber device 108 may transmit the synchronization beacon via the NAN communication channel. Electronic device(s) within a one-hop range of the second subscriber device 108 may retransmit the synchronization beacon so that the synchronization beacon propagates throughout the NAN 102. The device 104-114 may receive the synchronization beacon and may perform synchronization operations based on the synchronization beacon. For example, the device 104-114 may synchronize timing circuitry (e.g., an internal clock) based on receiving the synchronization beacon.

The provider device 104 may, e.g., after performing the synchronization operations, begin providing a particular service to other devices of the NAN 102, as described herein. The traffic advertisement generator 130 may determine a first plurality of logical channels. For example, the traffic advertisement generator 130 may determine the first plurality of logical channels based on default data, based on input of a user of the provider device 104, or both. The first plurality of logical channels may correspond to a plurality of physical communication channels (e.g., 2.4 Gigahertz (GHz) or 5 GHz wireless communication channels) and one or more associated transmission windows. In a particular aspect, a single logical channel corresponds to a plurality of physical communication channel. For example, the logical channel may correspond to a first physical communication channel during one or more first time windows and may correspond to a second physical communication channel during one or more second time windows. The first time windows and the second time windows may be distinct, overlapping, or the same. In a particular aspect, the logical channel corresponds to a channel hopping sequence. The channel hopping sequence may indicate that the logical channel corresponds to the first physical communication channel during the first time windows and corresponds to the second physical communication channel during the second time windows. The traffic advertisement generator 130 may determine available logical channels. For example, the available logical channels may be a subset of the first plurality of logical channels that are not being used by the traffic advertisement generator 130, e.g., to participate in other data path groups.

The provider device 104 may generate a message (e.g., a service advertisement) indicating that the provider device 104 is available to provide the particular service via one or more available logical channels. A particular logical channel may correspond to a particular communication channel (e.g., a wireless communication channel) and one or more transmission windows. The particular logical channel may correspond to a schedule of repeating time blocks occurring between consecutive NAN discovery windows. The transmission windows may correspond to the time blocks. In a particular aspect, the provider device 104 may provide the particular service via a "basic" channel. The basic channel may correspond to a transmission window of the NAN channel that begins after an end of a NAN discovery window. In a particular aspect, the service advertisement may not indicate the basic channel. A subscriber device 106-114 may assume that the provider device 104 is available to provide the particular service via the basic channel in response to receiving the service advertisement regardless of whether the service advertisement indicates the basic channel.

The provider device 104 may send the service advertisement to electronic devices (e.g., the subscriber device 106-112) of the NAN 102 during a NAN discovery window. The device 104-114 may monitor the NAN channel during the NAN discovery window. One or more devices (e.g., the subscriber device 106-112) may receive the service advertisement during the NAN discovery window. The one or more devices may send a subscribe message in response to receiving the service advertisement. The provider device 104 may determine that the one or more devices are available to receive the particular service based on receiving the subscribe message. For example, the provider device 104 may, in response to receiving a subscribe message from a particular device, determine that the particular device is available to communicate via at least one of the available logical channels, the basic channel, or a combination thereof.

In a particular aspect, the provider device 104 may receive subscribe messages from multiple subscriber devices (e.g., the subscriber device 106-112). A data path group corresponding to the available logical channels, the basic channel, or a combination thereof, may include the provider device 104 (e.g., a provider device) and each subscriber device from which the provider device 104 received a subscribe message responsive to the service advertisement.

A data path group may be associated with one or more communication channels corresponding to the available logical channels, the basic channel, or a combination thereof. The data path group may correspond to one or more transmission windows associated with the available logical channels, the basic channel, or a combination thereof. For example, the data path group may correspond to (e.g., communicate via) the basic channel. To illustrate, the data path group may communicate via the NAN communication channel during a transmission window of the basic channel. As another example, the data path group may correspond to (e.g., communicate via) a logical channel. To illustrate, the data path group may communicate via a communication channel (e.g., a physical communication channel) during one or more transmission windows. The communication channel and the one or more transmission windows may be associated with the logical channel.

Electronic devices participating in a data path group may monitor one or more communication channels during a beginning portion (e.g., a paging window) of at least some transmission windows associated with the data path group. For example, the provider device 104, the subscriber device 106-112 may listen to (e.g., monitor) the NAN communication channel during a paging window that begins when a NAN discovery window ends. As another example, the provider device 104, the subscriber device 106-112 may listen to (e.g., monitor) a particular communication channel corresponding to an available logical channel during a paging window of one or more corresponding transmission windows.

In a particular aspect, devices participating in a data path group may monitor a corresponding communication channel during at least a first number of paging windows of one or more corresponding transmission windows. For example, a first logical channel of the available logical channels may correspond to a first communication channel and one or more transmission windows. In a particular aspect, the first communication channel may correspond to an Institute of Electrical and Electronics Engineers (IEEE) channel 1 or an IEEE channel 11 in a 2.4 Gigahertz (GHz) frequency band.

The traffic advertisement analyzer 134 may monitor the first communication channel during at least a first percentage (e.g., 50%) of the one or more transmission window. For example, the traffic advertisement analyzer 134 may monitor the first communication channel during a first paging window and may refrain from monitoring the first communication channel during a second paging window. The first paging window and the second paging window may occur during the same discovery interval or during distinct discovery intervals. As referred to herein, a "discovery interval" may refer to a time period between an end of a first discovery window and a beginning of a next discovery window. For example, a discovery interval may correspond to a difference between a discovery end time of a first discovery window and a subsequent discovery begin time of a next discovery window. A first transmission window may include the first paging window and a first data transmission window.

The traffic advertisement generator 130 may generate a traffic advertisement 128 in response to determining that data is available (e.g., in buffer(s) at the provider device 104) to be sent by the provider device 104 to multiple subscriber devices (e.g., the subscriber devices 106-110). For example, the traffic advertisement 128 may indicate (or identify) multiple data recipients (e.g., the first subscriber device 106, the second subscriber device 108, and the third subscriber device 110). In a particular aspect, the traffic advertisement generator 130 may transition to an inactive mode (e.g., a sleep mode) during a remaining portion of the first transmission window in response to determining during the first paging window that the provider device 104 does not have data to send. In a particular aspect, when the traffic advertisement generator 130 transitions to the inactive mode, the traffic advertisement generator 130 may transition the provider device 104 to the inactive mode.

In a particular aspect, the traffic advertisement analyzer 134 may transition to the inactive mode during a remaining portion of the first data transmission window in response to determining that no traffic advertisements have been received from a provider device (e.g., the provider device 104) during the first paging window. In a particular aspect, when the traffic advertisement analyzer 134 transitions to the inactive mode, the traffic advertisement analyzer 134 may transition the first subscriber device 106 to the inactive mode.

The traffic advertisement generator 130 may send the traffic advertisement 128 via the first communication channel during the first paging window. In a particular aspect, the traffic advertisement 128 may include an announcement traffic indication message (ATIM), an action frame (e.g., a public action frame), or another message. For example, the traffic advertisement 128 may be sent during an ATIM window at the beginning (e.g., the first paging window) of the first transmission window.

The traffic advertisement 128 may include a unicast message or a multicast message. In a particular aspect, the traffic advertisement 128 may include a unicast message and may indicate that the first subscriber device 106 is a destination of the traffic advertisement 128. Although, the traffic advertisement 128 may be a unicast message, the traffic advertisement 128 may indicate multiple subscriber devices (e.g., the first subscriber device 106, the second subscriber device 108, and the third subscriber device 110) as data recipients. For example, the traffic advertisement 128 may include an address list (e.g., a MAC address indicator list) indicating addresses (e.g., media access control (MAC) addresses) of the multiple subscriber devices. To illustrate, a MAC address indicator of the MAC address indicator list may include at least a portion of a MAC address of a corresponding subscriber device, a hash value based on the MAC address, or another value based on the MAC address. In a particular aspect, the traffic advertisement 128 may include a bitmap indicating the address list. A particular bit of the bitmap may be associated with a particular MAC address indicator of a subscriber device. For example, a first bit of the bitmap may be associated with a MAC address indicator of the first subscriber device 106, and a second bit of the bitmap may be associated with a MAC address indicator of the fourth subscriber device 112. A value of each bit in the bitmap may indicate whether the corresponding subscriber device is included in the multiple subscriber devices (i.e., is a data recipient). For example, a first value (e.g., 1) of a first bit may indicate that the first subscriber device 106 is included in the multiple subscriber devices. As another example, a second value (e.g., 0) of a second bit may indicate that the fourth subscriber device 112 is not included in the multiple subscriber devices.

In a particular aspect, the traffic advertisement 128 may indicate that the multiple subscriber devices include each of the subscriber devices associated with the data path group. For example, the traffic advertisement generator 130 may set a destination field of the traffic advertisement 128 to indicate the identifier of the particular service in response to determining that the data is to be sent by the provider device 104 to each of the subscriber devices associated with the data path group. Thus, setting the destination field of the traffic advertisement 128 to identify the particular service may be equivalent to asserting all bits of the bitmap. In a particular aspect, the traffic advertisement 128 may indicate availability of multicast data. For example, the same data may be available to be sent to each of the subscriber devices associated with the data path group.

In a particular aspect, the traffic advertisement 128 may include an ATIM and a destination field of the ATIM may include a group address indicating multiple data recipients (e.g., the first subscriber device 106, the second subscriber device 108, and the third subscriber device 110). For example, the destination field of the ATIM may include an identifier of the particular service indicating that the ATIM is addressed to each of the subscriber devices (e.g., the first subscriber device 106, the second subscriber device 108, the third subscriber device 110, and the fourth subscriber device 112) associated with the data path group.

The traffic advertisement 128 may be received by the subscriber device 106-112. For example, the traffic advertisement analyzer 134 may receive the traffic advertisement 128 via the transceiver 136 of the first subscriber device 106. The first subscriber device 106 may forward the traffic advertisement 128 to subscriber devices (e.g., the fifth subscriber device 114) that are within a single-hop of the first subscriber device 106.

A traffic advertisement analyzer of a subscriber device may receive the traffic advertisement 128 and may determine whether the traffic advertisement 128 indicates that the subscriber device is included in the multiple subscriber devices. For example, a traffic advertisement analyzer of the fourth subscriber device 112 may receive the traffic advertisement 128 and may determine that the traffic advertisement 128 indicates that the fourth subscriber device 112 is excluded from the multiple subscriber devices. In response, the fourth subscriber device 112 may transition to the inactive mode. As another example, the traffic advertisement analyzer 134 may determine that the first subscriber device 106 is included in the multiple subscriber devices based on the address list indicating an address of the first subscriber device 106, a particular bit of the bitmap corresponding to the first subscriber device 106 having a particular value (e.g., 1), the traffic advertisement 128 indicating that the first subscriber device 106 is the unicast destination of the traffic advertisement 128, the destination field of the traffic advertisement 128 indicating (e.g., including an identifier of) the particular service, the traffic advertisement 128 indicating availability of multicast data, or a combination thereof.

In a particular aspect, a subscriber device may be operating in a monitor (e.g., promiscuous) mode. For example, while the subscriber device is operating in the monitor mode, a traffic advertisement analyzer (e.g., the traffic advertisement analyzer 134) of the subscriber device may receive the traffic advertisement 128, which may be detected by a transceiver (e.g., the transceiver 136) of the subscriber device regardless of whether the traffic advertisement 128 indicates that the subscriber device is a destination of the traffic advertisement 128. To illustrate, even though the traffic advertisement 128 may be a unicast message to the first subscriber device 106, a transceiver of the second subscriber device 108 may detect the traffic advertisement 128. In a particular aspect, a subscriber device may receive and process a message (e.g., the traffic advertisement 128) when the message indicates that the subscriber device is a destination of the message, when the message indicates that a source of the message is a provider device (e.g., the provider device 104) of the data path group, or both.

In a particular aspect, an interface of a first device (e.g., the provider device 104 or the subscriber device 106-114) may be configured to operate in the monitor mode (e.g., the promiscuous mode). The interface may be configured, while operating in the monitor mode (e.g., the promiscuous mode), to receive a packet (e.g., the traffic advertisement 128). The interface may be configured to provide the packet to a processor (e.g., the traffic advertisement analyzer 134 or the traffic advertisement generator 130) of the device (e.g., the provider device 104 or the subscriber device 106-114) independently of whether the packet indicates that the interface is a destination of the packet.

The processor (e.g., the traffic advertisement analyzer 134 or the traffic advertisement generator 130) may be configured to selectively process the packet (e.g., the traffic advertisement 128) based on at least one criterion. The processor (e.g., the traffic advertisement analyzer 134 or the traffic advertisement generator 130) may determine that the at least one criterion is satisfied in response to determining that an AID has been assigned to a source of the packet, determining that the packet includes a group identifier of a group of devices that includes the first device, determining that the packet corresponds to an active traffic session with the source of the packet, or a combination thereof. For example, the second subscriber device 108 may receive a packet (e.g., the traffic advertisement 128) from the provider device 104. The second subscriber device 108 may, while operating in the monitor mode (e.g., the promiscuous mode), selectively process the packet (e.g., the traffic advertisement 128). For example, the second subscriber device 108 may process the packet (e.g., the traffic advertisement 128) in response to determining that packet includes a group identifier of a group of devices that includes the second subscriber device 108. The group of devices may include an NDL group (e.g., the NAN 102) of a NAN cluster. The group identifier may include a NAN cluster identifier of the NAN cluster, an NDL identifier of the NDL group (e.g., the NAN 102), or another value that is compliant with an IEEE 802.11 specification. The second subscriber device 108 may, while in the monitor mode, process the packet independently of whether the packet indicates that the second subscriber device 108 is a destination of the packet.

In a particular implementation, the second subscriber device 108 may, while operating in the monitor mode, process the packet (e.g., the traffic advertisement 128) in response to determining that the second subscriber device 108 is associated with the provider device 104 independently of whether the packet indicates that the second subscriber device 108 is a destination of the packet. For example, the second subscriber device 108 may determine that the packet (e.g., the traffic advertisement 128) includes an association identifier (AID) of the provider device 104 and that the second subscriber device 108 assigned the association identifier to the provider device 104 during an association process between the provider device 104 and the second subscriber device 108, as described herein.

In a particular implementation, the first subscriber device 106 may, while operating in the monitor mode, process a packet (e.g., the data 122) in response to determining the packet (e.g., the data 122) corresponds to an active session between the first subscriber device 106 and the provider device 104. The first subscriber device 106 may determine that the packet (e.g., the data 122) corresponds to the active session based on a pattern associated with packets previously received from the provider device 104, a type of service associated with a service advertisement previously received from the provider device 104, or both. For example, the first subscriber device 106 may have previously received packets from the provider device 104 at intervals of approximately a first duration. The first subscriber device 106 may receive a previous packet from the provider device 104 at a first time. The first subscriber device 106 may receive the packet (e.g., the data 122) from the provider device 104 at a second time. The first subscriber device 106 may determine that the packet (e.g., the data 122) corresponds to the active session in response determining that a second duration between the first time and the second time approximates the first duration.

As another example, the first subscriber device 106 may determine that a service advertisement was previously received from the provider device 104. The first subscriber device 106 may determine that a type of service (e.g., a file transfer protocol (FTP) service, a voice over internet protocol (VoIP) service, a gaming service, a messaging service, or a combination thereof) is associated with the service advertisement. The first subscriber device 106 may determine that the packet corresponds to the active session in response to determining that the second duration satisfies (e.g., is less than or equal to) a threshold duration corresponding to the type of service. The first subscriber device 106 may, while operating in the monitor mode, process the packet in response to determining that the packet corresponds to the active session independently of whether the packet indicates that the first subscriber device 106 is a destination of the packet.

A traffic advertisement analyzer of a subscriber device may determine whether the subscriber device is a "leader" device of the multiple subscriber devices that are indicated by the traffic advertisement 128 as being data recipients (e.g., the subscriber devices 106-110). A leader device may be a subscriber device that sends an ACK in response to receiving the traffic advertisement 128. A single subscriber device of the multiple subscriber devices (e.g., the subscriber devices 106-110) may be a leader device. For example, the traffic advertisement analyzer 134 may determine whether the first subscriber device 106 is the leader device of the subscriber devices 106-110. The traffic advertisement analyzer 134 may determine whether the subscriber device is included in the multiple subscriber devices. Subscriber devices that are not indicated as being a data recipient (e.g., the fourth subscriber device 112) may be assumed as not being a leader device.

In a particular aspect, the traffic advertisement generator 130 may select one of the multiple subscriber devices as the leader device. The multiple subscriber devices may include each of the subscriber devices (e.g., the subscriber devices 106-112) associated with the data path group when the traffic advertisement 128 indicates availability of multicast data. The traffic advertisement 128 may indicate the leader device. For example, a particular value (e.g., 1 or an address of the first subscriber device 106) of a particular field (e.g., destination field, a leader device field, or both) of the traffic advertisement 128 may indicate that the first subscriber device 106 is the leader device. As another example, a particular order (e.g., first or last) in which the first subscriber device 106 is indicated in the multiple subscriber devices may indicate that the first subscriber device 106 is the leader device.

The traffic advertisement analyzer 134 may determine that the first subscriber device 106 is the leader device in response to determining that the particular field of the traffic advertisement 128 has the particular value, that the first subscriber device 106 is indicated in the particular order in the multiple subscriber devices, or both. For example, the traffic advertisement analyzer 134 may determine that the first subscriber device 106 is the leader device in response to determining that the traffic advertisement 128 includes a unicast message and that the traffic advertisement 128 (e.g., the destination field of the traffic advertisement 128) indicates that the first subscriber device 106 is a destination of the traffic advertisement 128. As another example, a traffic advertisement analyzer of the second subscriber device 108 may determine that the second subscriber device 108 is not the leader device in response to determining that the traffic advertisement 128 includes a unicast message and that the traffic advertisement 128 does not indicate that the second subscriber device 108 is a destination of the traffic advertisement 128.

The second subscriber device 108 may transition to the inactive mode during a remaining portion of the paging window in response to determining that the second subscriber device 108 is not the leader device. For example, the second subscriber device 108 may remain in the inactive mode until a trigger slot or the first data transmission window. The trigger slot may be subsequent to the first paging window and prior to the first data transmission window.

In a particular aspect, the traffic advertisement analyzer 134 may determine that the first subscriber device 106 is the leader device in response to determining that the first subscriber device 106 is included in the multiple subscriber devices (e.g., the subscriber devices 106-110) and that an acknowledgement (ACK) responsive to the traffic advertisement 128 from another subscriber device to the provider device 104 is undetected within a particular time period of receiving the traffic advertisement 128.

The particular time period may be based on a default value, an identifier (e.g., an address) of the first subscriber device 106, a counter (e.g., a random counter or a pseudo-random counter), or a combination thereof. For example, the traffic advertisement analyzer 134 may determine a sorting order (e.g., $1^{st}$, $2^{nd}$, etc.) of the identifier (e.g., the first address) of the first subscriber device 106 relative to identifiers (e.g., addresses) of the multiple subscriber devices indicated by the traffic advertisement 128. The traffic advertisement analyzer 134 may determine the duration of the particular time period by applying a particular function (e.g., multiplication, addition, or both) to the sorting order and to a gap duration. The gap duration may have a default value (e.g., 100 milliseconds). In a particular aspect, the provider device 104 (e.g., the traffic advertisement generator 130) may provide the gap duration to the subscriber devices 106-112. For example, the traffic advertisement 128 may indicate the gap duration. As another example, the traffic advertisement analyzer 134 may set (or reset) the pseudo-random counter at a first time in response to receiving the traffic advertisement 128. The duration may correspond to a time when the pseudo-random counter expires.

The traffic advertisement analyzer 134 may refrain from sending an ACK 138 responsive to the traffic advertisement 128 based on determining that the first subscriber device 106 is not the leader device. Alternatively, the traffic advertisement analyzer 134 may send the ACK 138, via the transceiver 136 of the first subscriber device 106, to the provider device 104 in response to determining that the first subscriber device 106 is the leader device. For example, the traffic advertisement analyzer 134 may send the ACK 138 via the first communication channel during the first paging window. The ACK 138 may include a MAC frame. The ACK 138 may indicate that the first subscriber device 106 is available to receive traffic during the first data transmission window.

In a particular aspect, the second subscriber device 108 may detect the ACK 138 from the first subscriber device 106 to the provider device 104 during the first paging window. A traffic advertisement analyzer of the second subscriber device 108 may determine that the second subscriber device 108 is not the leader device in response to detecting the ACK 138 from the first subscriber device 106 to the provider device 104. The traffic advertisement analyzer of the second subscriber device 108 may refrain from sending an ACK responsive to the traffic advertisement 128 in response to determining that the second subscriber device 108 is not the leader device. The second subscriber device 108 may conserve network resources by refraining from sending the ACK.

Alternatively, the second subscriber device 108 may determine that another ACK from another subscriber device is undetected within a first duration of receiving the traffic advertisement 128, even though the first subscriber device 106 has sent the ACK 138 within the first duration. For example, the ACK 138 may be undetected by the second subscriber device 108 due to network conditions. The second subscriber device 108 may assume that the second subscriber device 108 is the leader device and may also send an ACK. In this example, more than one subscriber device may determine that that subscriber device is the leader device.

In a particular aspect, the third subscriber device 110 may receive the traffic advertisement 128. A traffic advertisement analyzer of the third subscriber device 110 may determine that the third subscriber device 110 is unavailable during a subsequent portion of the first transmission window. The traffic advertisement analyzer of the third subscriber device 110 may, in response to the determination, refrain from sending an ACK responsive to the traffic advertisement 128. In a particular aspect, the third subscriber device 110 may transition to the inactive mode during a remainder of the first transmission window in response to determining that the third subscriber device 110 is unavailable during the subsequent portion of the first transmission window.

In some implementations, a subscriber device (e.g., the subscriber device 106-112) may send the ACK 138 independently of determining whether the subscriber device is a leader device. For example, the fourth subscriber device 112 may, in response to receiving the traffic advertisement 128, send the ACK 138 to the provider device 104. In some implementations, a subscriber device (e.g., the subscriber device 106-112) may send the ACK 138 in response to determining that another ACK from another subscriber device responsive to the traffic advertisement 128 is undetected. For example, the fourth subscriber device 112 may, in response to receiving the traffic advertisement 128 and determining that another ACK from another subscriber device responsive to the traffic advertisement 128 is undetected, send the ACK 138 to the provider device 104.

The traffic advertisement generator 130 may receive the ACK 138, via the transceiver 136 of the provider device 104, from the first subscriber device 106 during the first paging window. The traffic advertisement generator 130 may assume that the traffic advertisement 128 is likely to have been received by the remaining subscriber devices (e.g., the subscriber devices 108-110) in response to receiving the ACK 138 from the first subscriber device 106. A size (e.g., a default size) of the first paging window may be smaller to accommodate an ACK (e.g., the ACK 138) from a single subscriber device (or a few subscriber devices) of the multiple subscriber devices (e.g., the subscriber devices 106-110), as compared to a paging window to accommodate ACKs from all of the multiple subscriber devices. The devices 104-112 of the data path group may conserve network resources by monitoring the first communication channel during the shorter paging window, as compared to a longer paging window.

The traffic advertisement generator 130 may remain in an active operating mode in response to determining that the ACK 138 has been received during the first paging window. In a particular aspect, the traffic advertisement generator 130 may, in response to receiving the ACK 138, transition to the inactive mode until detecting the trigger slot or the first data transmission window. For example, the traffic advertisement generator 130 may, in response to receiving the ACK 138, transition to the inactive mode during the remainder of the first paging window and may transition to the active operating mode at a beginning of the trigger slot or a beginning of the first data transmission window. The traffic advertisement generator 130 may thus conserve network resources by refraining from monitoring the first communication channel during a remaining portion of the first paging window in response to receiving a single ACK.

In a particular aspect, the traffic advertisement generator 130 may determine that no ACK responsive to a particular traffic advertisement has been received from a particular subscriber device (e.g., a subscriber device distinct from the first subscriber device 106) within a particular ACK duration of sending the particular traffic advertisement to the particular subscriber device. The particular traffic advertisement (e.g., a unicast message) may indicate the particular subscriber device as a destination of the particular traffic advertisement. The traffic advertisement generator 130 may determine that a first number of traffic advertisements have been sent during the first paging window. The traffic advertisement generator 130 may send the traffic advertisement 128 indicating the first subscriber device 106 as a destination of the traffic advertisement 128 in response to determining that the first number of traffic advertisements fails to satisfy an advertising threshold. In a particular aspect, the traffic advertisement generator 130 may transition to the inactive mode during a remaining portion of the first transmission window in response to determining that no ACK responsive to the traffic advertisement 128 has been received during the first paging window and that the first number of traffic advertisements satisfies the advertising threshold.

An ACK (e.g., the ACK 138) responsive to the traffic advertisement 128 from at least one subscriber device may function as feedback to the traffic advertisement generator 130. For example, the traffic advertisement generator 130 may determine that the traffic advertisement 128 has been reliably transmitted (e.g., without collision and without errors) in response to receiving an ACK from at least one (e.g., fewer than all) of the subscriber devices 106-110. To illustrate, the traffic advertisement generator 130 may, in response to receiving the ACK 138, determine that the traffic advertisement 128 has been sent without collision and has been received without errors by at least one subscriber device (e.g., the first subscriber device 106).

The traffic advertisement generator 130 may improve reliability of traffic advertisement transmission by sending a second traffic advertisement in response to determining that no ACK responsive to a first traffic advertisement has been received within a particular ACK duration of sending the first traffic advertisement during the first paging window. The traffic advertisement generator 130 may send the first traffic advertisement at a first time during the first paging window. The traffic advertisement generator 130 may send the second traffic advertisement at a second time in response to determining that no ACK responsive to the first advertisement has been received within the particular ACK duration of the first time. The second time is subsequent to the first time. The second time may be during the first paging window or during a second paging window subsequent to the first paging window. The second traffic advertisement may be reliably transmitted at the second time due to changes in network conditions. In a particular aspect, the first traffic advertisement may be a first unicast message with a first unicast destination and the second traffic advertisement may be a second unicast message with a second unicast destination that is distinct from the first unicast destination. The second traffic advertisement may be reliably transmitted to the second unicast destination even though the first traffic advertisement was not reliably transmitted to the first unicast destination. For example, the first traffic advertisement may not have been reliably transmitted because of local network conditions of the first unicast destination causing collisions, errors, or both. The second traffic advertisement may be reliably transmitted to the second unicast destination because local network conditions of the second unicast destination are not causing collisions or errors.

The traffic advertisement generator 130 may determine network reliability (e.g., reliability of transmission of the traffic advertisement 128) in response to determining whether an ACK has been received during the first paging window. For example, the traffic advertisement generator 130 may determine that the traffic advertisement 128 is likely to have been received by each of the subscriber devices 106-110 during the first paging window in response to determining that the traffic advertisement 128 has been received by at least one of the subscriber devices 106-110 during the first paging window. To illustrate, the traffic advertisement generator 130 may determine that the traffic advertisement 128 has been received by the first subscriber device 106 in response to receiving the ACK 138 from the first subscriber device 106 during the first paging window. The traffic advertisement generator 130 may determine that the traffic advertisement 128 is likely to have been received by the subscriber devices 108-110 during the first paging window in response to determining that the traffic advertisement 128 has been received by the first subscriber device 106. Alternatively, the traffic advertisement generator 130 may determine that the traffic advertisement 128 is unlikely to have been received by the subscriber devices 106-110 in response to determining that no ACK responsive to the traffic advertisement 128 has been received from any of the subscriber devices 106-110 during the first paging window. In a particular aspect, a traffic advertisement may not be received by the subscriber devices 106-110 or an ACK responsive to the traffic advertisement may not be received by the provider device 104 due to network collisions, packet loss, or other communication errors.

The first subscriber device 106 (or the second subscriber device 108) may remain in the active operating mode (or may transition to the sleep mode and transition back to the active operating mode) in response to receiving the traffic advertisement 128. For example, the traffic advertisement analyzer 134 may monitor the first communication channel during a subsequent window (e.g., the trigger slot or the first data transmission window) in response to receiving the traffic advertisement 128 and determining that the traffic advertisement 128 indicates that the first subscriber device 106 is a data recipient (e.g., is included in the multiple subscriber devices).

In a particular aspect, the second subscriber device 108 may determine that the second subscriber device 108 is not a leader device and that the traffic advertisement 128 indicates that the second subscriber device 108 is a data recipient. In response to the determination, the second subscriber device 108 may transition to the inactive mode during a remaining portion of the first paging window and may transition to the active operating mode during the subsequent window (e.g., the trigger slot or the first data transmission window), because the second subscriber device 108 is not responsible for acknowledging the traffic advertisement 128. The second subscriber device 108 may conserve network resources by refraining from sending an ACK.

In a particular aspect, the traffic advertisement analyzer 134 (or the traffic advertisement generator 130) may change a channel of the transceiver 136 of a particular subscriber device (or the provider device 104) to the first communication channel to monitor the first communication channel. In a particular aspect, the traffic advertisement analyzer 134 (or the traffic advertisement generator 130) may monitor the NAN communication channel during a paging window of the basic channel by continuing to monitor the NAN communication channel after an end of a NAN discovery window. The traffic advertisement analyzer 134 (or the traffic advertisement generator 130) may thus avoid a wakeup penalty that may be associated with switching from refraining from monitoring a communication channel subsequent to the NAN discovery window to monitoring the communication channel during a paging window.

The traffic advertisement generator 130 may send data 122 to a particular subscriber device (e.g., the subscriber device 106-108) via the first communication channel during a first data transmission window. For example, the traffic advertisement generator 130 may send the data 122 via the transceiver 136 of the provider device 104. The first data transmission window may correspond to an ending portion of the first transmission window.

In a particular aspect, the traffic advertisement generator 130 may send the data 122 to multiple subscriber devices during the first data transmission window in response to determining that an ACK (e.g., the ACK 138) has been received from a single subscriber device of the multiple subscriber devices, that an ACK has been received from fewer than all of the multiple subscriber devices, or that an ACK has been received from each of the multiple subscriber devices during the first paging window.

In a particular aspect, the traffic advertisement generator 130 may send the data 122 to one or more of the multiple subscriber devices (e.g., the subscriber devices 106-110). For example, the traffic advertisement generator 130 may determine that the ACK 138 has been received from the first subscriber device 106 and that no ACK has been received from the second subscriber device 108. The traffic advertisement generator 130 may send the data 122 to the first subscriber device 106 and the data 122 to the second subscriber device 108 in response to determining that the ACK 138 has been received from the first subscriber device 106 (e.g., regardless of whether an ACK has been received from the second subscriber device 108 during the first paging window). The second subscriber device 108 may receive the data 122, even though the second subscriber device 108 has not sent an ACK during the first paging window.

The first paging window may not have to accommodate ACKs from all data recipients for the data recipients (e.g., the second subscriber device 108) to receive data. For example, the first paging window may accommodate an ACK (e.g., the ACK 138) from one of the first subscriber device 106 and the second subscriber device 108 for both of the first subscriber device 106 and the second subscriber device 108 to receive data. A size of the first paging window may be smaller, as compared to a paging window that accommodates ACKs from all of the multiple subscriber devices (e.g., the subscriber devices 106-110). The device 104-112 of the data path group may conserve network resources by monitoring the first communication channel during a smaller paging window. The data 122 sent to a particular subscriber device (e.g., the first subscriber device 106) may be distinct or same as the data 122 sent to another subscriber device (e.g., the second subscriber device 108). Thus, the data 122 may be unicast, broadcast, or communicated via some other scheme.

In a particular aspect, the traffic advertisement generator 130 may send the data 122 to a particular subscriber device of the multiple subscriber devices based on availability of the particular subscriber device. The traffic advertisement generator 130 may determine that the particular subscriber device is available to receive the data 122 in response to determining that an ACK (e.g., the ACK 138), a data trigger (e.g., a trigger message 150), or both, have been received from the particular subscriber device. For example, the traffic advertisement generator 130 may send the data 122 to the first subscriber device 106 in response to determining that the ACK 138 has been received from the first subscriber device 106 during the first paging window. As another example, the traffic advertisement generator 130 may send the data 122 to the first subscriber device 106 (or the second subscriber device 108) in response to determining that the trigger message 150 has been received from the first subscriber device 106 (or the second subscriber device 108, as described herein.

A traffic advertisement analyzer of a particular subscriber device may send the trigger message 150 via the first communication channel to the provider device 104 in response to determining that the traffic advertisement 128 has been received during the first paging window, that the particular subscriber device is included in the multiple recipients (e.g., is a data recipient), and that the particular subscriber device is available during a remaining portion of the first transmission window. For example, a traffic advertisement analyzer (e.g., the traffic advertisement analyzer 134) of the subscriber device 106, 108 may send the trigger message 150 via the first communication channel to the provider device 104 in response to determining that the traffic advertisement 128 has been received by the subscriber device 106, 108 during the first paging window, that the traffic advertisement 128 indicated that the subscriber device 106, 108 is a data recipient, and that the subscriber device 106, 108 is available during the remaining portion of the first transmission window. The trigger message 150 may indicate that the subscriber device 106, 108 is available to receive traffic during the first data transmission window. As another example, a traffic advertisement analyzer of the third subscriber device 110 may refrain from sending the trigger message 150 via the first communication channel to the provider device 104 in response to determining that the third subscriber device 110 is unavailable during a portion of the first transmission window.

In a particular aspect, the first subscriber device 106 and the second subscriber device 108 may contend for medium reservation to transmit the respective trigger messages 150. The first subscriber device 106 and the second subscriber device 108 may use contention mitigation techniques in accordance with a NAN standard or protocol. For example, the traffic advertisement analyzer 134 may select a random or pseudo-random start time within the trigger slot, the beginning portion of the first data transmission window, or the first data transmission window. The traffic advertisement analyzer 134 may select a random or pseudo-random back-off count. The traffic advertisement analyzer 134 may use a carrier sense multiple access (CSMA) protocol based on the start time and the back-count as a contention mitigation technique to transmit the trigger message 150 to the provider device 104.

In a particular aspect, the traffic advertisement analyzer 134 may refrain from sending the trigger message 150 in response to determining that traffic advertisement analyzer 134 sent the ACK 138 to the provider device 104 during the first paging window. For example, the traffic advertisement analyzer 134 of the first subscriber device 106 may refrain from sending the trigger message 150 to the provider device 104 in response to determining that the ACK 138 has been sent from the first subscriber device 106. A traffic advertisement analyzer of the second subscriber device 108 may send the trigger message 150 to the provider device 104 in response to determining that the traffic advertisement analyzer 134 received the traffic advertisement 128 during the first paging window, that the traffic advertisement 128 indicated that the second subscriber device 108 is a data recipient, that the second subscriber device 108 is available during a remaining portion of the first transmission window, and that an ACK responsive to the traffic advertisement 128 has not been sent from the second subscriber device 108 during the first paging window.

The traffic advertisement generator 130 may send the data 122 via the first communication channel during the first data transmission window to the subscriber device 106, 108 in response to determining that the trigger message 150 has been received from the subscriber device 106, 108 during the first paging window. In a particular aspect, the traffic advertisement generator 130 may send the data 122 to an acknowledging subscriber device from which the traffic advertisement generator 130 has received an ACK responsive to the traffic advertisement 128 during the first paging window, regardless of whether a data trigger (e.g., the trigger message 150) has been received from the acknowledging subscriber device. For example, the traffic advertisement generator 130 may send the data 122 to the first subscriber device 106 in response to determining that the ACK 138 has been received from the first subscriber device 106 during the first paging window, regardless of whether the trigger message 150 is received from the first subscriber device 106 by the traffic advertisement generator 130. The traffic advertisement generator 130 may send the data 122 to the second subscriber device 108 in response to receiving the trigger message 150 from the second subscriber device 108. The data 122 sent to the second subscriber device 108 may be distinct from the data 122 sent to the first subscriber device 106.

The trigger slot may occur subsequent to an end of the first paging window and prior to a beginning of the first data transmission window. In a particular aspect, the trigger message 150 may be exchanged during the trigger slot, during a beginning portion of the first data transmission window, or during the first data transmission window.

In a particular aspect, trigger duration of the trigger slot may be dynamically determined. For example, the traffic advertisement generator 130 may determine that the trigger slot has ended and that the first data transmission window has started in response to determining that expected data triggers (e.g., the trigger message 150) have been received during the trigger slot. In a particular aspect, the expected data triggers may correspond to data triggers from each of the data recipients (e.g., the subscriber devices 106-110). In an alternate aspect, the expected data triggers may exclude a data trigger from an acknowledging subscriber device (e.g., the first subscriber device 106) from which the traffic advertisement generator 130 received an ACK during the first paging window.

The beginning portion (e.g., an acknowledgement window) of the data transmission window during which a data trigger (e.g., the trigger message 150) may be exchanged may have a particular duration. The particular duration may be a default value or may be based on user input. In a particular aspect, the particular duration may be dynamically determined. For example, the traffic advertisement generator 130 may determine that the beginning portion of the first data transmission window has ended in response to determining that the expected data triggers have been received.

The traffic advertisement generator 130 may send the data 122 in response to receiving the trigger message 150. For example, the traffic advertisement generator 130 may send the data 122 to the first subscriber device 106 in response to receiving the trigger message 150 from the first subscriber device 106. As another example, the traffic advertisement generator 130 may send the data 122 to the second subscriber device 108 in response to receiving the trigger message 150 from the second subscriber device 108. The traffic advertisement generator 130 may refrain from sending the data 122 to the third subscriber device 110 in response to determining that no data trigger (e.g. the trigger message 150) has been received from the third subscriber device 110 during the trigger slot or the beginning portion of the first data transmission window.

The data 122 sent to the first subscriber device 106 may be same as or distinct from the data 122 send to the second subscriber device 108. The traffic advertisement generator 130 may send the data 122 during a second portion (e.g., an ending portion) of the first data transmission window. The second portion of the first data transmission window may be subsequent to the beginning portion (e.g., the acknowledgement window) of the data transmission window.

An electronic device (e.g., the devices 104-112) of the data path group may be available during a portion (e.g., 80%) of the one or more transmission windows. The provider device 104 (or the subscriber device 106-112) may not receive messages from the subscriber device 106-112 (or the provider device 104) because the subscriber device 106-112 (or the provider device 104) may be unavailable or because of network errors. The provider device 104 (or the subscriber device 106-112) may conserve resources by refraining from monitoring the particular communication channel when one or more of the subscriber devices 106-112 are (or the provider device 104 is) unavailable to receive (or send) data or is unable to receive (send) data because of network errors.

In a particular aspect, a traffic advertisement analyzer (e.g., the traffic advertisement analyzer 134) of a particular subscriber device (e.g., the first subscriber device 106) may remain in the active operating mode during a remaining portion of the first transmission window in response to determining that an ACK (e.g., the ACK 138) responsive to the traffic advertisement 128 has been sent to the provider device 104 from the particular subscriber device (e.g., the first subscriber device 106) during the first paging window.

In a particular aspect, the traffic advertisement generator 130 may transition to the inactive mode during a remaining portion of the first transmission window in response to determining that no data triggers (e.g., the trigger message 150) have been received during the trigger slot or during the beginning portion of the first data transmission window. For example, the traffic advertisement generator 130 may send the traffic advertisement 128 at a first time. The traffic advertisement generator 130 may, in response to determining, at a second time, that a difference between the first time and the second time is greater than a trigger threshold and that receipt of no trigger messages responsive to the traffic advertisement 128 has been detected, transition to an inactive mode during a remaining portion of the first transmission window. In some implementations, the traffic advertisement 128, the first negotiation message 1928, the second negotiation message 1938, a service advertisement, another message, or a combination thereof, may indicate the trigger threshold. For example, the traffic advertisement generator 130 may determine the trigger threshold based on a count (e.g., 3) of the multiple subscriber devices (e.g., the subscriber devices 106-110). The trigger threshold may be longer for a higher count of the multiple subscriber devices.

In a particular aspect, the traffic advertisement generator 130 may remain in the active mode during a remaining portion of the first transmission window in response to determining that the trigger message 150 has been received from at least one subscriber device (e.g., the subscriber device 106-108).

In a particular aspect, the traffic advertisement generator 130 may remain in the active mode during a remaining portion of the first transmission window in response to determining that an ACK (e.g., the ACK 138) has been received by the provider device 104 from at least one subscriber device (e.g., the first subscriber device 106) during the first paging window (e.g., regardless of whether the trigger message 150 has been received by the provider device 104).

In a particular aspect, the traffic advertisement generator 130, the traffic advertisement analyzer 134, or both, may refrain from monitoring the first communication channel while in the inactive mode. A transceiver of the device 104-114 may receive data via the first communication channel during the first transmission window and may refrain from providing the data to a traffic advertisement analyzer (or a traffic advertisement generator) in response to determining that the traffic advertisement analyzer (or the traffic advertisement generator) is refraining from monitoring the first communication channel during the first transmission window. For example, the transceiver 136 of the provider device 104 may receive data via the first communication channel during the first transmission window and may refrain from providing the data to the traffic advertisement generator 130 in response to determining that the traffic advertisement generator 130 is refraining from monitoring the first communication channel during the first transmission window. As another example, the transceiver 136 of the first subscriber device 106 may receive data via the first communication channel during the first transmission window and may refrain from providing the data to the traffic advertisement analyzer 134 in response to determining that the traffic advertisement analyzer 134 is refraining from monitoring the first communication channel during the first transmission window.

In a particular aspect, the transceiver 136 may provide the data to a wireless interface and the wireless interface may refrain from providing the data to the traffic advertisement analyzer 134 (or to the traffic advertisement generator 130) in response to determining that the traffic advertisement analyzer 134 (or the traffic advertisement generator 130) is refraining from monitoring the first communication channel during the first transmission window.

In a particular aspect, the wireless interface or the transceiver 136 may discard the data in response to determining that the traffic advertisement analyzer 134 (or the traffic advertisement generator 130) is refraining from monitoring the first communication channel during the first transmission window. In a particular aspect, the wireless interface may provide the data to the traffic advertisement analyzer 134 (or the traffic advertisement generator 130) in response to determining that the traffic advertisement analyzer 134 (or the traffic advertisement generator 130) is monitoring the first communication channel during the first transmission window.

In a particular aspect, the traffic advertisement generator 130, the traffic advertisement analyzer 134, or both, may perform a "capabilities exchange" prior to the traffic advertisement generator 130 sending the data 122 to the first subscriber device 106. For example, the traffic advertisement generator 130 may send a first capabilities message that includes first communication information of the provider device 104 to the first subscriber device 106, the traffic advertisement analyzer 134 may send a second capabilities message that includes second communication information of the first subscriber device 106 to the provider device 104, or both. The communication information (e.g., the first communication information, the second communication information, or both) may include security information (e.g., group keys or common network keys). The capabilities exchange may be performed during the first paging window, the trigger slot, the beginning portion of the first data transmission window, the first data transmission window, or a combination thereof. In a particular aspect, the second capabilities message may correspond to the trigger message 150.

The traffic advertisement generator 130 may send the data 122 based on the first communication information, the second communication information, or both. For example, the traffic advertisement generator 130 may encrypt the data 122 based on security information of the provider device 104, security information of the first subscriber device 106, or both, prior to sending the data 122.

The traffic advertisement analyzer 134 may receive the data 122 via the first communication channel during the first data transmission window. For example, the traffic advertisement analyzer 134 may receive the data 122 via the transceiver 136 of the first subscriber device 106. In a particular aspect, the transceiver 136 of the first subscriber device 106 may receive the data 122 and may provide the data 122 to the traffic advertisement analyzer 134 in response to determining that the traffic advertisement analyzer 134 is monitoring the first communication channel during the first data transmission window.

In a particular aspect, the traffic advertisement generator 130 and the traffic advertisement analyzer 134 may exchange data via multiple logical channels. The multiple logical channels may include one or more of the available logical channels, the basic channel, or a combination thereof. Each logical channel may correspond to a distinct data session. In a particular aspect, a first transmission window of a first logical channel of the multiple logical channels may overlap a second transmission window of a second logical channel of the multiple logical channels. In this aspect, the transceiver 136 of the provider device 104 and the transceiver 136 of the first subscriber device 106 may be communicating via multiple communication channels (e.g., a first communication channel corresponding to the first logical channel and a second communication channel corresponding to the second logical channel).

In a particular aspect, the traffic advertisement 128 may include an address list (e.g., a MAC address indicator list)

indicating the recipients. A MAC address indicator of the MAC address indicator list may include at least a portion of a MAC address of a corresponding recipient, a hash value based on the MAC address, or another value based on the MAC address. The address list may be represented by a traffic indication map (TIM), a Bloom filter, or in some other manner. In a particular aspect, a value of a particular field of the traffic advertisement 128 may indicate whether the address list is represented by a TIM or by a Bloom filter. The traffic advertisement analyzer 134 may determine whether the address list is represented by the TIM or the Bloom filter based on the value (e.g., 0 or 1) of the particular field.

The TIM may include a bitmap that indicates whether particular electronic devices are recipients of the data to be sent (e.g., the data 122). Each bit of the TIM may correspond to a different electronic device of the data path group, and a value of each bit may indicate whether or not the corresponding electronic device is a recipient of the data 122. A correspondence between the bit of the TIM and each electronic device may be based on an association identifier (AID). For example, the first subscriber device 106 may associate with the provider device 104. The provider device 104 and the first subscriber device 106 may generate and exchange AIDs. For example, the first subscriber device 106 may associate with the provider device 104. The provider device 104 may assign a first AID (e.g., 2) to the first subscriber device 106 and may send the first AID to the first subscriber device 106. The first subscriber device 106 may receive the first AID (e.g., 2) from the provider device 104. The subscriber devices 108, 110, and 112 may receive distinct AIDs (e.g., 3 and 4, respectively) during association with the provider device 104. The AIDs may be used by the subscriber device 106-112 to identify corresponding bits in the TIM received from the provider device 104. A particular bit of the TIM may correspond to a particular AID. For example, a second bit of the TIM may correspond to the first subscriber device 106 due to the AID of 2. In this example, a third bit, a fourth bit, and a fifth bit of the TIM may correspond to the second subscriber device 108, the third subscriber device 110, and the fourth subscriber device 112, respectively (a first bit of the TIM may be reserved).

Each of the subscriber devices 106-112 may determine whether it is a recipient of the data 122 based on the corresponding bit in the TIM received from the provider device 104. For example, a determination that the subscriber devices 106-110 are recipients of the data 122 may be based on the second bit, the third bit, and the fourth bit of the TIM having a logical value of one, and a determination that the fourth subscriber device 112 is not a recipient may be based on the fifth bit having a logical zero value. The TIM may be compliant with an IEEE 802.11 specification.

In a particular aspect, the traffic advertisement 128 may include a Bloom filter to represent the address list. The Bloom filter is a data structure (e.g., a string of bits) that indicates membership in a set (e.g., a set of recipients of the data 122) without explicitly identifying members of the set. The Bloom filter may be smaller (e.g., use less storage space) than a TIM and thus may reduce overhead in the networks and may reduce power consumption associated with transmitting the Bloom filter as compared to transmitting the TIM. An electronic device may be indicated as a recipient of the data 122 in the Bloom filter using a set of hash functions corresponding to the Bloom filter. For example, the Bloom filter may be a bit array of m bits that are initialized to a logical zero value, and the Bloom filter may correspond to a set of k hash functions. To indicate that a particular electronic device is a recipient of the data 122, a string of bits corresponding to the particular electronic device may be passed through the k hash functions to generate a set of bit positions, and each bit in the Bloom filter corresponding to the set of bit positions is set to a logical one value. In a particular aspect, the string of bits is a MAC address of the particular electronic device. Other electronic devices may be indicated as recipients of the data 122 by determining corresponding sets of bit positions based on corresponding strings of bits (e.g., MAC addresses) and by setting each bit in the Bloom filter corresponding to the sets of bit positions to a logical one value.

In a particular aspect, a hash function H(j, X, M) representing a jth index hash of a bit string X (e.g., a MAC address) for a Bloom filter having length M is computed in three steps. A first intermediate result A(j, X) may be determined based on Equation 1.

$$A(j,X)=[j\|X] \quad \text{(Eq. 1)}$$

In Equation 1, ∥ represents a concatenation operation and j is represented in one byte. Thus, A(j, X) may represent a concatenation of a one byte index (e.g., a jth index) with a MAC address (e.g., bit string X). A second intermediate result B(j, X) may be determined based on Equation 2.

$$B(j,X)=\text{CRC32}(A(j,X))\&0x0000FFFF \quad \text{(Eq. 2)}$$

In Equation 2, CRC32( ) is a 32-bit cyclic redundancy check operation defined in a NAN standard. Thus, B(j, X) may represent the last two bytes of a result of a 32-bit CRC operation performed on the first intermediate result A(j, X). The hash function H(j, X, M) may be determined based on Equation 3.

$$H(j,X,M)=B(j,X)\bmod M \quad \text{(Eq. 3)}$$

In Equation 3, mod represents a modulo or modulus operation. In this manner, multiple hash functions can be determined for multiple different j indices using Equations 1-3. In other aspects, different hash functions may be used and communicated to the electronic devices of the data path group.

In a particular aspect, a set of four hash functions corresponds to the Bloom filter. A bloom filter index may be included in the traffic advertisement 128 to identify (e.g., to indicate) the set of four hash functions that corresponds to the Bloom filter. In a particular aspect, the bloom filter index is a two-bit number that indicates one of four sets of four hash functions determined based on different index values using Equations 1-3. In this aspect, set of hash functions identified (e.g., indicated) by the bloom filter index are shown in Table 1.

TABLE 1

| Bloom Filter | | Hash Functions | | | |
|---|---|---|---|---|---|
| Set | Index (Binary) | 1 | 2 | 3 | 4 |
| 1 | 00 | H(0x00, X, M) | H(0x01, X, M) | H(0x02, X, M) | H(0x03, X, M) |
| 2 | 01 | H(0x04, X, M) | H(0x05, X, M) | H(0x06, X, M) | H(0x07, X, M) |

TABLE 1-continued

| Bloom Filter Set | Index (Binary) | Hash Functions 1 | 2 | 3 | 4 |
| --- | --- | --- | --- | --- | --- |
| 3 | 10 | H(0x08, X, M) | H(0x09, X, M) | H(0x0A, X, M) | H(0x0B, X, M) |
| 4 | 11 | H(0x0C, X, M) | H(0x0D, X, M) | H(0x0E, X, M) | H(0x0F, X, M) |

In the aspect where the traffic advertisement 128 includes the Bloom filter, the traffic advertisement generator 130 may select a particular set of hash functions to correspond to the Bloom filter and may generate the Bloom filter based on the particular set of hash functions and based on MAC addresses of the electronic devices that are to receive the data 122. For example, the traffic advertisement generator 130 may determine that the first subscriber device 106 is to be a recipient of the data 122, and the traffic advertisement generator 130 may generate the Bloom filter based on the particular set of hash functions and based on the MAC address 156 of the first subscriber device 106. The traffic advertisement generator 130 may have previously stored the MAC addresses of other electronic devices in memory. For example, the traffic advertisement generator 130 may store the MAC address 156 in response to receiving the subscribe message.

The Bloom filter, the Bloom filter index, and a size of the Bloom filter may be included in the traffic advertisement 128 generated by the traffic advertisement generator 130. The Bloom filter index may indicate the particular set of hash functions that corresponds to the Bloom filter (as shown in Table 1). The size of the Bloom filter may indicate a number of bits in the data structure. The size may be determined based on a target false positive percentage corresponding to the Bloom filter. For example, the Bloom filter may generate false positive matches (e.g., may erroneously indicate that a particular electronic device is a recipient of the data 122) and a percentage of false positive matches generated by the Bloom filter may be related to the size of the Bloom filter. The traffic advertisement generator 130 may determine the size such that the false positive percentage approaches a target false positive percentage. To illustrate, increasing the size of the Bloom filter may decrease the false positive percentage, while decreasing the size of the Bloom filter may reduce overhead associated with transmitting the Bloom filter at a cost of increasing the false positive percentage.

Each electronic device (e.g., the subscriber device 106-112) that receives the traffic advertisement 128 may determine whether the electronic device is a recipient of the data 122 based on a Bloom filter included in the traffic advertisement 128, a set of hash functions indicated by a Bloom filter index included in the traffic advertisement 128, and a corresponding MAC address. For example, the traffic advertisement analyzer 134 may determine a set of bit positions by passing a MAC address of the first subscriber device 106 through the set of hash functions. The traffic advertisement analyzer 134 may compare bit(s) in the Bloom filter corresponding to each of the set of bit positions to a particular value (e.g., a logical one value). If the bit(s) corresponding to the set of bit positions each have the particular value (e.g., the logical one value), the traffic advertisement analyzer 134 may determine that the first subscriber device 106 is identified (e.g., indicated) as a recipient of the data 122. If one or more of the bit(s) corresponding to the set of bit positions do not have the particular value (e.g., one or more of the bit(s) has a logical zero value), the traffic advertisement analyzer 134 may determine that the first subscriber device 106 is not identified (e.g., indicated) as a recipient of the data 122.

In a particular aspect, the traffic advertisement generator 130 may select whether the traffic advertisement 128 is to be generated to include a TIM, a MAC address indicator list, bits representing a bloom filter, or an ATIM. The selection may be based on determining whether a count of the recipients of the data 122 is less than a threshold, determining whether an AID has been assigned to at least one of the recipients of the data 122, or both. For example, the traffic advertisement generator 130 may generate the traffic advertisement 128 to include a MAC address indicator list in response to determining that a count of the recipients of the data 122 is less than a list threshold. Alternatively, the traffic advertisement generator 130 may generate the traffic advertisement 128 to include a bloom filter in response to determining that the count of the recipients of the data 122 is greater than or equal to the list threshold. As another example, the traffic advertisement generator 130 may generate the traffic advertisement 128 to include a TIM in response to determining that an AID has been assigned to at least one of the subscriber devices 106-110.

The traffic advertisement generator 130 may generate the traffic advertisement 128 to include an ATIM in response to determining that none of the recipients of the data 122 have been assigned an AID and that the count of the recipients of the data 122 is less than a threshold. In some implementations, the traffic advertisement generator 130 may send a distinct traffic advertisement (e.g., the traffic advertisement 128) to each of the recipients of the data 122 when the traffic advertisement includes an ATIM. For example, the traffic advertisement generator 130 may send a first traffic advertisement (e.g., the traffic advertisement 128) including a first ATIM to the first subscriber device 106, a second traffic advertisement (e.g., the traffic advertisement 128) including a second ATIM to the second subscriber device 108, a third traffic advertisement (e.g., the traffic advertisement 128) including a third ATIM to the third subscriber device 110, or a combination thereof. A subscriber device (e.g., the subscriber device 106-110) may, in response to receiving the traffic advertisement 128 including an ATIM, send the ACK 138 to the provider device 104. For example, the first subscriber device 106 may send the ACK 138 to the provider device 104 in response to receiving the first traffic advertisement (e.g., the traffic advertisement 128), the second subscriber device 108 may send the ACK 138 to the provider device 104 in response to receiving the second traffic advertisement (e.g., the traffic advertisement 128), and so on. In alternate implementations, the traffic advertisement generator 130 may send the same traffic advertisement (e.g., the traffic advertisement 128) to each of the recipients of the data 122. The traffic advertisement generator 130 may set a destination field of the ATIM to indicate a group address (e.g., an NDL group ID of an NDL group associated with the traffic advertisement 128 or another value that represents a subset of devices of the NDL group).

The trigger message 150 may include at least one of a power-save poll (PS-POLL) message, a quality of service null (QoS_NULL) frame, the QoS_NULL frame indicating a reverse direction grant (RDG), an ATIM, an action frame (e.g., a public action frame), or another frame. In a particular aspect, a first power-save poll (PS-POLL) message may operate as the trigger message 150. For example, the traffic advertisement analyzer 134 may generate the first PS-POLL message in a similar manner to generation of a PS-POLL message in a traditional access point (AP) based wireless network. However, the traffic advertisement analyzer 134 may generate the first PS-POLL message as a broadcast message, as compared to a unicast PS-POLL message in the traditional AP based wireless network.

In a particular aspect, the trigger message 150 may be responsive to traffic advertisements (e.g., the traffic advertisement 128) received from a plurality of devices. For example, the first subscriber device 106 may receive the traffic advertisement 128 from the provider device 104 and may receive a second traffic advertisement from a second provider device. The trigger message 150 may be responsive to the traffic advertisement 128 and the second traffic advertisement. For example, the first PS-POLL message may operate as a data trigger for multiple devices (e.g., the provider device 104 and the second provider device). To illustrate, multiple electronic devices (e.g., the provider device 104 and the second provider device) may receive the first PS-POLL message and may send data to the first subscriber device 106 in response to receiving the first PS-POLL message. The trigger message 150 may include a multicast message or a unicast message.

In a particular aspect, the traffic advertisement analyzer 134 may set a portion (e.g., a third octet and a fourth octet) of the first PS-POLL message to a particular value (e.g., "0"s). The traffic advertisement analyzer 134 may transmit the first PS-POLL message via the first communication channel during the trigger slot, during a beginning portion of the first data transmission window, or during the first data transmission window.

The traffic advertisement generator 130 may receive the first PS-POLL message during the trigger slot, during the beginning portion of the first data transmission window, or during the first data transmission window. In response to receiving the first PS-POLL message, the traffic advertisement generator 130 may transmit the data 122 to the first subscriber device 106 via the first communication channel during the first data transmission window (or during the trigger slot, during the beginning portion of the first data transmission window, or during the first data transmission window).

In a particular aspect, a quality of service null (QoS_NULL) frame may operate as trigger message 150. For example, the traffic advertisement analyzer 134 may generate the QoS_NULL frame. The QoS_NULL frame may indicate a RDG from the provider device 104. For example, value(s) of one or more bits in the QoS_NULL frame may indicate the RDG. The RDG may be similar to a RDG in a physical protocol data unit (PPDU), in accordance with one or more wireless standards or protocols, but may be included in the QoS_NULL frame instead of the PPDU. The RDG may authorize a recipient of the QoS_NULL frame to use a transmit opportunity (tx_op) of a sender of the QoS_NULL frame to transmit data during a tx_op of the sender. For example, the traffic advertisement analyzer 134 may generate a QoS_NULL frame that indicates a RDG and may transmit the QoS_NULL frame to the provider device 104 via the first communication channel during the trigger slot, during the beginning portion of the first data transmission window, or during the first data transmission window. The QoS_NULL frame with the RDG may authorize the provider device 104 to send a frame of the data 122 to the first subscriber device 106 during a tx_op of the first subscriber device 106.

The traffic advertisement generator 130 may, in response to receiving the QoS_NULL frame, transmit a frame of the data 122 to the first subscriber device 106 via the first communication channel during the tx_op of the first subscriber device 106. In this manner, the provider device 104 may not have to contend for the first communication channel prior to transmitting the frame of the data 122. When the data 122 is a single frame, an entirety of the data 122 may be transmitted from the provider device 104 to the first subscriber device 106 in response to the QoS_NULL frame. When the data 122 includes more than one frame, the traffic advertisement generator 130 may indicate, via one or more bits in the frame of the data 122, that additional frames of the data 122 are to be transmitted. For example, the traffic advertisement generator 130 may indicate that additional frames of the data 122 are to be transmitted via a more bit or an end-of-service-period (EOSP) bit.

In response to receiving the frame of the data 122 with an indication that additional frames of the data 122 are to be transmitted, the traffic advertisement analyzer 134 may contend for the first communication channel and, upon successful contention, the traffic advertisement analyzer 134 may transmit another QoS_NULL frame with a RDG to the provider device 104 to cause the provider device 104 to transmit another frame of the data 122. This process may be repeated until the traffic advertisement generator 130 has sent an entirety of the data 122 or until a termination of the first data transmission window.

In some aspects, the first subscriber device 106 may be indicated as a recipient of data from multiple other electronic devices. In these aspects, the traffic advertisement analyzer 134 may transmit a QoS_NULL frame with a RDG to the multiple electronic devices and may receive data responsive to the QoS_NULL frames from each of the multiple electronic devices. When the traffic advertisement analyzer 134 has received a data frame in response to each QoS_NULL frame, and when the data frame does not indicate that more data is to be transmitted, the first subscriber device 106 may transition to the inactive mode for a remainder of the first data transmission window. When at least one data frame indicates that more data is to be transmitted to the first subscriber device 106, the first subscriber device 106 may remain in the active operating mode and may continue to transmit QoS_NULL frames with RDGs.

In some aspects, the provider device 104 may have data to send to multiple recipients. In these aspects, the traffic advertisement generator 130 may transmit a QoS_NULL frame with a RDG to the multiple electronic devices and may receive data triggers (e.g., the trigger message 150) responsive to the QoS_NULL frames from each of the multiple electronic devices. When the traffic advertisement generator 130 has received a data trigger in response to each QoS_NULL frame, the provider device 104 may transition to the inactive mode for a remainder of the trigger slot or a remainder of the beginning portion of the first data transmission window.

In a particular aspect, the first subscriber device 106 may operate as a provider (or forwarder) of the particular service. For example, a traffic advertisement generator of the first subscriber device 106 may forward the traffic advertisement 128 to electronic devices of the NAN 102 that are within a single hop count of the first subscriber device 106. To illustrate, the traffic advertisement generator of the first subscriber device 106 may send the traffic advertisement 128 to the fifth subscriber device 114. A traffic advertisement analyzer of the fifth subscriber device 114 may send an ACK to the first subscriber device 106 in response to the traffic advertisement 128. The traffic advertisement analyzer of the fifth subscriber device 114 may send a data trigger (e.g., the trigger message 150) to the first subscriber device 106. The traffic advertisement generator of the first subscriber device 106 may send data (e.g., the data 122) to the fifth subscriber device 114. The fifth subscriber device 114 may thus receive data associated with the particular service provided by the provider device 104 even though the provider device 104 is not within a single hop of the fifth subscriber device 114.

The system 100 may thus reduce power consumption at the device 104-114 of the NAN 102. For example, the first subscriber device 106 may transition to the inactive mode (e.g., the sleep mode) during a remaining portion of a transmission window based on a determination that no traffic advertisement indicating the first subscriber device 106 as a data recipient has been received during a paging window. As another example, the provider device 104 may transition to the inactive mode in response to determining that no ACK responsive to the traffic advertisement has been received during the paging window. As a further example, the provider device 104 may transition to the inactive mode during a remaining portion of the paging window in response to receiving a single ACK responsive to the traffic advertisement. Thus, the provider device 104, the first subscriber device 106, or both may conserve power while in the inactive mode, as compared to substantially continuously monitoring the communication channel for data transmissions.

Figure 2:
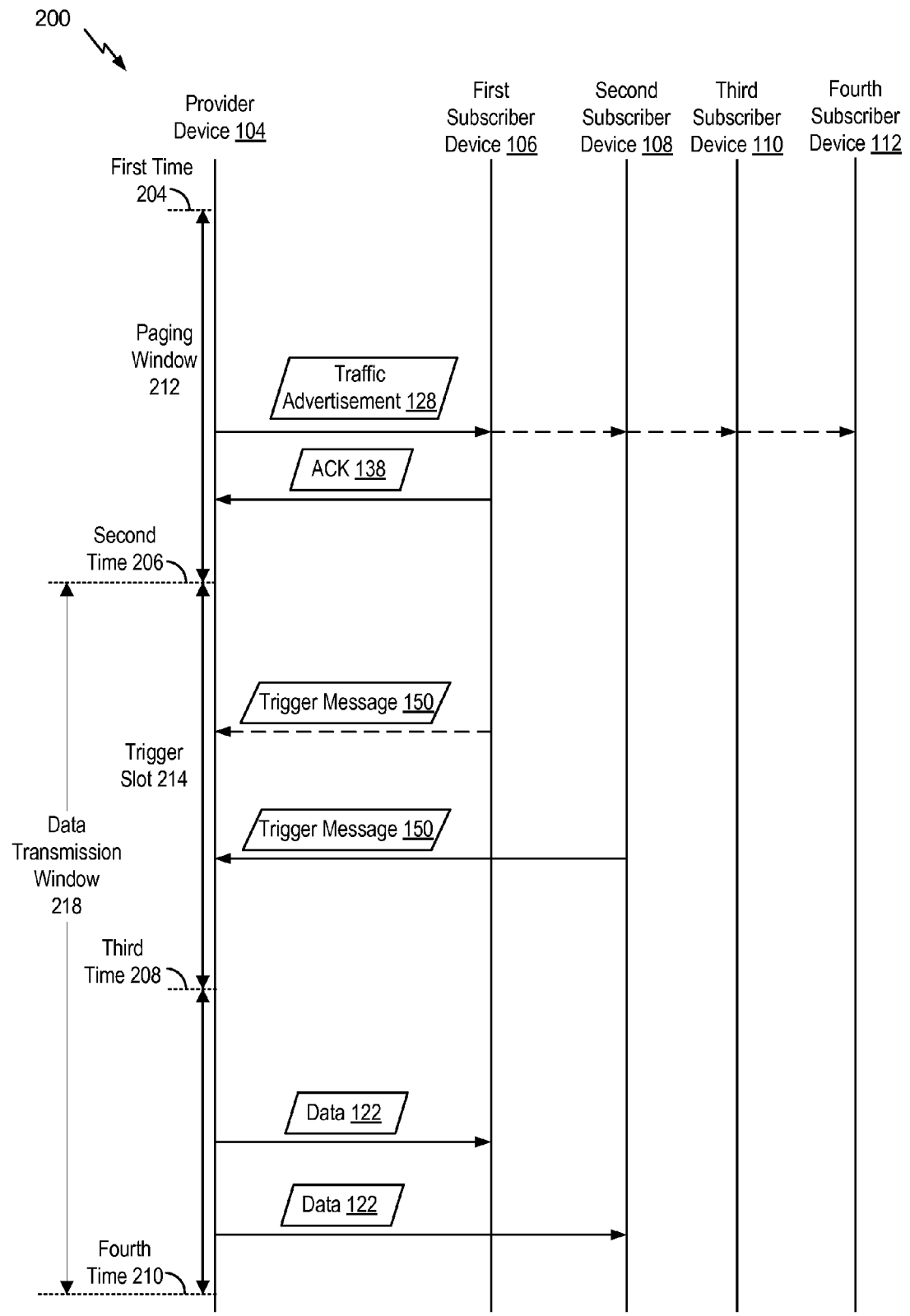
FIG. 2 is a ladder diagram corresponding to operation of a particular aspect of the system of FIG. 1.

Referring to FIG. 2, a diagram is shown and generally designated 200. In a particular aspect, the diagram 200 may correspond to operation of a particular aspect of the system 100 of FIG. 1. The timing and operations shown in FIG. 2 are for illustration and are not limiting. In other aspects, additional or fewer operations may be performed and the timing may be different.

A paging window 212 associated with a particular logical channel of a data path group, as described with reference to FIG. 1, may begin at a paging begin time and may end at a paging end time. For example, the paging begin time may include a first time 204 and the paging end time may include a second time 206. A trigger slot 214 associated with the particular logical channel may begin at approximately the second time 206 and may end at a third time 208. In a particular aspect, the trigger slot 214 may correspond to a beginning portion of a data transmission window 218. An ending portion of the data transmission window 218 may begin at approximately the third time 208 and may end at a fourth time 210. The data transmission window 218 may begin at a data begin time and may end at a data end time. For example, the data begin time may include the second time 206 and the data end time may include the fourth time 210. In a particular implementation, the data begin time may include the third time 208 and the data end time may include the fourth time 210.

The traffic advertisement generator 130 of FIG. 1 may determine that the provider device 104 has data to send to multiple recipients (e.g., the subscriber devices 106-110) during the data transmission window 218 or the ending portion of the data transmission window 218, as described with reference to FIG. 1. During the paging window 212, the provider device 104 (e.g., the traffic advertisement generator 130) may send the traffic advertisement 128 to subscriber devices of the data path group during the paging window 212. For example, the provider device 104 (e.g., the traffic advertisement generator 130) may send the traffic advertisement 128 via a first communication channel corresponding to the particular logical channel, as described with reference to FIG. 1. Each of the subscriber devices 106-112 may receive the traffic advertisement 128.

A particular subscriber device of the subscriber devices of the data path group may send an ACK in response to receiving the traffic advertisement 128, as described with reference to FIG. 1. For example, the first subscriber device 106 (e.g., the traffic advertisement analyzer 134) may send the ACK 138 during the paging window 212. The ACK 138 may be responsive to the traffic advertisement 128.

In a particular aspect, the provider device 104 (e.g., the traffic advertisement generator 130) may determine, at the second time 206, that the trigger slot 214 or that the data transmission window 218 has started in response to determining that at least one ACK (e.g., the ACK 138) responsive to the traffic advertisement 128 has been received during the paging window 212. For example, the provider device 104 may determine that the trigger slot 214 or that the data transmission window 218 has started in response to receiving an ACK (e.g., the ACK 138) from a single subscriber device of the multiple subscriber devices (e.g., the subscriber devices 106-110) without waiting to receive ACKs from the remaining subscriber devices (e.g., the subscriber devices 108-110) of the multiple subscriber devices. The provider device 104 may, in response to receiving the ACK 138 from the first subscriber device 106, determine that the remaining subscriber devices are likely to have received the traffic advertisement 128. Alternatively, the provider device 104 may determine that the multiple subscriber devices (106-110) are unavailable or unreachable in response to determining that no ACKs responsive to the traffic advertisement 128 have been received during the first paging window.

Subscriber device 106-108 may send data triggers (e.g., the trigger message 150) to the provider device 104 during the trigger slot 214, during the beginning portion of the data transmission window 218, or during the data transmission window 218, as described with reference to FIG. 1. The third subscriber device 110 may refrain from sending the trigger message 150 in response to determining that the third subscriber device 110 is unavailable, as described with reference to FIG. 1. In a particular aspect, the provider device 104 (e.g., the traffic advertisement generator 130) may determine that the trigger slot 214 has ended in response to determining that each expected data trigger has been received during the trigger slot 214, as described with reference to FIG. 1. The expected data triggers may include data triggers from the multiple subscriber devices (e.g., the subscriber devices 106-110). In a particular aspect, the expected data triggers may exclude a data trigger (e.g., the trigger message 150) from an acknowledging subscriber device (e.g., the first subscriber device 106).

The provider device 104 (e.g., the traffic advertisement generator 130) may send data to a particular subscriber device in response to determining that a data trigger (e.g., the trigger message 150) has been received from the particular subscriber device, as described with reference to FIG. 1. For example, the traffic advertisement generator 130 may send the data 122 to the first subscriber device 106 in response to determining that the trigger message 150 has been received from the first subscriber device 106. As another example, the traffic advertisement generator 130 may send the data 122 to the second subscriber device 108 in response to determining that the trigger message 150 has been received from the second subscriber device 108. The traffic advertisement generator 130 may refrain from sending the data 122 to the third subscriber device 110 in response to determining that no data triggers (e.g., the trigger message 150) have been received from the third subscriber device 110. In a particular aspect, the traffic advertisement generator 130 may determine that the data transmission window 218 has ended at the fourth time 210 in response to determining that the data 122 has been sent to each subscriber device from which a data trigger (e.g., the trigger message 150) has been received.

In a particular aspect, the traffic advertisement generator 130 may send the data 122 to the acknowledging subscriber device (e.g., the first subscriber device 106) independently of receiving the trigger message 150 from the acknowledging subscriber device. The traffic advertisement generator 130 may determine that the data transmission window 218 has ended at the fourth time 210 in response to determining that the data 122 has been sent to the acknowledging subscriber device (e.g., the first subscriber device 106) and each subscriber device from which a data trigger (e.g., the trigger message 150) has been received. The traffic advertisement generator 130 may transition to a inactive mode in response to determining that the data transmission window 218 has expired.

In a particular aspect, the provider device 104 conserve resources at the end of the paging window 212 in response to determining that no ACKs responsive to the traffic advertisement 128 have been received during the paging window 212. For example, the provide device 104 may not have received an ACK because subscriber devices are unavailable or there is a network connectivity problem. The provider device 104 may transition to a inactive mode, monitor another communication channel corresponding to another logical channel, or perform other tasks, as compared to using resources to monitor the first data communication channel during the trigger slot 214 or during the data transmission window 218.

As another example, the provider device 104 may determine that the trigger slot 214 (or the data transmission window 218) has started in response to determining that a single ACK (e.g., the ACK 138) responsive to the traffic advertisement 128 has been received. The provider device 104 may not have to wait to receive ACKs from each available recipient of the data. A size of the paging window 212 may thus be reduced to accommodate the single ACK, as compared to accommodating multiple ACKs. A smaller paging window 212 may reduce resource consumption of one or more electronic devices of the data path group. For example, the one or more electronic devices may monitor the first communication channel during the paging window 212. A smaller paging window may result in fewer resources of the one or more electronic devices being used to monitor the first communication channel.

FIGS. 1-6 illustrate various aspects and operations of a system that includes a NAN 102. The aspects and operations shown in FIG. 1-6 are for illustration and are not limiting. In other aspects, one or more portions of the aspects and operations shown in FIGS. 1-6 may be combined.

Figure 3:
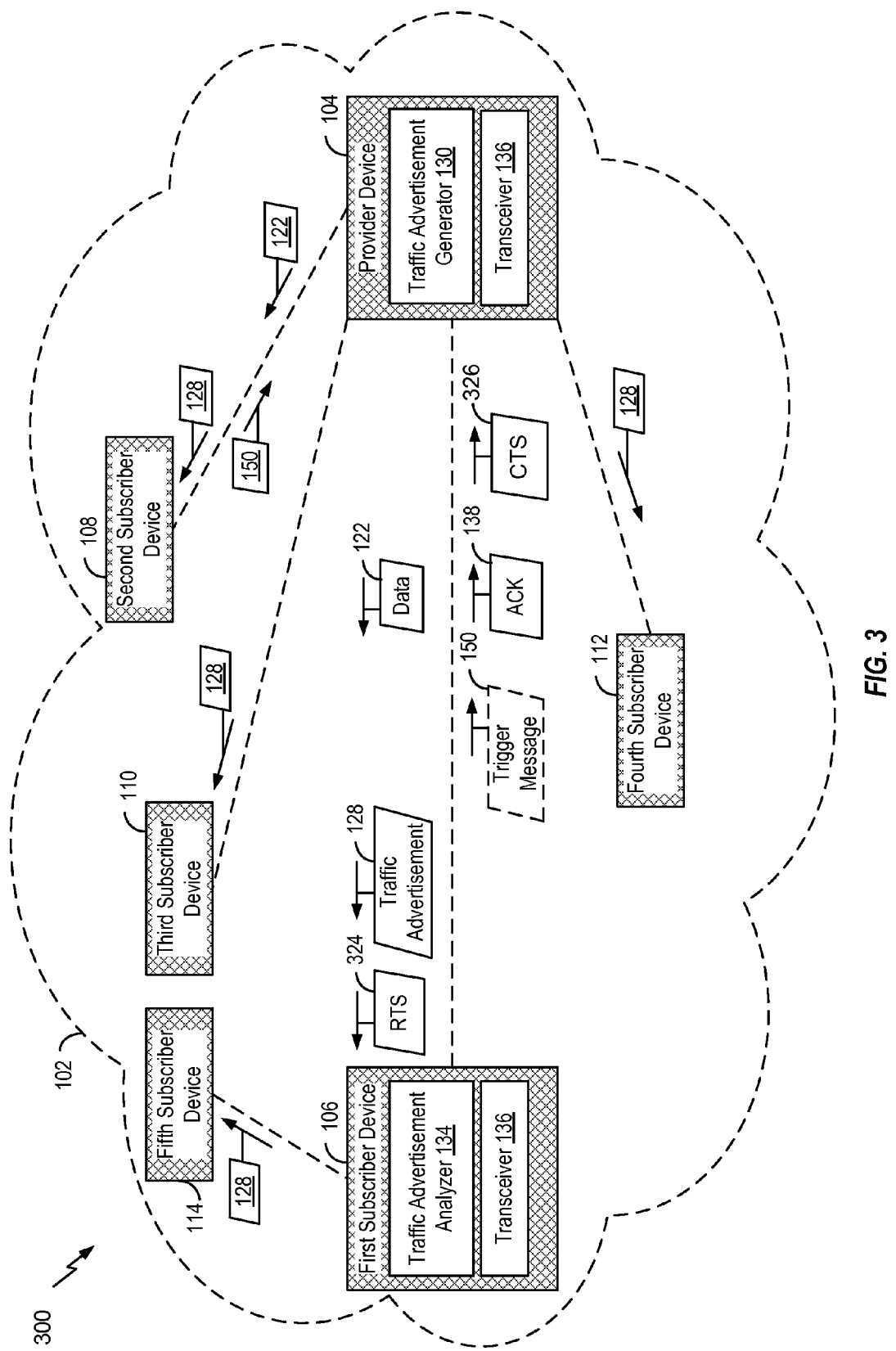
FIG. 3 is a diagram of another particular aspect of a system that includes a neighbor aware network (NAN) having one or more electronic devices of a data path group that exchange a traffic advertisement.

Referring to FIG. 3, a particular aspect of a system 300 that includes the neighbor aware network (NAN) 102 is shown. The system 300 differs from the system 100 of FIG. 1 in that the provider device 104 may, prior to sending the traffic advertisement 128, send a request-to-send (RTS) frame (e.g., an RTS frame 324) via the transceiver 136 of the provider device 104 to a particular subscriber device (e.g., the subscriber device 106-110) of the multiple subscriber devices. The traffic advertisement generator 130 may send the RTS frame 324 to reduce a likelihood of a frame collision when sending the traffic advertisement 128.

The traffic advertisement generator 130 may send the RTS frame 324 via a first communication channel during a first paging window of a first transmission window. The first communication channel and the first transmission window may correspond to a first logical channel associated with a data path group. In a particular aspect, the first communication channel (e.g., the NAN communication channel) and the first transmission window may correspond to a basic channel of the data path group.

A traffic advertisement analyzer (e.g., the traffic advertisement analyzer 134) of a particular subscriber device (e.g., the first subscriber device 106) may receive the RTS frame 324. The traffic advertisement analyzer 134 may send a clear-to-send (CTS) frame 326 via the first communication channel during the first paging window in response to receiving the RTS frame 324. The CTS frame 326 may indicate that a channel (e.g., the first communication channel) has been reserved (and will be collision-free) during an upcoming time period. Thus, the CTS frame 326 may indicate that the provider device 104 has permission to send data (e.g., the traffic advertisement 128) during the upcoming time period. The traffic advertisement analyzer 134 may reserve the upcoming time period to receive the traffic advertisement 128 from the provider device 104. In a particular aspect, the traffic advertisement analyzer 134 may transition the first subscriber device 106 to the inactive mode during a remaining portion of the first transmission window in response to determining that no RTS frames were received from a provider device (e.g., the provider device 104) during the first paging window.

In a particular aspect, the traffic advertisement generator 130 may determine that no CTS frames have been received within a particular duration of sending the RTS frame 324. The particular duration may be a default value or may be user defined. The traffic advertisement generator 130 may, in response to determining that no CTS frames have been received within the particular duration, determine that a first number of RTS frames (e.g., the RTS frame 324) have been previously sent during the first paging window. The traffic advertisement generator 130 may, in response to determining that the first number satisfies an RTS threshold (e.g., 2), refrain from sending the traffic advertisement 128 during the first paging window. The RTS threshold may be a default value or may be user defined. The traffic advertisement generator 130 may transition to an inactive mode (e.g., a sleep mode) during a remaining portion of the first transmission window in response to determining that the first number satisfies the RTS threshold. Alternatively, the traffic advertisement generator 130 may, in response to determining that the first number fails to satisfy the RTS threshold, send a second RTS frame to a second subscriber device (e.g., the subscriber device 106-110) of the multiple subscriber devices. For example, the traffic advertisement generator 130 may, at a first time, send the RTS frame 324 to the first subscriber device 106. The traffic advertisement generator 130 may, in response to determining at a second time that no CTS frames responsive to the RTS frame 324 have been received from the first subscriber device 106 and that the first number fails to satisfy the RTS threshold, send a second RTS frame to the second subscriber device (e.g., the subscriber device 106-110). A difference between the first time and the second time may be greater than or equal to a threshold (e.g., a short interframe space (SIFS) time). The traffic advertisement generator 130 may send the traffic advertisement 128 in response to receiving a CTS frame from the second subscriber device (e.g., the subscriber device 106-110) that is responsive to the second RTS frame.

The traffic advertisement generator 130 may attempt to send the traffic advertisement 128 during a subsequent paging window. For example, the traffic advertisement generator 130 may send another RTS frame during the subsequent paging window. The subsequent paging window may correspond to the first logical channel, to another logical channel of the data path group, or to the basic channel. The traffic advertisement generator 130 may send the traffic advertisement 128 via the first communication channel during the first paging window. In a particular aspect, the traffic advertisement generator 130 may send the traffic advertisement 128 in response to receiving the CTS frame 326. In a particular aspect, the traffic advertisement generator 130 may receive the CTS frame 326 from a particular subscriber device, and the destination of the (e.g., unicast) traffic advertisement 128 may be the same as or distinct from the particular subscriber device. The provider device 104 may receive the ACK 138 responsive to the traffic advertisement 128 from an acknowledging subscriber device (e.g., the first subscriber device 106). The particular subscriber device may be the same as or distinct from the acknowledging device. For example, the provider device 104 may send the RTS frame 324 to the acknowledging subscriber device or to another subscriber device. A subscriber device that sends the CTS frame 326 responsive to the RTS frame 324 may be the same as or distinct from the acknowledging subscriber device that sends the ACK 138 responsive to the traffic advertisement 128.

In some implementations, the provider device 104 may receive the CTS frame 326 responsive to the RTS frame 324 from a particular subscriber device. The provider device 104 may send the traffic advertisement 128 in response to receiving the CTS frame 326. The provider device 104 may send the data 122 independently of receiving the ACK 138 responsive to the traffic advertisement 128, as further described with reference to FIG. 16.

The system 300 may thus enable the provider device 104 to reduce a likelihood of a frame collision when sending a traffic advertisement during a paging window. With a frame collision, the subscriber device may not receive the traffic advertisement and may not acknowledge the traffic advertisement. The provider device may, in response to determining that an ACK is not received, refrain from sending data during a corresponding data transmission window. The provider device may resend the traffic advertisement during a subsequent paging window. Without a frame collision, the subscriber device may receive the traffic advertisement and may acknowledge the traffic advertisement. The provider device may send data in response to receiving the acknowledgement. As a result, network resources may be conserved. For example, the data may be sent earlier and the provider device may perform other operations during the subsequent paging window.

Figure 4:
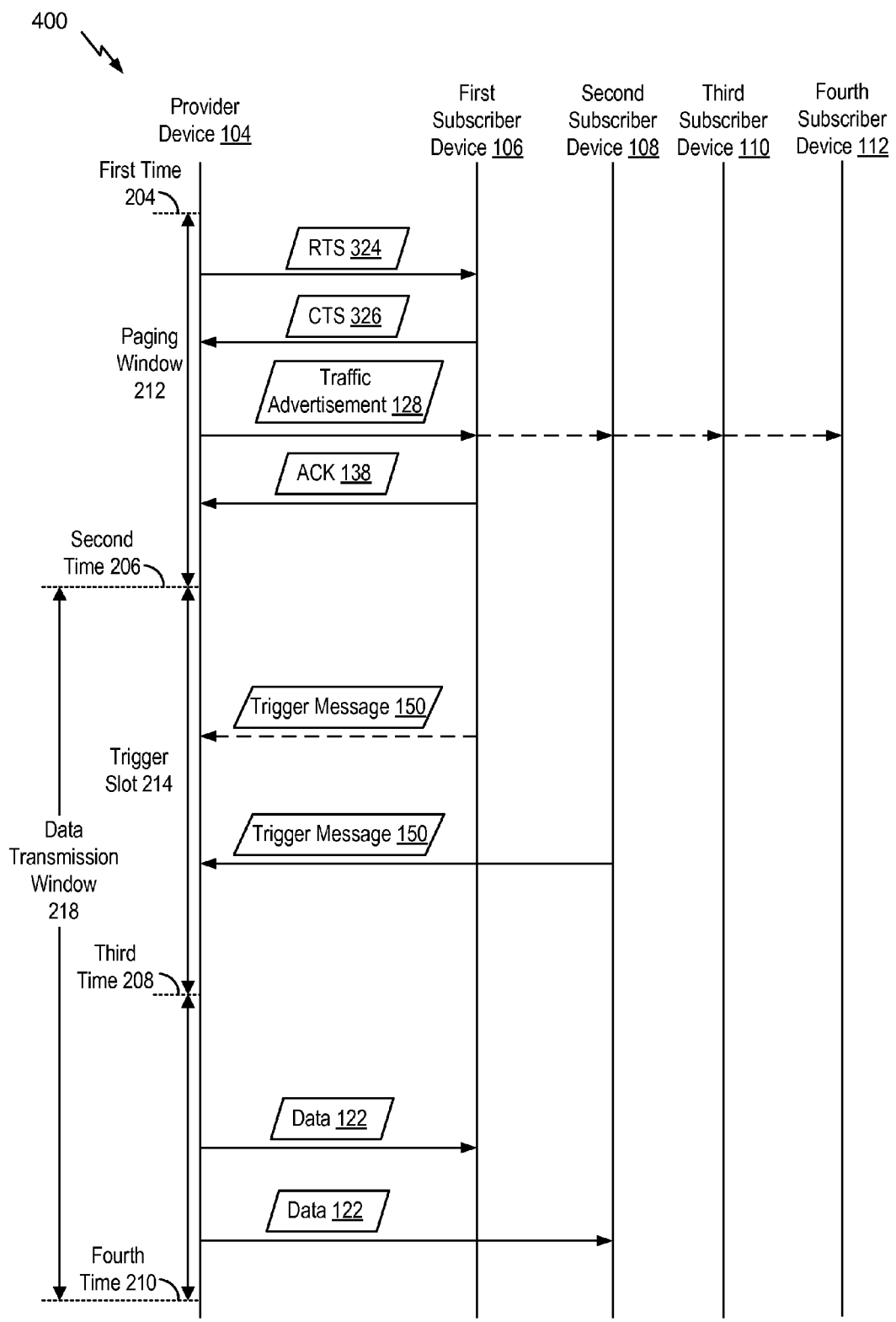
FIG. 4 is a ladder diagram corresponding to operation of a particular aspect of the system of FIG. 2.

Referring to FIG. 4, a diagram is shown and generally designated 400. In a particular aspect, the diagram 400 may correspond to operation of a particular aspect of the system 300 of FIG. 3. The timing and operations shown in FIG. 4 are for illustration and are not limiting. In other aspects, additional or fewer operations may be performed and the timing may be different.

The diagram 400 may differ from the diagram 200 of FIG. 2 in that during the paging window 212, the provider device 104 (e.g., the traffic advertisement generator 130 of FIG. 1) may send the RTS frame 324 to a particular subscriber device (e.g., the first subscriber device 106) of the data path group, as described with reference to FIG. 3. The first subscriber device 106 (e.g., the traffic advertisement analyzer 134 of FIG. 1) may send the CTS frame 326 to the provider device 104 during the paging window 212 in response to receiving the RTS frame 324, as described with reference to FIG. 3. The provider device 104 (e.g., the traffic advertisement generator 130) may send the traffic advertisement 128 in response to receiving the CTS frame 326.

The provider device 104 may conserve network resources by sending a traffic advertisement in response to receiving a CTS frame. For example, sending the traffic advertisement in response to receiving the CTS frame may reduce a likelihood of a frame collision when sending the traffic advertisement during a paging window. With a frame collision, the subscriber device may not receive the traffic advertisement and may not acknowledge the traffic advertisement. The provider device may, in response to determining that an ACK is not received, refrain from sending data during a corresponding data transmission window. The provider device may resend the traffic advertisement during a subsequent paging window. Without a frame collision, the subscriber device may receive the traffic advertisement and may acknowledge the traffic advertisement. The provider device may send data in response to receiving the acknowledgement. As a result, network resources may be conserved. For example, the data may be sent earlier and the provider device may perform other operations during the subsequent paging window.

Figure 5:
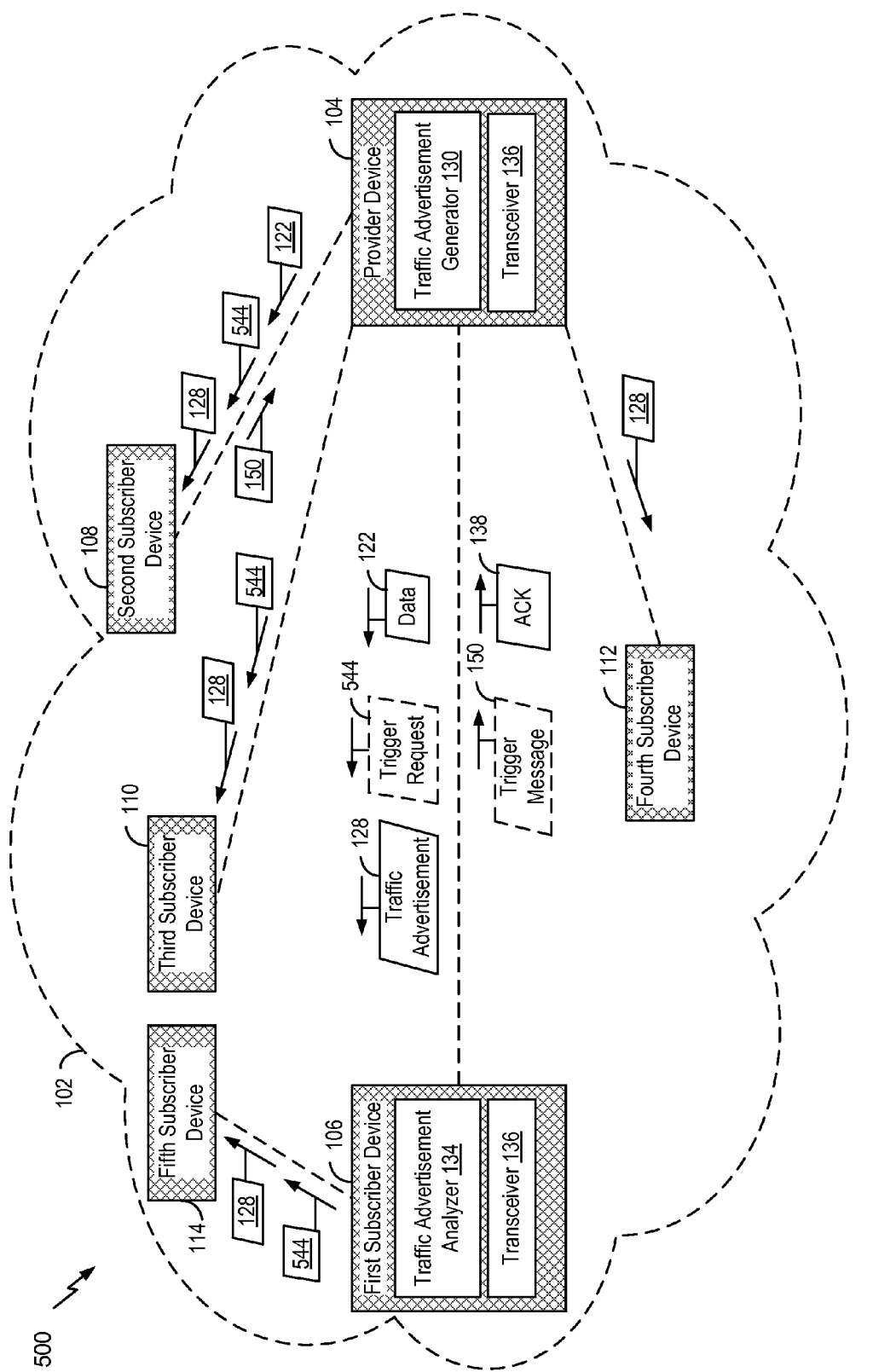
FIG. 5 is a diagram of another particular aspect of a system that includes a neighbor aware network (NAN) having one or more electronic devices of a data path group that exchange a traffic advertisement.

Referring to FIG. 5, a particular aspect of a system 500 that includes the neighbor aware network (NAN) 102 is shown. The system 500 differs from the system 100 of FIG. 1 in that the traffic advertisement generator 130 of the provider device 104 may send a trigger request 544 to one or more of the multiple subscriber devices (e.g., the subscriber device 106-110). For example, the traffic advertisement generator 130 may send the trigger request 544 via a first communication channel in response to determining that an ACK has been received from at least one subscriber device (e.g., the first subscriber device 106) of the multiple subscriber devices. The first communication channel may correspond to a logical channel or to a basic channel of a data path group. A first transmission window may be associated with the logical channel or the basic channel. The first transmission window may include a first paging window, a trigger slot, a first data transmission window, or a combination thereof, as described with reference to FIG. 1. The trigger request 544 may include a PS-POLL message, an ATIM, a request-to-send (RTS) frame, a QoS_NULL frame, the QoS_NULL frame indicating a RDG, an action frame (e.g., a public action frame), or another message. In some implementations, the trigger request 544 may include a QoS_NULL frame indicating a RDG from the provider device 104.

The traffic advertisement generator 130 may send the trigger request 544 in response to determining that an ACK has been received from a single subscriber device of the multiple subscriber devices, that ACKs have been received from fewer than all of the multiple subscriber devices, or that an ACK has been received from each of the multiple subscriber devices during the first paging window. For example, the traffic advertisement generator 130 may send the trigger request 544 to each of the subscriber devices 106-110 in response to determining that the ACK 138 has been received from the first subscriber device 106 during the first paging window and that the provider device 104 has data to send to each of the subscriber devices 106-110. In some implementations, the traffic advertisement generator 130 may send the trigger request 544 independently of receiving the ACK 138.

The trigger request 544 may include a unicast message or a multicast message. In some implementations, the provider device 104 may send a distinct trigger request to each of the multiple subscriber devices. For example, the provider device 104 may send a first trigger request (e.g., the trigger request 544) to the first subscriber device 106. A destination field of the first trigger request may indicate an identifier (e.g., an address) of the first subscriber device 106. The provider device 104 may send a second trigger request (e.g., the trigger request 544) to the second subscriber device 108 with a destination field indicating an identifier (e.g., an address) of the second subscriber device 108, and so on. In alternate implementations, the provider device 104 may send a multicast trigger request (e.g., the trigger request 544) to the subscriber devices 106-110.

In a particular aspect, the traffic advertisement generator 130 may refrain from sending a trigger request to an acknowledging subscriber device. For example, the traffic advertisement generator 130 may refrain from sending the trigger request 544 to the first subscriber device 106 in response to determining that the ACK 138 has been received from the first subscriber device 106 during the first paging window.

In a particular aspect, the traffic advertisement generator 130 may send the trigger request 544 to the subscriber device 106-110 in response determining that no data triggers (e.g., the trigger message 150) have been received from the subscriber device 106-110 during a beginning portion of a trigger slot or during an initial portion of the first data transmission window, that the subscriber device 106-110 is a data recipient, and that at least one ACK has been received from at least one subscriber device (e.g., the first subscriber device 106) during the first paging window. In a particular aspect, the traffic advertisement generator 130 may send the trigger request 544 to a subscriber device (e.g., the first subscriber device 106, the second subscriber device 108, or the third subscriber device 110) in response to determining that no data triggers have been received from the subscriber device during a beginning portion of the trigger slot or during an initial portion of the first data transmission window and that no ACK responsive to the traffic advertisement 128 has been received from the subscriber device during the first paging window. In a particular aspect, the trigger request 544, the trigger message 150, or both, may be exchanged during the trigger slot, during a beginning portion of the first data transmission window, during the first data transmission window, or a combination thereof.

As another example, the traffic advertisement generator 130 may determine that the trigger slot has ended and that the first data transmission window has started in response to determining that expected trigger requests (e.g., the trigger request 544) have been sent during the trigger slot, that a first trigger request has been sent at a first trigger time, and that a particular duration has passed subsequent to the first trigger time. The expected trigger requests may correspond to trigger requests to each of the data recipients (e.g., the subscriber devices 106-110). In a particular aspect, the expected trigger requests may exclude a trigger request to the acknowledging subscriber device (e.g., the first subscriber device 106). The first trigger request may correspond to a most recently sent trigger request of the expected trigger requests.

The beginning portion (e.g., an acknowledgement window) of the data transmission window during which a trigger request (e.g., the trigger request 544), a data trigger (e.g., the trigger message 150), or both, may be exchanged may have a particular duration. The particular duration may be a default value or may be based on user input. In a particular aspect, the particular duration may be dynamically determined. For example, the traffic advertisement generator 130 may determine that the beginning portion of the first data transmission window has ended in response to determining that expected trigger requests have been sent during the beginning portion of the first data transmission window and that no data trigger responsive to the first trigger request has been received within a particular duration of sending the first trigger request. The first trigger request may correspond to a most recently sent trigger request of the expected trigger requests.

The subscriber device 106-110 may receive the trigger request 544 via the first communication channel. For example, the traffic advertisement analyzer 134 may receive the trigger request 544 via the first communication channel. The first subscriber device 106, the second subscriber device 108, or both, may send the trigger message 150 via the first communication channel in response to receiving the trigger request 544. For example, the traffic advertisement analyzer 134 may send the trigger message 150 in response to receiving the trigger request 544. The third subscriber device 110 may refrain from sending a data trigger (e.g., the trigger message 150) responsive to the trigger request 544 based on determining that the third subscriber device 110 is unavailable during a portion of the first transmission window.

In a particular aspect, the traffic advertisement generator 130 may monitor the first communication channel during a particular duration subsequent to sending the trigger request 544 to a particular subscriber device. The traffic advertisement generator 130 may send a subsequent trigger request 544 via the first communication channel to another subscriber device in response to receiving the trigger message 150 via the first communication channel from the particular subscriber device or in response to determining that the particular duration has expired. For example, the traffic advertisement generator 130 may send the trigger request 544 via the first communication channel to the first subscriber device 106. The traffic advertisement generator 130 may monitor the first communication channel subsequent to sending the trigger request 544 to the first subscriber device 106. The traffic advertisement generator 130 may receive the trigger message 150 via the first communication channel from the first subscriber device 106.

The traffic advertisement generator 130 may send the trigger request 544 via the first communication channel to the third subscriber device 110 in response to receiving the trigger message 150 from the first subscriber device 106. The traffic advertisement generator 130 may determine that the trigger message 150 has not been received from the third subscriber device 110 within the particular duration of sending the trigger request 544 to the third subscriber device 110. The traffic advertisement generator 130 may, in response to the determination, send the trigger request 544 via the first communication channel to the second subscriber device 108. The traffic advertisement generator 130 may receive the trigger message 150 from the second subscriber device 108. In a particular aspect, the first subscriber device 106 and the second subscriber device 108 may not have to contend for medium reservation to transmit the respective trigger messages 150 because the first subscriber device 106 may have transmitted the trigger message 150 to the provider device 104 prior to the second subscriber device 108 receiving the trigger request 544 from the provider device 104.

In a particular aspect, a traffic advertisement analyzer (e.g., the traffic advertisement analyzer 134) of a particular subscriber device (e.g., the subscriber device 106-110) may transition to the inactive mode during a remaining portion of the first transmission window in response to determining that no trigger requests (e.g., the trigger request 544) have been received from a provider device (e.g., the provider device 104) during the trigger slot or during the beginning portion of the first data transmission window.

In a particular aspect, the traffic advertisement analyzer (e.g., the traffic advertisement analyzer 134) of the particular subscriber device (e.g., the subscriber device 106-108) may remain in the active mode during a remaining portion of the first transmission window in response to determining that the trigger request 544 has been received from the provider device 104.

The traffic advertisement generator 130 may send a first capabilities message to the subscriber device 106-108 prior to sending the data 122 to the subscriber device 106-108, as described with reference to FIG. 1. In a particular aspect, the first capabilities message may correspond to the trigger request 544.

In a particular aspect, a first power-save poll (PS-POLL) message may operate as the trigger request 544. For example, the traffic advertisement generator 130 may generate the first PS-POLL message in a similar manner to generation of a PS-POLL message in a traditional access point (AP) based wireless network. However, the traffic advertisement generator 130 may generate the first PS-POLL message as a broadcast message, as compared to a unicast PS-POLL message in the traditional AP based wireless network. In a particular aspect, the first PS-POLL message may operate as a trigger request for multiple devices. For example, multiple electronic devices may receive the first PS-POLL message and may send data triggers to the provider device 104 in response to receiving the first PS-POLL message.

In a particular aspect, the traffic advertisement generator 130 may set a portion (e.g., a third octet and a fourth octet) of the first PS-POLL message to a particular value (e.g., "0"s). The traffic advertisement generator 130 may transmit the first PS-POLL message via the first communication channel during the trigger slot, during a beginning portion of the first data transmission window, or during the first data transmission window.

The traffic advertisement analyzer 134 may receive the first PS-POLL message during the trigger slot, during the beginning portion of the first data transmission window, or during the first data transmission window. In response to receiving the first PS-POLL message, the traffic advertisement analyzer 134 may transmit the trigger message 150 to the provider device 104 via the first communication channel during the first data transmission window (or during the trigger slot, during the beginning portion of the first data transmission window, or during the first data transmission window).

In a particular aspect, a quality of service null (QoS_NULL) frame may operate as the trigger request 544. For example, the traffic advertisement generator 130 may generate the QoS_NULL frame. The QoS_NULL frame may indicate a reverse direction grant (RDG) from the first subscriber device 106. For example, the traffic advertisement generator 130 may generate a QoS_NULL frame that indicates a RDG and may transmit the QoS_NULL frame to the first subscriber device 106 via the first communication channel during the trigger slot, during the beginning portion of the first data transmission window, or during the first data transmission window. The QoS_NULL frame with the RDG may authorize the first subscriber device 106 to send a frame of the trigger message 150 to the provider device 104 during a tx_op of the provider device 104.

The traffic advertisement analyzer 134 may, in response to receiving the QoS_NULL frame, transmit a frame of the trigger message 150 to the provider device 104 via the first communication channel during the tx_op of the provider device 104. In this manner, the first subscriber device 106 may not have to contend for the first communication channel to transmit the frame of the trigger message 150.

In a particular aspect, a NULL frame may correspond to the trigger request 544. For example, the NULL frame may include a preamble (e.g., a header) without a payload (e.g., data) portion. In a particular aspect, the NULL frame may be a QoS_NULL frame, which may have a higher priority than other null frames. The traffic advertisement generator 130 may transmit the NULL frame to the first subscriber device 106 via the first communication channel during the trigger slot, during a beginning portion (e.g. an acknowledgement window) of the first data transmission window, or during the first data transmission window, to provoke the trigger message 150. In a particular aspect, the traffic advertisement generator 130 may send the trigger request 544 during an ending portion of the trigger slot, an ending portion of the acknowledgement window, or an ending portion of the first data transmission window, in response to determining that the trigger message 150 has not been received during a beginning portion of the trigger slot, a beginning portion of the acknowledgement window, or the acknowledgement window.

The traffic advertisement analyzer 134 may, in response to receiving the trigger request 544 from the provider device 104, contend for the first communication channel and, upon successful contention, may transmit the trigger message 150 to the provider device 104 via the first communication channel. In response to receiving the trigger message 150, the traffic advertisement generator 130 may contend for the first communication channel and, upon successful contention, transmit the data 122 to the first subscriber device 106 via the first communication channel during the first data transmission window. In a particular aspect, an action frame (e.g., a public action frame) may be used as the trigger request 544.

The system 500 may thus enable a provider device to conserve network resources. For example, the provider device may send a trigger request to prompt a trigger message from a subscriber device. If the trigger message is not received within a particular duration of sending the trigger request, the provider device may determine that the subscriber device is unavailable or unreachable. The provider device may transition to an inactive mode in response to determining that the trigger message is not received and may thus conserve network resources.

Figure 6:
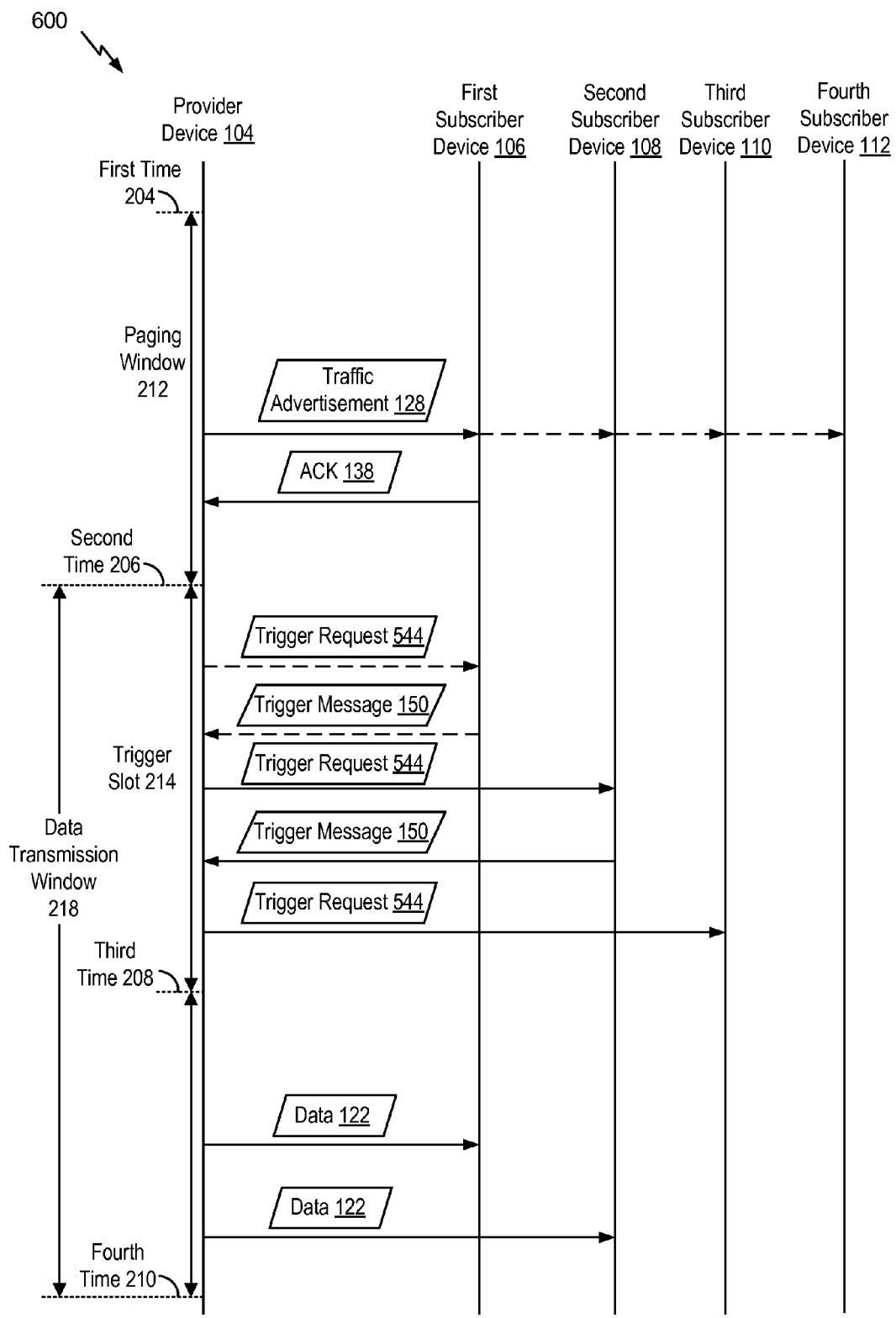
FIG. 6 is a ladder diagram corresponding to operation of a particular aspect of the system of FIG. 5.

Referring to FIG. 6, a diagram is shown and generally designated 600. In a particular aspect, the diagram 600 may correspond to operation of a particular aspect of the system 500 of FIG. 5. The timing and operations shown in FIG. 6 are for illustration and are not limiting. In other aspects, additional or fewer operations may be performed and the timing may be different.

The diagram 600 may differ from the diagram 200 of FIG. 2 in that the provider device 104 (e.g., the traffic advertisement generator 130) may send expected trigger requests (e.g., the trigger request 544) during the trigger slot 214, during the beginning portion of the data transmission window 218, or during the data transmission window 218, as described with reference to FIG. 5. For example, the traffic advertisement generator 130 may send the trigger request 544 to each of the subscriber devices 106-110. As another example, the traffic advertisement generator 130 may send the trigger request 544 to each of the subscriber devices 108-110, and may refrain from sending the trigger request 544 to the first subscriber device 106 in response to determining that the ACK 138 has been received from the first subscriber device 106 during the paging window 212, as described with reference to FIG. 5.

In a particular aspect, the traffic advertisement generator 130 may monitor the first communication channel for a particular duration subsequent to sending the trigger request 544 to a particular subscriber device. The traffic advertisement generator 130 may send a subsequent trigger request 544 to another subscriber device in response to receiving the trigger message 150 from the particular subscriber device or in response to determining that the particular duration has expired.

The provider device 104 (e.g., the traffic advertisement generator 130) may send the trigger request 544 to the first subscriber device 106. The first subscriber device 106 (e.g., the traffic advertisement analyzer 134) send the trigger message 150 to the provider device 104 in response to receiving the trigger request 544, as described with reference to FIG. 4. The provider device 104 (e.g., the traffic advertisement generator 130) may send the trigger request 544 to the second subscriber device 108, e.g., in response to receiving the trigger message 150 from the first subscriber device 106. The second subscriber device 108 may send the trigger message 150 to the provider device 104 in response to receiving the trigger request 544. The provider device 104 (e.g., the traffic advertisement generator 130) may send the trigger request 544 to the third subscriber device 110, e.g., in response to receiving the trigger message 150 from the second subscriber device 108. The third subscriber device 110 may refrain from sending the trigger message 150 in response to receiving the trigger request 544, as described with reference to FIG. 5.

In a particular aspect, the provider device 104 (e.g., the traffic advertisement generator 130) may determine that the trigger slot 214 has ended in response to determining that each of the expected trigger requests has been sent during the trigger slot 214 and that a data trigger has not been received within a particular duration of a most recently sent trigger request, as described with reference to FIG. 5. For example, the traffic advertisement generator 130 may determine, at the third time 208, that the trigger slot 214 has ended in response to determining that a data trigger (e.g., the trigger message 150) has not been received from the third subscriber device 110 within the particular duration of sending the trigger request 544 to the third subscriber device 110.

The provider device may send a trigger request to prompt a trigger message from a subscriber device. If the trigger message is not received within a particular duration of sending the trigger request, the provider device may determine that the subscriber device is unavailable or unreachable. The provider device may transition to an inactive mode in response to determining that the trigger message is not received and may thus conserve network resources.

Figure 7:
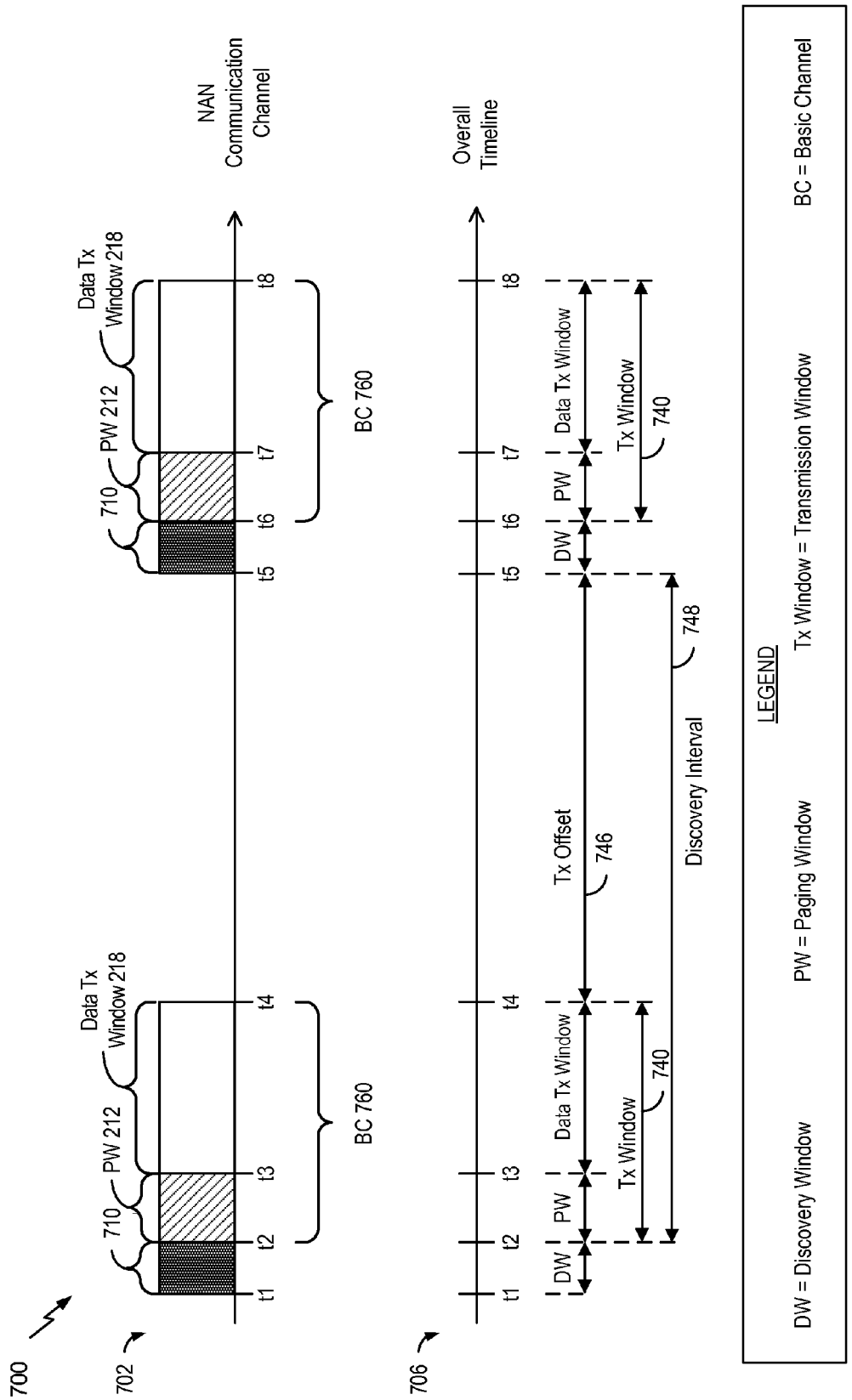
FIG. 7 is a timing diagram corresponding to operation of another particular aspect of one or more of the systems disclosed herein.

Referring to FIG. 7, a timing diagram is shown and generally designated 700. In a particular aspect, the timing diagram 700 may correspond to operation of a particular aspect of one or more of the systems described herein. The timing and operations shown in FIG. 7 are for illustration and are not limiting. In other aspects, additional or fewer operations may be performed and the timing may be different.

The timing diagram 700 includes an overall timeline 706 corresponding to a NAN communication channel 702. As illustrated in the timing diagram 700, a discovery window 710 may correspond to the NAN communication channel 702. The discovery window 710 may be a time period (e.g., a discovery period) reserved for the device 104-114 to perform discovery operations and synchronization operations corresponding to the NAN 102.

The discovery window 710 may occur periodically. The discovery window 710 may begin at time t1 and may end at time t2. A subsequent discovery window 710 may begin at time t5 and end at time t6. The discovery window 710 may have a particular discovery window duration (e.g., a period of time between time t1 and time t2 may be the same as a period of time between time t5 and time t6). The discovery window duration may be determined in accordance with a NAN standard or protocol. A time period (e.g., a period of time between time t2 and time t5) between consecutive discovery windows (e.g., the discovery window 710) may be referred to as a discovery interval 748. In a particular aspect, a duration of the discovery interval 748 may be 500 time units (TU) (e.g., approximately 512 ms), in accordance with a NAN standard or protocol. For example, each TU may correspond to 1024 microseconds (µs), as described in an IEEE 802.11-3212 specification.

During the discovery window 710, a service advertisement may be transmitted via the NAN communication channel 702. For example, the provider device 104 may transmit the service advertisement via the NAN communication channel 702 to advertise a service being provided by the provider device 104. The service advertisement may indicate the available logical channels and a provider MAC address, as described with reference to FIG. 1. The available logical channels may correspond to an NDL schedule. The NDL schedule may include one or more NDL time blocks (e.g., one or more transmission windows) that are periodically repeated in every discovery interval (e.g., the discovery interval 748). The subscriber device 106-112 may transmit a subscribe message via the NAN communication channel 702 in response to receiving the service advertisement, as described with reference to FIG. 1.

A basic channel 760 may correspond to a transmission window 740 of the NAN communication channel 702 that begins after an end of the discovery window 710 of the NAN communication channel 702. For example, the transmission window 740 may begin at t2 and may end at t4. A subsequent transmission window 740 may begin at t6 and may end at t8. A transmission offset 746 may correspond to a difference between an end of a data transmission window and a beginning of a next discovery window. For example, the transmission offset 746 may correspond to a difference between t5 and t4.

Each transmission window may include a paging window and a data transmission window. For example, the transmission window 740 may include the paging window 212 and the data transmission window 218. In a particular aspect, the transmission window 740 may include the paging window 212, the trigger slot 214 of FIG. 2, and an ending portion of the data transmission window 218 of FIG. 2.

The paging window 212 may begin at t2 and may end at t3. The data transmission window 218 may begin at t3 and may end at t4. The subsequent paging window 212 may begin at t6 and may end at t7. The subsequent data transmission window 218 may begin at t7 and may end at t8. A duration of a paging window, a duration of a data transmission window, a duration of a transmission window (e.g., 128 time units (TUs), 356 TUs, or 512 TUs), or a combination thereof, may be determined in accordance with a NAN standard or protocol.

During the paging window 212 of the basic channel 760, the traffic advertisement generator 130 of FIG. 1 may send the traffic advertisement 128 via the NAN communication channel 702, as described with reference to FIG. 1.

The traffic advertisement analyzer 134 of FIG. 1 may monitor the NAN communication channel 702 during the paging window 212. The traffic advertisement analyzer 134 may receive the traffic advertisement 128 via the NAN communication channel 702. The traffic advertisement analyzer 134 may send the ACK 138 of FIG. 1 via the NAN communication channel 702 to the provider device 104 during the paging window 212 in response to receiving the traffic advertisement 128, as described with reference to FIG. 1. The traffic advertisement analyzer 134 may monitor the NAN communication channel 702 during the data transmission window 218 in response to determining that the traffic advertisement 128 has been received during the corresponding paging window 212.

The traffic advertisement generator 130 may monitor the NAN communication channel 702 during the paging window 212. The traffic advertisement generator 130 may receive the ACK 138 via the NAN communication channel 702. The traffic advertisement generator 130 may monitor the NAN communication channel 702 during the data transmission window 218 in response to determining that the ACK 138 has been received during the corresponding paging window 212.

The traffic advertisement generator 130 may send the expected trigger requests via the NAN communication channel 702 during the data transmission window 218, as described with reference to FIGS. 5-6. For example, the traffic advertisement generator 130 may send the trigger request 544 via the NAN communication channel 702 to each of multiple recipients (e.g., the subscriber devices 106-110) of data to be sent by the provider device 104. In a particular aspect, the traffic advertisement generator 130 may refrain from sending the trigger request 544 to the first subscriber device 106 during the data transmission window 218 in response to determining that the ACK 138 has been received from the first subscriber device 106 during the corresponding paging window 212.

A particular subscriber device (e.g., the subscriber device 106-108) may send the trigger message 150 via the NAN communication channel 702 to the provider device 104 during the data transmission window 218, e.g., in response to receiving the trigger request 544, as described with reference to FIGS. 5-6. For example, the traffic advertisement analyzer 134 may send the trigger message 150 via the NAN communication channel 702 to the provider device 104 in response to receiving the trigger request 544 and determining that the first subscriber device 106 is available during a remaining portion of the data transmission window 218.

The traffic advertisement generator 130 may send the data 122 via the NAN communication channel 702 to the particular subscriber device (e.g., the subscriber device 106-108) during the data transmission window 218 in response to receiving the trigger message 150, as described with reference to FIGS. 1-2. In a particular aspect, the traffic advertisement generator 130 may send the data 122 via the NAN communication channel 702 to the first subscriber device 106 during the data transmission window 218 in response to determining that the ACK 138 has been received from the first subscriber device 106 during the paging window 212, e.g., regardless of whether the trigger message 150 has received from the first subscriber device 106. The traffic advertisement analyzer 134 may receive the data 122 via the NAN communication channel 702 during the data transmission window 218, as described with reference to FIGS. 1-2.

In a particular aspect, the traffic advertisement generator 130 may transition to an inactive mode during the paging window 212 in response to determining that the provider device 104 has no data to send to subscriber devices in the corresponding data transmission window 218.

In a particular aspect, the traffic advertisement analyzer 134 may transition to an inactive mode during the data transmission window 218 in response to determining that no traffic advertisement has been received from a provider device (e.g., the provider device 104) during the paging window 212. In a particular aspect, the traffic advertisement generator 130 may transition to an inactive mode during the data transmission window 218 in response to determining that no ACK responsive to the traffic advertisement 128 has been received during the paging window 212.

In a particular aspect, the traffic advertisement analyzer 134 may transition to an inactive mode during a remaining portion of the data transmission window 218 in response to determining that no trigger request (e.g., the trigger request 544) has been received from the provider device 104 during a beginning portion of the data transmission window 218. In an alternate aspect, the traffic advertisement analyzer 134 may continue to monitor the NAN communication channel 702 during the remaining portion of the data transmission window 218 in response to determining that the ACK 138 has been sent to the provider device 104 during the paging window 212 (e.g., regardless of whether the trigger request 544 is received during the beginning portion of the data transmission window 218).

In a particular aspect, the traffic advertisement generator 130 may transition to an inactive mode during the remaining portion of the data transmission window 218 in response to determining that no data trigger (e.g., the trigger message 150) has been received from subscriber devices 106-110 during the beginning portion of the data transmission window 218. In a particular aspect, the device 104-112 may transition to an inactive mode while refraining from monitoring the NAN communication channel 702.

The device 104-112 may reduce power consumption by performing operations based on the timing windows illustrated in the timing diagram 700. For example, the device 104-112 may transition to an inactive mode in response to determining that there is no data to be sent, that no traffic advertisement has received, that no ACK has been received, that no trigger request has been received, that no data trigger has been received, or a combination thereof.

Figure 8:
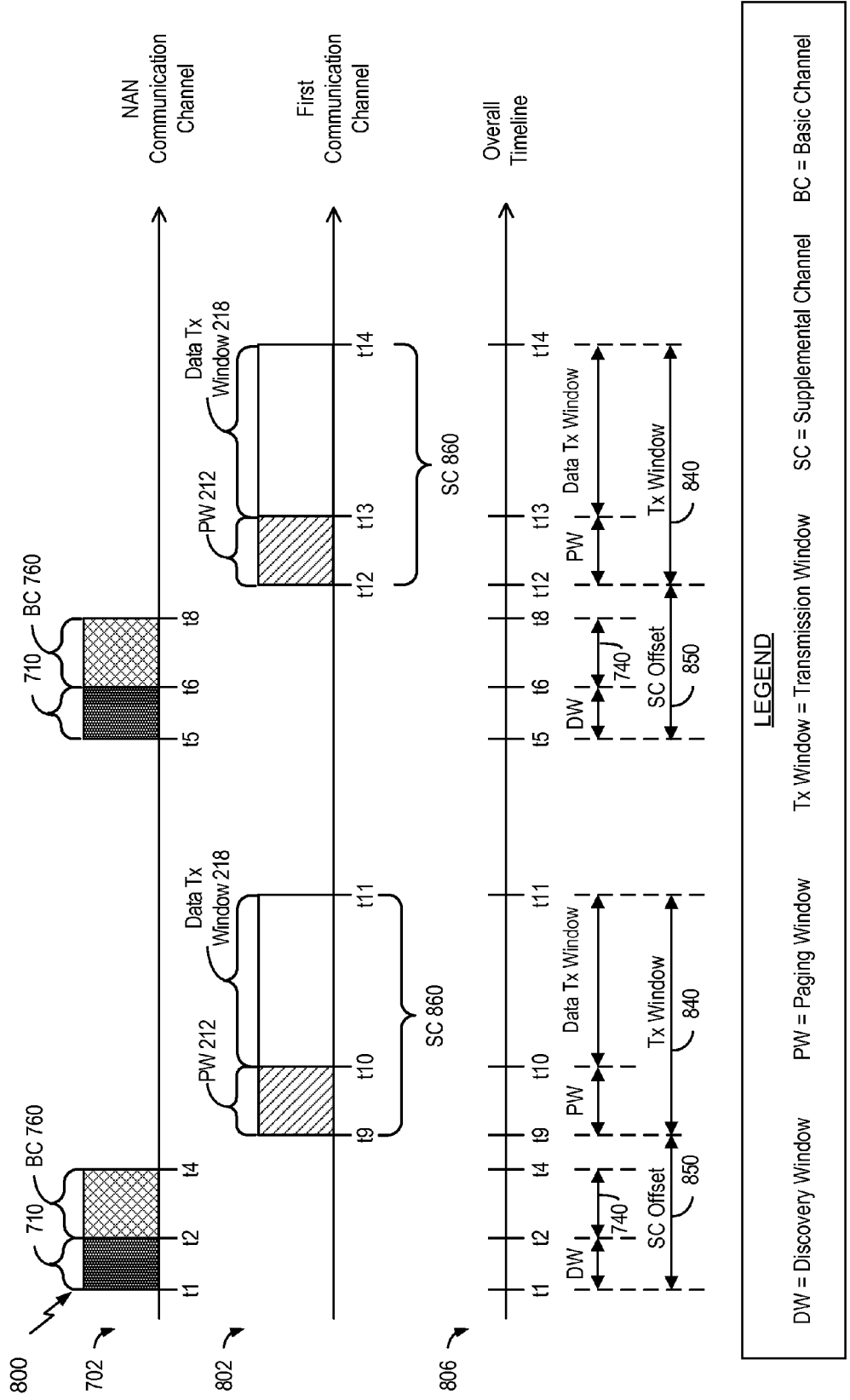
FIG. 8 is a timing diagram corresponding to operation of another particular aspect of one or more of the systems disclosed herein.

Referring to FIG. 8, a timing diagram is shown and generally designated 800. In a particular aspect, the timing diagram 800 may correspond to operation of a particular aspect of the system 100 of FIG. 1. The timing and operations shown in FIG. 8 are for illustration and are not limiting. In other aspects, additional or fewer operations may be performed and the timing may be different.

The timing diagram 800 includes an overall timeline 806 corresponding to the NAN communication channel 702 and a first communication channel 802. During the discovery window 710, the service advertisement may be transmitted via the NAN communication channel 702. The service advertisement may indicate a supplemental channel 860. The supplemental channel 860 may correspond to the first communication channel 802 and a supplemental channel offset 850. For example, the provider device 104 may transmit the service advertisement via the NAN communication channel 702 to advertise a service being provided by the provider device 104. The service advertisement may indicate the available logical channels and the provider MAC address, as described with reference to FIG. 1. The available logical channels may include the supplemental channel 860. The subscriber device 106-112 may transmit the subscribe message via the NAN communication channel 702 in response to receiving the service advertisement, as described with reference to FIG. 1.

The supplemental channel (SC) 860 may correspond to a transmission window 840 of the first communication channel 802. For example, the supplemental channel offset 850 may indicate that the transmission window 840 begins a period of time corresponding to the supplemental channel offset 850 after a beginning of a NAN discovery window. In a particular aspect, the supplemental channel 860 may correspond to a single offset (e.g., the supplemental channel offset 850) indicating a single transmission window during each discovery interval. In an alternate aspect, the supplemental channel (SC) 860 may correspond to multiple offsets indicating multiple transmission windows during each discovery interval.

The transmission window 840 may begin subsequent to an end of the discovery window 710. For example, the transmission window 840 may begin at time t9 and may end at time t11. The time t9 may occur a period of time after time t1, the period of time corresponding to the supplemental channel offset 850. A subsequent transmission window 840 may begin subsequent to an end of the subsequent discovery window 710. For example, the subsequent transmission window 840 may begin at time t12 and may end at time t14. The time t12 may occur a period of time after time t5, the period of time corresponding to the supplemental channel offset 850.

Each transmission window of the supplemental channel 860 may include a paging window and a data transmission window. For example, the paging window 212 may correspond to a paging window of the supplemental channel 860 and the data transmission window 218 may correspond to a data transmission window of the supplemental channel 860. The transmission window 840 may include the paging window 212 and the data transmission window 218. In an alternate aspect, the trigger slot 214 may correspond to a trigger slot of the supplemental channel 860 and a second portion (e.g., an ending portion) of the data transmission window 218 may correspond to a data transmission window of the supplemental channel 860.

The paging window 212 may begin at t9 and may end at t10. The data transmission window 218 may begin at t10 and may end at t11. The subsequent paging window 212 may begin at t12 and may end at t13. The subsequent data transmission window 218 may begin at t13 and may end at t14. A duration of a paging window, a duration of a data transmission window, or both, may be determined in accordance with a NAN standard or protocol.

The devices 104-112 may exchange the traffic advertisement 128, the ACK 138, the trigger request 544, the trigger message 150, the data 122, or a combination thereof, via the NAN communication channel 702, the first communication channel 802, or both. For example, the devices 104-112 may exchange the traffic advertisement 128, the ACK 138, the trigger request 544, the trigger message 150, the data 122, or a combination thereof, via the NAN communication channel 702, as described with reference to FIG. 7.

As another example, the traffic advertisement generator 130 may send the traffic advertisement 128 via the first communication channel 802 during the paging window 212 of the supplemental channel 860, as described with reference to FIG. 1. The traffic advertisement generator 130 (or the traffic advertisement analyzer 134) may monitor the first communication channel 802 during the paging window 212 of the supplemental channel 860. For example, the traffic advertisement analyzer 134 may receive the traffic advertisement 128 via the first communication channel 802 during the paging window 212, as described with reference to FIG. 1. The traffic advertisement analyzer 134 may send the ACK 138 via the first communication channel 802 during the paging window 212 in response to receiving the traffic advertisement 128, as described with reference to FIG. 1.

The traffic advertisement analyzer 134 may monitor the first communication channel 802 during the data transmission window 218 of the supplemental channel 860 in response to determining that the traffic advertisement 128 has been received during the corresponding paging window 212.

The traffic advertisement generator 130 may monitor the first communication channel 802 during the data transmission window 218 in response to determining that at least one ACK (e.g., the ACK 138) responsive the traffic advertisement 128 has been received during the corresponding paging window 212 of the first communication channel 802, as described with reference to FIG. 1.

The traffic advertisement generator 130 may send the trigger request 544 via the first communication channel 802 during the data transmission window 218 to each of multiple recipients (e.g., the subscriber devices 106-110) of data to be sent by the provider device 104, as described with reference to FIG. 1. The traffic advertisement analyzer 134 may send the trigger message 150 via the first communication channel 802 during the data transmission window 218, e.g., in response to receiving the trigger request 544, as described with reference to FIG. 5-6.

The traffic advertisement generator 130 may send the data 122 via the first communication channel 802 during the data transmission window 218 to each subscriber device (e.g., the subscriber devices 106-108) from which the traffic advertisement generator 130 received the trigger message 150, as described with reference to FIG. 1. The traffic advertisement analyzer 134 may receive the data 122 via the first communication channel 802 during the data transmission window 218, as described with reference to FIG. 1.

In a particular aspect, the traffic advertisement generator 130 may transition to an inactive mode during the paging window 212 in response to determining that the provider device 104 has no data to send to subscriber devices in the corresponding data transmission window 218.

In a particular aspect, the traffic advertisement analyzer 134 may transition to an inactive mode during the data transmission window 218 in response to determining that no traffic advertisement has been received from a provider device (e.g., the provider device 104) during the paging window 212. In a particular aspect, the traffic advertisement generator 130 may transition to an inactive mode during the data transmission window 218 in response to determining that no ACK responsive to the traffic advertisement 128 has been received during the paging window 212.

In a particular aspect, the traffic advertisement analyzer 134 may transition to an inactive mode during a remaining portion of the data transmission window 218 in response to determining that no trigger request (e.g., the trigger request 544) has been received from the provider device 104 during a beginning portion of the data transmission window 218. In an alternate aspect, the traffic advertisement analyzer 134 may continue to monitor the first communication channel 802 during the remaining portion of the data transmission window 218 in response to determining that the ACK 138 has been sent to the provider device 104 during the paging window 212 (e.g., regardless of whether the trigger request 544 is received during the beginning portion of the data transmission window 218).

In a particular aspect, the traffic advertisement generator 130 may transition to an inactive mode during the remaining portion of the data transmission window 218 in response to determining that no data trigger (e.g., the trigger message 150) has been received from subscriber devices 106-110 during the beginning portion of the data transmission window 218. In a particular aspect, the devices 104-112 may transition to an inactive mode while refraining from monitoring the first communication channel 802.

The devices 104-112 may reduce power consumption by performing operations based on the timing windows illustrated in the timing diagram 800. For example, the devices 104-112 may transition to an inactive mode in response to determining that there is no data to be sent, that no traffic advertisement has received, that no ACK has been received, that no trigger request has been received, that no data trigger has been received, or a combination thereof.

Figure 9:
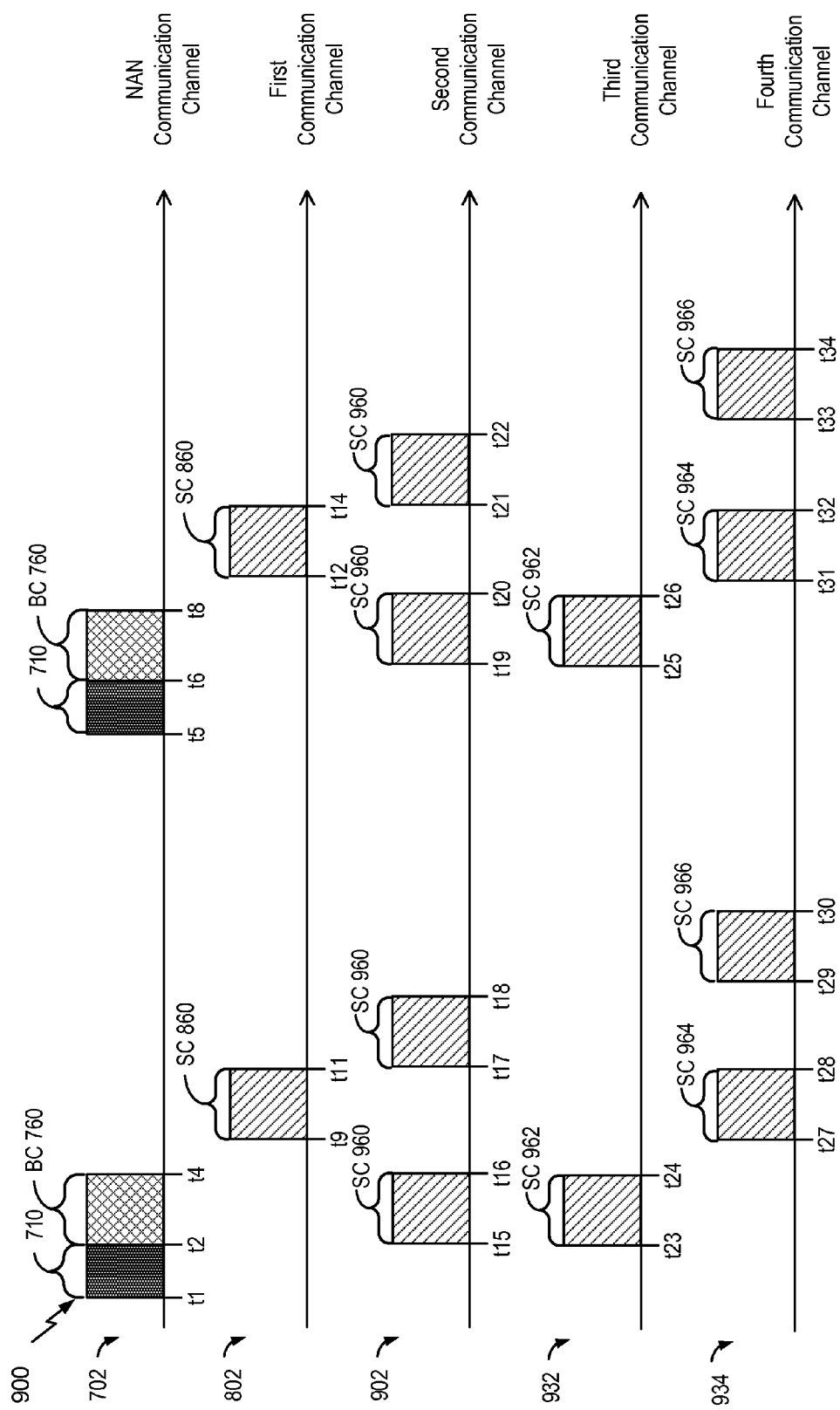
FIG. 9 is a timing diagram corresponding to operation of another particular aspect of one or more of the systems disclosed herein.

Referring to FIG. 9, a timing diagram is shown and generally designated 900. In a particular aspect, the timing diagram 900 may correspond to operation of a particular aspect of the system 100 of FIG. 1. The timing and operations shown in FIG. 9 are for illustration and are not limiting. In other aspects, additional or fewer operations may be performed and the timing may be different.

The timing diagram 900 illustrates relative timing of paging windows and transmission windows of the NAN communication channel 702, the first communication channel 802, a second communication channel 902, a third communication channel 932, and a fourth communication channel 934.

The traffic advertisement generator 130 may determine that the provider device 104 is available to provide a particular service via the available logical channels, as described with reference to FIG. 1. The available logical channels may include one or more of the supplemental channel 860, a supplemental channel 960, a supplemental channel 962, a supplemental channel 964, and a supplemental channel 966. In a particular aspect, the available logical channels may include more than five supplemental channels.

The supplemental channel 960 may correspond to a first supplemental channel offset (e.g., time t1 to time t15, time t5 to time t19), a second supplemental channel offset (e.g., time t1 to time t17, time t5 to time t21), and the second communication channel 902. The supplemental channel 960 may correspond to a transmission window corresponding to each supplemental channel offset during a particular discovery interval. For example, the supplemental channel 960 may, during a first discovery interval that begins at t2, correspond to a first transmission window beginning at the time t15 and ending at the time t16 and to a second transmission window beginning at the time t17 and ending at the time t18. As another example, the supplemental channel 960 may, during a second discovery interval that begins at t6, correspond to a first transmission window beginning at the time t19 and ending at the time t20 and to a second transmission window beginning at the time t21 and ending at the time t12.

The supplemental channel 962 may correspond to a supplemental channel offset (e.g., time t1 to time t23, time t5 to time t25), and the third communication channel 932. The supplemental channel 962 may correspond to a transmission window corresponding to the supplemental channel offset during a particular discovery interval. For example, the supplemental channel 962 may, during a first discovery interval that begins at t2, correspond to a transmission window beginning at the time t23 and ending at the time t24. As another example, the supplemental channel 962 may, during a second discovery interval that begins at t6, correspond to a transmission window beginning at the time t25 and ending at the time t26.

The supplemental channel 964 may correspond to a supplemental channel offset (e.g., time t1 to time t27, time t5 to time t31), and the fourth communication channel 934. The supplemental channel 964 may correspond to a transmission window corresponding to the supplemental channel offset during a particular discovery interval. For example, the supplemental channel 964 may, during a first discovery interval that begins at t2, correspond to a transmission window beginning at the time t27 and ending at the time t28. As another example, the supplemental channel 964 may, during a second discovery interval that begins at t6, correspond to a transmission window beginning at the time t31 and ending at the time t32.

The supplemental channel 966 may correspond to a supplemental channel offset (e.g., time t1 to time t29, time t5 to time t33), and the fourth communication channel 934. The supplemental channel 966 may correspond to a transmission window corresponding to the supplemental channel offset during a particular discovery interval. For example, the supplemental channel 966 may, during a first discovery interval that begins at t2, correspond to a transmission window beginning at the time t29 and ending at the time t30. As another example, the supplemental channel 966 may, during a second discovery interval that begins at t6, correspond to a transmission window beginning at the time t33 and ending at the time t34.

In a particular aspect, the traffic advertisement generator 130 may determine that the available logical channels include at least one supplemental channel (e.g., the supplemental channel 860, 960, 962, 964, or 966), as described with reference to FIG. 1. During the discovery window 710, the service advertisement may be transmitted via the NAN communication channel 702. For example, the provider device 104 (e.g., the traffic advertisement generator 130) may transmit the service advertisement via the NAN communication channel 702 to advertise availability of the particular service. The service advertisement may indicate the available logical channels and the provider MAC address, as described with reference to FIG. 1.

Each transmission window of the supplemental channels 860, 960, 962, 964, and 966 may include a paging window and a data transmission window. A duration of a paging window, a duration of a data transmission window, or both, may be determined in accordance with a NAN standard or protocol.

A paging window of the basic channel 760 (or a paging window of one or more of the available logical channels) may correspond to the paging window 212 of FIG. 2. A data transmission window of the basic channel 760 (or a data transmission window of one or more of the available logical channels) may correspond to the data transmission window 218 (or an ending portion of the data transmission window 218) of FIG. 2. In a particular aspect, a trigger slot of the basic channel 760 (or a trigger slot of one or more of the available logical channels) may correspond to the trigger slot 214 of FIG. 2.

The devices 104-112 may exchange the traffic advertisement 128, the ACK 138, the trigger request 544, the trigger message 150, the data 122, or a combination thereof, via the NAN communication channel 702, the first communication channel 802, the second communication channel 902, the third communication channel 932, the fourth communication channel 934, or a combination thereof.

Figure 10A:
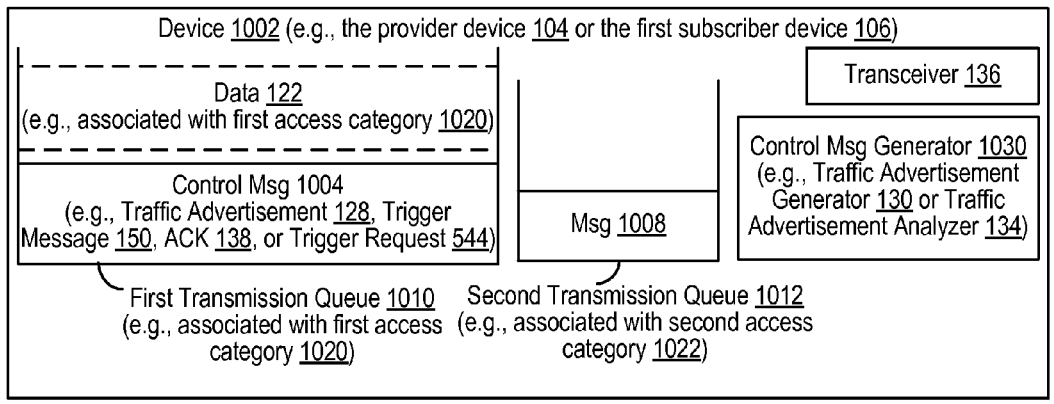
FIG. 10A is a diagram of a particular example of a device of the system of FIG. 1.

Referring to FIG. 10A, a particular example of a device of the system of FIG. 1 is shown and generally designated 1002. The device 1002 may correspond to one or more devices of the system 100 of FIG. 1. For example, the device 1002 may correspond to the device 104-114 of the system 100 of FIG. 1.

The device 1002 includes a control message generator 1030 (e.g., the traffic advertisement generator 130, the traffic advertisement analyzer 134, or both). The device 1002 includes the transceiver 136. The device 1002 includes multiple transmission queues (e.g., a first transmission queue 1010 and a second transmission queue 1012).

Various types of data may be associated with various access categories. For example, video data may be associated with a particular access category, and voice data may be associated with another access category. To illustrate, the data 122 may be associated with a first access category 1020. The first access category 1020 may correspond to video data, voice data, or background data.

A particular transmission queue may be associated with a particular access category. For example, the first transmission queue 1010 may be associated with the first access category 1020, and the second transmission queue 1012 may be associated with a second access category 1022.

During operation, the control message generator 1030 may generate a control message 1004 (the traffic advertisement 128, the trigger request 544, the ACK 138, or the trigger message 150). For example, the provider device 104 may generate the traffic advertisement 128, the trigger request 544, or both, as described with reference to FIG. 1. The control message 1004 (e.g., the traffic advertisement 128, the trigger request 544, or both) may indicate availability of the data 122. As another example, the first subscriber device 106 may receive the traffic advertisement 128 and may generate the ACK 138, the trigger message 150, or both, based on the traffic advertisement 128, as described with reference to FIG. 1.

The data 122 may be associated with the first access category 1020. For example, the data 122 (or a packet including the data 122) may indicate the first access category 1020. The control message 1004 may indicate that the control message 1004 corresponds to the first access category 1020, that the control message 1004 is associated with data (e.g., the data 122) that corresponds to the first access category 1020, or both. The control message generator 1030 may select a particular transmission queue from the first transmission queue 1010 and the second transmission queue 1012 based on an access category associated with the data 122, an access category associated with the control message 1004, or both. For example, the control message generator 1030 may select the first transmission queue 1010 in response to determining that the first transmission queue 1010 is associated with the first access category 1020 and that the first access category 1020 is associated with the data 122, the control message 1004, or both. The control message generator 1030 may add the control message 1004 to the selected transmission queue (e.g., the first transmission queue 1010).

In particular implementation, the control message 1004 may have a particular access category that is the same as or distinct from the first access category 1020. The control message generator 1030 may select a transmission queue (e.g., the first transmission queue 1010, the second transmission queue 1012, or another transmission queue) based on the particular access category (e.g., the first access category 1020, the second access category 1022, or another access category). The control message generator 1030 may add the control message 1004 to the selected transmission queue (e.g., the first transmission queue 1010, the second access category 1022, or another access category).

In a particular aspect, the control message generator 1030 may determine that the traffic advertisement 128, the trigger request 544, or both, correspond to the same access category (e.g., the first access category 1020) as the data 122. The control message generator 1030 may determine that the trigger message 150, the ACK 138, or both, correspond to the same access category (e.g., the first access category 1020) as the traffic advertisement 128. The control message generator 1030 may thus determine an access category of the trigger message 150, the ACK 138, or both, based on an access category of the traffic advertisement 128 independently of whether the traffic advertisement 128 explicitly indicates that the traffic advertisement 128 is associated with data (e.g., the data 122) having a particular access category. In a particular aspect, the control message generator 1030 may determine that the trigger message 150 corresponds to the same access category (e.g., the first access category 1020) as the trigger request 544. The control message generator 1030 may thus determine an access category of the trigger message 150 based on an access category of the trigger request 544 independently of whether the trigger request 544 explicitly indicates that the trigger request 544 is associated with data (e.g., the data 122) having a particular access category.

In a particular example, the first transmission queue 1010 may include the data 122. For example, the traffic advertisement generator 130 may, in response to determining that the data 122 and the first transmission queue 1010 corresponds to the same access category (e.g., the first access category 1020), add the data 122 to the first transmission queue 1010 during the data transmission window 218. The second transmission queue 1012 may include a message (msg) 1008. The message 1008 (e.g., a control message or a data packet) and the second transmission queue 1012 may be associated with the second access category 1022.

The first transmission queue 1010 and the second transmission queue 1012 may be processed in an order based on corresponding access categories. For example, the first access category 1020 may correspond to lower priority data than the second access category 1022. In this example, the first transmission queue 1010 may be processed subsequent to the second transmission queue 1012. For example, the message 1008 may be transmitted by the transceiver 136 prior to transmission of the control message 1004.

In a particular implementation, the control message generator 1030 may determine that transmission of the control message 1004 is to be delayed. For example, the control message generator 1030 may determine that transmission of the control message 1004 is to be delayed in response to determining that a transmission medium is busy. To illustrate, the control message generator 1030 may determine that the transmission medium is busy in response to receiving a particular indication from the transceiver 136. As another example, the control message generator 1030 may determine that the transmission of the control message 1004 is to be delayed in response to determining that the second transmission queue 1012 is to be processed prior to the first transmission queue 1010. To illustrate, the control message generator 1030 may determine that the second transmission queue 1012 is to be processed prior to the first transmission queue 1010 based on determining that the second access category 1022 has a higher priority than the first access category 1020 and that the second transmission queue 1012 includes the message 1008.

The control message generator 1030 may, in response to determining that transmission of the control message 1004 is to be delayed, determine a first delay based on an access category (e.g., the first access category 1020) associated with the selected transmission queue (e.g., the first transmission queue 1010). For example, a delay mapping may indicate a corresponding delay associated with each access category. For example, the first delay corresponding to the first access category 1020 may have a first value, and a second delay corresponding to the second access category 1022 may have a second value. The first value may be greater than (or less than) the second value. The delay mapping may be accessible by the control message generator 1030. The control message generator 1030 may determine the first delay corresponding to the first access category 1020 based on the delay mapping.

A plurality of access categories may be specified in a standard (e.g., Institute of Electrical and Electronics Engineers (IEEE) 802.11e standard). The plurality of access categories may include the first access category 1020. The standard (e.g., the IEEE 802.11e standard) may specify a medium access scheme of transmitting data corresponding to the first access category 1020. The plurality of access categories and the medium access scheme may be compliant with an IEEE 802.11e specification. The control message generator 1030 may determine the first delay based on the medium access scheme.

The control message generator 1030 may send the control message 1004, via the transceiver 136, upon expiration of a delay period, as described with reference to FIG. 10B. The delay period may be based on the first delay, as described with reference to FIG. 10B.

In a particular aspect, the control message generator 1030 may determine that a first paging window has expired prior to expiration of a first delay period and prior to sending the control message 1004. For example, the first delay period may begin at a first time (e.g., 1:00:00 PM) and may be scheduled to end at a second time (e.g., 1:00:05 PM). The first delay period may correspond to the first delay (e.g., 5 seconds). The paging window may end at a paging window expiration time (e.g., 1:00:02 PM) that is subsequent to the first time (e.g., 1:00:00 PM) and prior to the second time (e.g., 1:00:05 PM). An unexpired portion of the first delay period may correspond to a time period (e.g., 3 seconds) between the paging window expiration time (e.g., 1:00:02 PM) and the second time (e.g., 1:00:05 PM). The control message generator 1030 may send the control message 1004 during a second paging window (e.g., the paging window 212 of FIG. 2) upon expiration of a delay period. The paging window 212 may be subsequent to the first paging window. The delay period may be based on the unexpired portion of the first delay period. For example, a length (e.g., 3 seconds) of the delay period may correspond to a length of the unexpired portion of the first delay period.

Figure 10B:
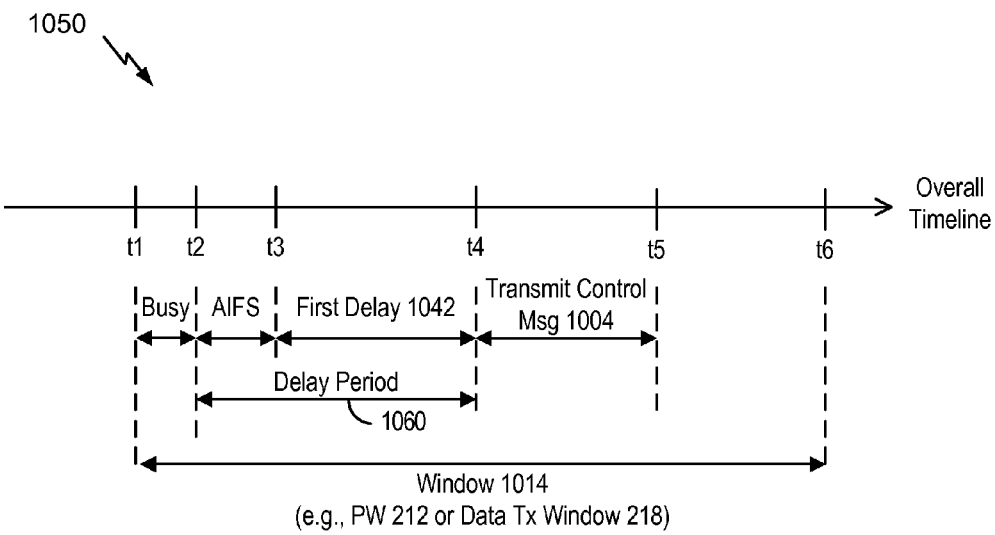
FIG. 10B is a timing diagram corresponding to operation of the device of FIG. 10A.

Referring to FIG. 10B, a timing diagram is shown and generally designated 1050. The timing diagram 1050 may correspond to operation of a particular implementation or use case of the device 1002 of FIG. 10A. The timing and operations shown in FIG. 10B are for illustration and are not limiting. In other implementations or use cases, additional or fewer operations may be performed and the timing may be different. The timing diagram 1050 includes an overall timeline corresponding to a communication channel (e.g., the communication channel 702, 802, 902, 932, or 934).

During operation, the control message generator 1030 may determine, at time t1, that transmission of the control message 1004 is to be delayed, as described with reference to FIG. 10A. For example, the control message generator 1030 may detect, at a time t1, that a transmission medium (e.g., the communication channel 702, 802, 902, 932, or 934) is busy. As another example, the control message generator 1030 may determine that the first transmission queue 1010 is to be processed subsequent to the second transmission queue 1012, as described with reference to FIG. 10A. In a particular example, the control message generator 1030 may determine during a window 1014 that transmission of the control message 1004 is to be delayed. For example, the control message generator 1030 may determine during (e.g., at a beginning of) the paging window 212 or the data transmission window 218 that the transmission of the control message 1004 is to be delayed.

The control message generator 1030 may determine a first delay 1042 based on the first access category 1020, as described with reference to FIG. 10A. The first delay 1042 (e.g., a CW value) may correspond to a contention window associated with the first access category 1020. A delay period 1060 may begin at a time t2 in response to detecting that a transmission medium is idle. In a particular example, the delay period 1060 may begin at the time t2 in response to determining that the first transmission queue 1010 is a next transmission queue to be processed and that the transmission medium is idle. For example, the control message generator 1030 may determine that the first transmission queue 1010 is the next transmission queue to be processed in response to determining that the second transmission queue 1012 is empty or in response to determining that a time interval of processing the second transmission queue 1012 has expired.

The delay period 1060 may be based on the first delay 1042. For example, the delay period 1060 may have a duration corresponding to a sum of an arbitration interframe spacing (AIFS) and the first delay 1042. The delay period 1060 may expire in response to determining that the transmission medium remained idle from the time t2 to a time t4. A first time interval from the time t2 to a time t3 may correspond to the AIFS. A second time interval from the time t3 to the time t4 may correspond to the first delay 1042. The control message generator 1030 may transmit, from the time t4 to a time t5, the control message 1004 upon expiration of the delay period 1060. For example, the first subscriber device 106 may transmit, at the time t4, the ACK 138 or the trigger message 150 to the provider device 104. As another example, the provider device 104 may transmit, at the time t4, the traffic advertisement 128 or the trigger request 544. The window 1014 may end at a time t6.

In a particular implementation, the control message generator 1030 may determine the AIFS associated with the control message 1004 based on the first access category 1020. For example, a first AIFS may be associated with the first access category 1020 and the control message 1004, and a second AIFS may be associated with the second access category 1022 and the message 1008. The first AIFS may be shorter (or longer) than the second AIFS.

When multiple messages (e.g., data packets or control messages) contend for a transmission medium, a control message associated with a higher priority access category may be transmitted prior to messages (e.g., control messages or data packets) associated with a lower priority access category because the higher priority access category is associated with a shorter delay. The control message generator 1030 may thus enable prioritized transmission of control messages based on corresponding access categories.

Figure 11:
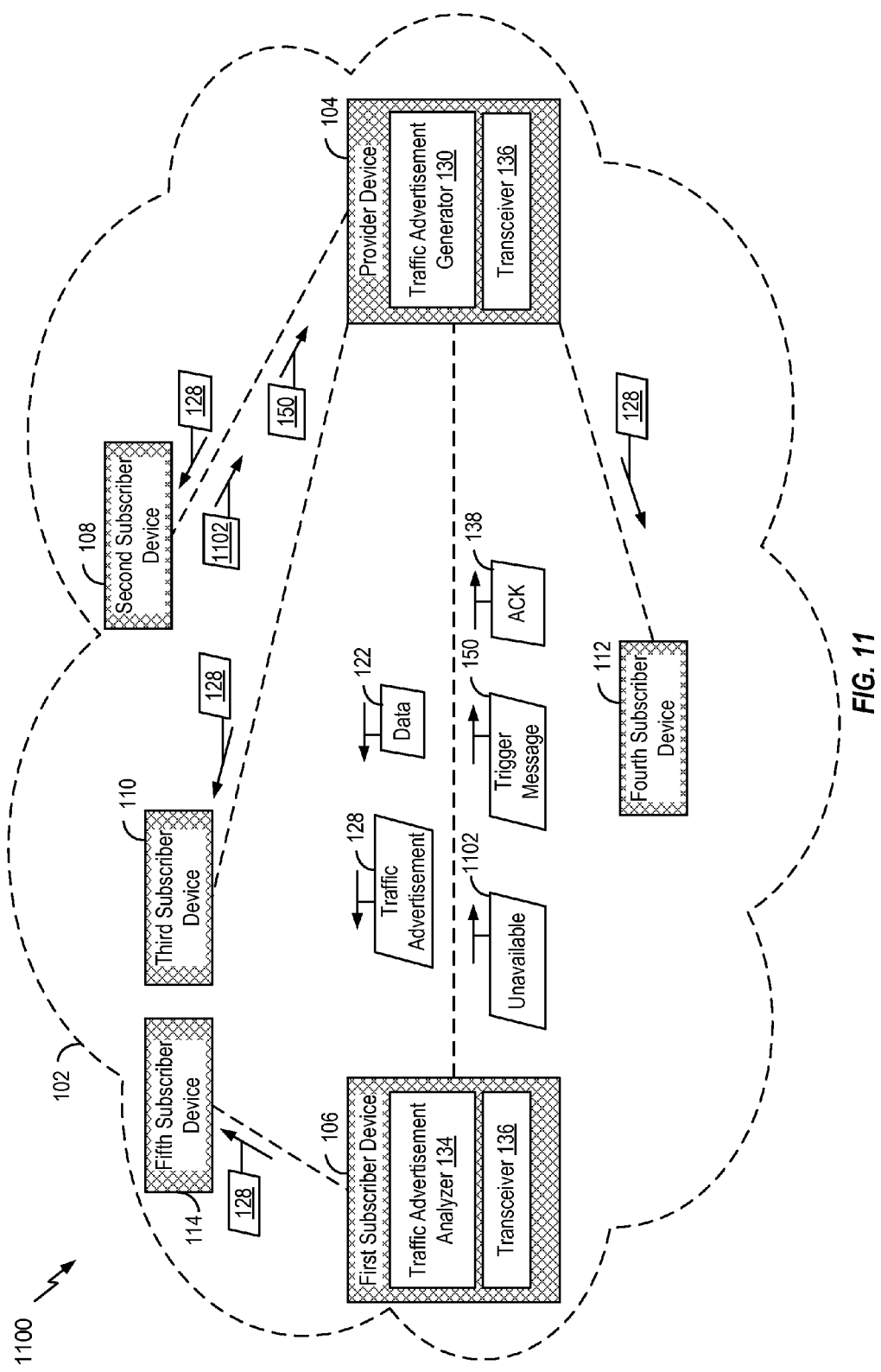
FIG. 11 is a diagram of another particular aspect of a system that includes one or more electronic devices that exchange a traffic advertisement.

Referring to FIG. 11, a particular aspect of a system is shown and generally designated 1100. The system 1100 may include the NAN 102.

The system 1100 differs from the system 100 of FIG. 1 in that a subscriber device (e.g., the first subscriber device 106, the second subscriber device 108, or both) may, subsequent to receiving the traffic advertisement 128 from the provider device 104, send an unavailable message 1102 (e.g., a pause message) to the provider device 104. The unavailable message 1102 may indicate a pause in an NDL schedule. For example, the unavailable message 1102 may indicate that a subscriber device (e.g., the first subscriber device 106, the second subscriber device 108, or both) is unavailable to receive data associated with an NDL group corresponding to the traffic advertisement 128. The unavailable message 1102 may indicate that the subscriber device (e.g., the first subscriber device 106, the second subscriber device 108, or both) is unavailable during at least a portion of an NDL schedule associated with the NDL group. The provider device 104 may refrain from sending data to the subscriber device (e.g., the first subscriber device 106, the second subscriber device 108, or both) in response to receiving the unavailable message 1102 from the subscriber device. For example, the provider device 104 may retain the data to send to the subscriber device (e.g., the first subscriber device 106, the second subscriber device 108, or both) in a subsequent transmission window. To illustrate, the provider device 104 may send a second traffic advertisement during a second transmission window that indicates that the provider device 104 has data to send to at least the subscriber device (e.g., the first subscriber device 106, the second subscriber device 108, or both). Data to be sent to the subscriber device (e.g., the first subscriber device 106, the second subscriber device 108, or both) during the second transmission window may include the retained data. The unavailable message 1102 may include a QoS_NULL frame or another frame. For example, a particular bit (e.g., a power management bit) of a particular field (e.g., a frame control field) of a header (e.g., a MAC header) of a frame (e.g., the QoS_NULL frame or another frame) may be set to a particular value (e.g., 1) to indicate that the frame corresponds to the unavailable message 1102. To illustrate, a particular value (e.g., 1) of a power management bit of a frame control field of a MAC header of the unavailable message 1102 may indicate that the subscriber device (e.g., the first subscriber device 106, the second subscriber device 108, or both) is unavailable to receive data.

In a particular implementation, the provider device 104 may send the traffic advertisement 128 via a first communication channel during a first paging window of a first transmission window, as described with reference to FIG. 1. The traffic advertisement analyzer 134 of the first subscriber device 106 may send an available message (e.g., the ACK 138 or the trigger message 150) in response to receiving the traffic advertisement 128. For example, the traffic advertisement analyzer 134 of the first subscriber device 106 may, in response to receiving the traffic advertisement 128, send the ACK 138 via the first communication channel to the provider device 104 during the first paging window. Alternatively, or in addition, the traffic advertisement analyzer 134 of the first subscriber device 106 may send the trigger message 150 via a second communication channel to the provider device 104 during a first data transmission window of the first transmission window.

The traffic advertisement analyzer 134 of the first subscriber device 106 may send the trigger message 150 in response to determining that the first subscriber device 106 is available to communicate, via the second communication channel, with the provider device 104. Subsequently, the traffic advertisement analyzer 134 of the first subscriber device 106 may determine that the first subscriber device 106 is unavailable to receive data via the second communication channel from the provider device 104 during a remaining portion of the first data transmission window. In a particular implementation the traffic advertisement analyzer 134 of the first subscriber device 106 may receive the data 122 via the second communication channel from the provider device 104 during the first data transmission window and may determine that the first subscriber device 106 is unavailable to receive additional data via the second communication channel from the provider device 104 during a remaining portion of the first data transmission window.

The first subscriber device 106 may be unavailable to receive data for various reasons. For example, the first subscriber device 106 may be unavailable to receive data because the first subscriber device 106 may be transitioning to an inactive operating mode. As another example, the first subscriber device 106 may be unavailable to receive data because the first subscriber device 106 may be scheduled to monitor another communication channel during the remaining portion of the first data transmission window. As a further example, the first subscriber device 106 may be unavailable to receive data because the first subscriber device 106 may be performing operations (e.g., a channel scan) related to another network (e.g., an Infra-based network).

The traffic advertisement analyzer 134 of the first subscriber device 106 may generate the unavailable message 1102 in response to determining that the first subscriber device 106 is unavailable to receive data via the second communication channel from the provider device 104 during the remaining portion of the first data transmission window. The first subscriber device 106 may send the unavailable message 1102 via the second communication channel to the provider device 104 during the first data transmission window. In a particular aspect, the first subscriber device 106 may transition to an inactive mode during a remaining portion of the first data transmission window subsequent to sending the unavailable message 1102. For example, the first subscriber device 106 may transition to the inactive mode in response to determining that the traffic advertisement analyzer 134 is not scheduled to monitor any communication channels during the remaining portion of the first data transmission window.

The provider device 104 may refrain from sending data (e.g., the data 122) via the second communication channel to the first subscriber device 106 during a remaining portion of the first data transmission window in response to receiving the unavailable message 1102 from the first subscriber device 106. The provider device 104 may identify a set of available subscriber devices in response to receiving the unavailable message 1102. The provider device 104 may transition to an inactive mode (e.g., refrain from monitoring the second communication channel, transition to a low-power operating mode, perform actions related to another network, or a combination thereof) during a remaining portion of the first data transmission window in response to determining that there is no data to send to the set of available subscriber devices during the remaining portion of the first data transmission window.

The system 1100 may thus enable a subscriber device to use an unavailable message to inform a provider device when the subscriber device becomes unavailable to receive data. The provider device may conserve resources (e.g., network usage, power, or both) by refraining from sending data to the subscriber device, transitioning to an inactive mode (e.g., transitioning to a low-power operating mode, refraining from monitoring a communication channel, performing actions related to another network), or both, in response to receiving the unavailable message from the subscriber device.

Figure 12:
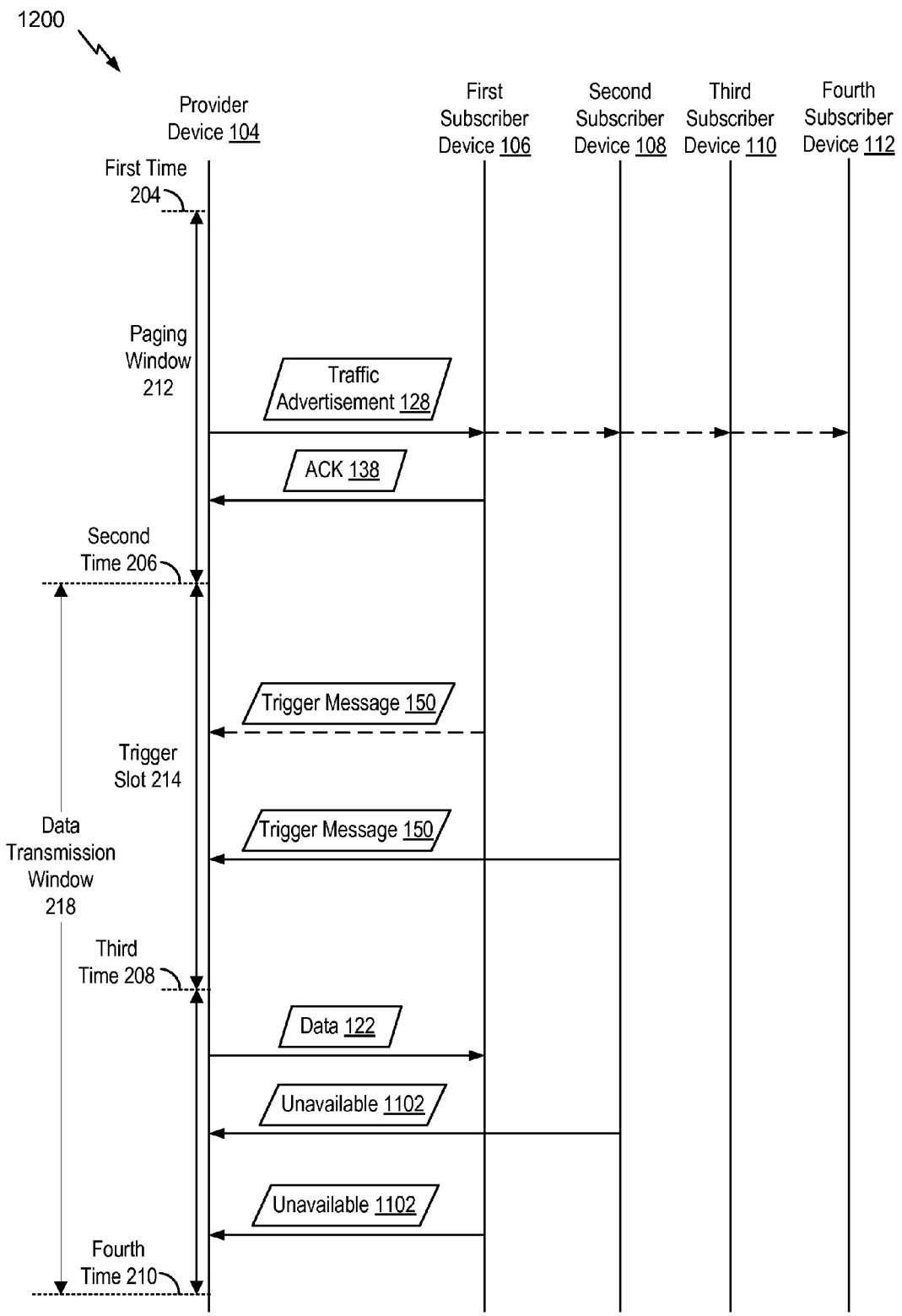
FIG. 12 is a ladder diagram corresponding to operation of a particular aspect of the system of FIG. 11.

Referring to FIG. 12, a diagram is shown and generally designated 1200. In a particular aspect, the diagram 1200 may correspond to operation of a particular aspect of the system 1100 of FIG. 11. The timing and operations shown in FIG. 12 are for illustration and are not limiting. In other aspects, additional or fewer operations may be performed and the timing may be different.

The diagram 1200 may differ from the diagram 200 of FIG. 2 in that during the data transmission window 218 (or an ending portion of the data transmission window 218), one or more subscriber devices may send the unavailable message 1102 to the provider device 104, as described with reference to FIG. 11. For example, the first subscriber device 106 (e.g., the traffic advertisement analyzer 134 of FIG. 1) may send the unavailable message 1102 subsequent to receiving the data 122 during the data transmission window 218. The provider device 104 may, in response to receiving the unavailable message 1102 from the first subscriber device 106, refrain from sending additional data to the first subscriber device 106 during the data transmission window 218. To illustrate, the provider device 104 may retain the additional data in response to receiving the unavailable message 1102. The provider device 104 may send the retained data to the first subscriber device 106 during a subsequent transmission window. As another example, the second subscriber device 108 may send the unavailable message 1102 to the provider device 104 during the data transmission window 218 without having previously received any data from the provider device 104 during the data transmission window 218. The provider device 104 may, in response to receiving the unavailable message 1102 during the data transmission window 218, refrain from sending data to the second subscriber device 108 during the data transmission window 218. In a particular implementation, the provider device 104 may, in response to receiving the unavailable message 1102, retain the data to be sent to the second subscriber device 108. For example, the provider device 104 may store the data in a memory. The provider device 104 may send the retained data to the second subscriber device 108 during a subsequent transmission window.

The provider device 104 may conserve network resources by refraining from sending data to a subscriber device during a data transmission window in response to receiving an unavailable message from the subscriber device. The provider device 104 may transition to an inactive mode (e.g., transition to a low-power operating mode or perform other operations during a remaining portion of the data transmission window).

Figure 13:
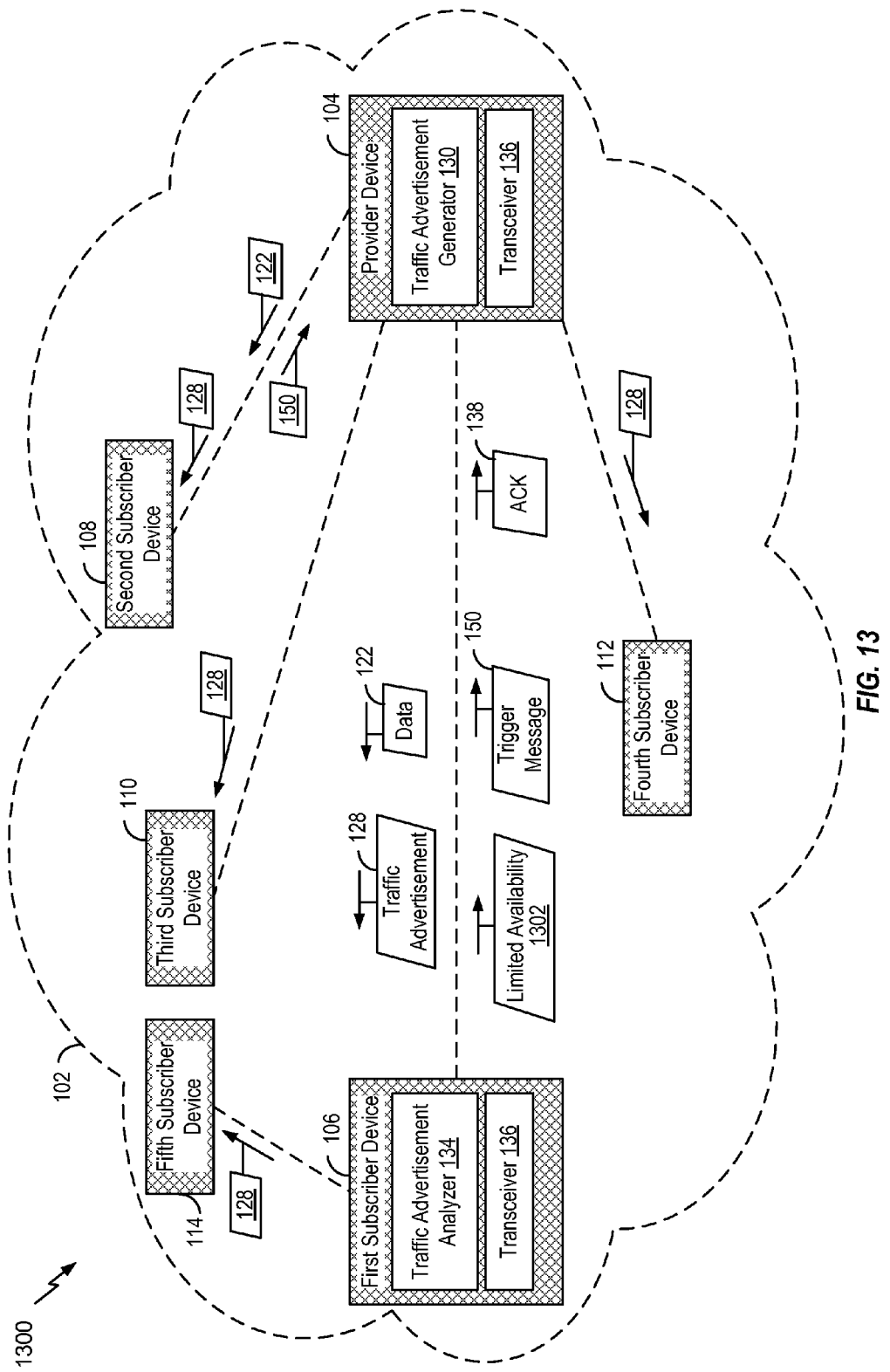
FIG. 13 is a diagram of another particular aspect of a system that includes one or more electronic devices that exchange a traffic advertisement.

Referring to FIG. 13, a particular aspect of a system is shown and generally designated 1300. The system 1300 may include the NAN 102.

The system 1300 differs from the system 100 of FIG. 1 in that a subscriber device (e.g., the first subscriber device 106, the second subscriber device 108, or both) may, subsequent to receiving the traffic advertisement 128 from the provider device 104, send a limited availability message 1302 to the provider device 104. The provider device 104 may prioritize sending data to the subscriber device (e.g., the first subscriber device 106, the second subscriber device 108, or both) in response to receiving the limited availability message 1302 from the subscriber device.

In a particular implementation, the provider device 104 may send the traffic advertisement 128 via a first communication channel during a first paging window of a first transmission window, as described with reference to FIG. 1. The traffic advertisement analyzer 134 of the first subscriber device 106 may, in response to receiving the traffic advertisement 128, send the ACK 138 via the first communication channel to the provider device 104 during the first paging window. Alternatively, or in addition, the traffic advertisement analyzer 134 of the first subscriber device 106 may send the trigger message 150 via a second communication channel to the provider device 104 during a first data transmission window of the first transmission window.

The traffic advertisement analyzer 134 may determine that the first subscriber device 106 is expected to be partially available during the first data transmission window. For example, the first subscriber device 106 may be scheduled to transition to an inactive mode (e.g., monitor another communication channel, to transition to a low-power operating mode, or both) during at least a portion of the first data transmission window. The traffic advertisement analyzer 134 may generate the limited availability message 1302 in response to determining that the first subscriber device 106 is expected to be partially available during the first data transmission window. In a particular implementation, the limited availability message 1302 may correspond to (e.g., include) the ACK 138, the trigger message 150, or both. For example, the ACK 138, the trigger message 150, or both, sent by the first subscriber device 106 may include information indicating that the first subscriber device 106 is partially available during the first data transmission window. The traffic advertisement analyzer 134 may send the limited availability message 1302 via the first communication channel (or the second communication channel) to the provider device 104 during the first paging window (or the first data transmission window).

In a particular implementation, the traffic advertisement analyzer 134 may send the limited availability message 1302 prior to the first paging window. For example, the traffic advertisement analyzer 134 may send the limited availability message 1302 during NDL setup or NDL schedule negotiation. The traffic advertisement generator 130 may receive the limited availability message 1302 prior to the first paging window. For example, the traffic advertisement generator 130 may receive the limited availability message 1302 during NDL setup or NDL schedule negotiation. The provider device 104 may prioritize sending the data 122 to the first subscriber device 106 during each transmission window (e.g., the transmission window 740 Of FIG. 7) in which the provider device 104 receives the trigger message 150, the ACK 138, or both, from the first subscriber device 106.

The traffic advertisement generator 130 of the provider device 104 may prioritize sending data to the first subscriber device 106 in response to receiving the limited availability message 1302 from the first subscriber device 106. For example, the traffic advertisement generator 130 may receive the limited availability message 1302 from the first subscriber device 106 and may receive an available message (e.g., the ACK 138 or the trigger message 150) from the second subscriber device 108. The traffic advertisement generator 130 may, responsive to the limited availability message 1302, send first data (e.g., the data 122) to the first subscriber device 106. The traffic advertisement generator 130 may, responsive to the available message (e.g., the ACK 138 or the trigger message 150), send second data (e.g., the data 122) to the second subscriber device 108. The traffic advertisement generator 130 may, based on determining that the limited availability message 1302 has been received from the first subscriber device 106, send the first data (e.g., the data 122) to the first subscriber device 106 prior to sending the second data (e.g., the data 122) to the second subscriber device 108.

The system 1300 may thus enable a subscriber device to use a partially available message to inform a provider device that the subscriber device is expected to be unavailable during at least a portion of a data transmission window. The provider device may prioritize sending data to the subscriber device in response to receiving the partially available message from the subscriber device to increase a likelihood of the subscriber device receiving the data.

Figure 14:
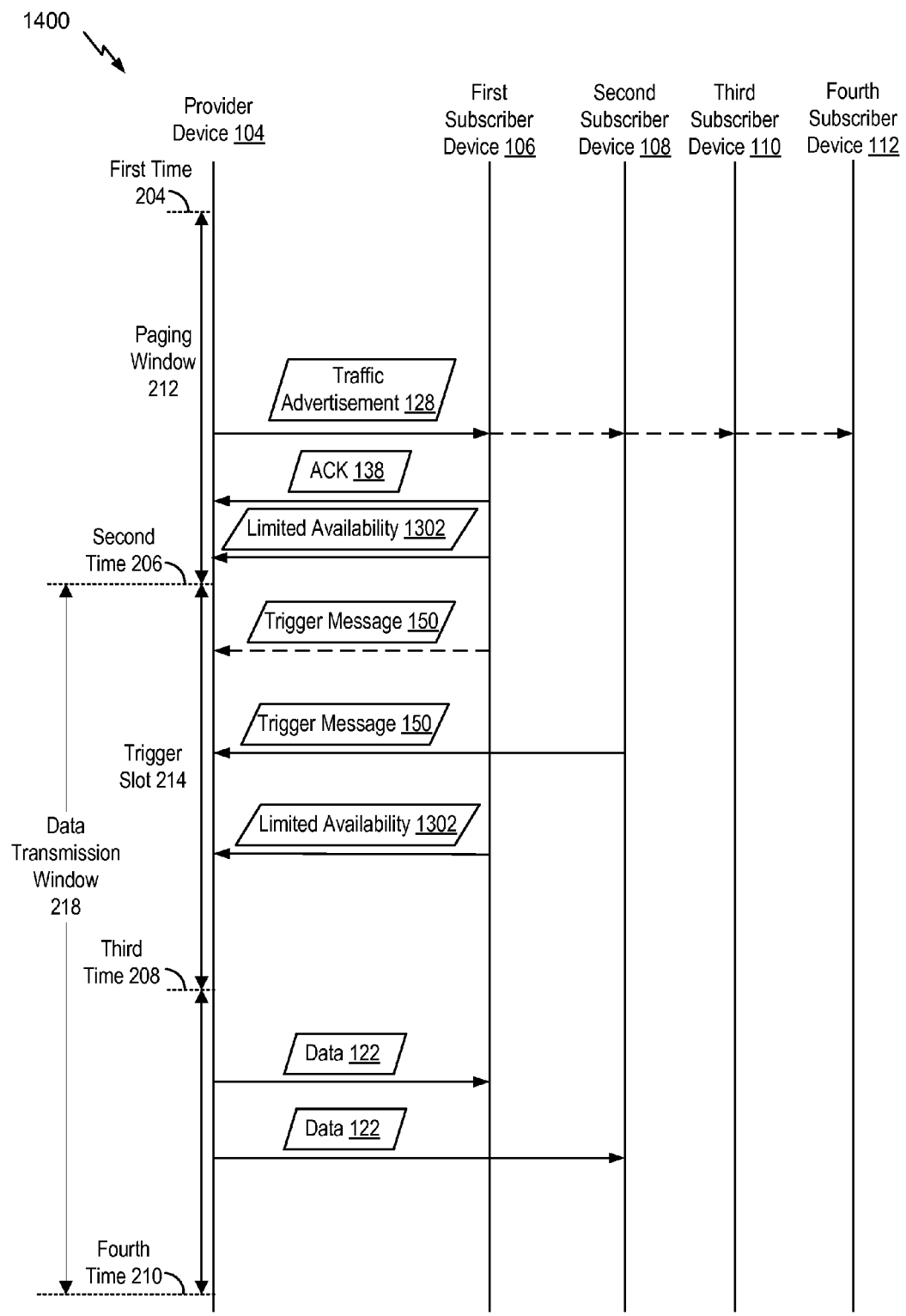
FIG. 14 is a ladder diagram corresponding to operation of a particular aspect of the system of FIG. 13.

Referring to FIG. 14, a diagram is shown and generally designated 1400. In a particular aspect, the diagram 1400 may correspond to operation of a particular aspect of the system 1300 of FIG. 13. The timing and operations shown in FIG. 14 are for illustration and are not limiting. In other aspects, additional or fewer operations may be performed and the timing may be different.

The diagram 1400 may differ from the diagram 200 of FIG. 2 in that during the paging window 212, the data transmission window 218, or both, one or more subscriber devices may send the limited availability message 1302 to the provider device 104, as described with reference to FIG. 13. For example, the first subscriber device 106 (e.g., the traffic advertisement analyzer 134 of FIG. 1) may send the limited availability message 1302 subsequent to receiving the traffic advertisement 128. In a particular implementation, the ACK 138, the trigger message 150, or both, sent by the first subscriber device 106 may include the limited availability message 1302.

The provider device 104 may, in response to receiving the limited availability message 1302 from the first subscriber device 106, prioritize sending data (e.g., the data 122) to the first subscriber device 106 during the data transmission window 218. For example, the provider device 104 (e.g., the traffic advertisement generator 130 of FIG. 1) may determine at a first time during the data transmission window 218 that the limited availability message 1302 has been received from the first subscriber device 106 and that a partially available message has not been received from the second subscriber device 108 subsequent to sending the traffic advertisement 128 during the paging window 212 and prior to the first time. The provider device 104 (e.g., the traffic advertisement generator 130 may, in response to the determination, send first data (e.g., the data 122) to the first subscriber device 106 prior to sending second data (e.g., the data 122) to the second subscriber device 108 during the data transmission window 218.

The provider device 104 may prioritize sending data to the subscriber device during a data transmission window in response to receiving the partially available message from the subscriber device. As a result, a likelihood of the subscriber device receiving the data during the data transmission window may be increased.

Figure 15:
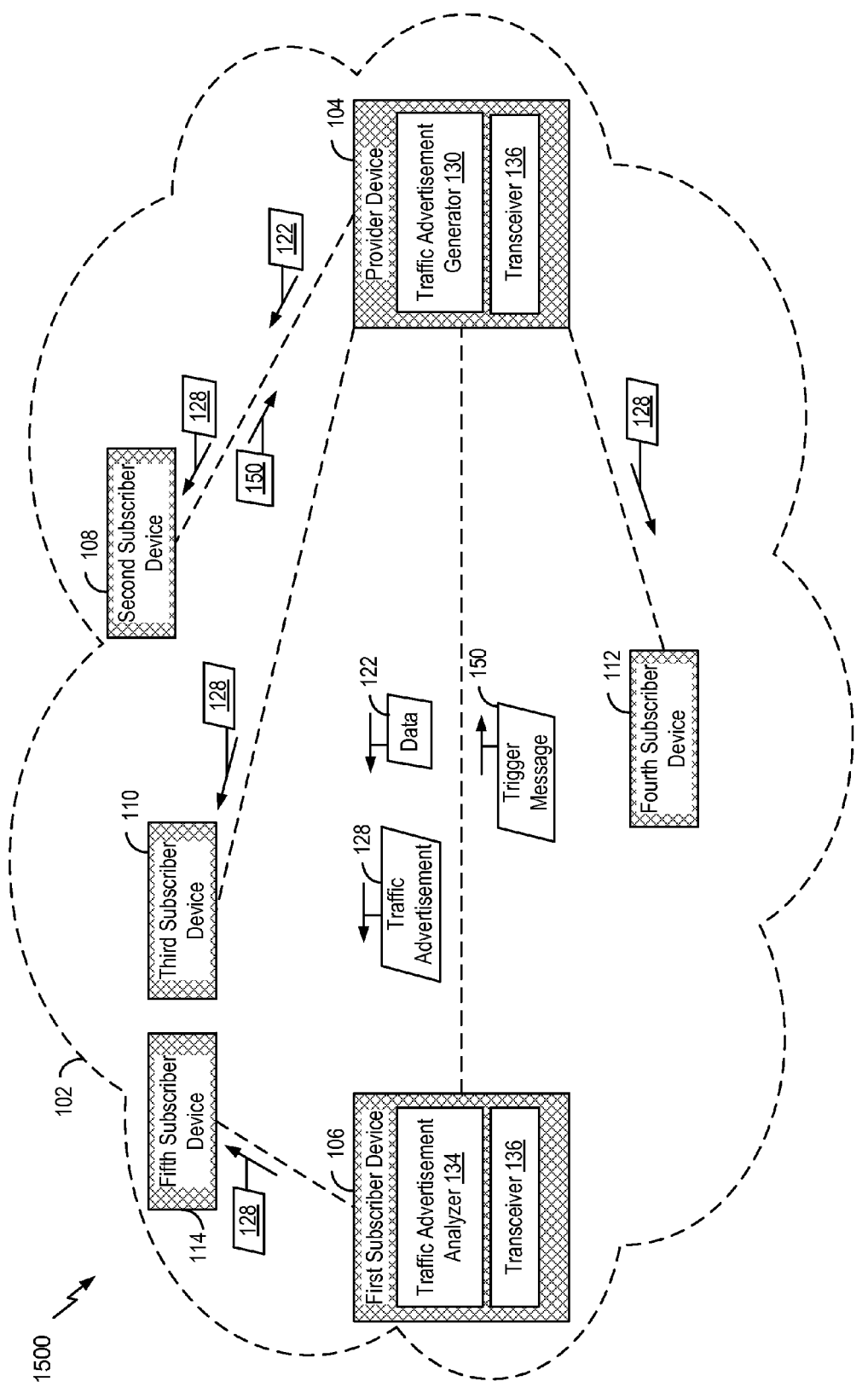
FIG. 15 is a diagram of another particular aspect of a system that includes one or more electronic devices that exchange a traffic advertisement.

Referring to FIG. 15, a particular aspect of a system is shown and generally designated 1500. The system 1500 may include one or more electronic devices.

The system 1500 differs from the system 100 of FIG. 1 in that the provider device 104 may not receive the ACK 138 responsive to the traffic advertisement 128. The traffic advertisement generator 130 may monitor a communication channel for the trigger message 150 irrespective of whether the ACK 138 is received. The traffic advertisement generator 130 may send the data 122 in response to receiving the trigger message 150. In a particular implementation, the traffic advertisement generator 130 may send the trigger request 544 to one or more subscriber devices (e.g., the subscriber devices 106, 108, and 110), as described with reference to FIG. 5, irrespective of whether the ACK 138 is received.

In a particular implementation, the provider device 104 may send the traffic advertisement 128 via a first communication channel during a first paging window of a first transmission window, as described with reference to FIG. 1. The traffic advertisement generator 130 may not receive an ACK (e.g., the ACK 138) responsive to the traffic advertisement 128 during the first paging window. For example, the traffic advertisement 128 may not have been received by any subscriber devices (e.g., due to packet loss or delay) during the first paging window and the ACK 138 may not have been sent. As another example, the ACK 138 may have been sent by at least one of the subscriber devices 106-112 in response to receiving the traffic advertisement 128 and the ACK 138 may not have reached the provider device 104 during the first paging window due to packet loss or delay.

The traffic advertisement generator 130 of the provider device 104 may monitor a second communication channel during a first portion (e.g., a trigger slot) of a first data transmission window of the first transmission window irrespective of receiving the ACK 138 during the first paging window. The traffic advertisement generator 130 may send the data 122 to a subscriber device (e.g., the first subscriber device 106 or the second subscriber device 108) during the first data transmission window in response to determining that the trigger message 150 has been received from the subscriber device during the first portion of the data transmission window.

The system 1500 may thus enable a provide device to increase a likelihood of sending data to a subscriber device. For example, the provider device monitor a communication channel for a trigger message from a subscriber device during a first portion of a first data transmission window irrespective of whether an ACK responsive to a traffic advertisement has been received by the provider device during a first paging window. The provider device may send data to a subscriber device in response to determining that a trigger message has been received from the subscriber device during the first portion of the data transmission window.

Figure 16:
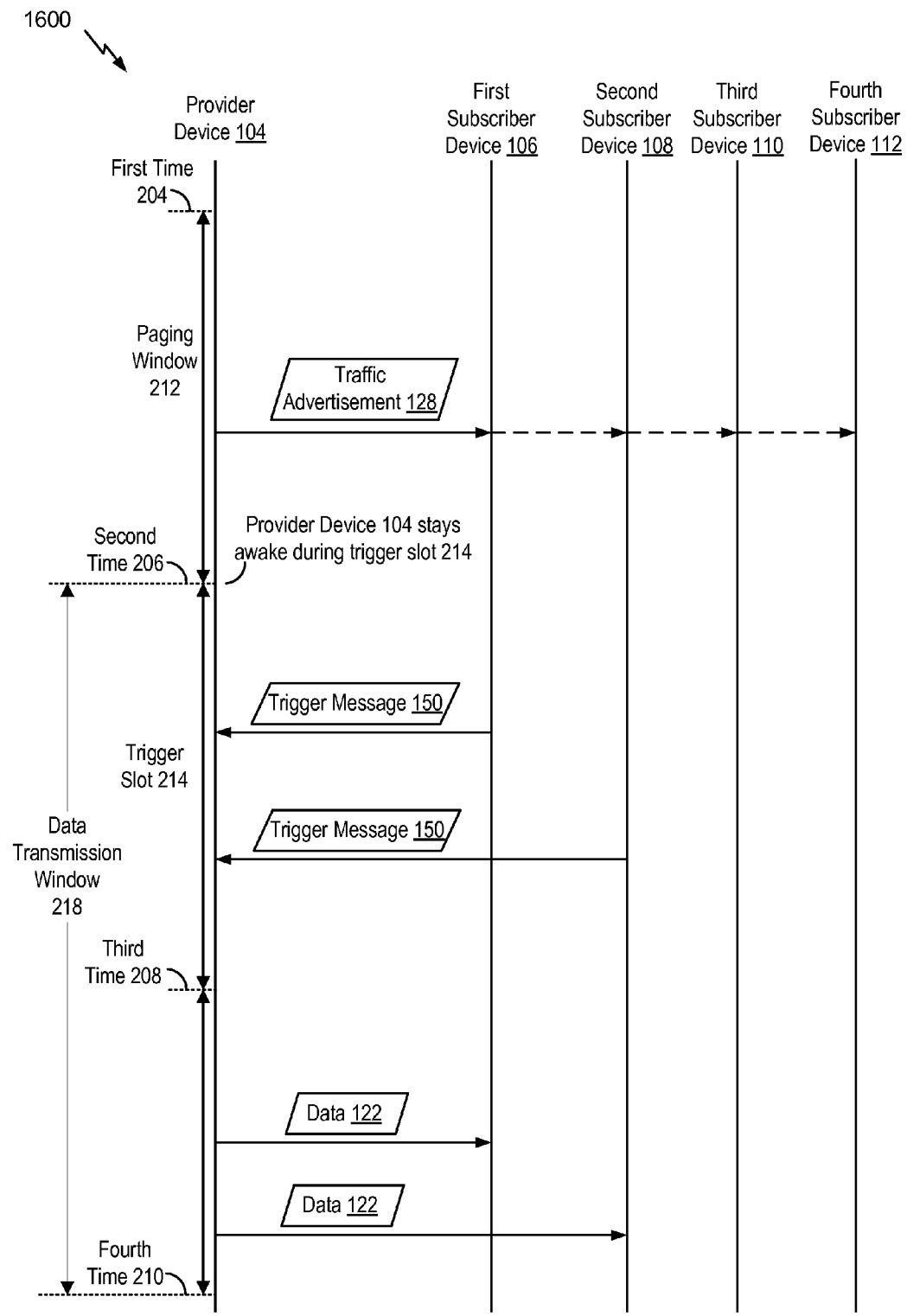
FIG. 16 is a ladder diagram corresponding to operation of a particular aspect of the system of FIG. 15.

Referring to FIG. 16, a diagram is shown and generally designated 1600. In a particular aspect, the diagram 1600 may correspond to operation of a particular aspect of the system 1500 of FIG. 15. The timing and operations shown in FIG. 16 are for illustration and are not limiting. In other aspects, additional or fewer operations may be performed and the timing may be different.

The diagram 1600 may differ from the diagram 200 of FIG. 2 in that the provider device 104 may not receive an ACK (e.g., the ACK 138) responsive to the traffic advertisement 128 during the paging window 212, as described with reference to FIG. 15. The provider device 104 may monitor a communication channel during a first portion (e.g., the trigger slot 214) of the data transmission window 218 irrespective of whether an ACK (e.g., the ACK 138) responsive to the traffic advertisement 128 is received during the paging window 212.

The provider device 104 may receive the trigger message 150 from a subscriber device (e.g., the first subscriber device 106, the second subscriber device 108, or both) during the trigger slot 214. The provider device 104 may send the data 122 to the subscriber device (e.g., the first subscriber device 106, the second subscriber device 108, or both) during the data transmission window 218 (or an ending portion of the data transmission window 218) in response to receiving the trigger message 150 from the subscriber device during the trigger slot 214.

In a particular implementation, the traffic advertisement 128 may indicate that a particular subscriber device (e.g., the first subscriber device 106) is an acknowledging subscriber device that is to send an ACK (e.g., the ACK 138) responsive to the traffic advertisement 128. Another subscriber device (e.g., the second subscriber device 108) may receive the traffic advertisement 128 and may not send an ACK in response to determining that the traffic advertisement 128 indicates that the first subscriber device 106 is the acknowledging subscriber device. The first subscriber device 106 may not receive the traffic advertisement 128 and may not send the ACK 138 to the provider device 104. The second subscriber device 108 (e.g., a non-acknowledging subscriber device) may send the trigger message 150 during the trigger slot 214 irrespective of detecting an ACK (e.g., the ACK 138) from the first subscriber device 106 to the provider device 104 during the paging window 212. The provider device 104 may monitor a communication channel during the trigger slot 214 irrespective of receiving the ACK 138 during the paging window 212 and may receive the trigger message 150, via the communication channel, from the second subscriber device 108 during the trigger slot 214. The provider device 104 may send the data 122 to the second subscriber device 108 in response to receiving the trigger message 150. The second subscriber device 108 may receive the data 122 during the data transmission window 218 (or an ending portion of the data transmission window 218). Monitoring the communication channel during the trigger slot 214 may enable the provider device 104 to receive trigger messages (e.g., the trigger message 150) from non-acknowledging subscriber devices that have received the traffic advertisement 128 during the paging window 212.

The provider device 104 may thus the provide data 122 to a subscriber device that is not indicated as an acknowledging subscriber device in the traffic advertisement 128 irrespective of whether the provider device 104 receives the ACK 138 from the acknowledging subscriber device during the paging window 212.

Figure 17:
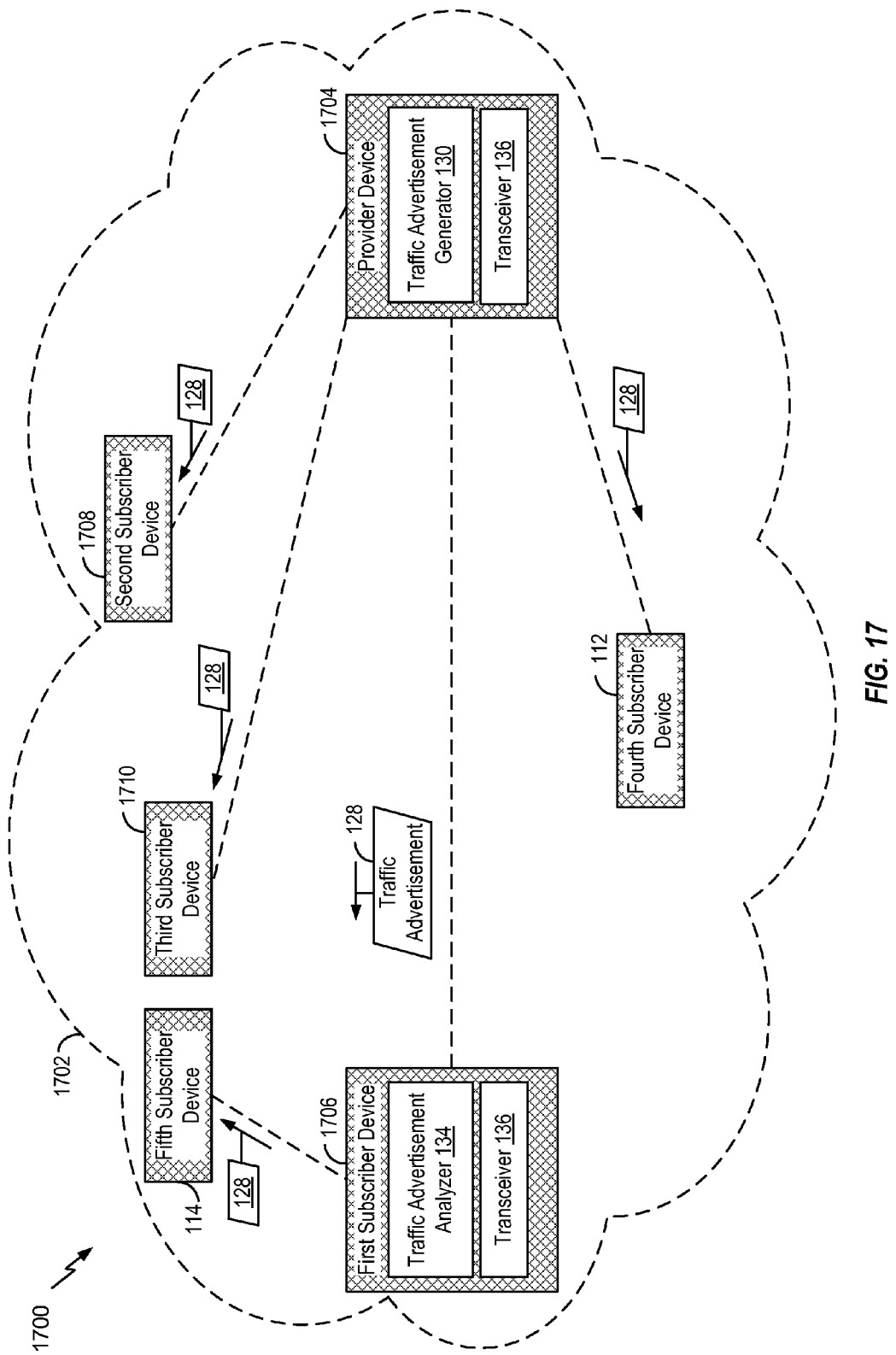
FIG. 17 is a diagram of another particular aspect of a system that includes one or more electronic devices that exchange a traffic advertisement.

Referring to FIG. 17, a particular aspect of a system is shown and generally designated 1700. The system 1700 may include one or more electronic devices.

The system 1700 differs from the system 1500 of FIG. 15 in that the provider device 104 may not receive the ACK 138 responsive to the traffic advertisement 128. The traffic advertisement generator 130 may monitor a communication channel for the trigger message 150 irrespective of whether the ACK 138 is received. The traffic advertisement generator 130 may refrain from sending data (e.g., the data 122) in response to determining that no trigger messages (e.g., the trigger message 150) have been received.

In a particular implementation, the provider device 104 may send the traffic advertisement 128 via a first communication channel during a first paging window of a first transmission window, as described with reference to FIG. 1. The traffic advertisement generator 130 may not receive an ACK (e.g., the ACK 138) responsive to the traffic advertisement 128 during the first paging window. The traffic advertisement generator 130 of the provider device 104 may monitor a second communication channel during a first portion (e.g., a trigger slot) of a first data transmission window of the first transmission window irrespective of receiving the ACK 138 during the first paging window. The provider device 104 may transition to an inactive mode (e.g., transition to a low-power operating mode, monitor another communication channel, or perform other operations) during a remaining portion of the first data transmission window in response to determining that no ACK responsive to the traffic advertisement 128 has been received during the first paging window and that no trigger message has been received during the first portion of the first data transmission window.

The system 1700 may thus enable a provide device to reduce resource usage. For example, the provider device may monitor a communication channel for a trigger message from a subscriber device during a first portion of a first data transmission window irrespective of whether an ACK responsive to a traffic advertisement has been received by the provider device during a first paging window. The provider device may conserve resources (e.g., power) during a remaining portion of the first data transmission window in response to determining that no ACK has been received during the first paging window and that no trigger message has been received during the first portion of the data transmission window.

Figure 18:
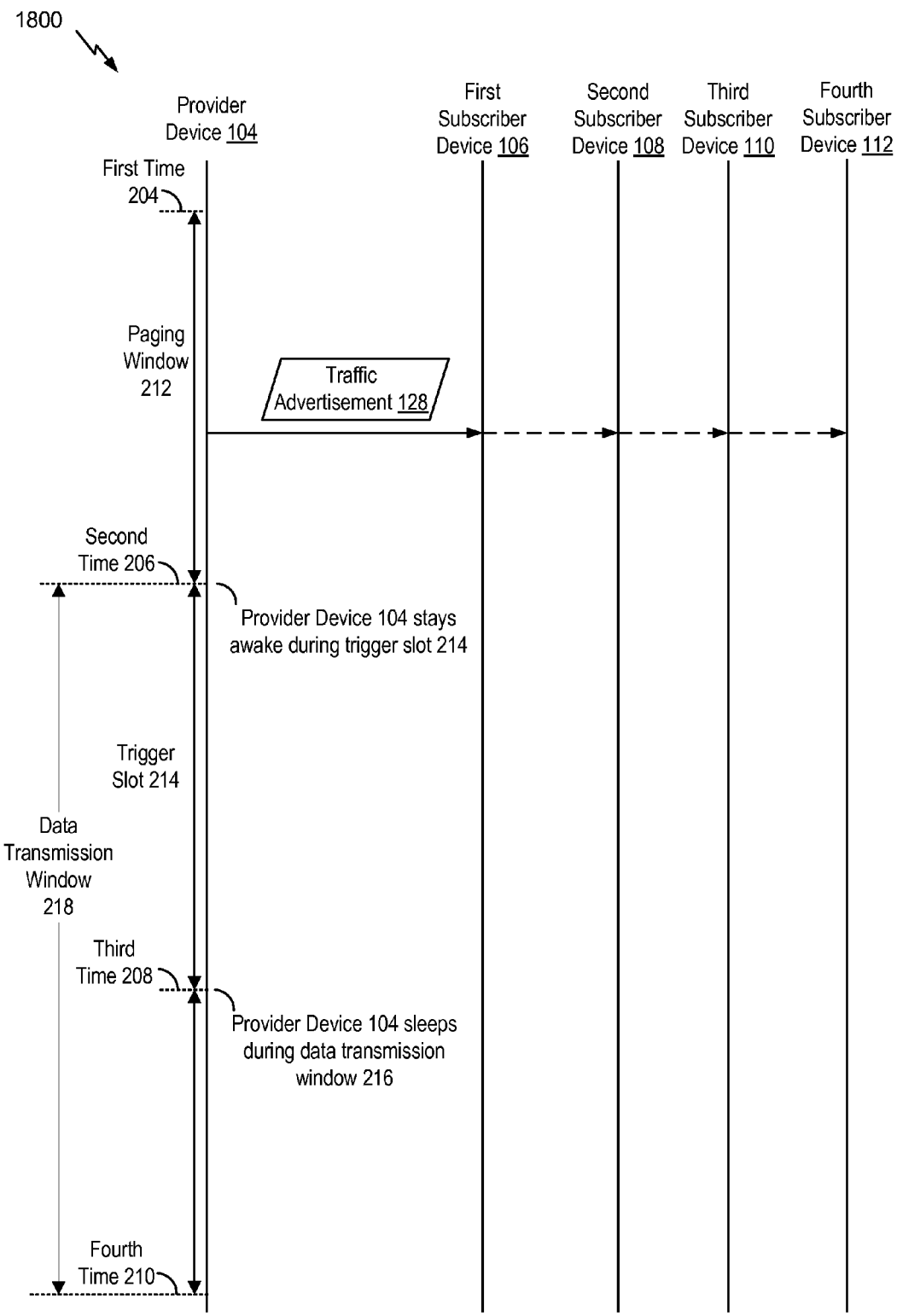
FIG. 18 is a ladder diagram corresponding to operation of a particular aspect of the system of FIG. 17.

Referring to FIG. 18, a diagram is shown and generally designated 1800. In a particular aspect, the diagram 1800 may correspond to operation of a particular aspect of the system 1700 of FIG. 17. The timing and operations shown in FIG. 18 are for illustration and are not limiting. In other aspects, additional or fewer operations may be performed and the timing may be different.

The diagram 1800 may differ from the diagram 200 of FIG. 2 in that the provider device 104 may not receive an ACK (e.g., the ACK 138) responsive to the traffic advertisement 128 during the paging window 212, as described with reference to FIG. 17. The provider device 104 may monitor a communication channel during a first portion (e.g., the trigger slot 214) of the data transmission window 218 irrespective of whether an ACK (e.g., the ACK 138) responsive to the traffic advertisement 128 is received during the paging window 212. The provider device 104 may transition to an inactive mode (e.g., transition to a low-power operating mode, refrain from monitoring the communication channel, refrain from sending the data 122 of FIG. 1, or perform other operations) during a remaining portion (e.g., an ending portion) of the data transmission window 218 in response to determining that no trigger message (e.g., the trigger message 150 of FIG. 1) has been received during the trigger slot 214. The provider device 104 may conserve resources (e.g., network usage, power, or both) by refraining from sending data (e.g., the data 122) during the data transmission window 218 in response to determining that no ACK (e.g., the ACK 138) responsive to the traffic advertisement 128 has been received during the paging window 212 and that no trigger message (e.g., the trigger message 150 of FIG. 1) has been received during the trigger slot 214.

FIGS. 1-6 and 11-18 illustrate systems and methods where the provider device 104 may send the data 122 in response to the ACK 138, the trigger message 150, or both. FIGS. 19-20 and 27-28 illustrate systems and methods where the provider device 104 may send the data 122 without receiving the ACK 138, the trigger message 150, or both. A transmission window corresponding to one or more of the systems and methods of FIGS. 19-20 and 27-28 may exclude a dedicated paging window. For example, the entire transmission window may be available to the provider device 104 to transmit a traffic message, data, or a combination thereof, as described herein. In an alternate aspect, the transmission window may include a paging window. The traffic message may include a traffic advertisement, a traffic page, or both. The traffic advertisement may indicate availability of data to be sent by the provider device 104 to one or more data recipient devices. A traffic page may indicate that the provider device 104 will not be sending data to one or more non-recipient devices during a transmission window.

Figure 19:
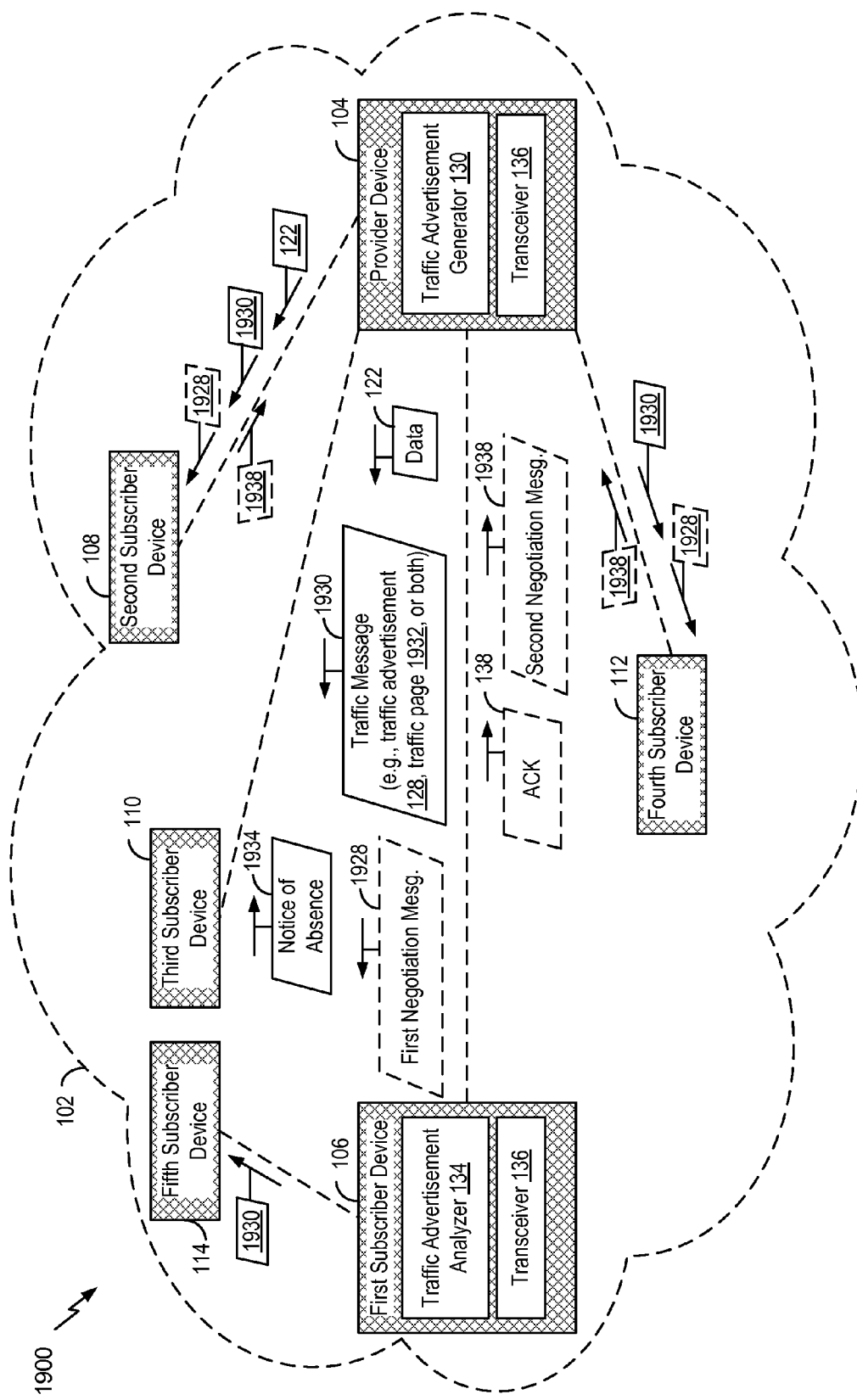
FIG. 19 is a diagram of another particular aspect of a system that includes one or more electronic devices that exchange a traffic message.

Referring to FIG. 19, a system is disclosed and generally designated 1900. The system 1900 may include one or more electronic devices.

The system 1900 differs from the system 100 of FIG. 1 in that the provider device 104 may send the data 122 to the first subscriber device 106, the second subscriber device 108, or both, independently of receiving the ACK 138, the trigger message 150, or both.

The traffic advertisement generator 130 may send a traffic message 1930 via a first communication channel during a first communication window. The communication window may include a discovery window, a transmission window, a paging window, or a data transmission window. Alternatively, or in addition, the communication window may correspond to at least a portion of an NDL time block (e.g., an initial portion of the NDL time block). The traffic message 1930 may include the traffic advertisement 128, a traffic page 1932, or both. The traffic advertisement 128 may indicate availability of data to be sent by the provider device 104 to one or more data recipients (e.g., the subscriber devices 106, 108, and 110), as described with reference to FIG. 1. The traffic page 1932 may indicate that the provider device 104 will not send data to one or more non-recipient devices (e.g., the fourth subscriber device 112).

The traffic page 1932 may include an address indicators list (e.g., a MAC address indicator list), a bloom filter, an ATIM, or a TIM representing the non-recipient devices. For example, an address indicator of the MAC address indicator list may include at least a portion of a MAC address of a corresponding non-recipient device, a hash value based on the MAC address, or another value based on the MAC address. A destination field of the ATIM may include a group address indicating the non-recipient devices. The TIM may include a bitmap indicating the non-recipient devices. For example, the provider device 104 and a non-recipient device (e.g., the fourth subscriber device 112) may perform an association process. During the association process, the fourth subscriber device 112 may receive an AID from the provider device 104. A particular bit of the bitmap may correspond to the AID. The TIM may be compliant with an IEEE 802.11 specification.

A subscriber device (e.g., the subscriber device 106, 108, 110, or 112) may receive the traffic message 1930. For example, an interface of the subscriber device (e.g., the subscriber device 106, 108, 110, or 112) may be configured to receive the traffic message 1930. In a particular aspect, the interface of the subscriber device (e.g., the subscriber device 106, 108, 110, or 112) may be configured to receive the traffic message 1930 prior to a first portion of the first communication window (e.g., the NDL time block).

A subscriber device (e.g., the subscriber device 106, 108, or 110) may monitor the first communication channel during the first portion of the first communication window in response to determining that the data recipients (e.g., recipient devices) include the subscriber device or determining that the non-recipient devices do not include the subscriber device. For example, a processor of the subscriber device (e.g., the subscriber device 106, 108, or 110) may be configured to monitor the first communication channel during the first portion of the first communication window in response to determining that the data recipients (e.g., recipient devices) include the interface of the subscriber device or determining that the non-recipient devices do not include the interface of the subscriber device. The subscriber device (e.g., the subscriber device 106, 108, or 110) may monitor the first communication channel during the first portion of the first communication window independently of whether the ACK 138 responsive to the traffic advertisement 128 is detected from the data recipients. A subscriber device (e.g., the fourth subscriber device 112) may transition to an inactive mode during a remaining portion of the first communication window in response to determining the data recipients exclude the subscriber device or the non-recipient devices include the subscriber device. A subscriber device (e.g., the subscriber device 106, 108, 110, or 112) may, while operating in the inactive mode, refrain from monitoring the first communication channel, transition to a low-power mode (e.g., a power save mode), perform operations (or actions) related to another network, or a combination thereof.

The traffic advertisement generator 130 may send the data 122 via the first communication channel to a subscriber device (e.g., the first subscriber device 106 or the second subscriber device 108) during the first communication window. For example, the traffic advertisement generator 130 may send the data 122 via the first communication channel to the first subscriber device 106 subsequent to sending the traffic message 1930. In an alternate aspect, the traffic advertisement generator 130 may send the data 122 without sending the traffic message 1930 during the first communication window. The data 122 may be sent to the first subscriber device 106 independently of receiving the ACK 138, the trigger message 150, or both from the first subscriber device 106.

The traffic advertisement generator 130 may send the data 122 via the first communication channel to the second subscriber device 108 subsequent to sending the data 122 to the first subscriber device 106. The data 122 may be sent to the second subscriber device 108 independently of receiving the ACK 138, the trigger message 150, or both, from the second subscriber device 108.

The traffic advertisement generator 130 may send the data 122 in conjunction with a more traffic indicator indicating whether the provider device 104 has additional data to send to the subscriber device (e.g., the first subscriber device 106 or the second subscriber device 108). For example, the traffic advertisement generator 130 may send the data 122 in conjunction with a first more traffic indicator to the first subscriber device 106. The first more traffic indicator may have a first value (e.g., 1) indicating that the provider device 104 has additional data to send to the first subscriber device 106. The first subscriber device 106 (e.g., the traffic advertisement analyzer 134) may monitor the first communication channel during a second portion of the transmission window in response to determining that the first more traffic indicator has the first value. The first more traffic indicator may correspond to a MORE DATA bit of a header of a packet that includes the data 122, an end of service period (EOSP) bit of a quality of service (QoS) field of the header, or both.

As another example, the traffic advertisement generator 130 may send the data 122 in conjunction with a second more traffic indicator to the second subscriber device 108. The second more traffic indicator (e.g., a MORE DATA bit) may have a second value (e.g., 0) indicating that the provider device 104 will not send additional data to the second subscriber device 108 during the first communication window. The second subscriber device 108 may transition to the inactive mode during a remaining portion of the first communication window (e.g., the NDL time block) in response to determining that the second more traffic indicator has the second value.

In a particular implementation, the traffic advertisement generator 130 may send the data 122 to the first subscriber device 106 and the second subscriber device 108 as multicast traffic. The first subscriber device 106, the second subscriber device 108, or both, may receive the data 122. The traffic advertisement generator 130 may send the data 122 in conjunction with a more traffic indicator indicating whether the traffic advertisement generator 130 has additional data to send to the first subscriber device 106 and the second subscriber device 108. The first subscriber device 106, the second subscriber device 108, or both, may monitor the first communication channel during a second portion of the first communication window in response to determining that the more traffic indicator has a first value (e.g., 1). Alternatively, the first subscriber device 106, the second subscriber device 108, or both, may transition to the inactive mode in response to determining that the more traffic indicator has a second value (e.g., 0).

A subscriber device (e.g., the subscriber device 106, 108, or 110) may detect that the first communication channel is idle for a first duration (e.g., an idle time) during a portion of the first communication window. The subscriber device (e.g., the subscriber device 106, 108, or 110) may transition to the inactive mode during a remaining portion of the first communication window in response to determining that the idle time satisfies a threshold.

In a particular implementation, the provider device 104 (e.g., the traffic advertisement generator 130) may send a service advertisement during a discovery window or another window (e.g., a NAN further service availability window). The discovery window may be prior to the first communication window (e.g., the NDL time block. The service advertisement may indicate that the provider device 104 is available to provide a particular service via one or more communication channels. In a particular aspect, the service advertisement may indicate whether the provider device 104 supports traffic messaging. Traffic messaging may include traffic advertising by sending the traffic advertisement 128 indicating that the provider device 104 has data to send to one or more recipient devices. Traffic messaging may include traffic paging by sending the traffic page 1932 indicating one or more non-recipient devices. The provider device 104 may not send data to the one or more non-recipient devices during a transmission window. One or more of the subscriber devices 106, 108, 110, and 112 may receive the service advertisement during the discovery window or the other window (e.g., the NAN further service availability window). The data 122 may be associated with the particular service. The subscriber device 106, 108, 110, or 112 may determine whether to join the particular service by sending a subscribe message based on determining whether the provider device 104 supports traffic messaging. For example, the subscriber device 106, 108, 110, or 112 may send a subscribe message to the provider device 104 in response to determining that the provider device 104 supports traffic messaging.

The provider device 104 and a subscriber device (e.g., the subscriber device 106, 108, 110, or 112) may exchange one or more negotiation messages subsequent to transmission of the service advertisement by the provider device 104. For example, the provider device 104 may send a first negotiation message 1928 to the first subscriber device 106. As another example, the first subscriber device 106 may send a second negotiation message 1938 to the provider device 104.

The first negotiation message 1928, the second negotiation message 1938, or both, may indicate that the provider device 104 is to send data (e.g., the data 122) to the first subscriber device 106 subsequent to sending a traffic message (e.g., the traffic message 1930). The first negotiation message 1928, the second negotiation message 1938, or both, may indicate a power save request. For example, the first negotiation message 1928 may include a first power save request identifying the provider device 104 as a power-constraint device. As another example, the second negotiation message 1938 may include a second power save request identifying the first subscriber device 106 as power-constraint device.

The first negotiation message 1928, the second negotiation message 1938, or both, may indicate whether a transmission window (or a communication window) is to include a paging window. The provider device 104, the first subscriber device 106, or both, may determine that the transmission window (or the communication window) excludes the paging window based on the first negotiation message 1928, the second negotiation message 1938, or both, indicating that the transmission window is to exclude the paging window. The transmission window (or the communication window) may correspond to an NDL time block.

In a particular aspect, the provider device 104 may determine whether the traffic message 1930 is to be sent during the first communication window based at least in part on determining that the first negotiation message 1928 includes the first power save request, the second negotiation message 1938 includes the second power save request, or both. For example, the provider device 104 may determine that the traffic message 1930 is to be sent during the first communication window based at least in part on determining that the first negotiation message 1928 includes the first power save request, the second negotiation message 1938 includes the second power save request, or both. As another example, the provider device 104 may determine that the traffic message 1930 is not to be sent during the first communication window based at least in part on determining that the first negotiation message 1928 does not include the first power save request, that the second negotiation message 1938 does not include the second power save request, or both.

The first negotiation message 1928, the second negotiation message 1938, or both, may indicate a type of the traffic message 1930 (e.g., a traffic advertisement type or a traffic page type). For example, a value of a particular field (e.g., a bit corresponding to a traffic advertisement indicator) of a negotiation message may indicate the type of the traffic message 1930. The provider device 104, the first subscriber device 106, or both, may determine that the provider device 104 is expected to send a traffic advertisement (e.g., the traffic advertisement 128) during the first communication window in response to determining that the first negotiation message 1928, the second negotiation message 1938, or both, indicate the traffic advertisement type. Alternatively, the provider device 104, the first subscriber device 106, or both, may determine that the provider device 104 is expected to send a traffic page (e.g., the traffic page 1932) during the first communication window in response to determining that the first negotiation message 1928, the second negotiation message 1938, or both, indicate the traffic page type. In a particular implementation, when the provider device 104 is expected to send the traffic advertisement 128 to indicate availability of data to be sent by the provider device 104, a default behavior of the subscriber device 106, 108, 110, or 112 may include transitioning to the inactive mode in response to determining that the traffic advertisement 128 is not received during a first portion of the first communication window. In this implementation, the provider device 104 may not send the traffic advertisement 128 in response to determining that no data is to be sent by the provider device 104 during the first communication window. The subscriber devices 106, 108, 110, and 112 may transition to the inactive mode in response to determining that the traffic advertisement 128 is not received during the first portion of the first communication window.

Alternatively, the provider device 104 may send the traffic advertisement 128 during the first communication window when the provider device 104 has data to send to one or more data recipients (e.g., the subscriber devices 106, 108, and 110). A subscriber device (e.g., the subscriber device 106, 108, or 110) may monitor the first communication channel during the second portion of the first communication window in response to determining that the data recipients include the subscriber device. A particular subscriber device (e.g., the fourth subscriber device 112) may transition to the inactive mode in response to determining that the data recipients exclude the particular subscriber device.

In an alternate implementation, in which the provider device 104 is expected to send the traffic page 1932 to indicate that the provider device 104 will not be sending data during the first communication window, a default behavior of the subscriber device 106, 108, 110, or 112 may include continuing to monitor the first communication channel during at least a second portion of the first communication window in response to determining that the traffic page 1932 is not received during the first portion of the first communication window. In this implementation, the provider device 104 may not send the traffic page 1932. For example, the provider device 104 may not send the traffic page 1932 in response to determining that data is available to be sent by the provider device 104 during the first communication window. The subscriber devices 106, 108, 110, and 112 may continue to monitor the first communication channel during a second portion of the first communication window in response to determining that the traffic page 1932 is not received during the first portion of the first communication window.

Alternatively, the provider device 104 may send the traffic page 1932 during the first communication window in response to determining that no data is to be sent by the provider device 104 to one or more non-recipient devices (e.g., the fourth subscriber device 112). A subscriber device (e.g., the subscriber device 106, 108, or 110) may monitor the first communication channel during the second portion of the first communication window in response to determining that the non-recipient devices do not include the subscriber device. A particular subscriber device (e.g., the fourth subscriber device 112) may transition to the inactive mode in response to determining that the non-recipient devices include the particular subscriber device. The provider device 104 may send the data 122 to the subscriber devices 106, 108, and 110 via the first communication channel during the second portion of the first communication window. In a particular implementation, the provider device 104 may send the data 122 to a subscriber device (e.g., the first subscriber device 106 or the second subscriber device 108) independently of receiving an ACK (e.g., the ACK 138), a trigger message (e.g., the trigger message 150), or both, from the subscriber device.

The first communication window may correspond to a transmission window. In a particular aspect, the transmission window may include a paging window. In this aspect, the first portion of the first communication window may correspond to the paging window. In another aspect, the transmission window may exclude a dedicated paging window. In a particular implementation, the transmission window may include the paging window and the provider device 104 may initiate data transmission during the paging window subsequent to any traffic messaging. For example, the provider device 104 may send the data 122 during the paging window subsequent to sending the traffic advertisement 128, the traffic page 1932, or both. As another example, the provider device 104 may send the data 122 during the paging window in response to determining that the traffic advertisement 128, the traffic page 1932, or both, are not to be sent during the first communication window.

In a particular implementation, the provider device 104 may send the traffic message 1930 with a higher priority than a priority associated with data (e.g., the data 122). For example, the provider device 104 may send the traffic message 1930 with an access category (e.g., the second access category 1022) having a higher priority than another access category (e.g., the first access category 1020) associated with data (e.g., the data 122). To illustrate, the traffic message 1930 may be queued for transmission based on the access category, as described with reference to FIGS. 10A-10B. As another example, the provider device 104 may send the traffic message 1930 based on a first contention window (CW) value, a first arbitration interframe space (AIFS) value, or both. Data transmission may be associated with a second CW value, a second AIFS value, or both. The first CW value, the first AIFS value, or both, may correspond to higher priority than the second CW value, the second AIFS value, or both. For example, the first CW value and the first AIFS value may be lower (or shorter) than the second CW value and the second AIFS value, respectively. Sending the traffic message 1930 with the higher priority than the priority associated with data may enable the provider device 104 to access a transmission medium prior to another device that has data to send via the transmission medium.

In a particular implementation, the provider device 104 may exchange a first negotiation message with the first subscriber device 106 that includes a power save request and may exchange a second negotiation message with the second subscriber device 108 that does not include the power save request. The provider device 104 may send the traffic message 1930 during the transmission based at least in part on determining that a negotiation message exchanged with at least one subscriber device indicates the power save request. The first subscriber device 106 may monitor the first communication channel during the first portion of the first communication window. The first subscriber device 106 may transition to the inactive mode during a remaining portion of the first communication window in response to determining that the traffic advertisement 128 is not received during the first portion of the first communication window, that the data recipients indicated by the traffic advertisement 128 exclude the first subscriber device 106, or that the non-recipient devices indicated by traffic page 1932 include the first subscriber device 106. The second subscriber device 108 may not process or may discard the traffic message 1930. For example, the second subscriber device 108 may monitor the first communication channel during the entire first communication window independently of receiving the traffic message 1930. In an alternate implementation, the second subscriber device 108 may transition to the inactive mode during a remaining portion of the first communication window in response to determining that the data recipients indicated by the traffic advertisement 128 exclude the second subscriber device 108 or that the non-recipient devices indicated by traffic page 1932 include the second subscriber device 108.

In a particular aspect, the provider device 104 may prioritize data transmission to the first subscriber device 106 in response to determining that at least one negotiation message exchanged with the first subscriber device 106 indicates the power save request. For example, the provider device 104 may send the traffic message 1930 during an initial portion of the first communication window. The first communication window may include a transmission window. In a particular aspect, the initial portion of the first communication window may correspond to a paging window (e.g., the paging window 212) of the transmission window (e.g., the transmission window 740). In an alternate aspect, the transmission window may exclude the paging window. For example, the transmission window 740 may correspond entirely to the data transmission window 218.

The first subscriber device 106 may send the ACK 138, the trigger message 150, or both, during the first communication window in response to receiving the traffic message 1930. The provider device 104 may prioritize sending the data 122 to the first subscriber device 106 during a second portion of the first communication window. For example, the provider device 104 may send the data 122 to the first subscriber device 106 prior to sending the data 122 to the second subscriber device 108 during the first portion of the first communication window. In a particular aspect, the provider device 104 may, in response to determining that at least one negotiation message exchanged with the first subscriber device 106 indicates the power save request, send the data 122 with a first priority to the first subscriber device 106. Alternatively, the provider device 104 may, in response to determining that no negotiation messages exchanged with the first subscriber device 106 indicate the power save request, send the data 122 with a second priority to the first subscriber device 106. The second priority may be lower (or higher) than the first priority. The first subscriber device 106 may transition to the inactive mode subsequent to receiving the data 122. In a particular aspect, the second portion of the first communication window may correspond to a data transmission window.

In a particular implementation, the first communication window may correspond to a transmission window (e.g., the transmission window 740) that includes a paging window (e.g., the paging window 212). The provider device 104 may initiate data transmission during the paging window 212 subsequent to traffic messaging. For example, the provider device 104 may, during the paging window 212, send the data 122 to the first subscriber device 106, the second subscriber device 108, or both, subsequent to sending the traffic message 1930.

In a particular implementation, a subscriber device may generate a notice of absence 1934 (e.g., a pause message) indicating that the subscriber device is unavailable to participate in at least one NDL group. The notice of absence 1934 may indicate a pause in an NDL schedule. For example, the notice of absence 1934 may indicate that a subscriber device (e.g., the first subscriber device 106, the second subscriber device 108, or both) is unavailable to receive data associated with the at least one NDL group. The notice of absence 1934 may indicate that the subscriber device (e.g., the first subscriber device 106, the second subscriber device 108, or both) is unavailable during at least a portion of an NDL schedule associated with the at least one NDL group. For example, the third subscriber device 110 may generate the notice of absence 1934 indicating that the third subscriber device 110 is unavailable to participate in at least one NDL group. The notice of absence 1934 may include at least one NDL group identifier corresponding to the at least one NDL group. The third subscriber device 110 may transmit the notice of absence 1934 during a discovery window. The provider device 104 may receive the notice of absence 1934 from the third subscriber device 110. The provider device 104 may determine that the provider device 104 will not send data associated with the at least one NDL group to the third subscriber device 110 during at least a portion of one or more discovery intervals (e.g., the discovery interval 748 of FIG. 7) subsequent to the discovery window based on the notice of absence 1934. For example, the provider device 104 may receive the notice of absence 1934 from the third subscriber device 110 during the discovery window 710 of FIG. 7. The provider device 104 may determine that no data associated with the at least one NDL group is to be sent to the third subscriber device 110 during at least a portion of the discovery interval 748. For example, the notice of absence 1934 may indicate that no data associated with the at least one NDL group is to be sent to the third subscriber device 110 during a subset of NDL time blocks associated with the discovery interval 748. The provider device 104 may determine that no data associated with the at least one NDL group is to be sent to the third subscriber device 110 during the subset of NDL time blocks based on the notice of absence 1934.

In a particular aspect, the notice of absence 1934 may indicate that no data associated with the at least one NDL group is to be sent to the third subscriber device 110 during multiple discovery intervals subsequent to the discovery window 710. The provider device 104 may determine that no data associated with the at least one NDL group is to be sent to the third subscriber device 110 during the multiple discovery intervals based on the notice of absence 1934.

The provider device 104 may determine that no data associated with the at least one NDL group is to be sent to the third subscriber device 110 during the first communication window based on the notice of absence 1934. In a particular aspect, the provider device 104 may refrain from sending a traffic message (e.g., the traffic message 1930) associated with the at least one NDL group to the third subscriber device 110 during the first communication window.

In a particular aspect, the provider device 104 may determine that the third subscriber device 110 is to be omitted from the data recipient devices indicated by the traffic advertisement 128 in response to receiving the notice of absence 1934 indicating that no data associated with at least one NDL group is to be sent to the third subscriber device 110 and determining that the traffic advertisement 128 is associated with the at least one NDL group. Alternatively, the provider device 104 may determine that the third subscriber device 110 is to be included in the data recipient devices indicated by the traffic advertisement 128 in response to receiving the notice of absence 1934 indicating that no data associated with the at least one NDL group is to be sent to the third subscriber device 110 and determining that the traffic advertisement 128 is associated with a second NDL group that is excluded from the at least one NDL group. The provider device 104 may send the traffic advertisement 128 during the portion of one or more discovery intervals (e.g., the discovery interval 748) subsequent to the NAN discovery window.

In a particular aspect, the provider device 104 may determine that the third subscriber device 110 is to be included in the non-recipient devices indicated by the traffic page 1932 in response to receiving the notice of absence 1934 indicating that no data associated with the at least one NDL group is to be sent to the third subscriber device 110 and determining that the traffic advertisement 128 is associated with the at least one NDL group. Alternatively, the provider device 104 may determine that the third subscriber device 110 is to be omitted from the non-recipient devices indicated by the traffic page 1932 in response to receiving the notice of absence 1934 indicating that no data associated with the at least one NDL group is to be sent to the third subscriber device 110 and determining that the traffic advertisement 128 is associated with a second NDL group that is excluded from the at least one NDL group. The provider device 104 may send the traffic page 1932 during the portion of one or more discovery intervals (e.g., the discovery interval 748) subsequent to the NAN discovery window.

In a particular implementation, the provider device 104 may send the data 122 to the third subscriber device 110 during the first communication window in response to determining that the data 122 is associated with a second NDL group and that the at least NDL group does not include the second NDL group.

The system 1900 may enable the provider device 104 to send the data 122 to a subscriber device independently of sending a traffic message, receiving an ACK, receiving a trigger message, or a combination thereof. The provider device 104 may thus transmit the data 122 earlier in the first communication window, as compared to sending the traffic message, waiting for the ACK, waiting the trigger message, or a combination thereof, prior to transmission of the data 122.

Figure 20:
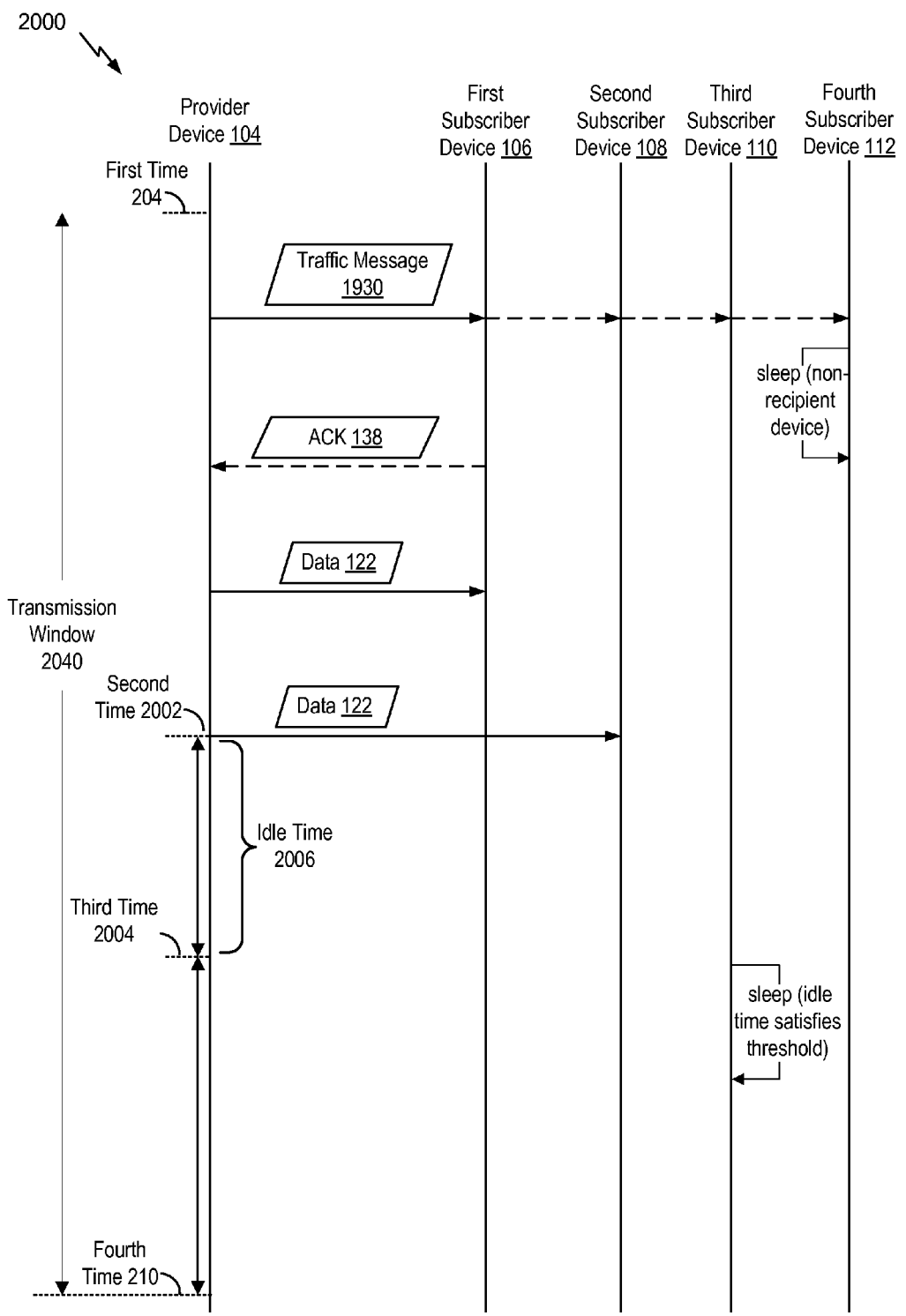
FIG. 20 is a ladder diagram corresponding to operation of a particular aspect of the system of FIG. 19.

Referring to FIG. 20, a diagram is shown and generally designated 2000. In a particular aspect, the diagram 2000 may correspond to operation of a particular aspect of the system 1900 of FIG. 19. The timing and operations shown in FIG. 20 are for illustration and are not limiting. In other aspect, additional or fewer operations may be performed and the timing may be different.

The diagram 2000 may differ from the diagram 200 of FIG. 2 in that the provider device 104 may not receive an ACK (e.g., the ACK 138), a trigger message (e.g., the trigger message 150), or both, during a transmission window 2040. The transmission window 2040 may include a paging window. In an alternate aspect, no portion of the transmission window 2040 may correspond to a dedicated paging window. For example, no portion of the transmission window 2040 may be restricted for exchanging traffic messages (e.g., the traffic message 1930). The provider device 104 may send the traffic message 1930, the data 122, or both, during any portion of the transmission window 2040. The provider device 104 may send the traffic message 1930 during the transmission window 2040. The traffic message 1930 may include the traffic advertisement 128, the traffic page 1932, or both.

The subscriber devices 106, 108, 110, and 112 may monitor a communication channel during a first portion of the transmission window 2040. In a particular aspect, the first portion of the transmission window 2040 may correspond to a paging window during which traffic messages (e.g., the traffic message 1930) may be exchanged between the devices 104-112. In an alternate aspect, the traffic message 1930, the data 122, or both, may be exchanged during any portion of the transmission window 2040. The subscriber devices 106, 108, 110, and 112 may receive the traffic message 1930 from the provider device 104. The traffic message 1930 may include the traffic advertisement 128, the traffic page 1932, or both. The traffic advertisement 128 may indicate one or more data recipients (e.g., the subscriber devices 106, 108, and 110). The traffic page 1932 may indicate one or more non-recipient devices (e.g., the fourth subscriber device 112). The fourth subscriber device 112 may transition to the inactive mode during a remaining portion of the transmission window 2040 in response to determining that the data recipients exclude the fourth subscriber device 112, that the non-recipient devices include the fourth subscriber device 112, or both.

A subscriber device (e.g., the subscriber device 106, 108, or 110) may monitor the communication channel in response to determining that the data recipients include the subscriber device, that the non-recipient devices do not include the subscriber device, or both. In a particular implementation, the first subscriber device 106 may send the ACK 138 to the provider device 104 responsive to the traffic message 1930.

In a particular implementation, the subscriber device (e.g., the subscriber device 106, 108, or 110) may monitor the communication channel during a first portion of the transmission window 2040 (e.g., an NDL time block) independently of receiving the traffic message 1930 (e.g., the traffic advertisement 128, the traffic page 1932, or both). The provider device 104 may send the data 122 to the first subscriber device 106 independently of receiving the ACK 138, the trigger message 150, or both, from the first subscriber device 106. The provider device 104 may send the data 122 to the second subscriber device 108 independently of receiving the ACK 138, the trigger message 150, or both, from the second subscriber device 108.

A subscriber device (e.g., the third subscriber device 110) may detect that the communication channel is idle for a first duration (e.g., an idle time 2006) during a portion of the transmission window 2040. The third subscriber device 110 may transition to the inactive mode during a remaining portion of the transmission window 2040 in response to determining that the idle time 2006 satisfies a threshold.

The provider device 104 may thus provide the data 122 to a subscriber device irrespective of whether the provider device 104 receives the ACK 138, the trigger message 150, or both, from the subscriber device. The entire transmission window 2040 may be available to the provider device 104 to send the traffic message 1930, the data 122, or both.

Figure 21:
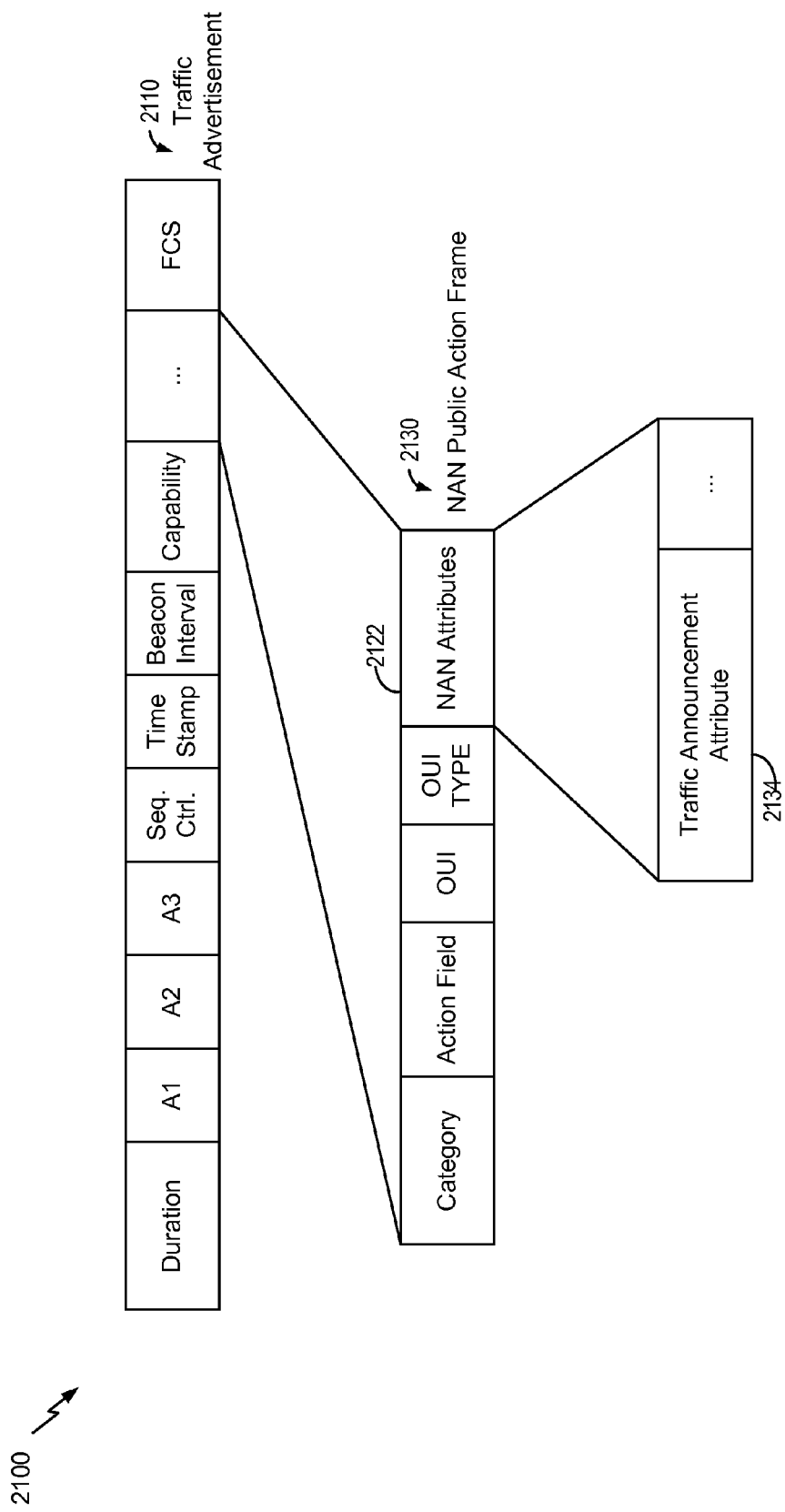
FIG. 21 is a diagram illustrating an example of a traffic advertisement.

Referring to FIG. 21, a diagram 2100 of an example of a traffic advertisement 2110 is shown. In a particular aspect, the traffic advertisement 2110 may include or correspond to the traffic advertisement 128 of FIG. 1.

The traffic advertisement 2110 may include header fields, such as a duration field, address fields A1, A2, and A3, a sequence control (seq. ctrl.) field, a time stamp field, a beacon interval field, a capability field, a frame check sequence (FCS) field, or a combination thereof. In a particular implementation, the A3 field may indicate a NAN cluster ID. For example, the NAN cluster ID may correspond to an identifier of the NAN 102 of FIG. 1.

The traffic advertisement 2110 may further include a NAN public action frame 2130. The NAN public action frame 2130 may include a category field, an action field, an organizationally unique identifier (OUI) field, an OUI type field, or a combination thereof. The NAN public action frame 2130 may include one or more NAN attributes 2122.

In the illustrated example, the one or more NAN attributes 2122 include a traffic announcement attribute 2134. The traffic announcement attribute 2134 may include information indicating availability of data to be sent by a provider device, such as the provider device 104 of FIG. 1. The traffic advertisement 2110 (e.g., a frame) may have a NAN service discovery frame (SDF) format, a NAN management frame (NMF) format, or both. For example, the traffic advertisement 2110 may correspond to a format of a service advertisement. The traffic advertisement 2110 may differ from the service advertisement in that the traffic advertisement 2110 may include the traffic announcement attribute 2134. The traffic announcement attribute 2134 may include a traffic indicator field, as described further with reference to FIG. 22. The traffic indicator field may indicate one or more data recipients, as further described with reference to FIG. 22. Thus, the traffic advertisement 2110 may indicate availability of data to be sent by the provider device 104 to the data recipients.

Referring to FIG. 22, a diagram 2200 of examples of a traffic announcement attribute 2234 and a traffic indicator field 2213 is shown. The traffic announcement attribute 2234 may correspond to the traffic announcement attribute 2134 of FIG. 21. The traffic announcement attribute 2234 may include an attribute identifier field 2210, a length field 2211, an NDL group identifier field 2212, the traffic indicator field 2213, or a combination thereof.

The attribute identifier field 2210 may have a particular value that identifies the traffic announcement attribute 2234 as a traffic announcement attribute. For example, the traffic advertisement 2110 of FIG. 21 may include attributes selected from a plurality of attribute types. The particular value of the attribute identifier field 2210 may identify the traffic announcement attribute 2234 as a traffic announcement attribute. The length field 2211 may include a value indicating a length of the traffic announcement attribute 2234. The NDL group identifier field 2212 may include a value indicating an identifier (e.g., a name) of an NDL group.

The traffic indicator field 2213 may include data descriptive of a traffic indicator. For example, the traffic indicator field 2213 may include a type field 2214, a length field 2215, a value field 2216, or a combination thereof. The type field 2214 may indicate a type of the traffic indicator (e.g., a bloom filter type, a TIM type, an ATIM type, or an address indicator list type). The length field 2215 may indicate a length of the traffic indicator field 2213. The value field 2216 may include the traffic indicator (e.g., a bloom filter, a TIM, an ATIM, or a list of MAC address indicators). The bloom filter, the TIM, the ATIM, or the list of MAC address indicators may indicate one or more data recipients (e.g., the subscriber devices 106, 108, and 110), as described with reference to FIG. 1. In some aspects, the traffic indicator field 2213 may include a QoS category field. The QoS category field may indicate an access category (e.g., the first access category 1020, the second access category 1022 of FIG. 10, or another access category) of the traffic advertisement 2110 or may indicate that the traffic advertisement 2110 is associated with data (e.g., the data 122) corresponding to the access category.

During operation, the provider device 104 (e.g., the traffic advertisement generator 130) may generate a frame (e.g., the traffic advertisement 2110) having a NAN SDF format, a NMF format, or both. A NMF may include attributes related to NAN operation (e.g., NDL setup, paging, etc.). The traffic advertisement 2110 may include a vendor specific action frame or a vendor specific public action frame. The traffic advertisement 2110 may include the traffic announcement attribute 2234 indicating availability of data to be sent by the provider device 104 to one or more data recipient devices. For example, the traffic announcement attribute 2234 may include the value field 2216. The value field 2216 may include a traffic indicator (e.g., a bloom filter, a TIM, an ATIM, or a list of MAC address indicators) indicating the one or more data recipient devices (e.g., the subscriber devices 106, 108, and 110). The provider device 104 may send the traffic advertisement 2110 via a first communication channel during a first communication window. For example, the provider device 104 may send the traffic advertisement 2110 via a NAN interface or a NDL interface. The first communication window may include a NAN discovery window, a transmission window, a paging window, or a data transmission window. In a particular aspect, the first communication window may correspond to an initial portion of an NDL time block. The NDL time block may correspond to a transmission window. In a particular aspect, the transmission window may include a paging window and a data transmission window. In an alternate aspect, the transmission window may exclude the paging window. For example, any portion of the transmission window may be available for transmission of traffic messages (e.g., the traffic message 1930), data (e.g., the data 122), or both.

A subscriber device (e.g., the first subscriber device 106) may receive the traffic advertisement 2110 via the first communication channel during the first communication window from the provider device 104. For example, the first subscriber device 106 may receive the traffic advertisement 2110 via a NAN interface or a NDL interface. The first subscriber device 106 may include (or have access to) mapping data indicating a mapping between a NAN interface and a NDL interface of devices (e.g., the provider device 104) associated with an NDL group. The first subscriber device 106 may determine that the traffic advertisement 2110 includes the traffic announcement attribute 2234 in response to determining that the attribute identifier field 2210 has a particular value corresponding to a traffic attribute.

The first subscriber device 106 may determine a type of the traffic indicator (e.g., a bloom filter type, a TIM type, an ATIM type, or an address indicator list type) included in the traffic announcement attribute 2234 based on a value of the type field 2214. The first subscriber device 106 may extract the traffic indicator (e.g., a bloom filter, a TIM, an ATIM, or a list of address indicators) from the value field 2216 based on the type of traffic indicator.

The first subscriber device 106 may determine the one or more data recipient devices based on the traffic indicator. The first subscriber device 106 may monitor the first communication during at least a portion of the first communication window in response to determining that the one or more data recipient devices include the first subscriber device 106. Alternatively, the first subscriber device 106 may transition to an inactive mode during a remaining portion of the first communication window in response to determining that the one or more data recipient devices do not include the first subscriber device 106. The first subscriber device 106 may, while in the inactive mode, refrain from monitoring the first communication channel, perform other network operations, transition to a low-power mode, or a combination thereof. In a particular aspect, the traffic page 1932 may differ from the traffic advertisement 2110 in that a particular field (e.g., the attribute identifier field 2210) of the traffic page 1932 may have a particular value that identifies the traffic page 1932 as a traffic page and the traffic indicator may indicate one or more non-recipient devices.

The traffic advertisement 2110 may indicate availability of data to be sent by the provider device 104 to one or more data recipients. A subscriber device may monitor a communication channel or perform other operations based on determining whether the one or more data recipients include the subscriber device.

Referring to FIG. 23, a diagram 2300 of examples of a traffic announcement attribute 2334, a page control field 2313, a paged device list (PDL) 2318, and a PDL control field 2319 is shown. The traffic announcement attribute 2334 may correspond to the traffic announcement attribute 2134 of FIG. 21.

The traffic announcement attribute 2334 may include the attribute identifier field 2210, the length field 2211, the NDL group identifier field 2212, the page control field 2313, a sequence of PDLs field 2317, or a combination thereof. The traffic announcement attribute 2334 may differ from the traffic announcement attribute 2234 in that the traffic announcement attribute 2334 may include the page control field 2313, the sequence of PDLs field 2317, or both, and may exclude (or omit) the traffic indicator field 2213.

The page control field 2313 may indicate which fields are present. For example, the page control field 2313 may indicate a number of PDLs present. To illustrate, the page control field 2313 may include a broadcast/multicast field 2314, a number of PDLs field 2315, a reserved field 2316, or a combination thereof. The broadcast/multicast field 2314 may indicate whether the data to be sent is multicast data or unicast data.

The number of PDLs field 2315 may indicate a count of PDLs included in the sequence of PDLs field 2317. The sequence of PDLs field 2317 may include zero or more PDLs (e.g., a PDL 2318).

The PDL 2318 may include a PDL control field 2319, a list of devices field 2320, or both. The PDL control field 2319 may include data descriptive of the list of devices field 2320. For example, the PDL control field 2319 may include a length field 2321, a QoS category field 2322, a type field 2323, a number of octets per address field 2324, or a combination thereof.

The length field 2321 may indicate a length of the list of devices field 2320. The QoS category field 2322 may indicate a QoS category (e.g., an access category) of data. The type field 2323 may indicate a type of a data recipients list included in the list of devices field 2320. For example, a first value (e.g., 00) of the type field 2323 may indicate that the list of devices field 2320 includes a list of address indicators (e.g., MAC address indicators), a second value (e.g., 01) of the type field 2323 may indicate that the list of devices field 2320 includes a bloom filter, a third value (e.g., 10) may indicate that the list of devices field 2320 includes a bitmap representing a TIM, a fourth value may indicate that the list of devices field 2320 includes an ATIM.

When the type field 2323 has the first value (e.g., 00), the number of octets per address field 2324 may indicate a number of bytes of an address indicated in the list of address indicators. For example, a first value (e.g., 00, 01, 10, or 11) of the number of octets per address field 2324 may indicate that an address indicator of the list of address indicators includes a first number of bytes (e.g., 6 octets, 1 octet, 2 octets, or 4 octets) of an address. The address indicator may include the least significant bytes (LSB) of the address.

When the type field 2323 has the second value (e.g., 01), the number of octets per address field 2324 may indicate a bloom filter index. When the type field 2323 has the third value (e.g., 10), the number of octets per address field 2324 may include a bitmap control field, a partial value bitmap field, or both. When the type field 2323 has the third value (e.g., 10), one or more bits of the list of devices field 2320 may indicate a bitmap offset.

During operation, the provider device 104 (e.g., the traffic advertisement generator 130) may generate a frame (e.g., the traffic advertisement 2110) having a NAN service discovery frame format, a NMF format, or both. The traffic advertisement 2110 may include the traffic announcement attribute 2334 indicating availability of data to be sent by the provider device 104 to one or more data recipient devices. For example, the traffic announcement attribute 2334 may include the page control field 2313. The broadcast/multicast field 2314 may indicate whether the data includes multicast data or unicast data. For example, the provider device 104 may set the broadcast/multicast field 2314 to a first value (e.g., 1) in response to determining that the same data (e.g., the data 122) is to be multicast to the data recipient devices. Alternatively, the provider device 104 may set the broadcast/multicast field 2314 to a second value (e.g., 0) in response to determining that the data 122 is to be unicast to each of the data recipient devices. The data 122 to be sent to the first subscriber device 106 may be distinct from the data 122 to be sent to the second subscriber device 108.

The provider device 104 may set the number of PDLs field 2315 to indicate a count of PDLs included in the sequence of PDLs field 2317. For example, the provide device 104 may include multiple PDLs in the sequence of PDLs field 2317 in response to determining that multiple types of lists (e.g., MAC address indicator list, a bloom filter, a TIM, an ATIM, etc.) are to be sent, that availability of data corresponding to multiple access categories is to be indicated, or both. For example, the sequence of PDLs field 2317 may include a first list of devices, a second list of devices, or both. In some implementations, the first list of devices may include one of a MAC address indicator list, a bloom filter, a TIM, or an ATIM. The second list of devices may include another of the MAC address indicator list, a bloom filter, the TIM, or the ATIM. In some implementations, the first list of devices may correspond to a first access category that is distinct from a second access category associated with the second list of devices.

The sequence of PDLs field 2317 may include the PDL 2318. For example, the provider device 104 may generate an address indicator list, a bloom filter, a TIM, or an ATIM, as described with reference to FIG. 1. The list of devices field 2320 may include the address indicator list, the bloom filter, the TIM, or the ATIM. The type field 2323 may indicate whether the list of devices field 2320 includes the address indicator list, the bloom filter, the TIM, or the ATIM. The QoS category field 2322 may indicate an access category of the data 122.

The provider device 104 may send the traffic advertisement 2110 via a first communication channel during a first communication window. A subscriber device (e.g., the first subscriber device 106) may receive the traffic advertisement 2110 via the first communication channel during the first communication window from the provider device 104. The first subscriber device 106 may determine that the traffic advertisement 2110 includes the traffic announcement attribute 2334 in response to determining that the attribute identifier field 2210 has a particular value corresponding to a traffic attribute.

The first subscriber device 106 may determine a count of PDLs included in the sequence of PDLs field 2317 based on the number of PDLs field 2315. The first subscriber device 106 may extract the PDL 2318 from the sequence of PDLs field 2317. The first subscriber device 106 may, based on the type field 2323, determine a type (e.g., a bloom filter type, a TIM type, an ATIM type, or an address indicator list type) of a list of devices included in the list of devices field 2320 of the PDL 2318. The first subscriber device 106 may extract the list of devices (e.g., a bloom filter, a TIM, an ATIM, or a list of addresses) from the value field 2216 based on the type (e.g., a bloom filter type, a TIM type, an ATIM type, or an address indicator list type).

The first subscriber device 106 may determine the one or more data recipient devices based on the list of devices. The first subscriber device 106 may monitor the first communication during at least a portion of the first communication window in response to determining that the one or more data recipient devices include the first subscriber device 106. Alternatively, the first subscriber device 106 may transition to an inactive mode during a remaining portion of the first communication window in response to determining that the one or more data recipient devices do not include the first subscriber device 106. The traffic advertisement 2110 may indicate availability of data to be sent by the provider device 104 to one or more data recipients. A subscriber device may monitor a communication channel or perform other operations based on determining whether the one or more data recipients include the subscriber device.

Figure 24:
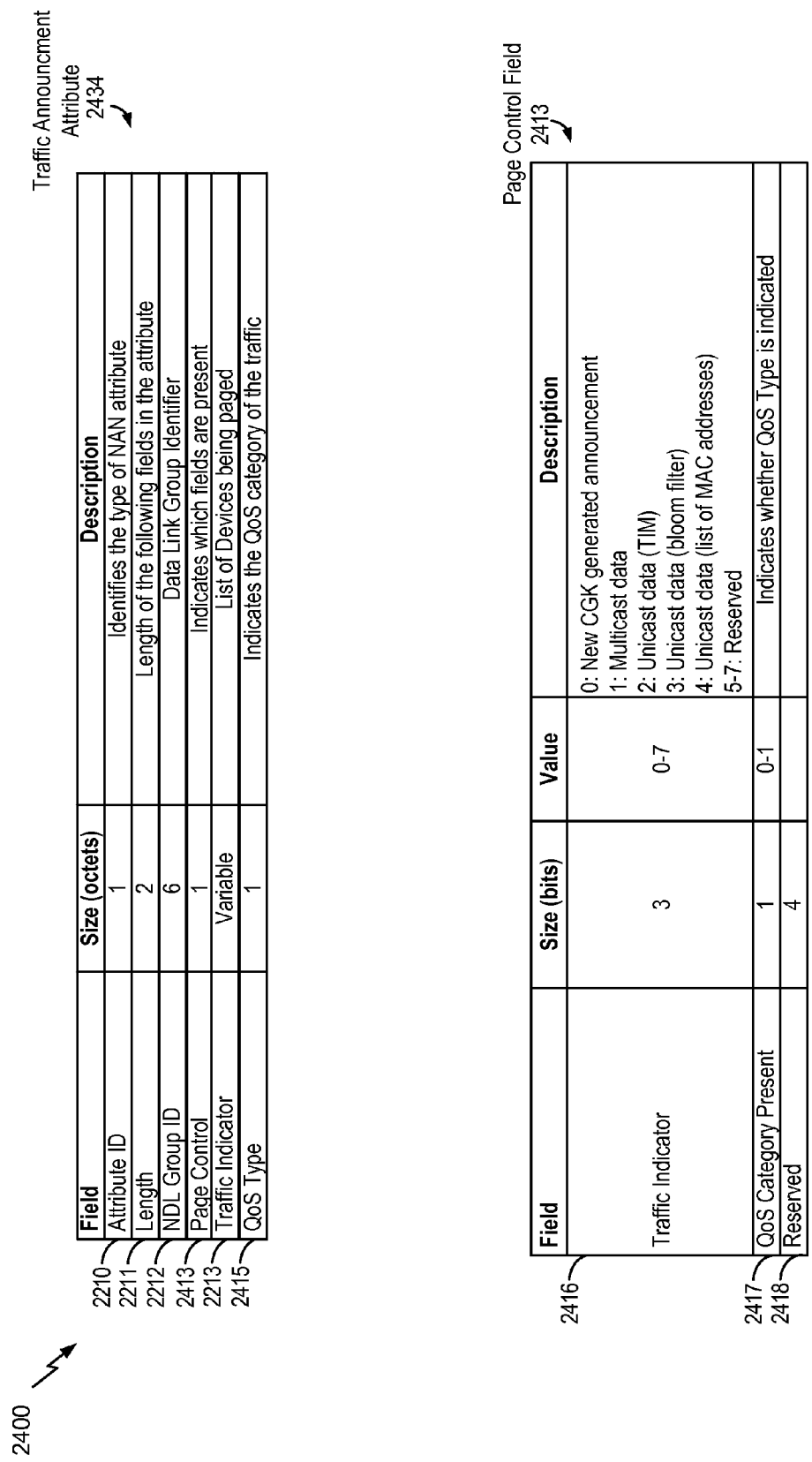
FIG. 24 is a diagram illustrating examples of a traffic announcement attribute and a page control field of the traffic announcement attribute.

Referring to FIG. 24, a diagram 2400 of examples of a traffic announcement attribute 2434 and a page control field 2413 of the traffic announcement attribute 2434 is shown. The traffic announcement attribute 2434 may correspond to the traffic announcement attribute 2134 of FIG. 21.

The traffic announcement attribute 2434 may include the attribute identifier field 2210, the length field 2211, the NDL group identifier field 2212, the page control field 2413, the traffic indicator field 2213, a QoS type field 2415, or a combination thereof. The traffic announcement attribute 2434 may differ from the traffic announcement attribute 2234 in that the traffic announcement attribute 2434 may include the page control field 2413, the QoS type field 2415, or both.

The page control field 2413 may indicate which fields are present. For example, the page control field 2413 may indicate whether the QoS type field 2415 is present, whether the data to be sent is multicast data, unicast data, or both. To illustrate, the page control field 2413 may include a traffic indicator field 2416, a QoS category present field 2417, a reserved field 2418, or a combination thereof. The traffic indicator field 2416 may indicate whether the data to be sent is multicast data or unicast data. For example, a first value (e.g., 1) may indicate that the data to be sent is multicast and a second value (e.g., 2-4) may indicate that the data to be sent is unicast. A particular value (e.g., 0) of the traffic indicator field 2416 may indicate that the traffic advertisement 2110 of FIG. 21 is generated based on a collaborative group key (CGK) scheme. The traffic indicator field 2213 may indicate an identifier (e.g., at least a portion of a MAC address) of a device associated with the CGK scheme. For example, the traffic indicator field 2213 may indicate an identifier of a device that generated a CGK associated with the traffic advertisement 2110. The QoS category present field 2417 may indicate whether the QoS type field 2415 is present. For example, a first value (e.g., 1) of the QoS category present field 2417 may indicate that the QoS type field 2415 indicates a QoS category (e.g., an access category) of the data to be sent. When the traffic indicator field 2213 indicates that the traffic advertisement 2110 is generated based on the CGK scheme, the QoS type field 2415 may indicate a first QoS category (e.g., a higher access category).

During operation, the provider device 104 (e.g., the traffic advertisement generator 130) may generate a frame (e.g., the traffic advertisement 2110) having a NAN service discovery frame format, a NMF format, or both. The traffic advertisement 2110 may include the traffic announcement attribute 2434 indicating availability of data to be sent by the provider device 104 to one or more data recipient devices. For example, the traffic announcement attribute 2434 may include the page control field 2413. The traffic indicator field 2416 may indicate whether the data includes multicast data or unicast data. For example, the provider device 104 may set the traffic indicator field 2416 to a first value (e.g., 1) in response to determining that the same data (e.g., the data 122) is to be multicast to the data recipient devices. Alternatively, the provider device 104 may set the traffic indicator field 2416 to a second value (e.g., 2-4) in response to determining that the data 122 is to be unicast to each of the data recipient devices. The data 122 to be sent to the first subscriber device 106 may be distinct from the data 122 to be sent to the second subscriber device 108.

The provider device 104 may set the traffic indicator field 2416 to a particular value based on determining whether the traffic indicator field 2213 is to represent the data recipient devices using a TIM, a bloom filter, an ATIM, an address indicator list, or another representation. For example, the provider device 104 may set the traffic indicator field 2416 to a first particular value (e.g., 2) in response to determining that the traffic indicator field 2213 is to include a TIM indicating the data recipient devices. The provider device 104 may set the traffic indicator field 2416 to a second particular value (e.g., 3) in response to determining that the traffic indicator field 2213 is to include a bloom filter indicating the data recipient devices. The provider device 104 may set the traffic indicator field 2416 to a third particular value (e.g., 4) in response to determining that the traffic indicator field 2213 is to include an address indicator list (e.g., a MAC address indicator list) indicating the data recipient devices. The provider device 104 may set the traffic indicator field 2416 to a fourth particular value in response to determining that the traffic indicator field 2213 is to include an ATIM indicating one or more of the data recipient devices.

The provider device 104 may send the traffic advertisement 2110 via a first communication channel during a first communication window. A subscriber device (e.g., the first subscriber device 106) may receive the traffic advertisement 2110 via the first communication channel during the first communication window from the provider device 104. The first subscriber device 106 may determine that the traffic advertisement 2110 includes the traffic announcement attribute 2434 in response to determining that the attribute identifier field 2210 has a particular value corresponding to a traffic attribute.

The first subscriber device 106 may determine whether the data recipient devices include the first subscriber device 106 based on the traffic indicator field 2213, as described with reference to FIG. 22. The first subscriber device 106 may, based on the QoS category present field 2417, determine a QoS type (e.g., an access category) of data to be received based on the QoS type field 2415. For example, the first subscriber device 106 may determine the QoS type based on the QoS type field 2415 in response to determining that the QoS category present field 2417 indicates that the QoS type field 2415 is present (e.g., includes valid data). The first subscriber device 106 may determine whether the data is to be multicast or unicast based on the traffic indicator field 2416.

The first subscriber device 106 may monitor the first communication during at least a portion of the first communication window in response to determining that the data recipient devices include the first subscriber device 106. Alternatively, the first subscriber device 106 may transition to an inactive mode during a remaining portion of the first communication window in response to determining that the data recipient devices do not include the first subscriber device 106. The traffic advertisement 2110 may indicate availability of data to be sent by the provider device 104 to one or more data recipients. A subscriber device may monitor a communication channel or perform other operations based on determining whether the one or more data recipients include the subscriber device.

Referring to FIG. 25, a diagram 2500 of an example of a neighbor aware network (NAN) data link (NDL) negotiation attribute 2534 is shown. In a particular aspect, a negotiation message (e.g., the first negotiation message 1928, the second negotiation message 1938, or both) may include the NDL negotiation attribute 2534. The negotiation message (e.g., the first negotiation message 1928, the second negotiation message 1938, or both) may correspond to a frame having a NAN SDF format, a NMF format, or both. A NAN SDF (or a NMF) may include one or more attributes (e.g., the NDL negotiation attribute 2534, the traffic announcement attribute 2134 of FIG. 21, or both). A negotiation message (e.g., the first negotiation message 1928, the second negotiation message 1938, or both) may correspond to a NAN SDF (or a NMF) that includes at least one NDL attribute (e.g., the NDL negotiation attribute 2534). The negotiation message (e.g., the first negotiation message 1928, the second negotiation message 1938, or both) may be generated by the traffic advertisement generator 130, the traffic advertisement analyzer 134, or both, of at least one of the devices 104-114. The devices 104-114 may generate the negotiation message (e.g., the first negotiation message 1928, the second negotiation message 1938, or both) during NDL setup of an NDL group (e.g., the NAN 102) or while extending a lifetime of the NDL group (e.g., the NAN 102).

The negotiation message may indicate data related to participation of a sender device (e.g., the device 104-114) in an NDL group. The sender device (e.g., the device 104-114) may generate and transmit the negotiation message. The NDL negotiation attribute 2534 may include an attribute identifier field 2510, a length field 2511, a MAC address field 2512, a group identifier field 2513, a validity time field 2514, an NDL control field 2515, a security type field 2519, an NDL logical channel indicator field 2516, a map control field 2517, an availability intervals bitmap field 2518, or a combination thereof. The attribute identifier field 2510 may have a particular value (e.g., 0x0C) identifying the NDL negotiation attribute 2534 as an NDL negotiation attribute. The length field 2511 may indicate a length of the NDL negotiation attribute 2534. The MAC address field 2512 may indicate a MAC address of a device (e.g., the sender device). The group identifier field 2513 may include an NDL group identifier of the NDL group. The validity time field 2514 may indicate a number of discovery window intervals (e.g., discovery intervals) that the NDL negotiation attribute 2534 is valid. For example, the NDL negotiation attribute 2534 may be valid for multiple discovery intervals. The NDL control field 2515 may indicate whether an availability map is present, whether an NDL logical channel indicator is present, a status code, a flexibility field, a power save field, or a combination thereof, as further described with reference to FIG. 26. The security type field 2519 may indicate one or more authentication protocols, one or more cipher suites, or a combination thereof, supported by the sender device (e.g., the device 104-114).

The NDL logical channel indicator field 2516 may include the NDL logical channel indicator. The NDL logical channel indicator may indicate at least one logical channel. A logical channel may correspond to a physical channel and at least one time period (or time block), as described with reference to FIG. 1. The NDL control field 2515 may indicate whether the NDL logical channel indicator field 2516 includes the NDL logical channel indicator, as further described with reference to FIG. 26

The map control field 2517 may include an availability channel and time map control information, as further described with reference to FIG. 26. A discovery interval (e.g., the discovery interval 748) between consecutive discovery windows may be divided into time intervals. Each of the time intervals may have the same duration. The availability channel and the time map control information may indicate a duration of a time interval. For example, a subfield (e.g., an availability interval duration subfield) of the map control field 2517 may indicate the duration of the time interval. The NDL control field 2515 may indicate whether the map control field 2517 includes the availability channel and the time map control information, as further described with reference to FIG. 26.

The NDL negotiation attribute 2534 may include one or more fields to indicate a proposed NDL schedule. For example, the availability intervals bitmap field 2518 may indicate a proposed NDL schedule. The availability intervals bitmap field 2518 may include an availability intervals bitmap. The sender device may set a particular bit (e.g., an i-th bit) of the availability intervals bitmap to a first value (e.g., 1) to announce that the sender device will monitor (e.g., is completely committed to monitoring) a particular channel (e.g., an operation channel) during a corresponding time interval (e.g., an i-th time interval) of the discovery interval 748; otherwise the sender device may set the particular bit (e.g., the i-th bit) to a second value (e.g., 0). The second value (e.g., 0) of the particular bit (e.g., the i-th bit) of the availability intervals bitmap may indicate that the sender device may optionally monitor (e.g., is partially committed to monitoring) the particular channel (e.g., the operation channel) during the corresponding time interval (e.g., the i-th time interval) of the discovery interval 748. The NDL negotiation attribute 2534 may thus indicate whether the sender device is partially or completely committed to the proposed NDL schedule. The particular channel may be indicated in another associated attribute (e.g., a further availability map attribute). The NDL control field 2515 may indicate whether the availability intervals bitmap field 2518 includes an availability intervals bitmap, as further described with reference to FIG. 26. In some implementations, a sender device may indicate a proposed schedule using a further availability attribute. For example, the further availability attribute may indicate one or more operation channels (e.g., one or more communication channels). The availability intervals bitmap may include bits corresponding to the one or more operation channels. For example, an i-th bit of the availability intervals bitmap may correspond to a particular operation channel indicated by the further availability attribute and to a particular time interval. A value of the i-th bit may indicate whether the sender is partially or completely committed to monitoring the particular operation channel during the particular time interval.

In some implementations, a negotiation message (e.g., the first negotiation message 1928, the NDL negotiation attribute 2534, or both) may indicate whether the proposed schedule is immutable (or partly immutable). For example, the provider device 104 may generate the negotiation message (e.g., the first negotiation message 1928, the NDL negotiation attribute 2534, or both) including a field indicating whether a receiving device (e.g., the first subscriber device 106, the second subscriber device 108, or the fourth subscriber device 112) is expected to be available during the entire proposed NDL schedule or during at least a portion of the proposed NDL schedule.

In some implementations, the negotiation message (e.g., the first negotiation message 1928, the NDL negotiation attribute 2534, or both) may indicate whether portions of the proposed NDL schedule are immutable (or partly immutable). For example, the negotiation message (e.g., the first negotiation message 1928, the NDL negotiation attribute 2534, or both) may include a bitmap (e.g., an immutability bitmap) that indicates whether portions of the proposed schedule are immutable (or partly immutable). To illustrate, the provider device 104 may set a particular bit (e.g., an i-th bit) of the immutability bitmap to a first value (e.g., 1) to indicate that a receiving device (e.g., the first subscriber device 106, the second subscriber device 108, or the fourth subscriber device 112) is expected to be available to monitor a particular communication channel during an entirety of a particular time interval. Alternatively, the provider device 104 may set the particular bit (e.g., the i-th bit) of the immutability bitmap to a second value (e.g., 0) to indicate that the receiving device (e.g., the first subscriber device 106, the second subscriber device 108, or the fourth subscriber device 112) is expected to be available to monitor the particular communication channel during at least a portion of the particular time interval.

In some implementations, a sender device may generate a negotiation message (e.g., the second negotiation message 1938, the NDL negotiation attribute 2534, or both) indicating whether the sender device (e.g., the first subscriber device 106, the second subscriber device 108, or the fourth subscriber device 112) is partly committed to (e.g., partially available during) a proposed schedule or completely committed to the proposed schedule. For example, the first subscriber device 106 may generate the negotiation message (e.g., the second negotiation message 1938, the NDL negotiation attribute 2534, or both) including a field indicating whether the sender device (e.g., the first subscriber device 106) is committed to being available during the entire proposed NDL schedule or during at least a portion of the proposed NDL schedule.

In some implementations, the negotiation message (e.g., the second negotiation message 1938, the NDL negotiation attribute 2534, or both) may indicate whether a sender device (e.g., the first subscriber device 106, the second subscriber device 108, or the fourth subscriber device 112) is partly or completely committed to portions of the proposed schedule. For example, the negotiation message (e.g., the second negotiation message 1938, the NDL negotiation attribute 2534, or both) may include a bitmap (e.g., a commitment bitmap) that indicates whether the sender device is partly committed (e.g., partially available) or completely committed to portions of the proposed schedule. To illustrate, the first subscriber device 106 may set a particular bit (e.g., an i-th bit) of the commitment bitmap to a first value (e.g., 1) to indicate that the first subscriber device 106 is committed to monitoring a particular communication channel during an entirety of a particular time interval. Alternatively, the first subscriber device 106 may set the particular bit (e.g., the i-th bit) of the commitment bitmap to a second value (e.g., 0) to indicate that the first subscriber device 106 is committed (e.g., is partially available) to monitor the particular communication channel during at least a portion of the particular time interval.

The NDL negotiation attribute 2534 may include one or more fields to indicate at least one condition to establish a data link between the sender device (e.g., one of the devices 104-112) and a receiving device. The at least one condition may include a data rate threshold, a QoS threshold, a channel communication capability, conformance to a WiFi standard, or a combination thereof. The data rate threshold may indicate a minimum data rate or a maximum data rate. The QoS threshold may indicate a minimum access category or a maximum access category. The channel communication capability may indicate one or more communication channels that the sender device (e.g., one of the devices 104-112) is capable of using to communicate. The conformance to a WiFi standard may indicate one or more WiFi standards to which the sender device (e.g., one of the devices 104-112) conforms.

The NDL negotiation attribute 2534 may enable a device to negotiate terms of participation of the device in an NDL group with another device. For example, the device may send a first negotiation message including the NDL negotiation attribute 2534 indicating information regarding availability of the device to participate in the NDL group. A second device may send a second negotiation message including the NDL negotiation attribute 2534 indicating information regarding availability of the second device to participate in the NDL group. The first device may exchange messages, data, or both, with the second device when the first device and the second device are available to participate in the NDL group.

Referring to FIG. 26, a diagram 2600 of the NDL control field 2515 is shown. The NDL control field 2515 may include an availability map present field 2614, an NDL logical channel indicator present field 2615, a status code field 2616, a flexible field 2617, a power save field 2618, a security field 2620, a reserved field 2619, or a combination thereof.

The availability map present field 2614 may indicate whether availability channel and time map control information is present. For example, a first value (e.g., 1) of the availability map present field 2614 may indicate that the availability channel and time map control information is present in the map control field 2517 and the availability intervals bitmap field 2518, as described with reference to FIG. 25. As another example, a second value (e.g., 0) of the availability map present field 2614 may indicate that the availability channel and time map control information is absent in the map control field 2517 and the availability intervals bitmap field 2518, as described with reference to FIG. 25.

The NDL logical channel indicator present field 2615 may indicate whether an NDL logical channel indicator is present. For example, a first value (e.g., 1) of the NDL logical channel indicator present field 2615 may indicate that the NDL logical channel indicator is present in the NDL logical channel indicator field 2516, as further described with reference to FIG. 25. As another example, a second value (e.g., 0) of the NDL logical channel indicator present field 2615 may indicate that the NDL logical channel indicator is absent in the NDL logical channel indicator field 2516, as further described with reference to FIG. 25. The NDL logical channel indicator may identify a logical channel that is defined in accordance with one or more wireless standards, such as an IEEE 802.11 standard.

The status code field 2616 may indicate whether the NDL negotiation attribute 2534 corresponds to a negotiation request, a negotiation response, a negotiation failure, or a negotiation confirmation. For example, a first value (e.g., 00) of the status code field 2616 may indicate that the NDL negotiation attribute 2534 corresponds to a negotiation request. To illustrate, the NDL negotiation attribute 2534 may be included in a first negotiation message sent by a first device (e.g., the provider device 104) to a second device (e.g., the first subscriber device 106) to initiate a negotiation process.

A second value (e.g., 01) of the status code field 2616 may indicate that the NDL negotiation attribute 2534 corresponds to a negotiation response (e.g., a rejection of the negotiation request and a counter request). To illustrate, the NDL negotiation attribute 2534 may be included in a second negotiation message sent by the first subscriber device 106 to the provider device 104 in response to receiving the first negotiation message.

A third value (e.g., 10) of the status code field 2616 may indicate that the NDL negotiation attribute 2534 corresponds to a negotiation failure. To illustrate, the NDL negotiation attribute 2534 may be included in a third negotiation message sent by the provider device 104 to the first subscriber device 106 in response to receiving the second negotiation message. The provider device 104 may send the third negotiation message in response to determining that the first negotiation message indicates first NDL participation information that is incompatible with second NDL participation information indicated by the second negotiation message. For example, the first NDL participation information may indicate that the provider device 104 is available during one or more first time intervals (or first time blocks). The second NDL participation information may indicate that the first subscriber device 106 is available during one or more second time intervals (or second time blocks). The first time intervals and the second time intervals may be non-overlapping.

A fourth value (e.g., 11) of the status code field 2616 may indicate that the NDL negotiation attribute 2534 corresponds to a negotiation confirmation. To illustrate, the NDL negotiation attribute 2534 may be included in a fourth negotiation message sent by the provider device 104 to the first subscriber device 106 in response to receiving the second negotiation message. The provider device 104 may send the fourth negotiation message in response to determining that the first NDL participation information indicated by the first negotiation message is compatible with second NDL participation information indicated by the second negotiation message. For example, the first NDL participation information may indicate that the provider device 104 is available during the first time intervals. The second NDL participation information may indicate that the first subscriber device 106 is available during the second time intervals. The first time intervals may overlap the second time intervals. The fourth negotiation message may indicate the overlapping time intervals.

The flexible field 2617 may indicate whether a receiving device may negotiate an alternate schedule. For example, a first value (e.g., 1) of the flexible field 2617 may indicate that the receiving device may negotiate an alternate schedule. A second value (e.g., 0) of the flexible field 2617 may indicate that the schedule is non-negotiable. For example, the provider device 104 may send the first negotiation message indicating that the provider device 104 is available during a proposed NDL schedule including the first time intervals. The first subscriber device 106 may send a second negotiation message with the status code field 2616 indicating a negotiation failure or a negotiation confirmation in response to determining that the flexible field 2617 has the second value (e.g., 0) indicating that the schedule is non-negotiable. Alternatively, the first subscriber device 106 may send a third negotiation message with the status code field 2616 indicating a negotiation response, a negotiation failure, or a negotiation confirmation in response to determining that the flexible field 2617 has the first value (e.g., 1) indicating that a receiving device may negotiate an alternate schedule.

The power save field 2618 may indicate a power save request. For example, a first value (e.g., 1) of the power save field 2618 (e.g., a power save bit) may identify a sender device (e.g., one of the devices 104-112) as a power-constraint device. In a particular aspect, the first value of the power save field 2618 may indicate that the sender device is able to support a power save mechanism during participation in a particular NDL group. In a particular implementation, the sender device may support a power save mechanism (e.g., traffic messaging) during participation in a first NDL group and may not support a power save mechanism (e.g., traffic message) during participation in a second NDL group. For example, the sender device may send a particular negotiation message associated with the first NDL group with the power save field 2618 having the first value and may send another negotiation message associated with the first NDL group with the power save field 2618 having a second value (e.g., 0).

The sender device may determine whether to support a power save mechanism during participation in a particular NDL group based on a type of service (e.g., an application) associated with the particular NDL group, a topology of the particular NDL group, or both. For example, the sender device may determine that the power save mechanism during participation in an NDL group is not to be supported in response to determining that a service associated with the NDL group corresponds to a low latency application (e.g., a real-time application), that the NDL group corresponds to a first topology (e.g., a many-to-one topology), or both. As another example, the sender device may determine that the power save mechanism during participation in the NDL group is to be supported in response to determining that the service does not correspond to a low latency application (e.g., corresponds to a file transfer application), that the NDL group corresponds to a second topology (e.g., a one-to-one topology), or both. The sender device may correspond to a device that sent a negotiation message including the NDL negotiation attribute 2534. The first value of the power save field 2618 may correspond to a power save request, as described with reference to FIG. 19.

The security field 2620 may indicate whether the security type field 2519 of FIG. 25 is present. For example, the security field 2620 may indicate whether the security type field 2519 includes valid data (e.g., security data indicating supported authentication protocol(s), cipher suites (s), or both). To illustrate, a first value (e.g., 0) of the security field 2620 may indicate that the security type field 2519 does not include valid data (e.g., the security data). A second value (e.g., 1) of the security field 2620 may indicate that the security type field 2519 includes valid data (e.g., the security data). A receiving device may, in response to determining that the security field 2620 indicates that the security type field 2519 includes valid data, determine one or more authentication protocols, one or more cipher suites, or both, supported by the sender device based on the security type field 2519.

The NDL control field 2515 may enable a device to negotiate terms of participation of the device in an NDL group with another device. For example, the device may send a first negotiation message including the NDL control field 2515 indicating information regarding the negotiation. For example, the NDL control field 2515 may indicate whether the first negotiation corresponds to a negotiation confirmation, a negotiation failure, a negotiation response, or a negotiation request.

Figure 27:
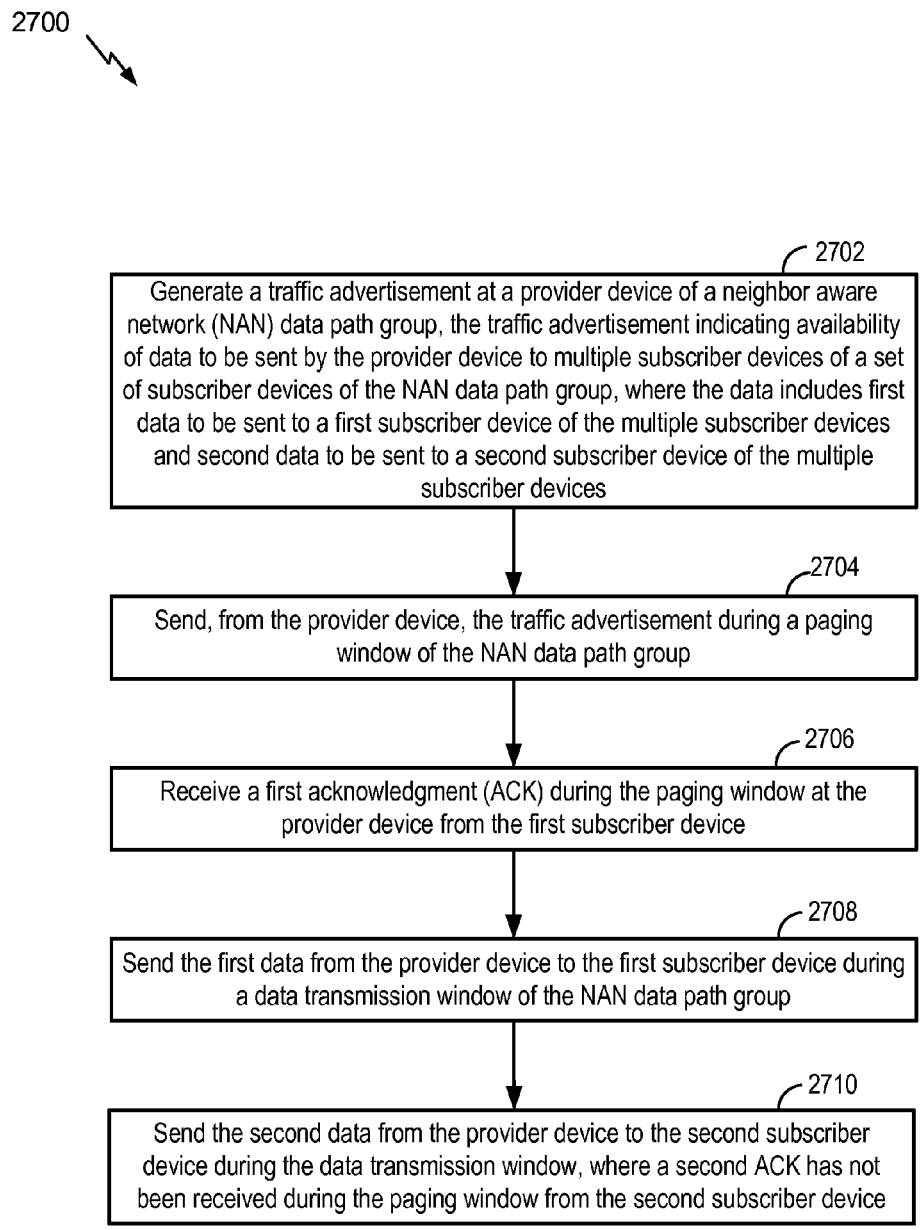
FIG. 27 is a flow diagram of a method of operation at an electronic device of one or more of the systems disclosed herein.

Referring to FIG. 27, a particular aspect of a method of operation is shown and generally designated 2700. In a particular aspect, the method 2700 may be performed by the traffic advertisement generator 130 of the provider device 104 of FIG. 1.

The method 2700 includes generating a traffic advertisement at a provider device of a neighbor aware network (NAN) data path group, at 2702. For example, the traffic advertisement generator 130 of FIG. 1 of the provider device 104 of a data path group of the NAN 102 may generate the traffic advertisement 128, as described with reference to FIG. 1. The traffic advertisement 128 may indicate availability of data to be sent by the provider device 104 to multiple subscriber devices (e.g., the subscriber devices 106-110) of a set of subscriber devices (e.g., the subscriber devices 106-114) of the NAN data path group. The data may include first data to be sent to the first subscriber device 106 and second data to be sent to the second subscriber device 108.

The method 2700 also includes sending, from the provider device, the traffic advertisement during a paging window of the NAN data path group, at 2704. For example, the traffic advertisement generator 130 of FIG. 1 may send the traffic advertisement 128 during a paging window of the NAN data path group, as described with reference to FIG. 1.

The method 2700 further includes receiving a first acknowledgement (ACK) during the paging window at the provider device from the first subscriber device, at 2706. For example, the traffic advertisement generator 130 of FIG. 1 may receive the ACK 138 during the paging window from the first subscriber device 106, as described with reference to FIG. 1.

The method 2700 also includes sending the first data from the provider device to the first subscriber device during a data transmission window of the NAN data path group, at 2708. For example, the traffic advertisement generator 130 of FIG. 1 may send the data 122 to the first subscriber device 106 during a data transmission window, as described with reference to FIG. 1.

The method 2700 further includes sending the second data from the provider device to the second subscriber device during the data transmission window, at 2710. For example, the traffic advertisement generator 130 of FIG. 1 may send the data 122 to the second subscriber device 108 during the data transmission window, as described with reference to FIG. 1. The data 122 sent to the first subscriber device 106 may be distinct from the data 122 sent to the second subscriber device 108. The traffic advertisement generator 130 of FIG. 1 may not have received an ACK during the paging window from the second subscriber device 108, as described with reference to FIG. 1.

The method 2700 may thus enable a provider device to send data of a particular service to multiple subscriber devices during a data transmission window in response to determining that an ACK has been received from a single subscriber device during a corresponding paging window or that ACKs have been received from fewer than all of the multiple subscriber devices during the corresponding paging window. For example, the provider device may send first data to an acknowledging subscriber device from which the provider device received an ACK and may send second data to a non-acknowledging subscriber device from which the provider device has not received an ACK. The provider device may thus send data to multiple subscriber devices without receiving an ACK from each of the multiple subscriber devices in response to determining that an ACK has been received from at least one of the multiple subscriber devices.

Figure 28:
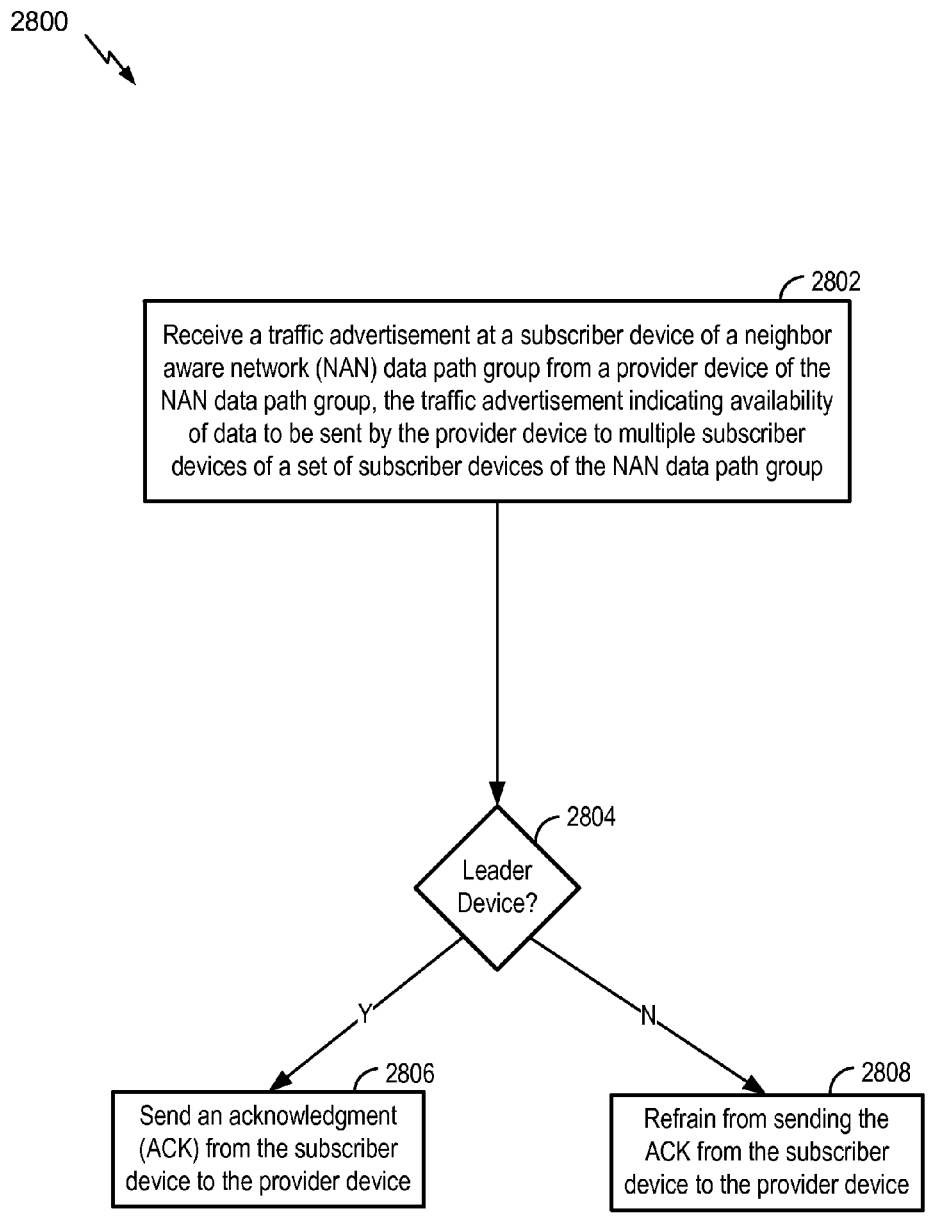
FIG. 28 is a flow diagram of another method of operation at an electronic device of one or more of the systems disclosed herein.

Referring to FIG. 28, a particular aspect of a method of operation is shown and generally designated 2800. In a particular aspect, the method 2800 may be performed by the traffic advertisement analyzer 134 of the device 104-114 of the system 100 of FIG. 1.

The method 2800 includes receiving a traffic advertisement at a subscriber device of a neighbor aware network (NAN) data path group from a provider device of the NAN data path group, at 2802. For example, the traffic advertisement analyzer 134 of the first subscriber device 106 of a data path group of the NAN 102 may receive the traffic advertisement 128 from the provider device 104, as described with reference to FIG. 1. The traffic advertisement 128 may indicate availability of data to be sent by the provider device 104 to multiple subscriber devices (e.g., the subscriber devices 106-110) of a set of subscriber devices (e.g., the subscriber devices 106-114) of the NAN data path group.

The method 2800 also includes determining, at the subscriber device, whether the subscriber device is a leader device of the multiple subscriber devices, at 2804. For example, the traffic advertisement analyzer 134 of FIG. 1 may determine whether the first subscriber device 106 is a leader device of the multiple subscriber devices (e.g., the subscriber devices 106-110), as described with reference to FIG. 1.

The method 2800 further includes, in response to determining that the subscriber device is the leader device, at 2804, sending an acknowledgement (ACK) from the subscriber device to the provider device, at 2806. For example, the traffic advertisement analyzer 134 of FIG. 1 may send the ACK 138 from the first subscriber device 106 to the provider device 104 in response to determining that the first subscriber device 106 is the leader device, as described with reference to FIG. 1.

The method 2800 further includes, in response to determining that the subscriber device is not the leader device, at 2804, refraining from sending the ACK from the subscriber device to the provider device, at 2808. For example, the traffic advertisement analyzer 134 of FIG. 1 may refrain from sending the ACK 138 from the first subscriber device 106 to the provider device 104 in response to determining that the first subscriber device 106 is not the leader device, as described with reference to FIG. 1.

The method 2800 may thus enable a subscriber device to determine send an ACK responsive to a traffic advertisement based on determining whether the subscriber device is a leader device. The subscriber device may conserve resources by refraining from sending the ACK in response to determining that the subscriber device is not the leader device.

Figure 29:
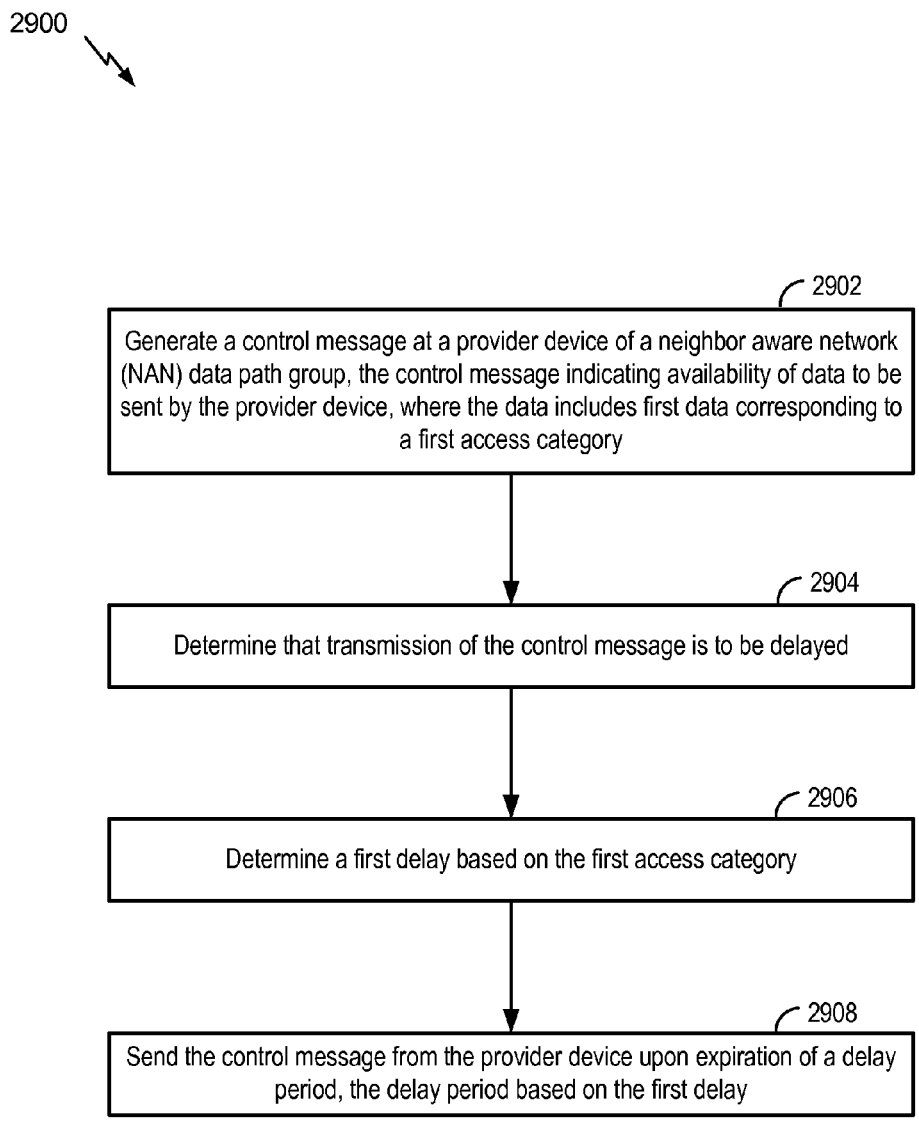
FIG. 29 is a flow diagram of another method of operation at an electronic device of one or more of the systems disclosed herein.

Referring to FIG. 29, a particular example of a method of operation is shown and generally designated 2900. The method 2900 may be performed by the traffic advertisement generator 130 of the provider device 104 of FIG. 1, the device 1002 of FIG. 10, or both.

The method 2900 includes generating a control message at a provider device of a neighbor aware network (NAN) data path group, at 2902. For example, the device 1002 of FIG. 10A (e.g., the provider device 104) of a data path group of the NAN 102 of FIG. 1 may generate the control message 1004, as described with reference to FIG. 10A. The control message 1004 may indicate availability of data to be sent by the provider device 104. The data may include the data 122 corresponding to the first access category 1020, as described with reference to FIG. 10A.

The method 2900 also includes determining that transmission of the control message is to be delayed, at 2904. For example, the device 1002 of FIG. 10A may determine that transmission of the control message 1004 is to be delayed, as described with reference to FIG. 10A.

The method 2900 further includes determining a first delay based on the first access category, at 2906. For example, the device 1002 of FIG. 10A may determine the first delay 1042 based on the first access category 1020, as described with reference to FIGS. 10A-10B.

The method 2900 also includes sending the control message from the provider device upon expiration of a delay period, at 2908. For example, the device 1002 of FIG. 10A (e.g., the provider device 104) may send the control message 1004 upon expiration of the delay period 1060, as described with reference to FIG. 10B. The delay period 1060 may be based on the first delay 1042, as described with reference to FIG. 10B.

The method 2900 may thus enable the provider device 104 to prioritize transmission of control messages based on corresponding access categories. Control messages associated with higher priority data may be transmitted prior to messages (e.g., control messages or data packets) associated with lower priority data.

Figure 30:
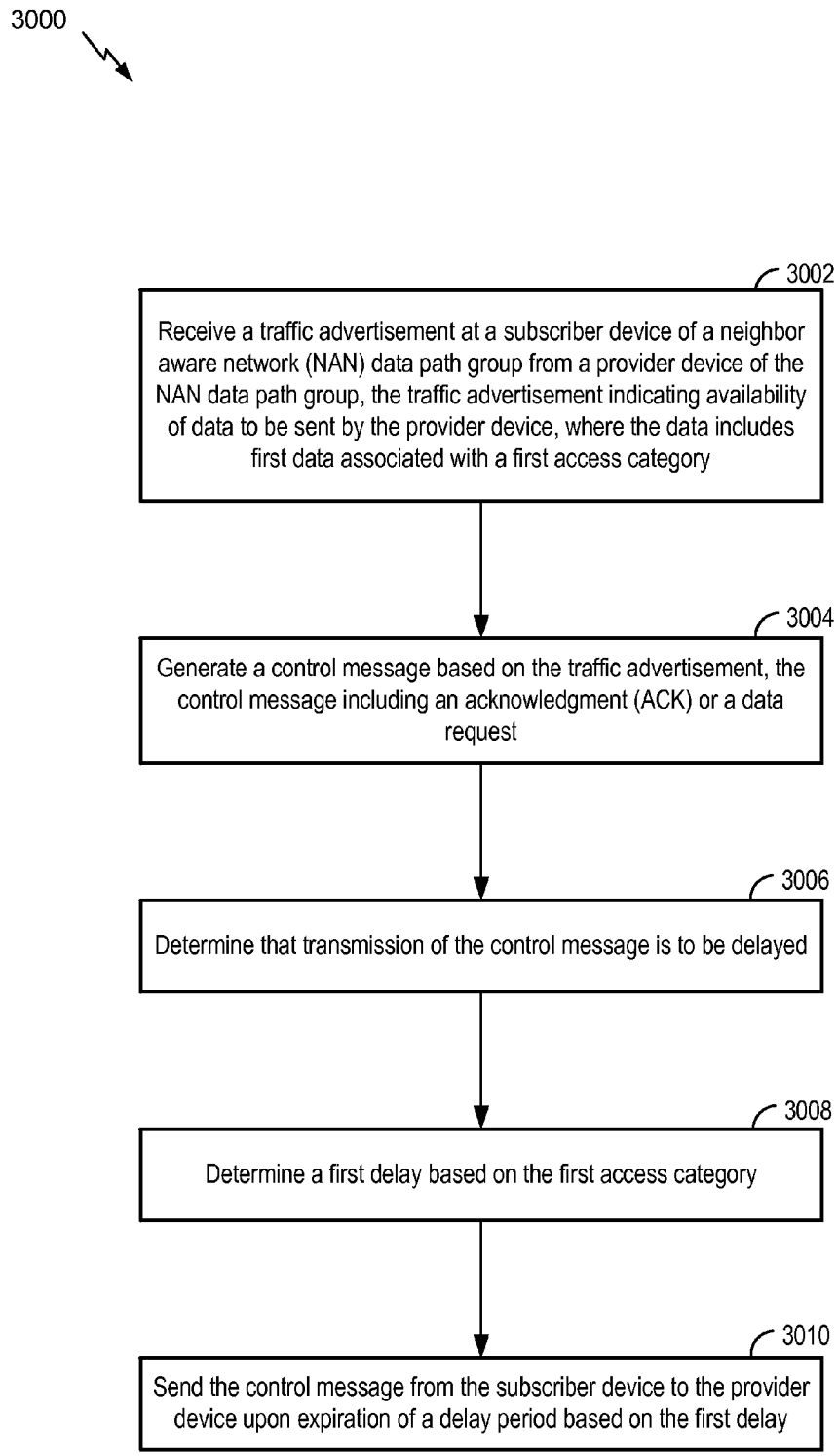
FIG. 30 is a flow diagram of another method of operation at an electronic device of one or more of the systems disclosed herein.

Referring to FIG. 30, a particular example of a method of operation is shown and generally designated 3000. The method 3000 may be performed by the traffic advertisement analyzer 134 of the first subscriber device 106 of FIG. 1, the device 1002 of FIG. 10, or both.

The method 3000 includes receiving a traffic advertisement at a subscriber device of a neighbor aware network (NAN) data path group from a provider device of the NAN data path group, at 3002. For example, the control message generator 1030 of FIG. 10A (e.g., the first subscriber device 106) of a data path group of the NAN 102 of FIG. 1 may receive the traffic advertisement 128 from the provider device 104 of the data path group, as described with reference to FIG. 10A. The traffic advertisement 128 may indicate availability of data to be sent by the provider device 104. The data may include the data 122 associated with the first access category 1020, as described with reference to FIG. 10A.

The method 3000 also includes generating a control message based on the traffic advertisement, at 3004. For example, the control message generator 1030 of FIG. 10A may generate the control message 1004 based on the traffic advertisement 128, as described with reference to FIG. 10A. The control message 1004 may include the ACK 138 or the trigger message 150.

The method 3000 further includes determining that transmission of the control message is to be delayed, at 3006. For example, the control message generator 1030 of FIG. 10A may determine that transmission of the control message 1004 is to be delayed, as described with reference to FIG. 10A.

The method 3000 also includes determining a first delay based on the first access category, at 3008. For example, the control message generator 1030 of FIG. 10A may determine the first delay 1042 based on the first access category 1020, as described with reference to FIGS. 10A-10B.

The method 3000 further includes sending the control message from the subscriber device to the provider device upon expiration of a delay period based on the first delay, at 3010. For example, the control message generator 1030 of FIG. 10A may send the control message 1004 from the first subscriber device 106 (e.g., the device 1002) to the provider device 104 upon expiration of the delay period 1060, as described with reference to FIGS. 10A-10B. The delay period 1060 may be based on the first delay 1042.

The method 3000 may thus enable the first subscriber device 106 to prioritize transmission of control messages based on corresponding access categories. Control messages associated with higher priority data may be transmitted prior to messages (e.g., control messages or data packets) associated with lower priority data.

Figure 31:
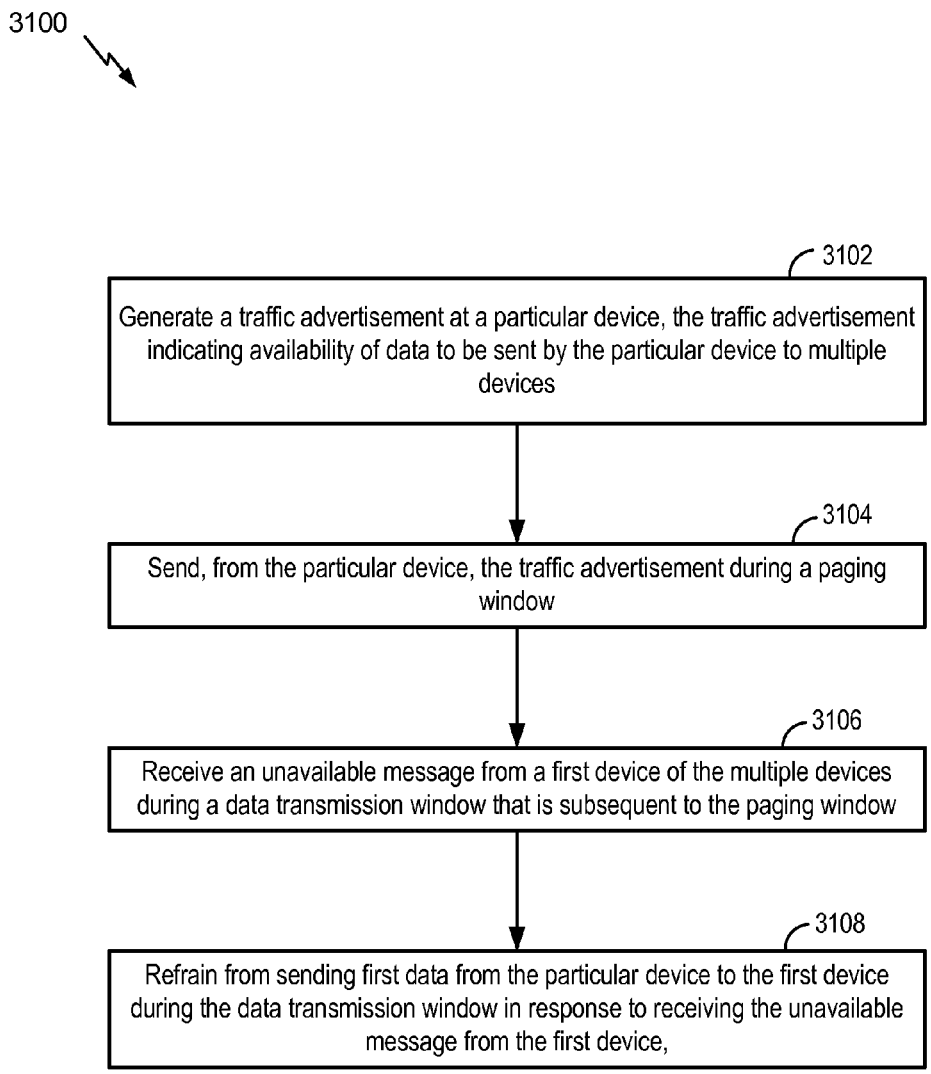
FIG. 31 is a flow diagram of another method of operation at an electronic device of one or more of the systems disclosed herein.

Referring to FIG. 31, a particular example of a method of operation is shown and generally designated 3100. The method 3100 may be performed by the traffic advertisement generator 130 of the provider device 104 of FIG. 1, the device 1002 of FIG. 10, or both.

The method 3100 includes generating a traffic advertisement at a particular device, at 3102. For example, the traffic advertisement generator 130 of the provider device 104 may generate the traffic advertisement 128, as described with reference to FIG. 1. The traffic advertisement 128 may indicate availability of data to be sent by the provider device 104 to multiple devices (e.g., the first subscriber device 106, the second subscriber device 108, the third subscriber device 110, the fourth subscriber device 112, or a combination thereof).

The method 3100 also includes sending, from the particular device, the traffic advertisement during a paging window, at 3104. For example, the traffic advertisement generator 130 of the provider device 104 may send the traffic advertisement 128 during the paging window 212, as described with reference to FIG. 2.

The method 3100 further includes receiving an unavailable message from a first device of the multiple devices during a data transmission window that is subsequent to the paging window, at 3106. For example, the traffic advertisement generator 130 of the provider device 104 may receive the unavailable message 1102 from the first subscriber device 106 during the data transmission window 218 that is subsequent to the paging window 212, as described with reference to FIG. 11.

The method 3100 also includes refraining from sending first data from the particular device to the first device during the data transmission window in response to receiving the unavailable message from the first device, at 3108. For example, the traffic advertisement generator 130 of the provider device 104 may refrain from sending the data 122 to the first subscriber device 106 during the data transmission window 218 in response to receiving the unavailable message 1102 from the first subscriber device 106. In a particular implementation, the traffic advertisement generator 130 of the provider device 104 may, in response to receiving the unavailable message 1102, retain the data 122 to be sent to the first subscriber device 106. For example, the traffic advertisement generator 130 of the provider device 104 may store the data 122 in a memory. The traffic advertisement generator 130 may send the data 122 (e.g., the retained data) to the first subscriber device 106 during a subsequent transmission window, as described with reference to FIG. 1. For example, the traffic advertisement generator 130 may send a second traffic advertisement during a second paging window of a second transmission window. The second traffic advertisement may indicate availability of data to be sent by the provider device 104 to at least the first subscriber device 106 during a second data transmission window of the second transmission window. The data to be sent to the first subscriber device 106 during the second data transmission window may include at least the retained data (e.g., the data 122).

The method 3100 may thus enable the provider device 104 to conserve resources (e.g., network resources, power, or both). For example, the provider device 104 may conserve resources by refraining from sending data to a subscriber device during a data transmission window when the subscriber device is unavailable to receive data during the data transmission window.

Figure 32:
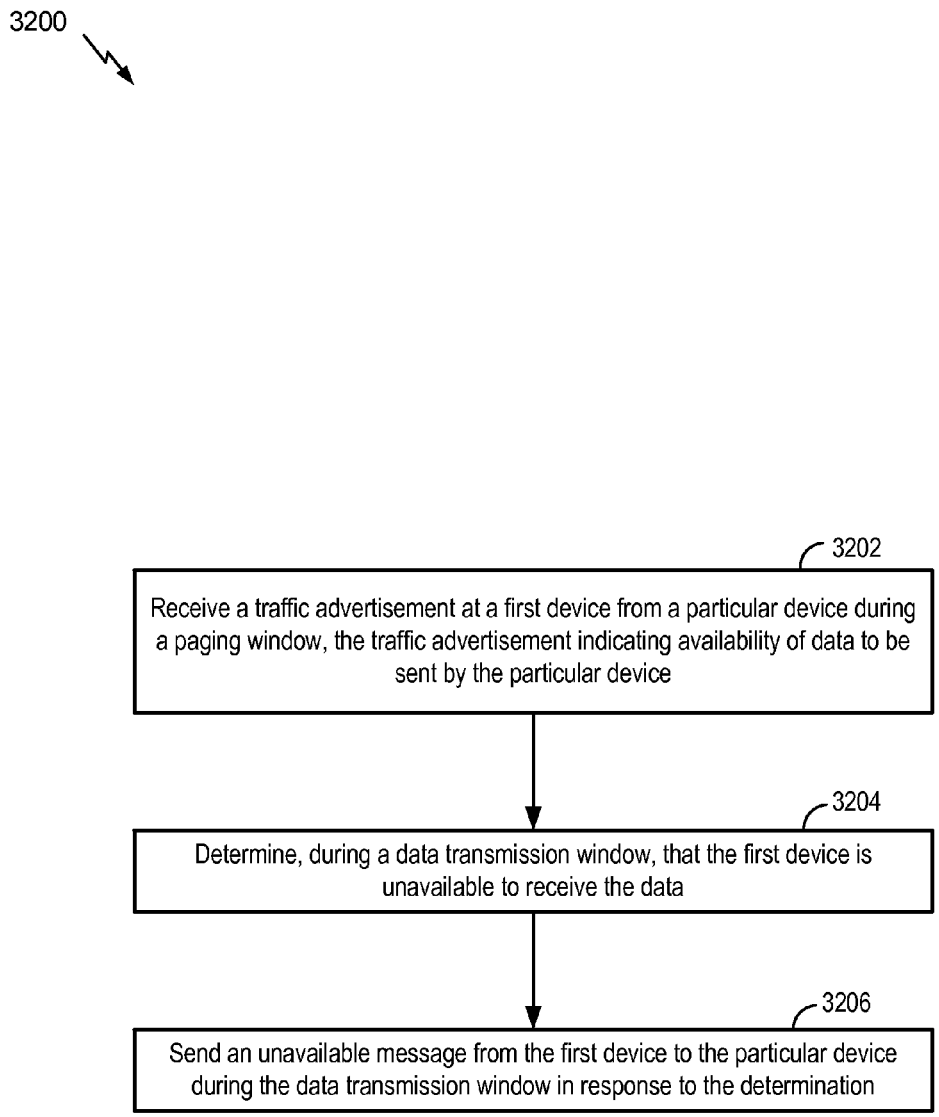
FIG. 32 is a flow diagram of another method of operation at an electronic device of one or more of the systems disclosed herein.

Referring to FIG. 32, a particular example of a method of operation is shown and generally designated 3200. The method 3200 may be performed by the traffic advertisement analyzer 134 of the first subscriber device 106 of FIG. 1, the device 1002 of FIG. 10, or both.

The method 3200 includes receiving a traffic advertisement at a first device from a particular device during a paging window, at 3202. For example, the first subscriber device 106 may receive the traffic advertisement 128 from the provider device 104 during the paging window 212, as described with reference to FIG. 2. The traffic advertisement 128 may indicate availability of data to be sent by the provider device 104.

The method 3200 also includes determining, during a data transmission window, that the first device is unavailable to receive the data, at 3204. For example, the traffic advertisement analyzer 134 of the first subscriber device 106 may determine, during the data transmission window 218, that the first subscriber device 106 is unavailable to receive the data, as described with reference to FIGS. 11-12.

The method 3200 further includes, in response to the determination, at 3204, sending an unavailable message from the first device to the particular device during the data transmission window, at 3206. The traffic advertisement analyzer 134 of the first subscriber device 106 may send the unavailable message 1102 to the provider device 104 during the data transmission window 218 in response to determining that the first subscriber device 106 is unavailable to receive the data, as described with reference to FIGS. 11-12.

The method 3200 may thus enable a subscriber device to send an unavailable message to inform a provider device that the subscriber device is unavailable to receive data. The provider device may conserver network resources by refraining from sending data to the subscriber device in response to receiving the unavailable message.

Figure 33:
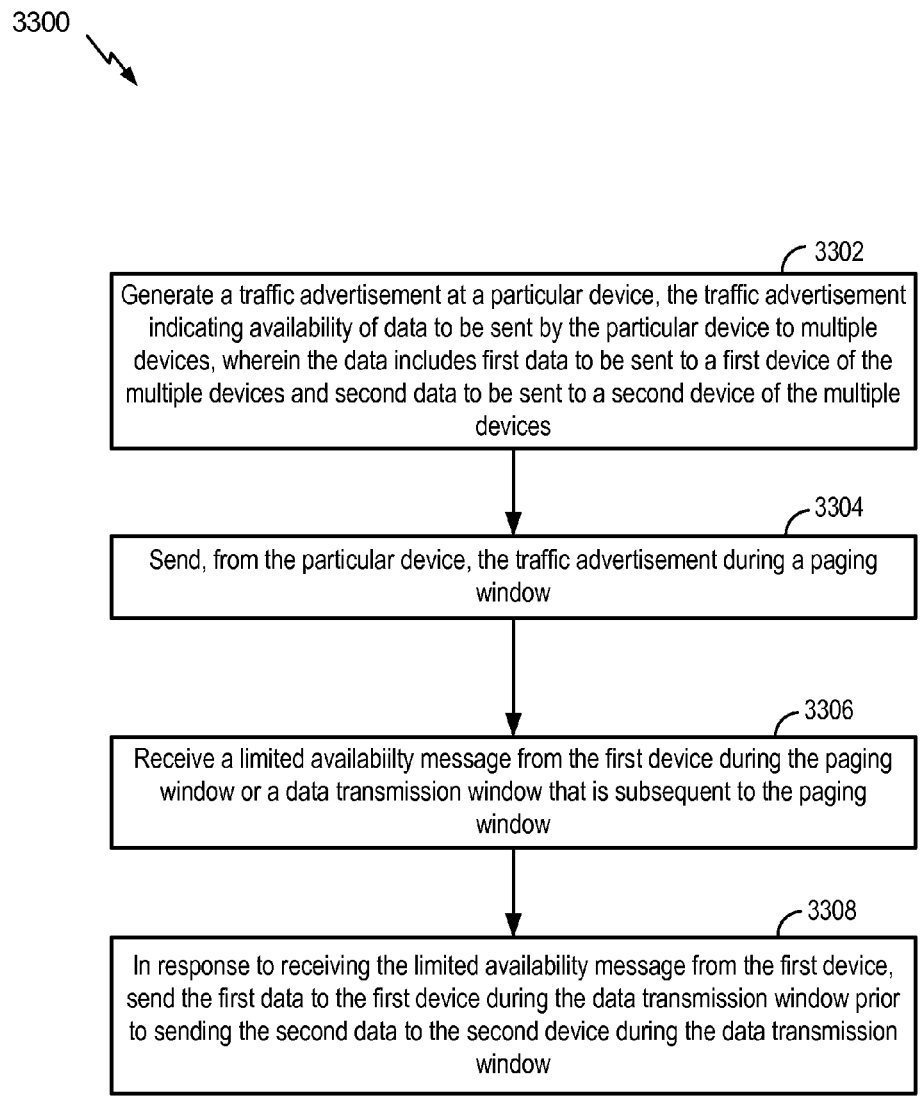
FIG. 33 is a flow diagram of another method of operation at an electronic device of one or more of the systems disclosed herein.

Referring to FIG. 33, a particular example of a method of operation is shown and generally designated 3300. The method 3300 may be performed by the traffic advertisement generator 130 of the provider device 104 of FIG. 1, the device 1002 of FIG. 10, or both.

The method 3300 includes generating a traffic advertisement at a particular device, at 3302. For example, the traffic advertisement generator 130 of the provider device 104 may generate the traffic advertisement 128, as described with reference to FIG. 1. The traffic advertisement 128 may indicate availability of data to be sent by the provider device 104 to multiple devices (e.g., the first subscriber device 106, the second subscriber device 108, the third subscriber device 110 of FIG. 1, or a combination thereof). The data may include first data (e.g., the data 122) to be sent to the first subscriber device 106 and second data (e.g., the data 122) to be sent to the second subscriber device 108. The data 122 sent to be sent to the first subscriber device 106 may be distinct from the data 122 to be sent to the second subscriber device 108.

The method 3300 also includes sending, from the particular device, the traffic advertisement during a paging window, at 3304. For example, the traffic advertisement generator 130 of the provider device 104 may send the traffic advertisement 128 during the paging window 212, as described with reference to FIG. 2.

The method 3300 further includes receiving a limited availability message from the first device during the paging window or a data transmission window that is subsequent to the paging window, at 3306. For example, the traffic advertisement generator 130 of the provider device 104 may receive the limited availability message 1302 from the first subscriber device 106 during the paging window 212, the data transmission window 218, or both, as described with reference to FIGS. 13-14.

The method 3300 also includes, in response to receiving the limited availability message from the first device, send the first data to the first device during the data transmission window prior to sending the second data to the second device during the data transmission window, at 3308. For example, the traffic advertisement generator 130 of the provider device 104 may, in response to receiving the limited availability message 1302 from the first subscriber device 106, send the first data (e.g., the data 122) to the first subscriber device 106 prior to sending the second data (e.g., the data 122) to the second subscriber device 108 during the data transmission window 218, as described with reference to FIGS. 13-14.

The method 3300 may thus enable a provider device to prioritize sending data to a subscriber device in response to receiving a partially available message from the subscriber device. Prioritizing sending the data may increase a likelihood of the subscriber device receiving the data prior to becoming unavailable.

Figure 34:
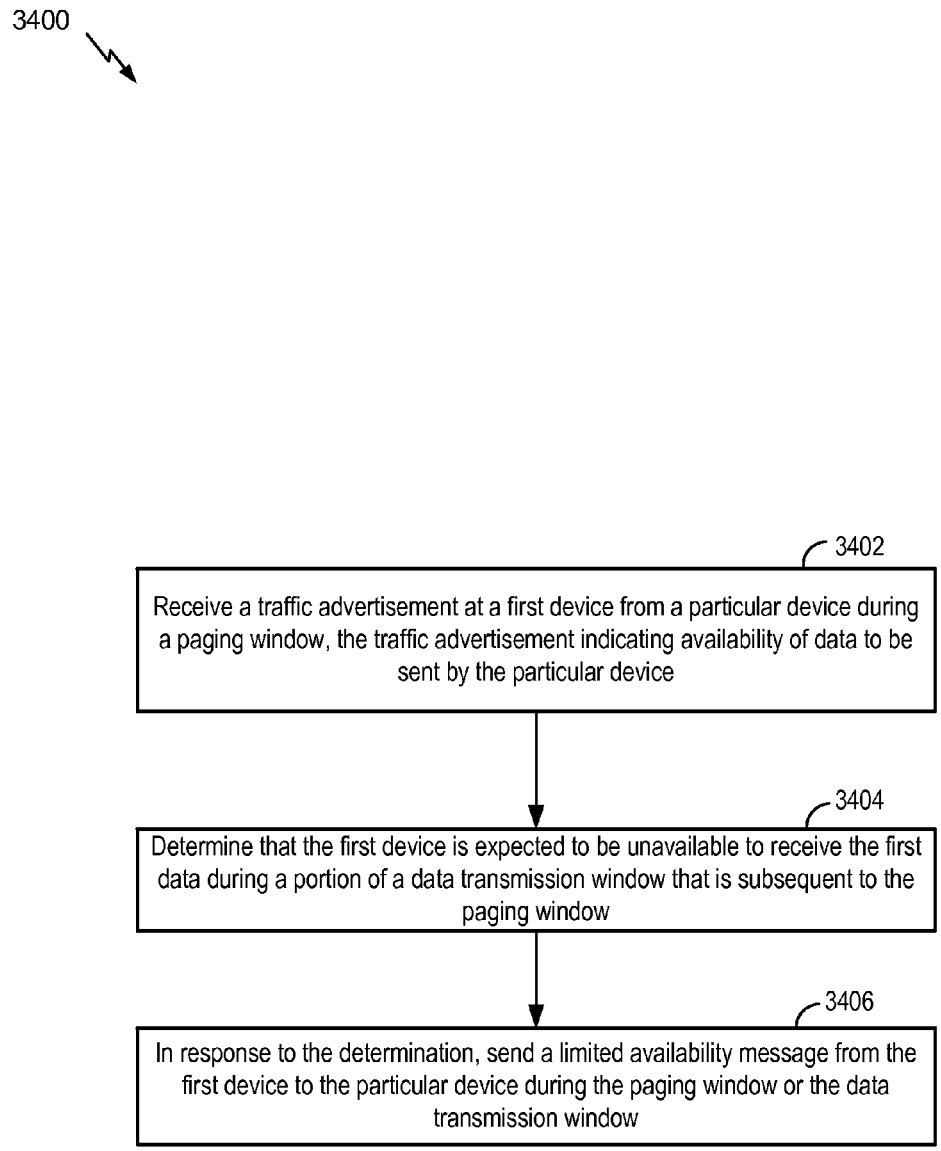
FIG. 34 is a flow diagram of another method of operation at an electronic device of one or more of the systems disclosed herein.

Referring to FIG. 34, a particular example of a method of operation is shown and generally designated 3400. The method 3400 may be performed by the traffic advertisement analyzer 134 of the first subscriber device 106 of FIG. 1, the device 1002 of FIG. 10, or both.

The method 3400 includes receiving a traffic advertisement at a first device from a particular device during a paging window, at 3402. For example, the traffic advertisement analyzer 134 of the first subscriber device 106 may receive the traffic advertisement 128 from the provider device 104 during the paging window 212, as described with reference to FIG. 2. The traffic advertisement 128 may indicate availability of data to be sent by the provider device 104.

The method 3400 also includes determining that the first device is expected to be unavailable to receive the first data during a portion of a data transmission window that is subsequent to the paging window, at 3404. For example, the traffic advertisement analyzer 134 of the first subscriber device 106 may determine that the first subscriber device 106 is expected to be unavailable to receive the first data during at least a portion of the data transmission window 218 that is subsequent to the paging window 212, as described with reference to FIGS. 13-14.

The method 3400 further includes, in response to the determination, at 3404, sending a limited availability message from the first device to the particular device during the paging window or the data transmission window, at 3406. For example, the traffic advertisement analyzer 134 of the first subscriber device 106 may send the limited availability message 1302 to the provider device 104 during the paging window 212 or the data transmission window 218 in response to determining that the first subscriber device 106 is expected to be unavailable to receive the first data, as described with reference to FIGS. 13-14.

The method 3400 may thus increase a likelihood of a subscriber device receiving data during a data transmission window. For example, the subscriber device may send a partially available message to inform a provider device that the subscriber device is unavailable during at least a portion of a data transmission window. The provider device may prioritize sending data to the subscriber device during the data transmission window in response to receiving the partially available message. The subscriber device may receive the data prior to becoming unavailable.

Figure 35:
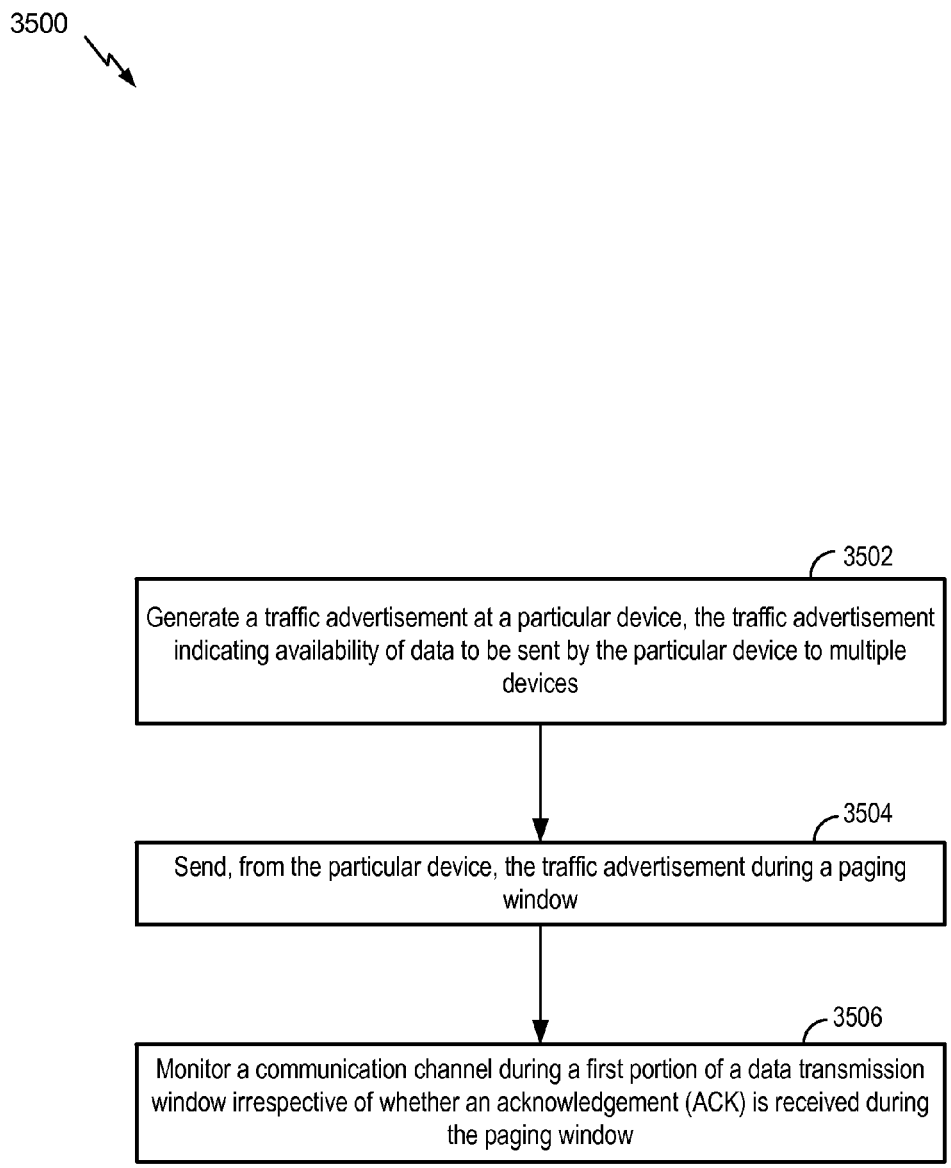
FIG. 35 is a flow diagram of another method of operation at an electronic device of one or more of the systems disclosed herein.

Referring to FIG. 35, a particular example of a method of operation is shown and generally designated 3500. The method 3500 may be performed by the traffic advertisement analyzer 134 of the first subscriber device 106 of FIG. 1, the device 1002 of FIG. 10, or both.

The method 3500 includes generating a traffic advertisement at a particular device, at 3502. For example, the traffic advertisement generator 130 of the provider device 104 may generate the traffic advertisement 128, as described with reference to FIG. 1. The traffic advertisement 128 may indicate availability of data to be sent by the provider device 104 to multiple devices (e.g., the first subscriber device 106, the second subscriber device 108, the third subscriber device 110, or a combination thereof).

The method 3500 also includes sending, from the particular device, the traffic advertisement during a paging window, at 3504. For example, the traffic advertisement generator 130 of the provider device 104 may send the traffic advertisement 128 during the paging window 212, as described with reference to FIG. 2.

The method 3500 further includes monitoring a communication channel during a first portion of a data transmission window irrespective of whether an acknowledgement (ACK) is received during the paging window, at 3506. For example, the traffic advertisement generator 130 may monitor a communication during the trigger slot 214 irrespective of whether the ACK 138 is received during the paging window 212, as described with reference to FIGS. 15-18.

The method 3500 may enable a provider device to send data to a subscriber device irrespective of whether an ACK is received during a paging window. For example, the provider device may monitor a communication channel during a first portion of a data transmission window irrespective of whether an ACK is received during the paging window. The provider device may send the data to the subscriber device in response to receiving a trigger message from the subscriber device during the first portion of the data transmission window.

Figure 36:
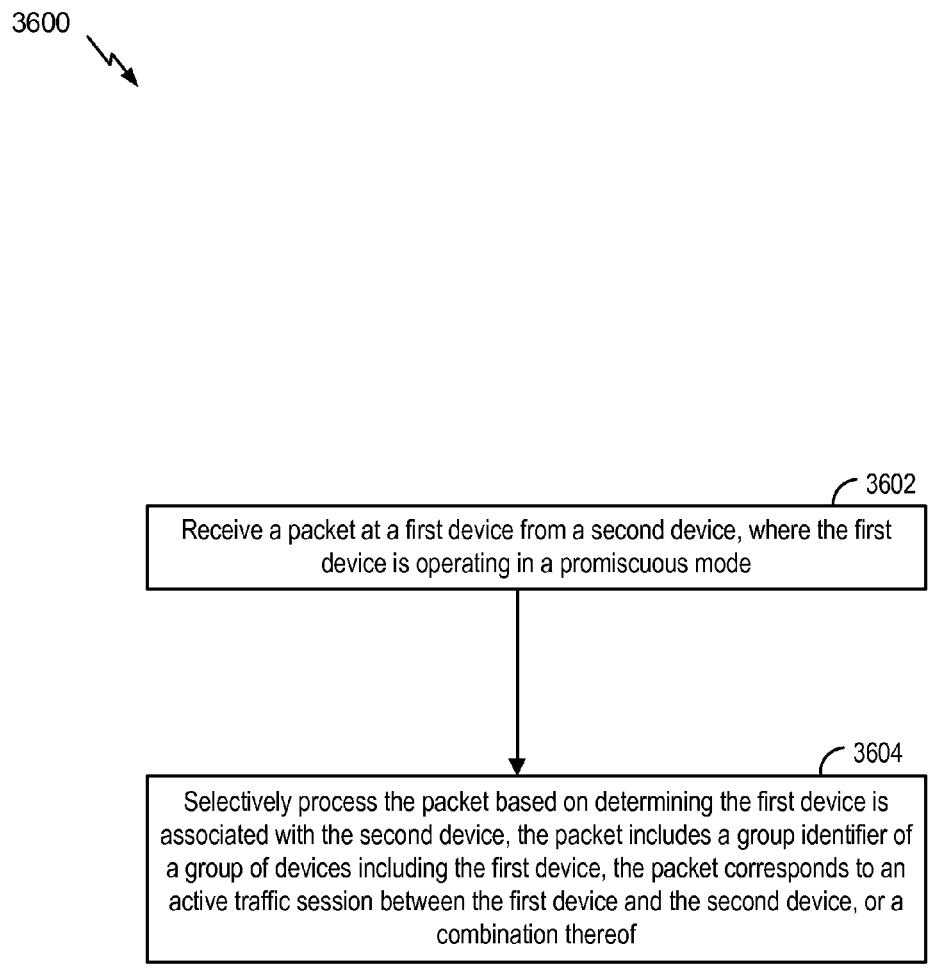
FIG. 36 is a flow diagram of another method of operation at an electronic device of one or more of the systems disclosed herein.

Referring to FIG. 36, a particular aspect of a method of operation is shown and generally designated 3600. In a particular aspect, the method 3600 may be performed by the traffic advertisement analyzer 134, traffic advertisement generator 130, or both, of the device 104-114 of the system 100 of FIG. 1.

The method 3600 includes receiving a packet at a first device from a second device, at 3602. For example, the first subscriber device 106 of FIG. 1 may receive a packet that includes the data 122 from the provider device 104, as described with reference to FIG. 1. The first subscriber device 106 may be operating in a promiscuous mode, as described with reference to FIG. 1.

The method 3600 also includes selectively processing the packet based on determining the first device is associated with the second device, the packet includes a group identifier of a group of devices including the first device, the packet corresponds to an active traffic session between the first device and the second device, or a combination thereof, at 3604. The first subscriber device 106 (e.g., the traffic advertisement analyzer 134) may selectively process the packet (e.g., the data 122) based on determining that the first subscriber device 106 is associated with the provider device 104, the packet includes a group identifier (e.g., a NAN cluster identifier or an NDL group identifier) of a group of devices (e.g., a NAN cluster or an NDL group) that includes the first subscriber device 106, the packet corresponds to an active traffic session between the first subscriber device 106 and the provider device 104, or a combination thereof, as described with reference to FIG. 1. For example, the first subscriber device 106 may process the packet (e.g., the data 122) in response to determining that the first subscriber device 106 is associated with the provider device 104, the packet includes the group identifier (e.g., the NAN cluster identifier or the NDL group identifier), the packet corresponds to an active traffic session between the first subscriber device 106 and the provider device 104, or a combination thereof. Alternatively, the first subscriber device 106 may refrain from processing the packet (e.g., the data 122) in response to determining that the first subscriber device 106 is not associated with the provider device 104, the packet does not include the group identifier (e.g., the NAN cluster identifier or the NDL group identifier), the packet does not correspond to an active traffic session between the first subscriber device 106 and the provider device 104, or a combination thereof.

The method 3600 may thus enable a device to process a packet independently of whether the packet indicates the device as a destination of the packet. The device may selectively process packets based on an association identifier included in the packet, a group identifier included in the packet, whether there is an active traffic session between the device and a sender of the packet, or a combination thereof.

Figure 37:
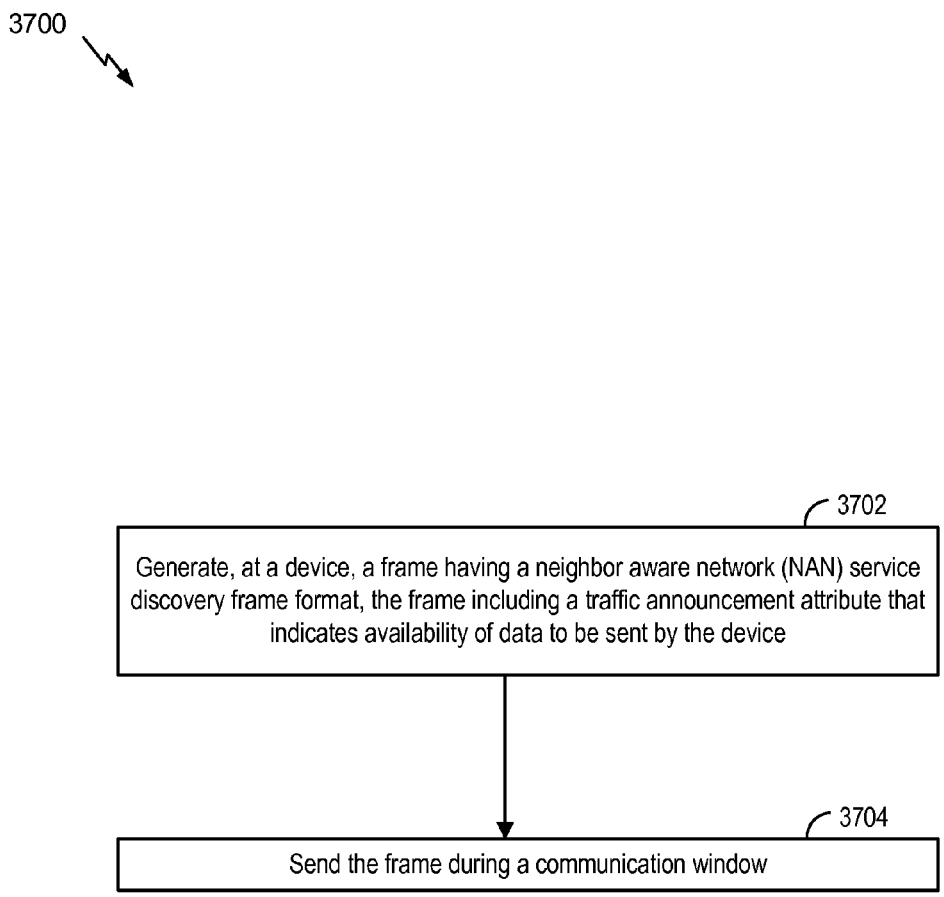
FIG. 37 is a flow diagram of another method of operation at an electronic device of one or more of the systems disclosed herein.

Referring to FIG. 37, a particular aspect of a method of operation is shown and generally designated 3700. In a particular aspect, the method 3700 may be performed by the traffic advertisement generator 130 of the device 104-114 of the system 100 of FIG. 1.

The method 3700 includes generating, at a device, a frame having a neighbor aware network (NAN) service discovery frame format, at 3702. For example, the provider device 104 (e.g., the traffic advertisement generator 130) of FIG. 1 may generate the traffic advertisement 2110 having a NAN service discovery frame format, as described with reference to FIGS. 21-22. The traffic advertisement 2110 may include the traffic announcement attribute 2134 that indicates availability of data to be sent by the provider device 104, as described with reference to FIGS. 21-22.

The method 3700 also includes sending the frame during a communication window, at 3704. For example, the provider device 104 of FIG. 1 may send the traffic advertisement 2110 of FIG. 21 during a communication window.

The method 3700 may thus enable the provider device 104 to send the traffic advertisement 2110 to advertise availability of data to be sent by the provider device 104. A subscriber device may determine whether the provider device 104 has data to send to the subscriber device during a transmission window based on the traffic advertisement 2110.

Figure 38:
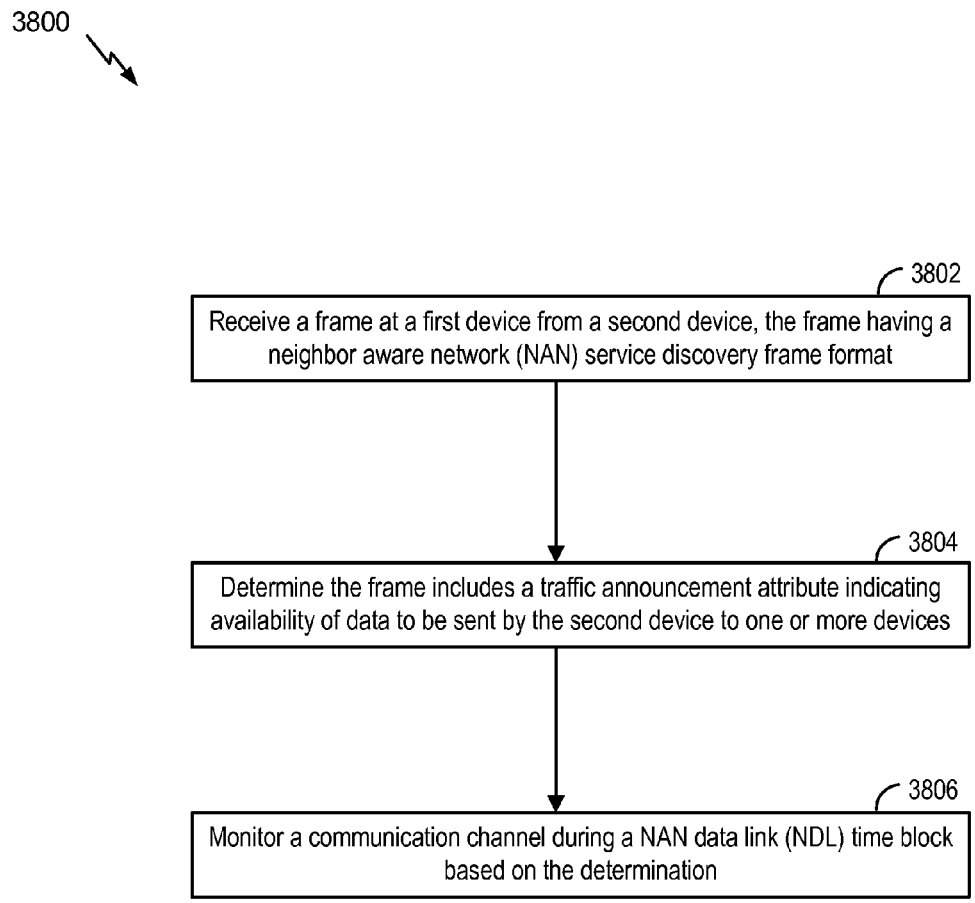
FIG. 38 is a flow diagram of another method of operation at an electronic device of one or more of the systems disclosed herein.

Referring to FIG. 38, a particular aspect of a method of operation is shown and generally designated 3800. In a particular aspect, the method 3800 may be performed by the traffic advertisement generator 130 of the device 104-114 of the system 100 of FIG. 1.

The method 3800 includes receiving a frame at a first device from a second device, at 3802. For example, the first subscriber device 106 (e.g., the traffic advertisement analyzer 134) of FIG. 1 may receive the traffic advertisement 2110 from the provider device 104, as described with reference to FIGS. 21-22. The traffic advertisement 2110 may have a neighbor aware network (NAN) service discovery frame format.

The method 3800 also includes determining the frame includes a traffic announcement attribute indicating availability of data to be sent by the second device to one or more devices, at 3804. For example, the first subscriber device 106 (e.g., the traffic advertisement analyzer 134) of FIG. 1 may determine the traffic advertisement 2110 includes the traffic announcement attribute 2134 indicating availability of data to be sent by the provider device 104 to one or more devices, as described with reference to FIGS. 21-22.

The method 3800 further includes monitoring a communication channel during a NAN data link (NDL) time block based on the determination, at 3806. For example, the first subscriber device 106 (e.g., the traffic advertisement analyzer 134) of FIG. 1 may monitor a communication channel during an NDL time block based on the determination, as described with reference to FIGS. 21-22.

The method 3800 may thus enable a subscriber device to determine whether the provider device 104 has data to send to the subscriber device during an NDL block based on the traffic advertisement 2110. The subscriber device may monitor a communication channel during the NDL block based on the determination.

Figure 39:
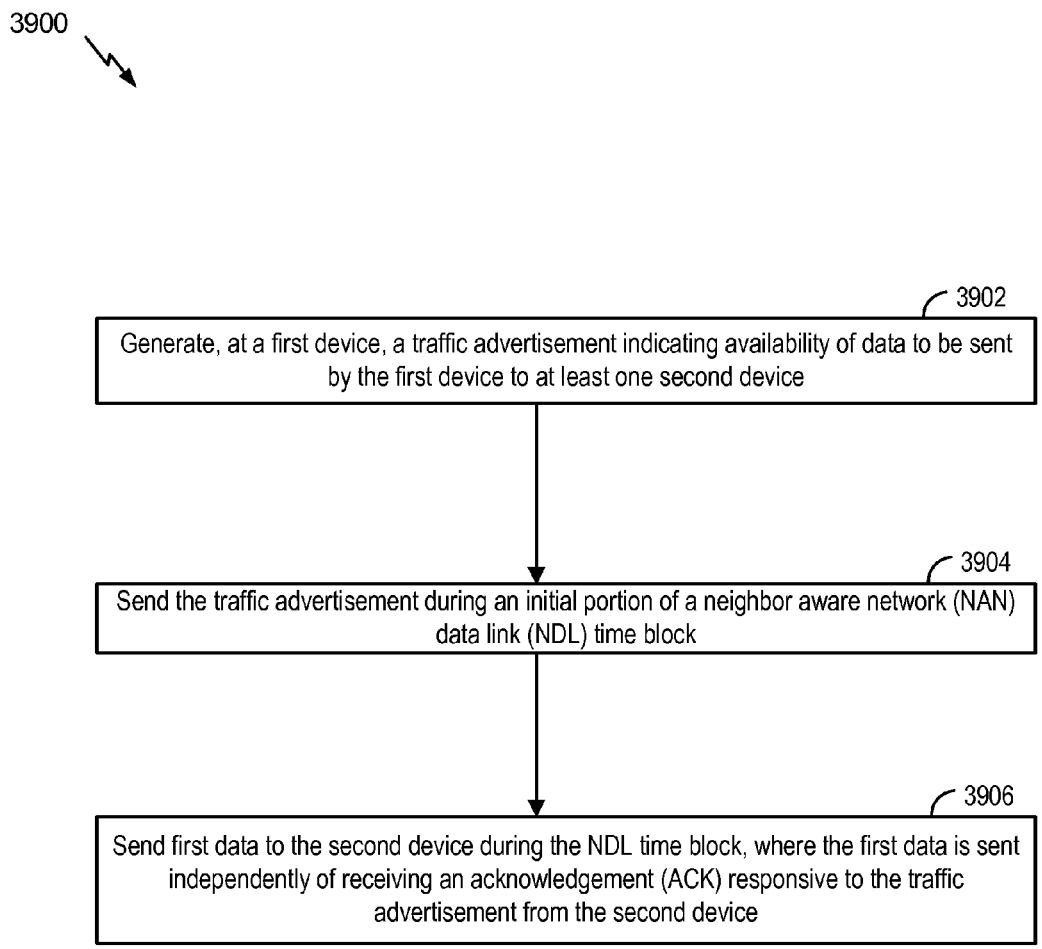
FIG. 39 is a flow diagram of another method of operation at an electronic device of one or more of the systems disclosed herein.

Referring to FIG. 39, a particular aspect of a method of operation is shown and generally designated 3900. In a particular aspect, the method 3900 may be performed by the traffic advertisement generator 130 of the device 104-114 of the system 100 of FIG. 1.

The method 3900 includes generating, at a first device, a traffic advertisement indicating availability of data to be sent by the first device to at least one second device, at 3902. For example, the provider device 104 (e.g., the traffic advertisement generator 130) may generate the traffic advertisement 128 indicating availability of data to be sent by the provider device 104 to at least one second device (e.g., the subscriber devices 106, 108, and 110), as described with reference to FIGS. 1 and 19.

The method 3900 also includes sending the traffic advertisement during an initial portion of a neighbor aware network (NAN) data link (NDL) time block, at 3904. For example, the provider device 104 (e.g., the traffic advertisement generator 130) of FIG. 1 may send the traffic advertisement 128 during an initial portion of an NDL time block.

The method 3900 further includes sending first data to the second device during the NDL time block, at 3906. For example, the provider device 104 (e.g., the traffic advertisement generator 130) may send the data 122 to the first subscriber device 106 during the NDL time block, as described with reference to FIG. 19. The data 122 may be sent independently of receiving the ACK 138 responsive to the traffic advertisement 128 from the first subscriber device 106.

The method 3900 may thus enable the provider device 104 to use the entire NDL block to send the traffic advertisement 128, the data 122, or both. The provider device 104 may send the data 122 earlier in the NDL block without waiting to receive the ACK 138.

Figure 40:
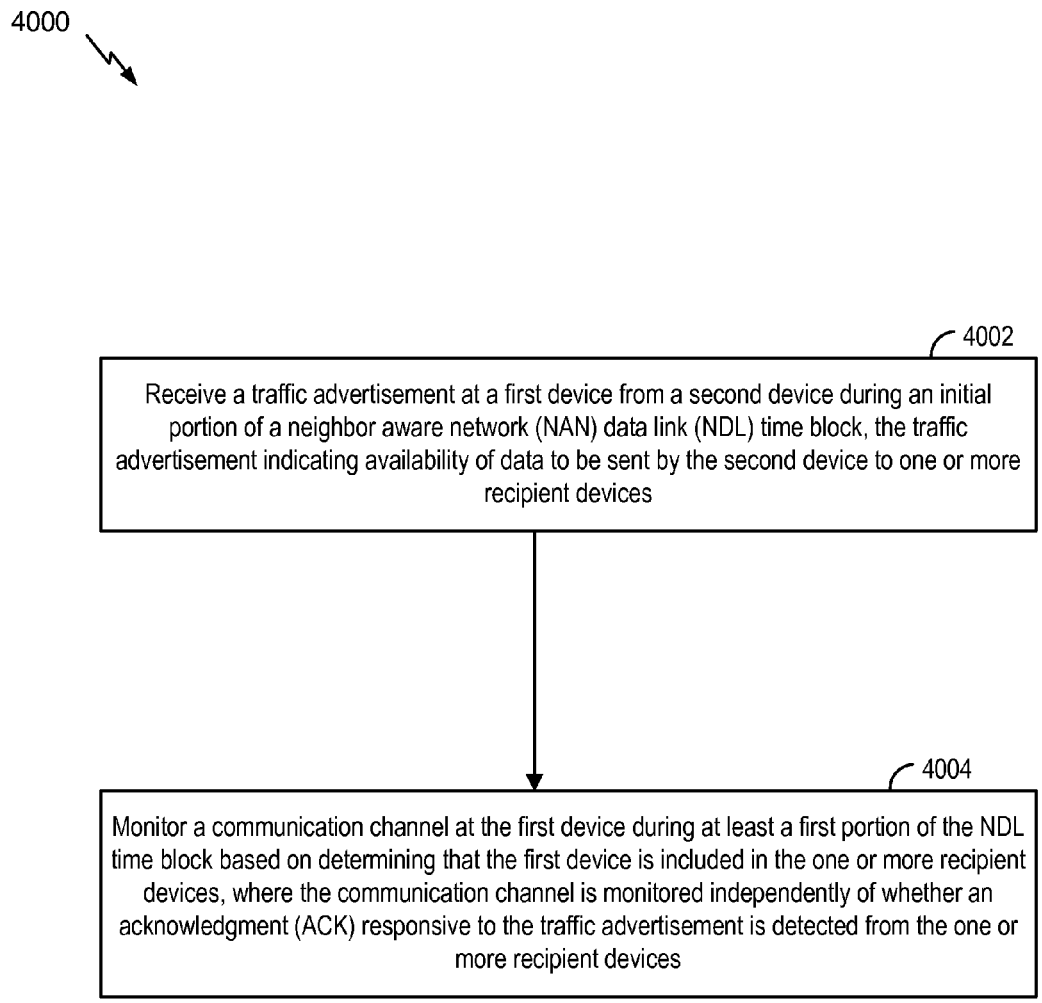
FIG. 40 is a flow diagram of another method of operation at an electronic device of one or more of the systems disclosed herein.

Referring to FIG. 40, a particular aspect of a method of operation is shown and generally designated 4000. In a particular aspect, the method 4000 may be performed by the traffic advertisement analyzer 134 of the device 104-114 of the system 100 of FIG. 1.

The method 4000 includes receiving a traffic advertisement at a first device from a second device during an initial portion of a neighbor aware network (NAN) data link (NDL) time block, at 4002. For example, the first subscriber device 106 (e.g., the traffic advertisement analyzer 134) may receive the traffic advertisement 128 from the provider device 104 during an initial portion of an NDL time block, as described with reference to FIG. 1. The traffic advertisement 128 may indicate availability of data to be sent by the provider device 104 to one or more recipient devices (e.g., the subscriber devices 106, 108, and 110).

The method 4000 also includes monitoring a communication channel at the first device during at least a first portion of the NDL block based on determining that the first device is included in the one or more recipient devices, at 4004. For example, the first subscriber device 106 may monitor a communication channel during at least a first portion of the NDL block based on determining that the first subscriber device 106 is included in the one or more recipient devices, as described with reference to FIG. 19. The communication channel may be monitored independently of whether the ACK 138 responsive to the traffic advertisement 128 is detected from the one or more recipient devices (e.g., the subscriber devices 106, 108, and 110).

Figure 41:
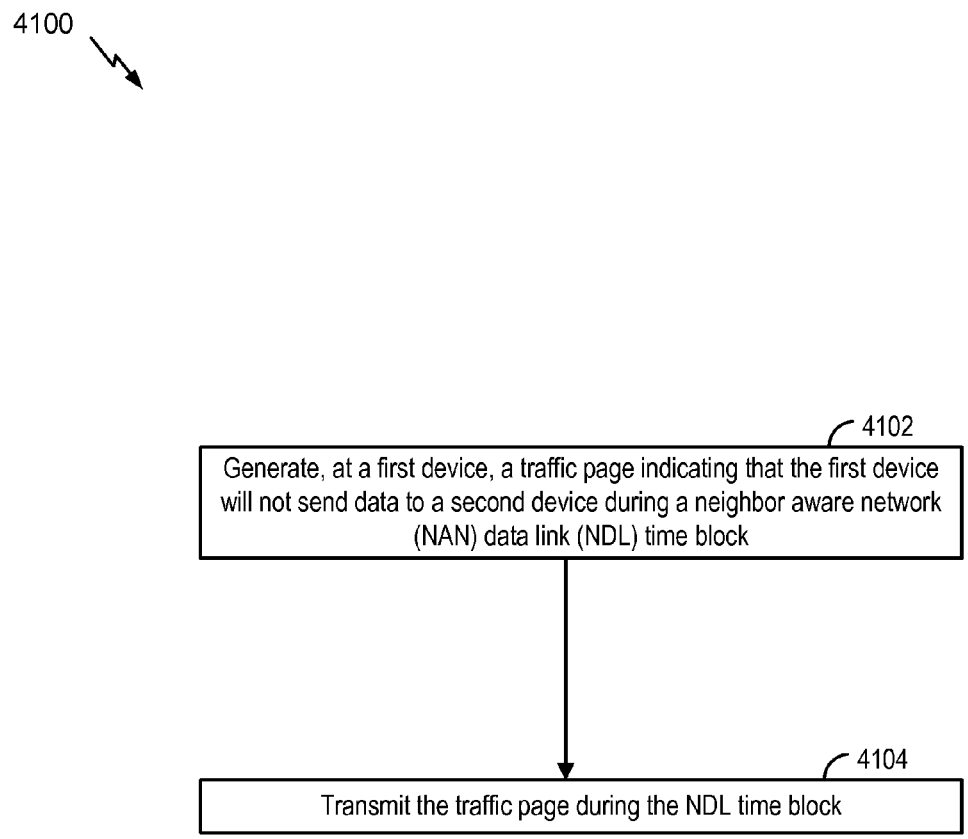
FIG. 41 is a flow diagram of another method of operation at an electronic device of one or more of the systems disclosed herein.

Referring to FIG. 41, a particular aspect of a method of operation is shown and generally designated 4100. In a particular aspect, the method 4100 may be performed by the traffic advertisement generator 130 of the device 104-114 of the system 100 of FIG. 1.

The method 4100 includes generating, at a first device, a traffic page indicating that the first device will not send data to a second device during a neighbor aware network (NAN) data link (NDL) time block, at 4102. For example, the provider device 104 (e.g., the traffic advertisement generator 130) of FIG. 1 may send the traffic page 1932 indicating that the provider device 104 will not send data to the fourth subscriber device 112 during an NDL time block, as described with reference to FIG. 19.

The method 4100 also includes transmitting the traffic page during the NDL time block, at 4104. For example, the provider device 104 (e.g., the traffic advertisement generator 130) of FIG. 1 may transmit the traffic page 1932 during the NDL time block.

The method 4100 may thus enable the provider device 104 to send the traffic page 1932 to indicate that the provider device 104 will not send data to one or more non-recipient devices during an NDL time block. A subscriber device may monitor a communication channel during the NDL time block prior to receiving the traffic page 1932. The subscriber device may transition to an inactive mode during a remaining portion of the NDL time block in response to determining that the traffic page 1932 indicates that that the non-recipient devices include the subscriber device. In a particular aspect, the subscriber device may not receive the traffic page 1932 and may monitor the communication channel during the NDL time block. The provider device 104 may use the entire NDL time block to send the data 122.

Figure 42:
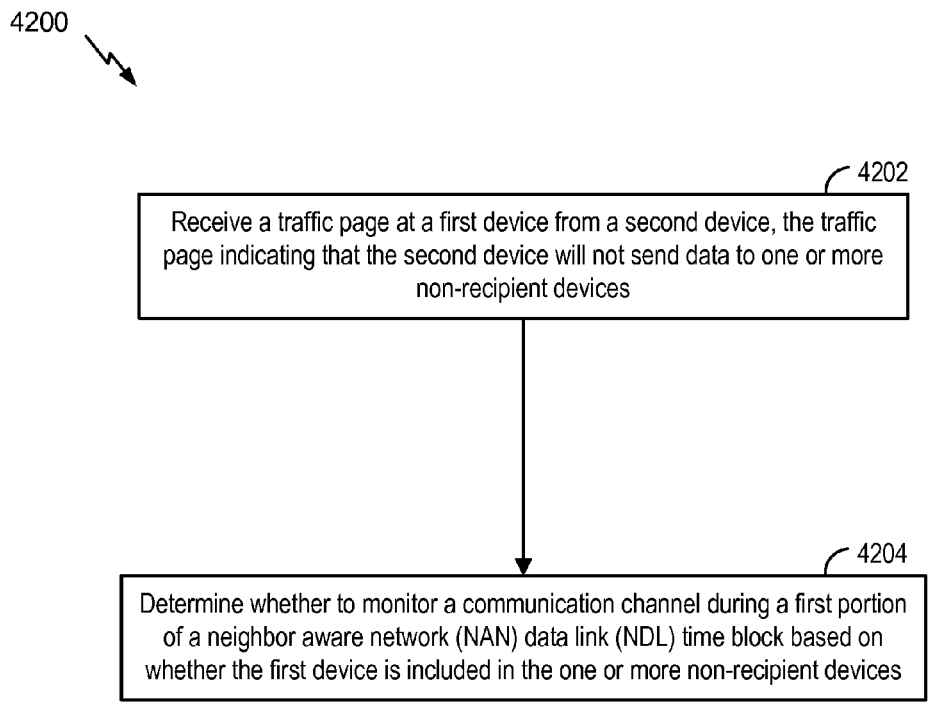
FIG. 42 is a flow diagram of another method of operation at an electronic device of one or more of the systems disclosed herein.

Referring to FIG. 42, a particular aspect of a method of operation is shown and generally designated 4200. In a particular aspect, the method 4200 may be performed by the traffic advertisement analyzer 134 of the device 104-114 of the system 100 of FIG. 1.

The method 4200 includes receiving a traffic page at a first device from a second device, at 4202. For example, the first subscriber device 106 (e.g., the traffic advertisement analyzer 134) of FIG. 1 may receive the traffic page 1932 from the provider device 104, as described with reference to FIG. 19. The traffic page 1932 may indicate that the provider device 104 will not send data to one or more non-recipient devices (e.g., the fourth subscriber device 112).

The method 4200 also includes determining whether to monitor a communication channel during a first portion of a neighbor aware network (NAN) data link (NDL) time block based on whether the first device is included in the one or more non-recipient devices, at 4204. For example, the first subscriber device 106 (e.g., the traffic advertisement analyzer 134) of FIG. 1 may determine whether to monitor a communication channel during a first portion of an NDL time block based on whether the first subscriber device 106 is included in the one or more non-recipient devices, as described with reference to FIG. 20.

The method 4200 may enable a subscriber device to determine whether to monitor a communication channel during an NDL time block based on receiving the traffic page 1932 from the provider device 104. The traffic page 1932 may indicate that the provider device 104 will not send data to one or more non-recipient devices. The subscriber device may determine whether to monitor the communication channel based on whether the non-recipient devices include the subscriber device.

Figure 43:
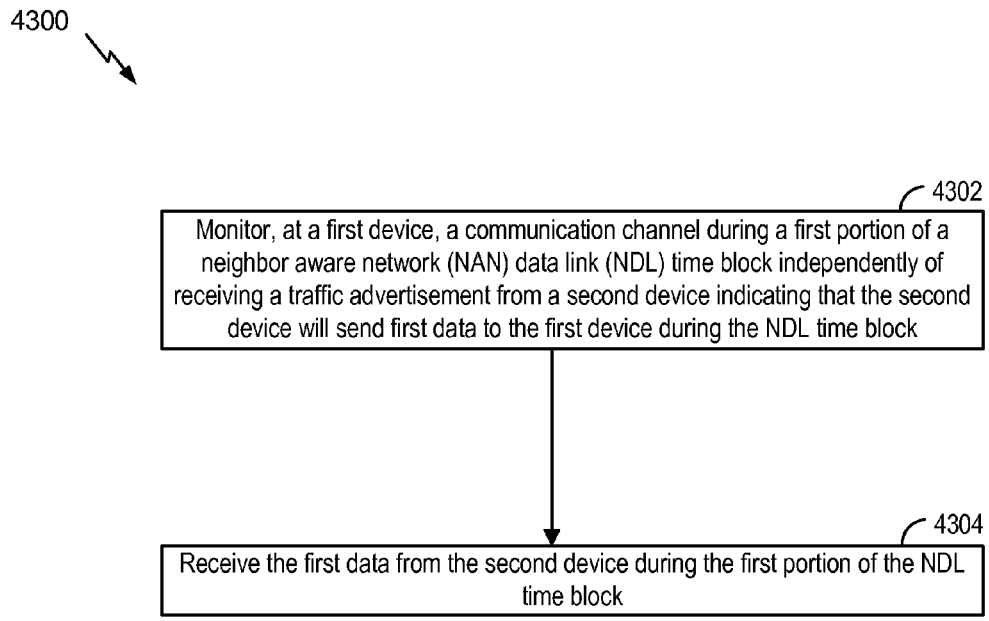
FIG. 43 is a flow diagram of another method of operation at an electronic device of one or more of the systems disclosed herein.

Referring to FIG. 43, a particular aspect of a method of operation is shown and generally designated 4300. In a particular aspect, the method 4300 may be performed by the traffic advertisement analyzer 134 of the device 104-114 of the system 100 of FIG. 1.

The method 4300 includes monitoring, at a first device, a communication channel during a first portion of a neighbor aware network (NAN) data link (NDL) time block independently of receiving a traffic advertisement from a second device indicating that the second device will send first data to the first device during the transmission window, at 4302. For example, the first subscriber device 106 (e.g., the traffic advertisement analyzer 134) of FIG. 1 may monitor a communication channel during a first portion of an NDL time block independently of receiving the traffic advertisement 128 from the provider device 104, as described with reference to FIG. 20. The traffic advertisement 128 may indicate that the provider device 104 will send data to the first subscriber device 106 during the transmission window.

The method 4300 also includes receiving the first data from the second device during the first portion of the NDL time block, at 4304. For example, the first subscriber device 106 (e.g., the traffic advertisement analyzer 134) of FIG. 1 may receive the data 122 form the provider device 104 during the first portion of the NDL time block.

The method 4300 may thus enable a subscriber device to receive data from the provider device 104 independently of receiving a traffic advertisement from the provider device 104. The provider device 104 may not send the traffic advertisement and use the entire NDL time block to send the data 122.

Figure 44:
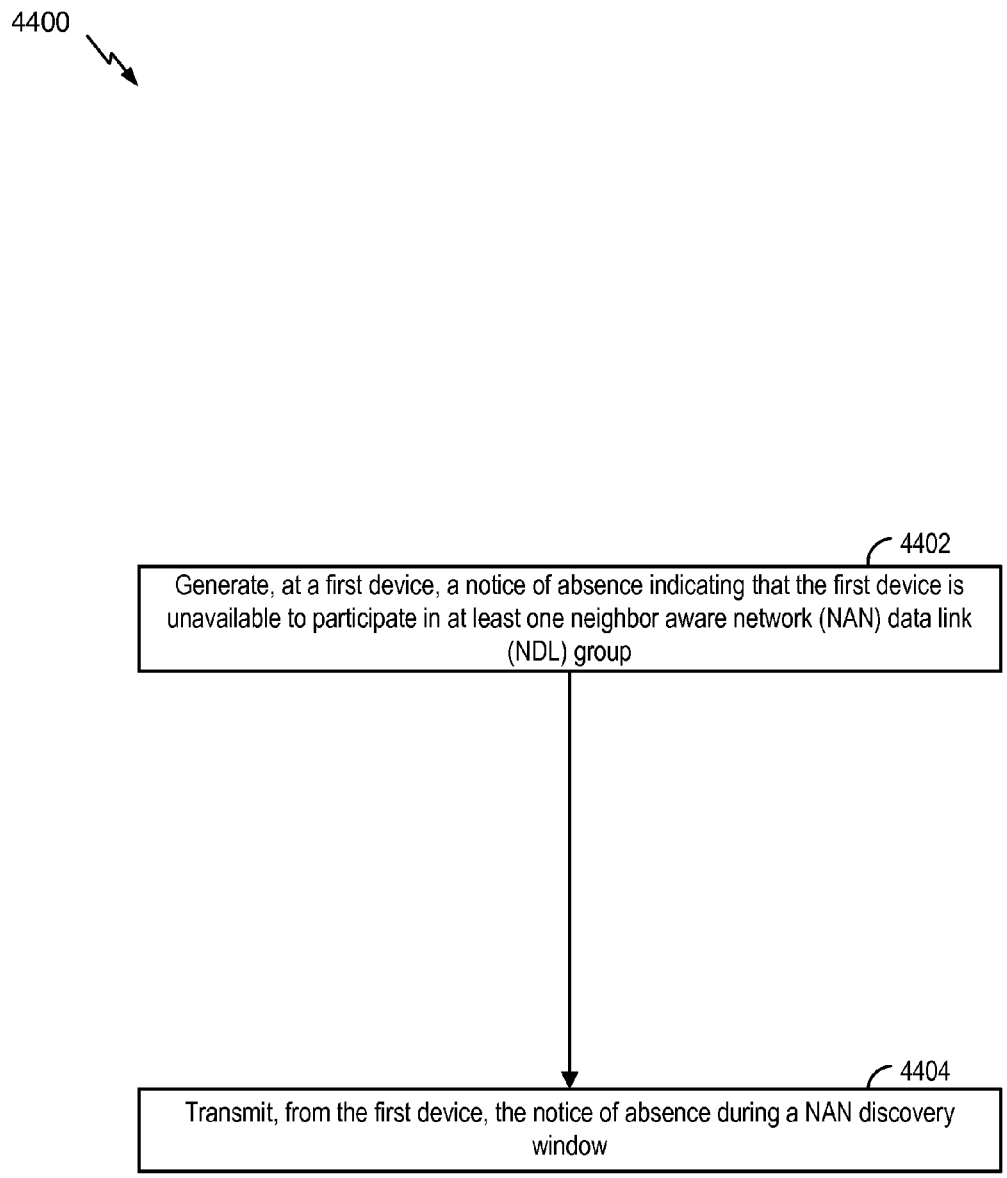
FIG. 44 is a flow diagram of another method of operation at an electronic device of one or more of the systems disclosed herein.

Referring to FIG. 44, a particular aspect of a method of operation is shown and generally designated 4400. In a particular aspect, the method 4400 may be performed by the traffic advertisement generator 130, the traffic advertisement analyzer 134, or both, of the device 104-114 of the system 100 of FIG. 1.

The method 4400 includes generating, at a first device, a notice of absence indicating that the first device is unavailable to participate in at least one neighbor aware network (NAN) data link (NDL) group, at 4402. For example, the third subscriber device 110 of FIG. 1 may generate the notice of absence 1934 indicating that the third subscriber device 110 is unavailable to participate in at least one NDL group, as described with reference to FIG. 19.

The method 4400 also includes transmitting, from the first device, the notice of absence during a NAN discovery window, at 4404. For example, the third subscriber device 110 of FIG. 1 may transmit the notice of absence 1934 during a NAN discovery window, as described with reference to FIG. 19.

The method 4400 may thus enable a device to send information indicating that the device is unavailable to participate in at least one NDL group. Other devices may refrain from sending data associated with the at least one NDL group to the device in response to receiving the information.

Figure 45:
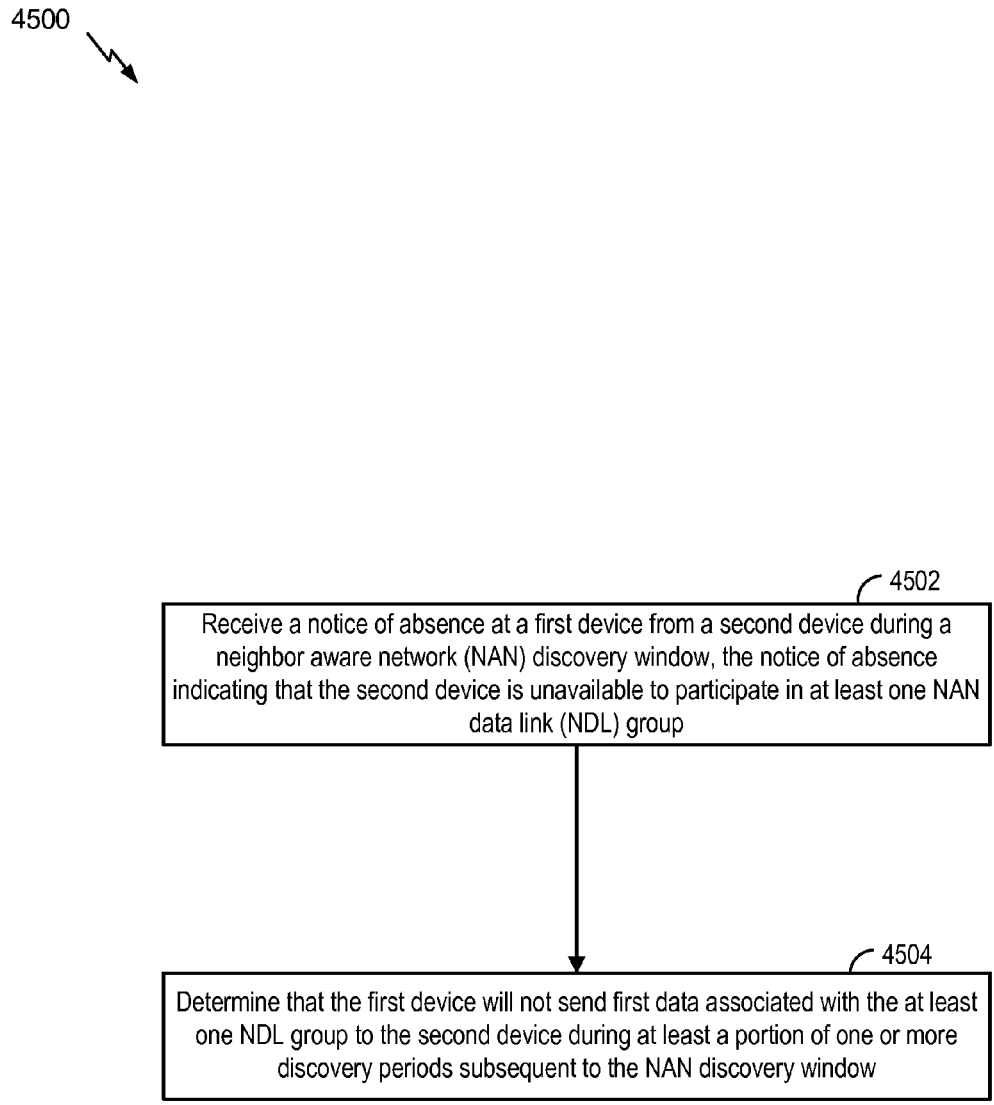
FIG. 45 is a flow diagram of another method of operation at an electronic device of one or more of the systems disclosed herein.

Referring to FIG. 45, a particular aspect of a method of operation is shown and generally designated 4500. In a particular aspect, the method 4500 may be performed by the traffic advertisement generator 130, the traffic advertisement analyzer 134, or both, of the device 104-114 of the system 100 of FIG. 1.

The method 4500 includes receiving a notice of absence at a first device from a second device during a neighbor aware network (NAN) discovery window, at 4502. For example, the provider device 104 of FIG. 1 may receive the notice of absence 1934 from the third subscriber device 110 during the NAN discovery window, as described with reference to FIG. 19. The notice of absence 1934 may indicate that the third subscriber device 110 is unavailable to participate in at least one NAN data link (NDL) group.

The method 4500 also includes determining that the first device will not send first data associated with the at least one NDL group to the second device during at least a portion of one or more discovery intervals subsequent to the NAN discovery window, at 4504. For example, the provider device 104 of FIG. 1 may determine that first data associated with the at least one NDL group is not to be sent to the third subscriber device 110 during at least a portion of a first discovery interval subsequent to the NAN discovery window, as described with reference to FIG. 19. As another example, the provider device 104 of FIG. 1 may determine that first data associated with the at least one NDL group is not to be sent to the third subscriber device 110 during multiple discovery intervals subsequent to the NAN discovery window.

The method 4500 may thus enable a first device to receive a notice of absence from a second device indicating that the second device is unavailable to participate in at least one NDL group. The first device may refrain from sending data associated with the at least one NDL group to the second device based on the notice of absence.

Figure 46:
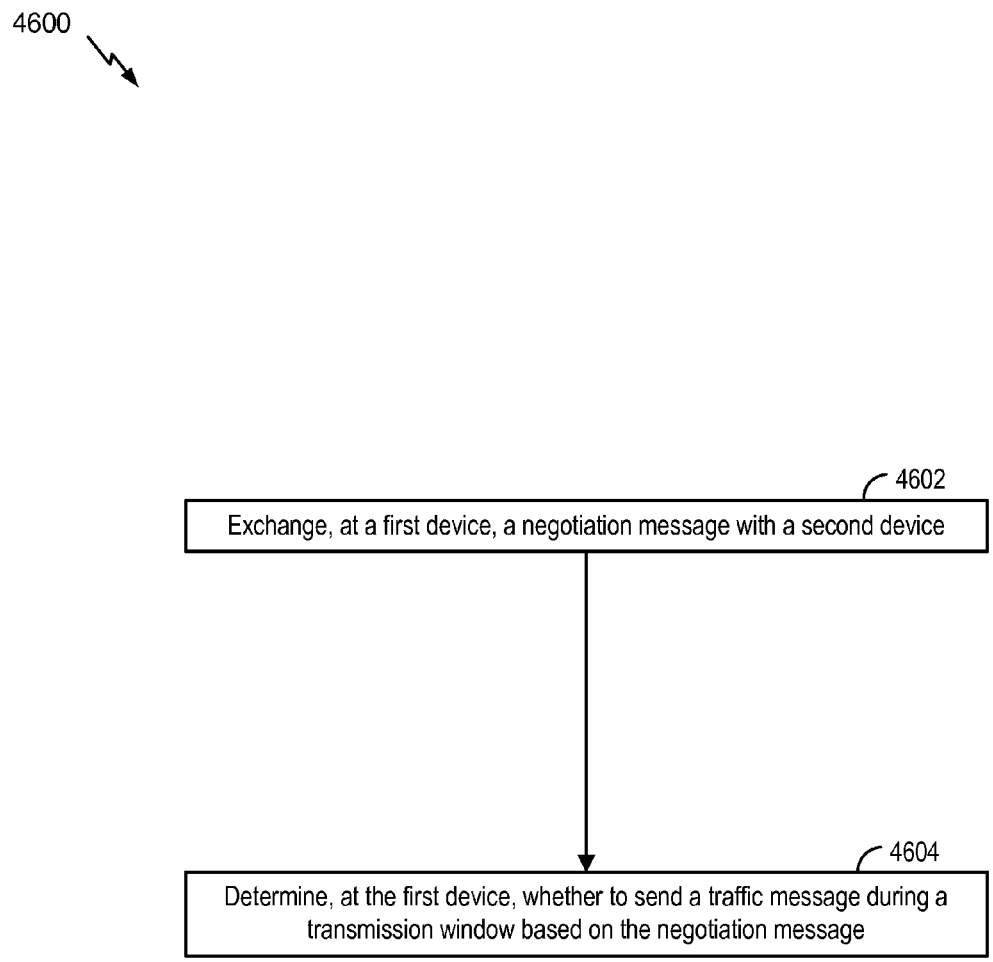
FIG. 46 is a flow diagram of another method of operation at an electronic device of one or more of the systems disclosed herein.

Referring to FIG. 46, a particular aspect of a method of operation is shown and generally designated 4600. In a particular aspect, the method 4600 may be performed by the traffic advertisement generator 130 of the device 104-114 of the system 100 of FIG. 1.

The method 4600 includes exchanging, at a first device, a negotiation message with a second device, at 4602. For example, the provider device 104 of FIG. 1 may exchange a negotiation message (e.g., the first negotiation message 1928, the second negotiation message 1938, or both) with the first subscriber device 106, as described with reference to FIG. 19.

The method 4600 also includes determining, at the first device, whether to send a traffic message during a transmission window based on the negotiation message, at 4604. For example, the provider device 104 of FIG. 1 may determine whether to send the traffic message 1930 during a transmission window based on the negotiation message (e.g., the first negotiation message 1928, the second negotiation message 1938, or both).

The method 4600 may thus enable a first device to negotiate with another device as to whether traffic messages are to be exchanged during a transmission window. The first device may send a traffic message to a second device in response to determining that a negotiation message indicates that traffic messages are to be exchanged. For example, a negotiation message including a power save request may indicate that traffic messages are to be exchanged during the transmission window.

Figure 47:
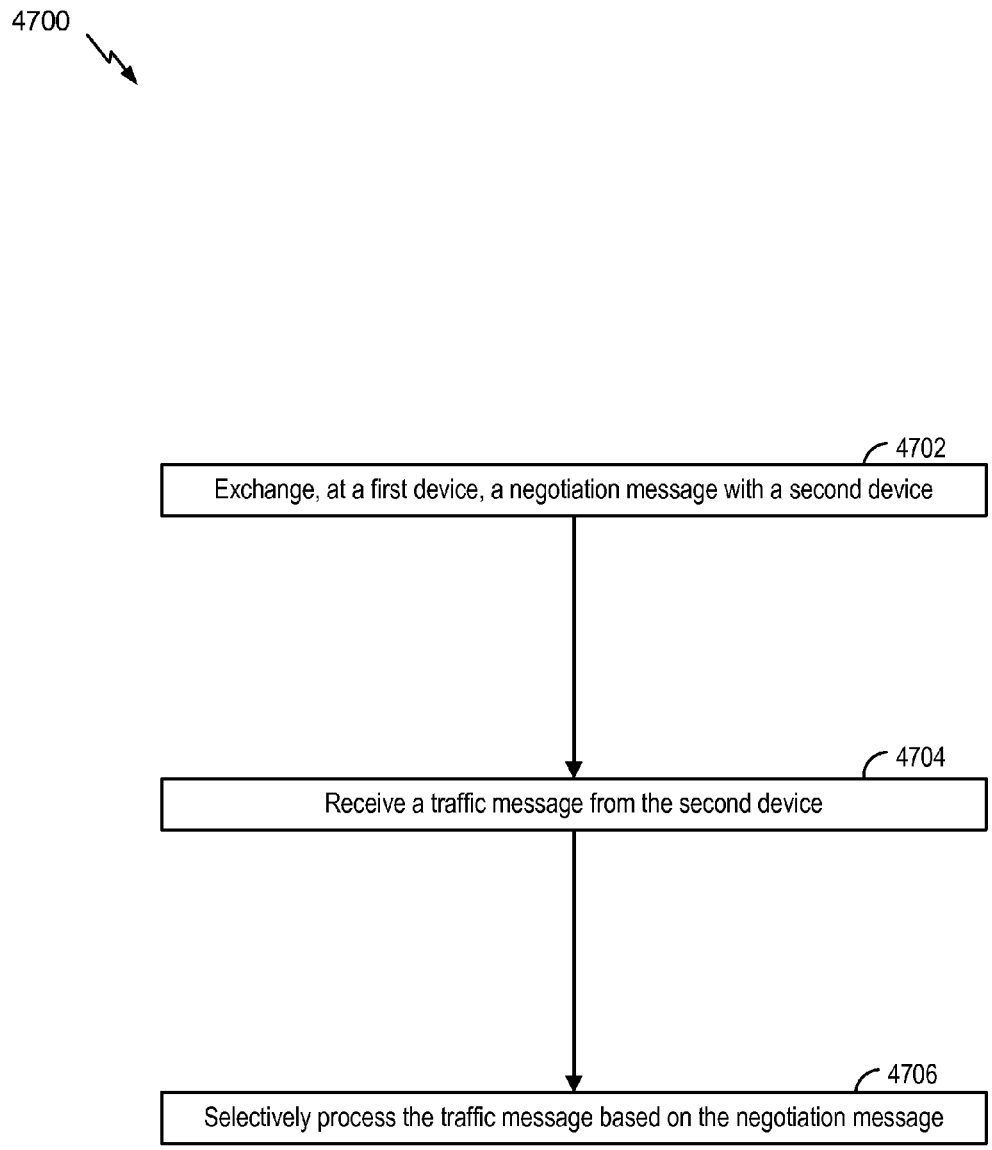
FIG. 47 is a flow diagram of another method of operation at an electronic device of one or more of the systems disclosed herein.

Referring to FIG. 47, a particular aspect of a method of operation is shown and generally designated 4700. In a particular aspect, the method 4700 may be performed by the traffic advertisement analyzer 134 of the device 104-114 of the system 100 of FIG. 1.

The method 4700 includes exchanging, at a first device, a negotiation message with a second device, at 4702. For example, the first subscriber device 106 of FIG. 1 may exchange a negotiation message (e.g., the first negotiation message 1928, the second negotiation message 1938, or both) with the provider device 104, as described with reference to FIG. 19.

The method 4700 also includes receiving a traffic message from the second device, at 4704. For example, the first subscriber device 106 of FIG. 1 may receive the traffic message 1930 from the provider device 104, as described with reference to FIG. 19.

The method 4700 further includes selectively processing the traffic message based on the negotiation message, at 4706. For example, the first subscriber device 106 of FIG. 1 may selectively process the traffic message 1930 based on the negotiation message (e.g., the first negotiation message 1928, the second negotiation message 1938, or both). To illustrate, the first subscriber device 106 may process the traffic message 1930 in response to determining that the negotiation message (e.g., the first negotiation message 1928, the second negotiation message 1938, or both) indicates a power save request, as described with reference to FIG. 19. Alternatively, the first subscriber device 106 may refrain from processing the traffic message 1930 in response to determining that the negotiation message (e.g., the first negotiation message 1928, the second negotiation message 1938, or both) does not indicate a power save request, as described with reference to FIG. 19.

The method 4700 may thus enable a first device to negotiate with another device as to whether traffic messages are to be exchanged during a transmission window. The first device may refrain from processing a traffic message in response to determining that a negotiation message indicates that traffic messages are not to be exchanged during the transmission window.

Figure 48:
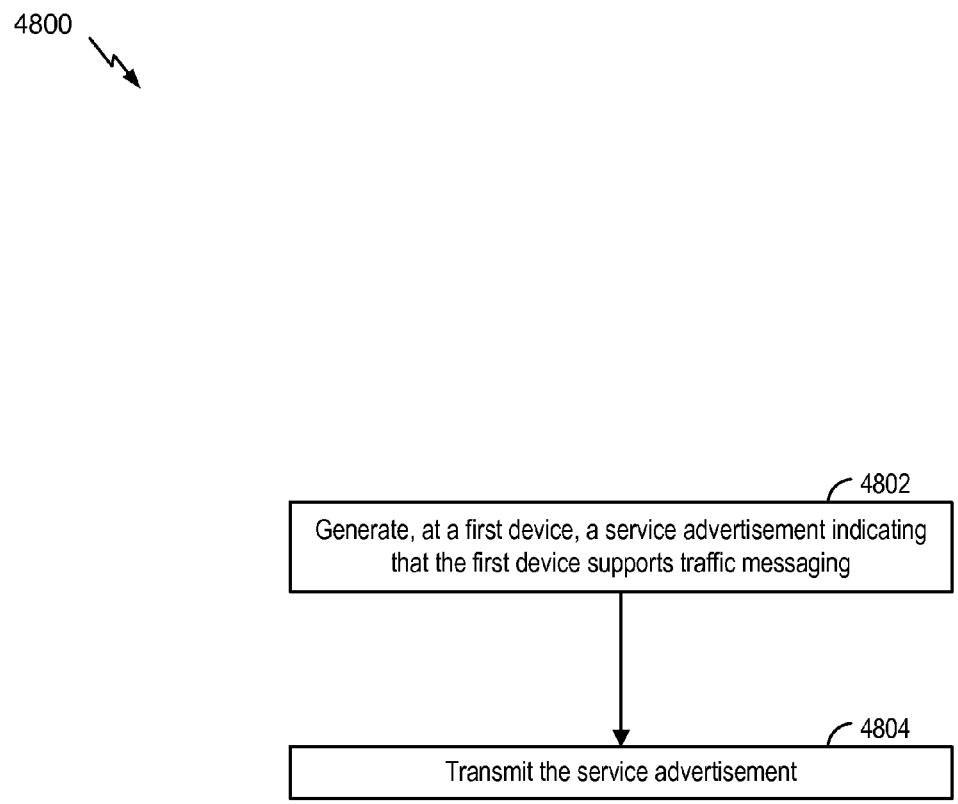
FIG. 48 is a flow diagram of another method of operation at an electronic device of one or more of the systems disclosed herein.

Referring to FIG. 48, a particular aspect of a method of operation is shown and generally designated 4800. In a particular aspect, the method 4800 may be performed by the traffic advertisement generator 130 of the device 104-114 of the system 100 of FIG. 1.

The method 4800 includes generating, at a first device, a service advertisement indicating that the first device supports traffic messaging, at 4802. For example, the provider device 104 of FIG. 1 may generate a service advertisement indicating that the provider device 104 supports traffic messaging, as described with reference to FIG. 19.

The method 4800 also includes transmitting the service advertisement, at 4804. For example, the provider device 104 of FIG. 1 may transmit the service advertisement.

The method 4800 may thus enable a first device to advertise whether the first device supports traffic messaging associated with a particular service. Another device may determine whether to participate in a particular NDL group corresponding to the particular service based on whether the first device supports traffic messaging associated with the particular service.

Figure 49:
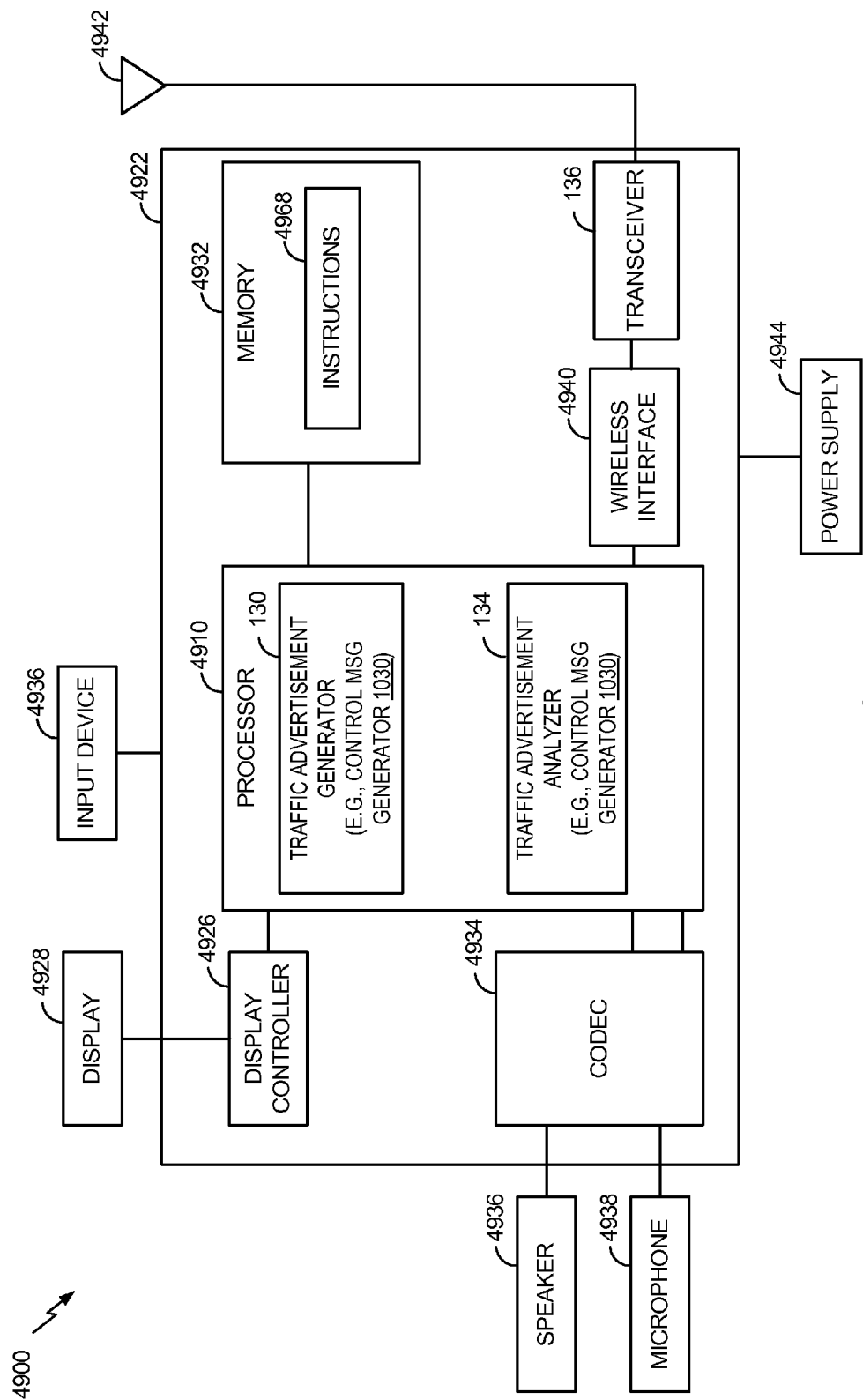
FIG. 49 is a diagram of a wireless device that is operable to support various aspects of one or more methods, systems, apparatuses, and computer-readable media disclosed herein.

Referring to FIG. 49, a particular illustrative aspect of a wireless communication device is depicted and generally designated 4900. The device 4900 includes a processor 4910, such as a digital signal processor, coupled to a memory 4932. In an illustrative aspect, the device 4900, or components thereof, may correspond to the device 104-114 of FIG. 1, the device 1002 of FIG. 10A, or components thereof. The processor 4910 may include the traffic advertisement generator 130 (e.g., the control message generator 1030 of FIG. 10A), the traffic advertisement analyzer 134 (e.g., the control message generator 1030 of FIG. 10A), or both.

The processor 4910 may be configured to execute software (e.g., a program of one or more instructions 4968) stored in the memory 4932. Additionally or alternatively, the processor 4910 may be configured to implement one or more instructions stored in a memory of a wireless interface 4940 (e.g., an Institute of Electrical and Electronics Engineers (IEEE) 802.11 compliant interface). For example, the wireless interface 4940 may be configured to operate in accordance with one or more wireless communication standards, including one or more IEEE 802.11 standards and one or more NAN standards. In a particular aspect, the processor 4910 may be configured to perform one or more operations or methods described with reference to FIGS. 1-48. For example, the processor 4910 may be configured to monitor one or more communication channels during one or more associated paging windows, one or more trigger slots, one or more data transmission windows, one or more portions of data transmission windows, or a combination thereof. The processor 4910 may be configured to generate the traffic advertisement 128 of FIG. 1 and to send the traffic advertisement 128 via one or more communication channels. To illustrate, the processor 4910 may be configured to add the traffic advertisement 128 of FIG. 1 to the first transmission queue 1010 of FIG. 10A based on the first access category 1020 of FIG. 10A and may be configured to process the first transmission queue 1010 in an order or at a time based on the first access category 1020. The processor 4910 may be configured to receive the ACK 138 of FIG. 1 via one or more communication channels. The processor 4910 may be configured to send the trigger request 544 of FIG. 1 via one or more communication channels. To illustrate, the processor 4910 may be configured to add the trigger request 544 of FIG. 5 to the first transmission queue 1010 of FIG. 10A based on the first access category 1020 of FIG. 10A and may be configured to process the first transmission queue 1010 in an order or at a time based on the first access category 1020. The processor 4910 may be configured to receive the trigger message 150 of FIG. 1 via one or more communication channels. The processor 4910 may be configured to send the data 122 of FIG. 1 via one or more communication channels. The processor 4910 may be configured to transition to an inactive mode during one or more paging windows, one or more trigger slots, one or more data transmission windows, one or more portions of data transmission windows, or a combination thereof.

As another example, the processor 4910 may be configured to receive the traffic advertisement 128 of FIG. 1 via one or more communication channels. The processor 4910 may be configured to send the ACK 138 of FIG. 1 via one or more communication channels. To illustrate, the processor 4910 may be configured to add the ACK 138 of FIG. 1 to the first transmission queue 1010 of FIG. 10A based on the first access category 1020 of FIG. 10A and may be configured to process the first transmission queue 1010 in an order or at a time based on the first access category 1020. The processor 4910 may be configured to receive the trigger request 544 of FIG. 1 via one or more communication channels. The processor 4910 may be configured to send the trigger message 150 of FIG. 1 via one or more communication channels. To illustrate, the processor 4910 may be configured to add the trigger message 150 of FIG. 1 to the first transmission queue 1010 of FIG. 10A based on the first access category 1020 of FIG. 10A and may be configured to process the first transmission queue 1010 in an order or at a time based on the first access category 1020. The processor 4910 may be configured to receive the data 122 of FIG. 1 via one or more communication channels.

The wireless interface 4940 may be coupled to the processor 4910 and to an antenna 4942. For example, the wireless interface 4940 may be coupled to the antenna 4942 via a transceiver 136, such that wireless data may be received via the antenna 4942 and may be provided to the processor 4910.

A coder/decoder (CODEC) 4934 can also be coupled to the processor 4910. A speaker 4936 and a microphone 4938 can be coupled to the CODEC 4934. A display controller 4926 can be coupled to the processor 4910 and to a display device 4928. In a particular aspect, the processor 4910, the display controller 4926, the memory 4932, the CODEC 4934, and the wireless interface 4940 are included in a system-in-package or system-on-chip device 4922. In a particular aspect, an input device 4930 and a power supply 4944 are coupled to the system-on-chip device 4922. Moreover, in a particular aspect, as illustrated in FIG. 49, the display device 4928, the input device 4930, the speaker 4936, the microphone 4938, the antenna 4942, and the power supply 4944 are external to the system-on-chip device 4922. However, each of the display device 4928, the input device 4930, the speaker 4936, the microphone 4938, the antenna 4942, and the power supply 4944 can be coupled to one or more components of the system-on-chip device 4922, such as one or more interfaces or controllers. In a particular aspect, the device 4900 may include at least one of a communications device, a music player, a video player, an entertainment unit, a navigation device, a personal digital assistant (PDA), a mobile device, a computer, a decoder, or a set top box.

In conjunction with the described aspects, an apparatus includes means for generating a traffic advertisement indicating availability of data to be sent to multiple subscriber devices of a set of subscriber devices of a neighbor aware network (NAN) data path group. For example, the means for generating may include the traffic advertisement generator 130, the device 104-114, the processor 4910 programmed to execute the instructions 4968, one or more other devices, circuits, or modules configured to generate the traffic advertisement, or a combination thereof. The data may include first data to be sent to a first subscriber device of the multiple subscriber devices and second data to be sent to a second subscriber device of the multiple subscriber devices.

The apparatus also includes means for receiving a first acknowledgement (ACK) during a paging window of the NAN data path group from the first subscriber device. For example, the means for receiving may include the transceiver 136, one or more other devices, circuits, or modules configured to receive a first ACK, or a combination thereof.

The apparatus further includes means for transmitting configured to send the traffic advertisement during the paging window, to send the first data to the first subscriber device during a data transmission window of the NAN data path group, and to send the second data to the second subscriber device during the data transmission window. For example, the means for transmitting may include the transceiver 136, one or more other devices, circuits, or modules configured to transmit the traffic advertisement, to send the first data, and to send the second data, or a combination thereof. The second data may be sent without receiving a second ACK from the second subscriber device during the paging window.

Further, in conjunction with the described aspects, an apparatus includes means for receiving configured to receive a traffic advertisement from a provider device of a neighbor aware network (NAN) data path group. For example, the means for receiving may include the transceiver 136, one or more other devices, circuits, or modules configured to receive the traffic advertisement, or a combination thereof. The traffic advertisement indicates that the provider device has data to be sent to multiple subscriber devices of a set of subscriber devices of the NAN data path group.

The apparatus also includes means for subscribing to a service configured to determine whether the apparatus is a leader device of the multiple subscriber devices. For example, the means for subscribing may include the traffic advertisement analyzer 134, the device 104-114, the processor 4910 programmed to execute the instructions 4968, one or more other devices, circuits, or modules configured to determine whether the apparatus is the leader device of the multiple subscriber devices, or a combination thereof.

The apparatus further includes means for transmitting configured to send an acknowledgement (ACK) to the provider device in response to a first determination that the apparatus is the leader device, and to refrain from sending the ACK to the provider device in response to a second determination that the apparatus is not the leader device. For example, the means for transmitting may include the transceiver 136, one or more other devices, circuits, or modules configured to send the ACK in response to the first determination and to refrain from sending the ACK in response to the second determination, or a combination thereof.

Additionally, in conjunction with the described aspects, an apparatus includes means for generating a control message indicating availability of data to be sent to at least one device of a set of devices. For example, the means for generating may include the traffic advertisement generator 130, the traffic advertisement analyzer 134, the device 104-114, the device 1002, the control message generator 1030, the processor 4910 programmed to execute the instructions 4968, one or more other devices, circuits, or modules configured to generate the control message, or a combination thereof. The data may include first data associated with the first access category.

The apparatus also includes means for transmitting the control message upon expiration of a delay period. For example, the means for transmitting may include the transceiver 136, one or more other devices, circuits, or modules configured to send a control message, or a combination thereof. The delay period may be based on the first access category.

Further, in conjunction with the described aspects, an apparatus includes means for receiving a traffic advertisement from a provider device of a neighbor aware network (NAN) data path group. For example, the means for receiving may include the transceiver 136, one or more other devices, circuits, or modules configured to receive the traffic advertisement, or a combination thereof. The traffic advertisement may indicate availability of data to be sent by the provider device. The data may include first data associated with a first access category.

The apparatus also includes means for generating a control message based on the traffic advertisement, the means for generating configured to determine a first delay based on the first access category in response to determining that transmission of the control message is to be delayed. For example, the means for generating may include the traffic advertisement analyzer 134, the device 104-114, the device 1002, the control message generator 1030, the processor 4910 programmed to execute the instructions 4968, one or more other devices, circuits, or modules configured to generate the control message and to determine the first delay, or a combination thereof. The control message may include an acknowledgement (ACK) or a trigger message.

The apparatus further includes means for transmitting configured to send the control message to the provider device upon expiration of a delay period. For example, the means for transmitting may include the transceiver 136, one or more other devices, circuits, or modules configured to send the control message to the provider device upon expiration of the delay period, or a combination thereof. The delay period may be based on the first delay.

Also, in conjunction with the described aspects, an apparatus includes means for generating a traffic advertisement indicating availability of data to be sent to multiple devices. For example, the means for generating may include the traffic advertisement generator 130, one or more other devices, circuits, or modules configured to generate the traffic advertisement, or a combination thereof.

The apparatus also includes means for sending the traffic advertisement during a paging window. For example, the means for sending may include the traffic advertisement generator 130, the transceiver 136, one or more other devices, circuits, or modules configured to send the traffic advertisement and to refrain from sending the first data, or a combination thereof. The means for sending may be configured to, in response to receiving an unavailable message from a first device of the multiple devices during a data transmission window that is subsequent to the paging window, refrain from sending first data to the first device during the data transmission window.

The apparatus further includes means for receiving the unavailable message from the first device during the data transmission window. For example, the means for receiving may include the traffic advertisement generator 130, the transceiver 136, one or more other devices, circuits, or modules configured to receive the unavailable message, or a combination thereof.

Further, in conjunction with the described aspects, an apparatus includes means for receiving a traffic advertisement from a particular device during a paging window. For example, the means for receiving may include the traffic advertisement analyzer 134, the transceiver 136, one or more other devices, circuits, or modules configured to receive the traffic advertisement, or a combination thereof. The traffic advertisement 128 may indicate availability of data to be sent by the provider device 104.

The apparatus may also include means for determining that the apparatus is unavailable to receive the data during a data transmission window. For example, the means for determining may include the traffic advertisement analyzer 134, one or more other devices, circuits, or modules configured to determine that the apparatus is unavailable to receive the data, or a combination thereof.

The apparatus may further include means for sending an unavailable message to the particular device during the data transmission window in response to the determination that the apparatus is unavailable to receive the data. For example, the means for sending may include the traffic advertisement analyzer 134, the transceiver 136, one or more other devices, circuits, or modules configured to send the unavailable message, or a combination thereof.

Also, in conjunction with the described aspects, an apparatus includes means for generating a traffic advertisement indicating availability of data to be sent to multiple devices. For example, the means for generating may include the traffic advertisement generator 130, one or more other devices, circuits, or modules configured to generate the traffic advertisement, or a combination thereof. The data includes first data to be sent to the first subscriber device 106 and second data to be sent to the second subscriber device 108.

The apparatus also includes means for sending the traffic advertisement during a paging window and, in response to receiving a partially available message from the first device, sending the first data to the first device during a data transmission window prior to sending the second data to the second device during the data transmission window. For example, the means for sending the traffic advertisement and sending the first data may include the traffic advertisement generator 130, the transceiver 136, one or more other devices, circuits, or modules configured to send the traffic advertisement and to send the first data, or a combination thereof. The data transmission window may be subsequent to the paging window.

The apparatus further includes means for receiving the partially available message from the first device during the paging window or the data transmission window. For example, the means for receiving may include the traffic advertisement generator 130, the transceiver 136, one or more other devices, circuits, or modules configured to receive the partially available message, or a combination thereof.

Further, in conjunction with the described aspects, an apparatus includes means for receiving a traffic advertisement from a particular device during a paging window. For example, the means for receiving may include the traffic advertisement analyzer 134, the transceiver 136, one or more other devices, circuits, or modules configured to receive the traffic advertisement, or a combination thereof. The traffic advertisement may indicate availability of data to be sent by the particular device.

The apparatus also includes means for determining that the apparatus is expected to be unavailable to receive the data during a portion of a data transmission window that is subsequent to the paging window. For example, the means for determining may include the traffic advertisement analyzer 134, one or more other devices, circuits, or modules configured to determine that the apparatus is expected to be unavailable, or a combination thereof.

The apparatus further includes means for sending a partially available message to the particular device during the paging window or the data transmission window in response to the determination that the apparatus is expected to be unavailable. For example, the means for sending may include the traffic advertisement analyzer 134, the transceiver 136, one or more other devices, circuits, or modules configured to send the partially available message, or a combination thereof.

Also, in conjunction with the described aspects, an apparatus includes means for generating a traffic advertisement indicating availability of data to be sent to multiple devices. For example, the means for generating may include the traffic advertisement generator 130, one or more other devices, circuits, or modules configured to generate the traffic advertisement, or a combination thereof.

The apparatus also includes means for sending the traffic advertisement during a paging window. For example, the means for sending may include the traffic advertisement generator 130, the transceiver 136, one or more other devices, circuits, or modules configured to send the traffic advertisement, or a combination thereof.

The apparatus further includes means for monitoring a communication channel during a first portion of a data transmission window irrespective of whether an acknowledgement (ACK) is received during the paging window. For example, the means for monitoring may include the traffic advertisement generator 130, the transceiver 136, one or more other devices, circuits, or modules configured to monitor the communication channel, or a combination thereof. The data transmission window may be subsequent to the paging window.

Further, in conjunction with the described aspects, an apparatus includes means for receiving a packet at a first device from a second device. For example, the means for receiving may include the transceiver 136, the wireless interface 4940, one or more other devices, circuits, or modules configured to receive the packet, or a combination thereof. The first device may be configured to operate in a promiscuous mode.

The apparatus also include means for selectively processing the packet. For example, the means for selectively processing may include the traffic advertisement generator 130, the traffic advertisement analyzer 134, the processor 4910, one or more other devices, circuits, or modules configured to selectively process the packet, or a combination thereof. The packet may be selectively processed based on determining that the first device is associated with the second device, that the packet includes a group identifier of a group of devices including the first device, that the packet corresponds to an active traffic session between the first device and the second device, or a combination thereof. The group of devices may correspond to a NDL group of a NAN cluster. The group identifier may correspond to an NDL group identifier, a NAN cluster identifier, or another value that is compliant with an IEEE 802.11 specification.

Also, in conjunction with the described aspects, an apparatus includes means for generating a frame having a neighbor aware network (NAN) service discovery frame format, a NAN management frame format, or both. For example, the means for generating may include the traffic advertisement generator 130, the processor 4910, one or more other devices, circuits, or modules configured to generate the frame, or a combination thereof. The frame may include a traffic announcement attribute that indicates availability of data to be sent.

The apparatus also includes means for sending the frame during a communication window. For example, the means for sending the frame may include the transceiver 136, the wireless interface 4940, one or more other devices, circuits, or modules configured to send the frame, or a combination thereof.

Further, in conjunction with the described aspects, an apparatus includes means for receiving a frame from a device. For example, the means for receiving may include the transceiver 136, the wireless interface 4940, one or more other devices, circuits, or modules configured to receive the frame, or a combination thereof. The frame may have a neighbor aware network (NAN) service discovery frame format.

The apparatus also includes means for monitoring a communication channel during a neighbor aware network (NAN) data link (NDL) time block based on determining that the frame includes a traffic announcement attribute indicating availability of data to be sent by the device to one or more second devices. For example, the means for monitoring may include the traffic advertisement analyzer 134, the processor 4910, one or more other devices, circuits, or modules configured to selectively process the packet, or a combination thereof.

Also, in conjunction with the described aspects, an apparatus includes means for generating a traffic advertisement indicating availability of data to be sent to at least one second device. For example, the means for generating may include the traffic advertisement generator 130, the processor 4910, one or more other devices, circuits, or modules configured to generate the traffic advertisement, or a combination thereof.

The apparatus also includes means for sending the traffic advertisement during an initial portion of a neighbor aware network (NAN) data link (NDL) time block and sending first data to the second device during the NDL time block. For example, the means for sending may include the transceiver 136, the wireless interface 4940, one or more other devices, circuits, or modules configured to send the traffic advertisement, or a combination thereof. The first data may be sent independently of receiving an acknowledgement (ACK) responsive to the traffic advertisement from the second device.

Further, in conjunction with described aspects, an apparatus includes means for receiving a traffic advertisement at a first device from a second device during an initial portion of a neighbor aware network (NAN) data link (NDL) time block. For example, the means for receiving may include the transceiver 136, the wireless interface 4940, one or more other devices, circuits, or modules configured to receive the traffic advertisement, or a combination thereof. The traffic advertisement may indicate availability of data to be sent by the second device to one or more recipient devices.

The apparatus also includes means for monitoring a communication channel during at least a first portion of the NDL time block based on determining that the first device is included in the one or more recipient devices. For example, the means for monitoring may include the traffic advertisement analyzer 134, the processor 4910, one or more other devices, circuits, or modules configured to monitor the communication channel, or a combination thereof. The communication channel may be monitored independently of whether an acknowledgment (ACK) responsive to the traffic advertisement is detected from the one or more recipient devices.

Also, in conjunction with described aspects, an apparatus includes means for generating a traffic page at a first device indicating that the first device will not send data to a second device during neighbor aware network (NAN) data link (NDL) time block. For example, the means for generating a traffic page may include the traffic advertisement generator 130, the processor 4910, one or more other devices, circuits, or modules configured to generate the traffic page, or a combination thereof.

The apparatus also includes means for transmitting the traffic page during the NDL time block. For example, the means for transmitting may include the transceiver 136, the wireless interface 4940, one or more other devices, circuits, or modules configured to transmit the traffic page, or a combination thereof.

Further, in conjunction with described aspects, an apparatus includes means for receiving a traffic page at a first device from a second device. For example, the means for receiving may include the transceiver 136, the wireless interface 4940, one or more other devices, circuits, or modules configured to receive the traffic page, or a combination thereof. The traffic page may indicate that the second device will not send data to one or more non-recipient devices.

The apparatus also includes means for determining whether to monitor a communication channel during a first portion of a neighbor aware network (NAN) data link (NDL) time block based on whether the first device is included in the one or more non-recipient devices. For example, the means for determining whether to monitor may include the traffic advertisement analyzer 134, the processor 4910, one or more other devices, circuits, or modules configured to monitor the communication channel, or a combination thereof.

Also, in conjunction with described aspects, an apparatus includes means for monitoring a communication channel at a first device during a neighbor aware network (NAN) data link (NDL) time block independently of receiving a traffic advertisement from a second device indicating that the second device will send first data to the first device during the NDL time block. For example, the means for monitoring may include the traffic advertisement analyzer 134, the processor 4910, one or more other devices, circuits, or modules configured to monitor the communication channel, or a combination thereof.

The apparatus also includes means for receiving the first data from the second device during the NDL time block. For example, the means for receiving may include the transceiver 136, the wireless interface 4940, one or more other devices, circuits, or modules configured to receive the first data, or a combination thereof.

Further, in conjunction with described aspects, an apparatus includes means for generating, at a first device, a notice of absence indicating that the first device is unavailable to participate in at least one neighbor aware network (NAN) data link (NDL) group. For example, the means for generating may include the traffic advertisement analyzer 134, the processor 4910, one or more other devices, circuits, or modules configured to generate the notice of absence, or a combination thereof.

The apparatus also includes means for transmitting the notice of absence during a NAN discovery window. For example, the means for transmitting the notice of absence may include the transceiver 136, the wireless interface 4940, one or more other devices, circuits, or modules configured to transmit the notice of absence, or a combination thereof.

Also, in conjunction with described aspects, an apparatus includes means for receiving a notice of absence from a device during a neighbor aware network (NAN) discovery window. For example, the means for receiving may include the transceiver 136, the wireless interface 4940, one or more other devices, circuits, or modules configured to receive the notice of absence, or a combination thereof. The notice of absence may indicate that the device is unavailable to participate in at least one NAN data link (NDL) group.

The apparatus also includes means for determining that first data associated with the at least one NDL group is not to be sent to the device during at least a portion of one or more discovery intervals subsequent to the NAN discovery window. For example, the means for determining may include the traffic advertisement generator 130, the processor 4910, one or more other devices, circuits, or modules configured to determine that first data is not to be sent, or a combination thereof.

The apparatus may further include means for sending second data associated with a second NDL group to the device during an NDL time block corresponding to the second NDL group in response to determining that the at least one NDL group does not include the second NDL group. For example, the means for sending may include the transceiver 136, the wireless interface 4940, one or more other devices, circuits, or modules configured to send second data, or a combination thereof. The NDL time block may occur during the portion of the one or more discovery intervals. The NDL time block may correspond to a transmission window (e.g., the transmission window 740 of FIG. 7). For example, the NDL time block may include the paging window 212, the data transmission window 218, or both.

Further, in conjunction with described aspects, an apparatus includes means for exchanging a negotiation message with a device. For example, the means for exchanging may include the transceiver 136, the wireless interface 4940, one or more other devices, circuits, or modules configured to exchange the negotiation message, or a combination thereof.

The apparatus also includes means for determining whether to send a traffic message during a neighbor aware network (NAN) data link (NDL) time block based on the negotiation message. For example, the means for determining may include the traffic advertisement generator 130, the processor 4910, one or more other devices, circuits, or modules configured to determine whether to send the traffic message, or a combination thereof.

Also, in conjunction with described aspects, an apparatus includes means for exchanging a negotiation message with a device and receiving a traffic message from the device. For example, the means for exchanging may include the transceiver 136, the wireless interface 4940, one or more other devices, circuits, or modules configured to exchange the negotiation message, or a combination thereof.

The apparatus also includes means for selectively processing the traffic message based on the negotiation message. For example, the means for selectively processing may include the traffic advertisement analyzer 134, the processor 4910, one or more other devices, circuits, or modules configured to selectively process the traffic message, or a combination thereof. To illustrate, the means for selectively processing the traffic message may process the traffic message 1930 of FIG. 19 in response to determining that the negotiation message (e.g., the first negotiation message 1928, the second negotiation message 1938, or both) indicates a power save request, as described with reference to FIG. 19. Alternatively, the means for selectively processing may refrain from processing the traffic message 1930 in response to determining that the negotiation message (e.g., the first negotiation message 1928, the second negotiation message 1938, or both) does not indicate a power save request, as described with reference to FIG. 19.

Further, in conjunction with described aspects, an apparatus includes means for generating a service advertisement indicating that traffic messaging is supported. For example, the means for generating may include the traffic advertisement generator 130, the processor 4910, one or more other devices, circuits, or modules configured to generate the service advertisement, or a combination thereof. Traffic messaging may include traffic advertising indicating availability of data to be sent to one or more recipient devices, traffic paging indicating that data is not to be sent to one or more non-recipient devices, or both.

The apparatus also includes means for transmitting the service advertisement. For example, the means for transmitting may include the transceiver 136, the wireless interface 4940, one or more other devices, circuits, or modules configured to transmit the service advertisement, or a combination thereof.

With regard to the described aspects, those of skill in the art would further appreciate that the various illustrative logical blocks, configurations, modules, circuits, and algorithm steps described in connection with the aspects disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the aspects disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient (e.g., non-transitory) storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed aspects is provided to enable a person skilled in the art to make or use the disclosed aspects. Various modifications to these aspects will be readily apparent to those skilled in the art, and the principles defined herein may be applied to other aspects without departing from the scope of the disclosure. Thus, the present disclosure is not intended to be limited to the aspects shown herein but is to be accorded the widest scope possible consistent with the principles and novel features as defined by the following claims.

What is claimed is:

1. A method of communication comprising:
   generating a traffic advertisement at a particular device, the traffic advertisement indicating availability of data to be sent by the particular device to multiple devices;
   sending, from the particular device, the traffic advertisement during a paging window;
   receiving a limited availability message from a first device of the multiple devices;
   receiving an available message from a second device of the multiple devices;
   sending first data from the particular device to the first device during a data transmission window prior to sending second data from the particular device to the second device during the data transmission window, wherein the data transmission window is subsequent to the paging window;
   subsequent to sending the first data from the particular device to the first device, receiving an unavailable message from the first device during the data transmission window; and
   in response to receiving the unavailable message from the first device, refraining from sending particular data from the particular device to the first device during the data transmission window.

2. The method of claim 1, further comprising, prior to receiving the unavailable message from the first device, receiving an available message from the first device indicating availability of the first device to receive traffic during the data transmission window.

3. The method of claim 2, wherein the available message includes an acknowledgement (ACK) or a trigger message.

4. The method of claim 1, wherein a particular logical channel corresponds to a particular communication channel and at least one transmission window, wherein one or more devices of a set of devices monitor the particular communication channel during the paging window, and wherein the set of devices includes the multiple devices.

5. The method of claim 4, wherein a particular transmission window of the at least one transmission window includes the paging window and the data transmission window, wherein the paging window corresponds to a beginning portion of the particular transmission window, and wherein the data transmission window corresponds to a second portion of the particular transmission window that is subsequent to the beginning portion.

6. The method of claim 4, wherein the traffic advertisement is sent by the particular device via the particular communication channel during the paging window.

7. The method of claim 1, wherein the second data is sent from the particular device to the second device subsequent to receiving the unavailable message from the first device.

8. A computer-readable storage device storing instructions that, when executed by a processor, cause the processor to perform operations comprising:
- receiving a traffic advertisement at a first device from a particular device during a paging window, the traffic advertisement indicating availability of data to be sent by the particular device;
- determining, during a data transmission window, that the first device is unavailable to receive the data; and
- in response to the determination, sending an unavailable message from the first device to the particular device during the data transmission window, wherein the unavailable message includes a quality of service null (QoS_NULL) frame or another frame, and wherein a particular value of a power management bit of a frame control field of a media access control (MAC) header of the unavailable message indicates that the first device is unavailable to receive the data.

9. The computer-readable storage device of claim 8, wherein the operations further comprise:
- prior to determining that the first device is unavailable to receive the data, sending a trigger message from the first device to the particular device during the data transmission window; and
- receiving first data from the particular device during the data transmission window.

10. The computer-readable storage device of claim 8, wherein the operations further comprise, subsequent to sending the unavailable message from the first device to the particular device, transitioning the first device to a low-power operating mode or performing actions related to another network during a remaining portion of the data transmission window.

11. The computer-readable storage device of claim 10, wherein the actions include participating in the other network, communicating with at least one device of the other network, or both.

12. The computer-readable storage device of claim 10, wherein the traffic advertisement is associated with a first neighbor aware network (NAN) data link (NDL) group, and wherein the other network includes a second NDL group, an access point (AP) based network, an infrastructure (Infra) based network, an independent basic service set (IBSS) network, or a wireless fidelity (WiFi) direct network.

13. The computer-readable storage device of claim 8, wherein the first device comprises a data sink.

14. An apparatus comprising:
- a processor configured to generate a traffic advertisement, the traffic advertisement indicating availability of data to be sent to multiple devices, wherein the data includes first data to be sent to a first device of the multiple devices and second data to be sent to a second device of the multiple devices;
- a transmitter configured to send the traffic advertisement during a paging window; and
- a receiver configured to receive a limited availability message from the first device,
- wherein the transmitter is further configured to, in response to determining that the limited availability message has been received from the first device, send the first data to the first device during a data transmission window prior to sending the second data to the second device during the data transmission window, wherein the data transmission window is subsequent to the paging window.

15. The apparatus of claim 14, wherein the limited availability message is received during the paging window or the data transmission window.

16. The apparatus of claim 14, wherein the limited availability message is received prior to the paging window during neighbor aware network (NAN) data link (NDL) setup or NDL schedule negotiation, wherein the receiver is further configured to receive a first trigger message from the first device and to receive a second trigger message from the second device, wherein the first data is sent to the first device responsive to the first trigger message and the second data is sent to the second device responsive to the second trigger message, and wherein, based on determining that the limited availability message has been received from the first device, the first data is sent prior to the second data.

17. The apparatus of claim 14, wherein the limited availability message includes a trigger message, an acknowledgement (ACK), or another message.

18. The apparatus of claim 14, wherein the multiple devices include a set of subscriber devices of a neighbor aware network (NAN) data path group.

19. The apparatus of claim 14, wherein the limited availability message indicates that the first device is expected to be partially available during the data transmission window.

20. The apparatus of claim 14, wherein the processor is further configured to:
- receive a notice of absence from a first particular device during a neighbor aware network (NAN) discovery window, the notice of absence indicating that the first particular device is unavailable to participate in at least one NAN data link (NDL) group; and
- determine that first data associated with the at least one NDL group is not to be sent to the first particular device during at least a portion of one or more discovery intervals subsequent to the NAN discovery window.

21. The apparatus of claim 20, wherein the traffic advertisement is associated with the at least one NDL group, and wherein the first particular device is not included in the multiple devices based on detecting receipt of the notice of absence from the first particular device.

22. The apparatus of claim 20, wherein the traffic advertisement is associated with a second NDL group, and wherein the first particular device is included in the multiple devices based on detecting that the at least one NDL group does not include the second NDL group.

23. The apparatus of claim 22, wherein the traffic advertisement is sent during an NDL time block that occurs during the portion of the one or more discovery intervals.

24. A computer-readable storage device storing instructions that, when executed by a processor, cause the processor to perform operations comprising:
- receiving a traffic advertisement at a first device from a particular device during a paging window, the traffic advertisement indicating availability of data to be sent by the particular device;
- determining that the first device is expected to be unavailable during a portion of a data transmission window that is subsequent to the paging window;
- in response to determining that the first device is expected to be unavailable during the portion of the data transmission window, sending a limited availability message from the first device to the particular device to cause the particular device to prioritize data transmission such that first data is sent to the first device prior to sending of second data to one or more devices that are available during the data transmission window;

receiving the first data at the first device from the particular device during the data transmission window;

subsequent to receiving the first data, determining that the first device is unavailable during a remaining portion of the data transmission window; and in response to determining that the first device is unavailable during the remaining portion of the data transmission window, sending an unavailable message from the first device to the particular device during the data transmission window.

25. The computer-readable storage device of claim 24, wherein the limited availability message indicates that the first device is expected to be partially available during the data transmission window.

26. The computer-readable storage device of claim 24, wherein the limited availability message includes a trigger message, an acknowledgement (ACK), or another message.

* * * * *